(12) United States Patent
Herranz et al.

(10) Patent No.: US 12,088,131 B2
(45) Date of Patent: Sep. 10, 2024

(54) POWER DISTRIBUTION AND CIRCUIT PROTECTION FOR A MOBILE APPLICATION HAVING A HIGH EFFICIENCY INVERTER

(71) Applicant: Eaton Intelligent Power Limited, Dublin (IE)

(72) Inventors: Patrick Herranz, Tassin-la-Demi-Lune (FR); Sankararao Pudi, Munich (DE); Roshan Kumar Pappu, Munich (DE); Hariharakumaran Dorairaj, Munich (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 220 days.

(21) Appl. No.: 17/647,549

(22) Filed: Jan. 10, 2022

(65) Prior Publication Data

US 2022/0131398 A1 Apr. 28, 2022

Related U.S. Application Data

(63) Continuation of application No. PCT/EP2020/069987, filed on Jul. 15, 2020, which is
(Continued)

(30) Foreign Application Priority Data

Sep. 10, 2019 (IN) .............................. 201911036406

(51) Int. Cl.
*B60L 53/62* (2019.01)
*B60L 53/63* (2019.01)
(Continued)

(52) U.S. Cl.
CPC .......... *H02J 7/00304* (2020.01); *B60L 53/62* (2019.02); *B60L 53/63* (2019.02); *B60L 58/12* (2019.02);
(Continued)

(58) Field of Classification Search
CPC .......... B60L 53/62; B60L 53/63; B60L 53/66; B60L 58/12; B60L 58/20;
(Continued)

(56) References Cited

U.S. PATENT DOCUMENTS 2,545,639 A 3/1951 Wolff et al.
2,618,688 A 11/1952 Pulvari
(Continued)

FOREIGN PATENT DOCUMENTS

CN 101499673 A 8/2009
CN 102903580 A 1/2013
(Continued)

OTHER PUBLICATIONS

"Second Quarter 2019 Results", Delphi Technologies [PowerPoint Slides], Aug. 1, 2019, 26 pages.
(Continued)

*Primary Examiner* — Levi Gannon
(74) *Attorney, Agent, or Firm* — Talem IP Law, LLP

(57) ABSTRACT

A system includes an electric mobile application having a configurable charging circuit, the configurable charging circuit including an AC charging circuit couplable to a charging station on a first side, a DC charging circuit selectively couplable to a high voltage battery of the electric mobile application on a first side, and a switch interposed between the AC and DC charging circuits, where the switch provides selective coupling between the AC charging circuit on a second side and the DC charging circuit on a second side, where the switch in a first position couples the AC charging
(Continued)

circuit to the DC charging circuit through a first inductive coupling arrangement utilizing a magnetic component, and where the switch in a second position couples the AC charging circuit to the DC charging circuit through a second inductive coupling arrangement utilizing the magnetic component.

17 Claims, 82 Drawing Sheets

Related U.S. Application Data a continuation-in-part of application No. PCT/EP2020/057951, filed on Mar. 23, 2020.

(60) Provisional application No. 62/874,499, filed on Jul. 15, 2019.

(51) Int. Cl.
| | | |
|---|---|---|
| *B60L 58/12* | (2019.01) | |
| *B60L 58/20* | (2019.01) | |
| *H02H 3/087* | (2006.01) | |
| *H02J 7/00* | (2006.01) | |
| *H02J 7/34* | (2006.01) | |

(52) U.S. Cl.
CPC ............ *B60L 58/20* (2019.02); *H02H 3/087* (2013.01); *H02J 7/00032* (2020.01); *H02J 7/0013* (2013.01); *H02J 7/0048* (2020.01); *H02J 7/007194* (2020.01); *H02J 7/342* (2020.01); *B60L 2240/545* (2013.01); *B60L 2240/547* (2013.01)

(58) Field of Classification Search
CPC ......... B60L 2240/545; B60L 2240/547; H02H 3/087; H02J 7/00032; H02J 7/0013; H02J 7/00304; H02J 7/0048; H02J 7/007194; H02J 7/342
See application file for complete search history.

(56) References Cited

U.S. PATENT DOCUMENTS

| | | | |
|---|---|---|---|
| 2,749,454 | A | 6/1956 | Little et al. |
| 2,786,968 | A | 3/1957 | Kabak |
| 2,994,015 | A | 7/1961 | Edward |
| 3,147,467 | A | 9/1964 | Peter |
| 3,172,010 | A | 3/1965 | John |
| 3,211,958 | A | 10/1965 | Miller et al. |
| 3,240,930 | A | 3/1966 | Porter et al. |
| 3,272,949 | A | 9/1966 | Lawrence |
| 3,491,315 | A | 1/1970 | Kesselring |
| 3,718,875 | A | 2/1973 | Kussy et al. |
| 3,914,723 | A | 10/1975 | Goodbar |
| 4,023,127 | A | 5/1977 | Mune |
| 4,032,870 | A | 6/1977 | Oppel et al. |
| 4,181,922 | A | 1/1980 | Matsko et al. |
| 4,208,689 | A | 6/1980 | Dunham et al. |
| 4,213,165 | A | 7/1980 | Jansen et al. |
| 4,262,179 | A | 4/1981 | Bauer |
| 1,518,055 | A | 5/1985 | Yagi et al. |
| 4,633,207 | A | 12/1986 | McClellan et al. |
| 4,816,792 | A | 3/1989 | Belbel et al. |
| 4,879,535 | A | 11/1989 | Mori et al. |
| 4,893,102 | A | 1/1990 | Bauer |
| 4,982,060 | A | 1/1991 | Streich et al. |
| 5,020,801 | A | 6/1991 | Negron |
| 5,021,760 | A | 6/1991 | Krubsack et al. |
| 5,029,064 | A | 7/1991 | Ball |
| 5,047,603 | A | 9/1991 | Pardini |
| 5,539,608 | A | 7/1996 | Hurley et al. |
| 5,559,426 | A | 9/1996 | Shea et al. |
| 5,633,577 | A * | 5/1997 | Matsumae ............ H02J 7/0013 320/138 |
| 5,654,859 | A | 8/1997 | Shi |
| 5,796,175 | A | 8/1998 | Itoh et al. |
| 5,872,497 | A | 2/1999 | Yerkovich et al. |
| 6,020,801 | A | 2/2000 | Passow |
| 6,768,402 | B2 | 7/2004 | Davidson et al. |
| 6,894,463 | B2 | 5/2005 | Kernahan |
| 6,975,191 | B2 | 12/2005 | Ward |
| 7,030,641 | B1 | 4/2006 | Tang et al. |
| 7,210,304 | B2 | 5/2007 | Nagashima et al. |
| 7,514,990 | B1 | 4/2009 | Voo |
| 7,561,448 | B2 | 7/2009 | Katayama et al. |
| 7,595,710 | B2 | 9/2009 | Deboer et al. |
| 7,644,220 | B2 | 1/2010 | Moriyama et al. |
| 7,692,903 | B2 | 4/2010 | Dwyer et al. |
| 7,777,600 | B2 | 8/2010 | Brooks |
| 7,952,875 | B2 | 5/2011 | Woody et al. |
| 7,957,169 | B2 | 6/2011 | Nakajima et al. |
| 8,134,438 | B2 | 3/2012 | Brooks |
| 8,138,440 | B2 | 3/2012 | Onufriyenko et al. |
| 8,378,623 | B2 | 2/2013 | Kusch et al. |
| 8,520,381 | B2 | 8/2013 | Hobein et al. |
| 8,587,912 | B2 | 11/2013 | Jezierski et al. |
| 8,653,913 | B2 | 2/2014 | Vellaiyanaicken et al. |
| 8,805,314 | B2 | 8/2014 | Katsube et al. |
| 8,829,722 | B2 | 9/2014 | Kusch et al. |
| 8,981,727 | B2 | 3/2015 | Kusch et al. |
| 8,994,327 | B2 | 3/2015 | Kusch et al. |
| 9,130,421 | B2 | 9/2015 | Chamberlin et al. |
| 9,148,946 | B1 | 9/2015 | Singh et al. |
| 9,241,429 | B2 | 1/2016 | Kaneko et al. |
| 9,493,077 | B2 | 11/2016 | Yamasaki et al. |
| 9,504,191 | B2 | 11/2016 | Singh et al. |
| 9,520,764 | B1 | 12/2016 | Bundschuh et al. |
| 9,538,691 | B2 | 1/2017 | Kikuchi et al. |
| 9,691,562 | B2 | 6/2017 | Neuhaus |
| 9,726,726 | B2 | 8/2017 | Bock et al. |
| 9,758,047 | B2 | 9/2017 | Hou et al. |
| 9,923,546 | B2 | 3/2018 | Nagahisa et al. |
| 10,010,011 | B2 | 6/2018 | Donth et al. |
| 10,032,588 | B2 | 7/2018 | Gonzales et al. |
| 10,149,413 | B1 | 12/2018 | Dede et al. |
| 10,164,300 | B2 | 12/2018 | Lee et al. |
| 10,242,829 | B2 | 3/2019 | Hasegawa et al. |
| 10,269,520 | B2 | 4/2019 | Honick et al. |
| 10,288,665 | B2 | 5/2019 | Smith |
| 10,361,051 | B2 | 7/2019 | Bock et al. |
| 11,050,241 | B2 | 6/2021 | Fisher |
| 11,052,784 | B2 | 7/2021 | Mensch et al. |
| 11,063,421 | B2 | 7/2021 | Griffiths |
| 11,070,049 | B2 | 7/2021 | Mensch et al. |
| 11,075,514 | B2 | 7/2021 | Shah et al. |
| 11,081,874 | B2 | 8/2021 | Fisher |
| 11,081,875 | B2 | 8/2021 | Fisher |
| 11,088,533 | B2 | 8/2021 | Fisher |
| 11,095,115 | B2 | 8/2021 | Fisher |
| 11,095,116 | B2 | 8/2021 | Douglass |
| 11,101,639 | B2 | 8/2021 | Griffiths et al. |
| 11,108,225 | B2 | 8/2021 | Fisher |
| 11,114,840 | B2 | 9/2021 | Fisher |
| 11,121,540 | B2 | 9/2021 | Dukaric et al. |
| 11,128,124 | B2 | 9/2021 | Shah et al. |
| 11,128,125 | B2 | 9/2021 | Fisher |
| 11,152,781 | B2 | 10/2021 | Fisher |
| 11,159,008 | B2 | 10/2021 | Fisher |
| 11,183,833 | B2 | 11/2021 | Shah et al. |
| 2003/0142449 | A1 | 7/2003 | Iwata et al. |
| 2004/0105664 | A1 | 6/2004 | Ivankovic |
| 2004/0189319 | A1 | 9/2004 | Stanisic et al. |
| 2004/0207968 | A1 | 10/2004 | Martin et al. |
| 2005/0006956 | A1 | 1/2005 | Shi |
| 2007/0058303 | A1 | 3/2007 | Hirai et al. |
| 2007/0076355 | A1 | 4/2007 | Oohama |
| 2007/0290646 | A1 | 12/2007 | Hasenour et al. |
| 2008/0137253 | A1 | 6/2008 | George et al. |
| 2009/0057112 | A1 | 3/2009 | Bennett et al. |
| 2010/0172515 | A1 | 7/2010 | Kimura |
| 2011/0043307 | A1 | 2/2011 | Gonzales et al. |

(56) References Cited

U.S. PATENT DOCUMENTS

| | | |
|---|---|---|
| 2011/0101904 A1 | 5/2011 | Sakamoto |
| 2012/0068663 A1 | 3/2012 | Tanikawa et al. |
| 2012/0235626 A1* | 9/2012 | Oh ................... H02M 3/3353 |
| | | 320/103 |
| 2013/0062724 A1 | 3/2013 | Tokuyama et al. |
| 2013/0154352 A1 | 6/2013 | Tokarz et al. |
| 2013/0257375 A1 | 10/2013 | Ang et al. |
| 2013/0320905 A1 | 12/2013 | Uryu |
| 2014/0009162 A1 | 1/2014 | Barrenscheen et al. |
| 2014/0092655 A1 | 4/2014 | Igarashi et al. |
| 2014/0103860 A1* | 4/2014 | Kominami .............. B60L 1/003 |
| | | 320/108 |
| 2014/0151337 A1 | 6/2014 | Hiraiwa et al. |
| 2014/0265743 A1 | 9/2014 | Chamberlin et al. |
| 2014/0316735 A1 | 10/2014 | Jao et al. |
| 2015/0084724 A1 | 3/2015 | Gonzales et al. |
| 2016/0169945 A1 | 6/2016 | Mauder et al. |
| 2016/0233777 A1 | 8/2016 | Murakami et al. |
| 2016/0380563 A1 | 12/2016 | Fukuta |
| 2017/0368941 A1 | 12/2017 | Chow |
| 2018/0182587 A1 | 6/2018 | Koepf et al. |
| 2018/0222333 A1 | 8/2018 | Khaligh et al. |
| 2019/0140245 A1 | 5/2019 | Mensch et al. |
| 2019/0143822 A1* | 5/2019 | Malek ............... H02M 3/33584 |
| | | 320/109 |
| 2019/0296541 A1 | 9/2019 | Mensch et al. |
| 2020/0114776 A1 | 4/2020 | Fisher |
| 2020/0114777 A1 | 4/2020 | Fisher et al. |
| 2020/0114778 A1 | 4/2020 | Fisher |
| 2020/0114779 A1 | 4/2020 | Fisher et al. |
| 2020/0114780 A1 | 4/2020 | Douglass et al. |
| 2020/0114781 A1 | 4/2020 | Douglass |
| 2020/0114782 A1 | 4/2020 | Douglass |
| 2020/0114783 A1 | 4/2020 | Douglass |
| 2020/0114784 A1 | 4/2020 | Fisher |
| 2020/0119542 A1 | 4/2020 | Fisher |
| 2020/0119543 A1 | 4/2020 | Fisher |
| 2020/0119544 A1 | 4/2020 | Fisher |
| 2020/0144809 A1 | 5/2020 | Fisher |
| 2020/0185907 A1 | 6/2020 | Griffiths |
| 2020/0185908 A1 | 6/2020 | Shah et al. |
| 2020/0185909 A1 | 6/2020 | Fisher |
| 2020/0194995 A1 | 6/2020 | Shah et al. |
| 2020/0194996 A1 | 6/2020 | Fisher |
| 2020/0194997 A1 | 6/2020 | Fisher |
| 2020/0194998 A1 | 6/2020 | Fisher |
| 2020/0194999 A1 | 6/2020 | Fisher |
| 2020/0195000 A1 | 6/2020 | Douglass |
| 2020/0195001 A1 | 6/2020 | Griffiths |
| 2020/0235564 A1 | 7/2020 | Shah et al. |
| 2020/0235565 A1 | 7/2020 | Griffiths et al. |
| 2020/0235566 A1 | 7/2020 | Fisher |
| 2020/0235567 A1 | 7/2020 | Griffiths et al. |
| 2020/0274375 A1 | 8/2020 | Griffiths et al. |
| 2020/0381915 A1 | 12/2020 | Mensch et al. |
| 2021/0006061 A9 | 1/2021 | Shah et al. |
| 2021/0036505 A9 | 2/2021 | Fisher |
| 2021/0044102 A9 | 2/2021 | Douglass |
| 2021/0083470 A9 | 3/2021 | Fisher |
| 2021/0111552 A9 | 4/2021 | Fisher |
| 2021/0155100 A1* | 5/2021 | Khaligh .............. H02M 1/4208 |
| 2021/0184455 A9 | 6/2021 | Fisher |
| 2021/0218242 A1 | 7/2021 | Mensch et al. |

FOREIGN PATENT DOCUMENTS

| | | |
|---|---|---|
| DE | 102009023801 A1 | 2/2010 |
| DE | 102012224223 A1 | 7/2014 |
| EP | 3017992 A1 | 5/2016 |
| EP | 3608153 A1 | 2/2020 |
| FR | 2741994 A1 | 6/1997 |
| FR | 3041143 A1 | 3/2017 |
| GB | 201811874 | 9/2018 |
| JP | H08154311 A | 6/1996 |
| JP | H09284902 A | 10/1997 |
| JP | H10322880 A | 12/1998 |
| JP | 2000324674 A | 11/2000 |
| JP | 2001078350 A | 3/2001 |
| JP | 5675337 B2 | 1/2015 |
| JP | 2016205866 A | 12/2016 |
| JP | 2017139902 A | 8/2017 |
| JP | 6255429 B2 | 12/2017 |
| KR | 20140030458 A | 3/2014 |
| KR | 20160119604 A | 10/2016 |
| WO | 2011141785 A1 | 11/2011 |
| WO | 2018186573 A1 | 10/2018 |
| WO | 2019092103 A2 | 5/2019 |
| WO | 2019092103 A3 | 7/2019 |
| WO | 2019197459 A2 | 10/2019 |
| WO | 2019197459 A3 | 2/2020 |
| WO | 2020193466 A1 | 10/2020 |
| WO | 2021009217 A2 | 1/2021 |
| WO | 2021009217 A3 | 3/2021 |

OTHER PUBLICATIONS 1811874.5, "United Kingdom Application Serial No. 1811874.5, Search Report dated Jan. 7, 2019", 5 pages.

Floyd, Thomas L., "Electronic Devices Fourth edition", 1996, pp. 839, 850-852.

PCT/EP18/80611, "International Application Serial No. PCT/EP18/80611, International Search Report and Written Opinion dated Jun. 18, 2019", Eaton Corporation, 21 pages.

PCT/EP18/80611, "International Application Serial No. PCT/EP18/80611, Invitation to Pay Additional Fees and, Where Applicable, Protest Fee", Eaton Corporation, 12 pages.

PCT/EP2019/059070, "International Application Serial No. PCT/EP2019/059070, International Preliminary Report on Patentability dated Oct. 13, 2020", Eaton Intelligent Power Limited, 29 pages.

PCT/EP2019/059070, "International Application Serial No. PCT/EP2019/059070, International Search Report and Written Opinion dated Jan. 7, 2020", Eaton Corporation, 39 pages.

PCT/EP2019/059070, "International Application Serial No. PCT/EP2019/059070, Invitation to Pay Additional Fees and, Where Applicable, Protest Fee dated Aug. 27, 2019", Eaton Corporation, 14 pages.

PCT/EP2020/057951, "International Application Serial No. PCT/EP2020/057951, International Search Report and Written Opinion dated Aug. 14, 2020", Eaton Intelligent Power Limited, 23 pages.

PCT/EP2020/057951, "International Application Serial No. PCT/EP2020/057951, Invitation to Pay Additional Fees and, Where Applicable, Protest Fee dated Jun. 24, 2020", Eaton Intelligent Power Limited, 16 pages.

PCT/EP2020/069987, "International Application Serial No. PCT/EP2020/069987, International Search Report and Written Opinion dated Feb. 19, 2021", Eaton Intelligent Power Limited, 17 pages.

PCT/EP2020/069987, "International Application Serial No. PCT/EP2020/069987, Invitation to Pay Additional Fees and, Where Applicable, Protest Fee dated Oct. 26, 2020", Eaton Intelligent Power Limited, 12 pages.

* cited by examiner

POWER DISTRIBUTION AND CIRCUIT PROTECTION FOR A MOBILE APPLICATION HAVING A HIGH EFFICIENCY INVERTER

CLAIM OF PRIORITY

This application claims priority to, and is a bypass continuation of, International Application Serial No. PCT/EP2020/069987, filed Jul. 15, 2020, and entitled "POWER DISTRIBUTION AND CIRCUIT PROTECTION FOR A MOBILE APPLICATION HAVING A HIGH EFFICIENCY INVERTER" (EATN-2602-WO).

International Application Serial No. PCT/EP2020/069987 (EATN-2602-WO) claims priority to, and is a continuation-in-part of, International Application Serial No. PCT/EP2020/057951, filed 23 Mar. 2020, and entitled "POWER DISTRIBUTION AND CIRCUIT PROTECTION FOR A MOBILE APPLICATION HAVING A HIGH EFFICIENCY INVERTER" (EATN-2600-WO). International Application Serial No. PCT/EP2020/069987 (EATN-2602-WO) also claims priority to U.S. Provisional Application No. 62/874,499, filed 15 Jul. 2019 entitled "INTEGRATED ON-BOARD CHARGER AND DIRECT CURRENT CONVERTER" (EATN-2116-P01), and to Indian Provisional Patent Application Serial No. 201911036406, filed 10 Sep. 2019, and entitled "ARCHITECTURE FOR COIL FAULTS DETECTION IN RELAY USED IN EV APPLICATION" (EATN-2025-P01-IN).

International Application PCT/EP2020/057951 (EATN-2600-WO) claims priority to Indian Provisional Patent Application Serial No. 201911036406, filed 10 Sep. 2019, and entitled "ARCHITECTURE FOR COIL FAULTS DETECTION IN RELAY USED IN EV APPLICATION" (EATN-2025-P01-IN).

All of the above patent documents are incorporated herein by reference in their entirety.

FIELD

Without limitation to a particular field of technology, the present disclosure is directed to electrical power distribution and circuit protection, and more particularly to electronic power distribution and circuit protection for highly variable load applications.

BACKGROUND

Electrical power distribution in many applications is subject to a number of challenges. Applications having a highly variable load, such as mobile applications or vehicles, subject fuses in the power channels to rapid swings in power throughput and induce thermal and mechanical stresses on the fuses. Certain applications have a high cost for downtime of the application. Certain applications, including mobile applications, are subject to additional drawbacks from loss of power, such as loss of mobility of the application unexpectedly, including at an inconvenient location, while in traffic, or the like. Electrical systems in many applications are complex, with multiple components in the system, and variations in the wiring and environment of the electrical system, leading to variations in the electrical system response, introduction of noise, variations in system resonant frequencies, and/or variations in system capacitance and/or inductance, even for nominally identical installations. These complexities introduce additional challenges for high resolution and/or highly precise determinations of the electrical characteristics of aspects of the system. Additionally, highly variable and/or mobile systems provide additional challenges for diagnostics and determinations about aspects of the electrical system, as highly invasive active determinations may not be acceptable to application performance, and/or the system may not provide many opportunities, or only brief opportunities, for making determinations about the electrical system.

Electric mobile applications, such as electric vehicles and high-capability hybrid vehicles provide numerous challenges for previously known inverter and power electronics systems. Mobile applications include on-highway vehicles, off-highway vehicles, commercial and passenger car vehicles, and/or off road applications including any type of vehicle or mobile equipment.

For example, many mobile applications, such as commercial and passenger vehicles, are highly cost sensitive to both initial costs of a system, and to ongoing operating costs. Additionally, downtime for service, maintenance, or system failures has a very high cost, due to large volumes and competitive markets. Accordingly, even modest improvements to initial costs, operating costs, and reliability can make a significant impact on the outcome of the system, or make a non-marketable system competitive.

Mobile applications have limited space and weight available for components of the drive system. For example, vehicle sizing and fuel efficiency concerns drive many applications to reduce both the size and the weight of the vehicle, and to accommodate vehicle shape for aerodynamics, according to the specific application, and/or according to user or customer preferences. Additionally, mobile applications have a large number of features, and application requirements and customer preferences are such that additional features are almost always value added if the system can accommodate them while meeting other constraints. Accordingly, reducing the size and weight of a given component provides value to the application, whether through a net reduction of the application size and weight, or through the ability to accommodate additional features within the same size and weight.

Mobile applications generally have a large number of components, and often many of the components are provided by third parties and integrated by a primary manufacturer or original equipment manufacturer (OEM). Accordingly, reductions in the size or weight of a component provide for easier integration of components, and/or are required to accommodate a limited space claim during the design phase, upgrades, retro-fits, or the like. Additionally, both the large number of components and the integration of many components from separate component providers introduce complexities into the integration of the mobile application. Further, each component and sub-component, and each interface between components, creates a failure point that can cause a service event, undesirable operation, application downtime, and/or a mission disabling failure. Failures occurring in mobile applications often occur at a location that is inconvenient for service access, and may require moving the degraded or disabled vehicle to a service location before the failure can be corrected. Accordingly, components that have a reduced number of sub-components, that can utilize standardized interfaces, and/or that have a reduced number of interfaces are desirable for mobile applications. Some mobile applications are produced in very high volume, and even modest reductions in either the number of interfaces or the number of sub-components can add high value to the system.

Some mobile applications are produced in small volumes with short engineering design time, and accordingly a reduction in the number of interfaces can greatly reduce the design cycle time, providing a significant benefit where engineering costs cannot be distributed across a high volume of products. Some mobile applications are produced as retro-fit or upgrades, and/or include a number of options where a component may appear on certain models or versions of the mobile application, but may not be on other models or versions, and/or may be installed in a different location on the vehicle than on other models or versions. For example, mobile applications may have components added post-manufacturing as part of a customer option, to accommodate new regulations, to support an environmental policy (e.g., of a company, or for a fleet of vehicles), to upgrade a vehicle, and/or to repurpose or remanufacture a vehicle. Accordingly, components having a reduced size, a reduced weight, and/or a reduced number of interfaces provide for easier post-manufacturing changes, a greater number of options in the post-manufacturing changes, and/or greater reliability for components that are installed using non-standardized or low volume processes that may not be as refined as a standardized process for a high volume application. Additionally, size and weight savings in components of the application can provide for the inclusion of additional features within the same cost and weight profile.

Mobile applications often have a large differential in duty cycle even for systems that have similar power ratings. Further, mobile applications often involve systems that are sold or otherwise transferred, where the same system can experience a significant change in the duty cycle and operating conditions after the system is in the hands of a user. Accordingly, a lack of flexibility in design parameters at the time of initial sale can limit the available markets for a system, and a lack of flexibility in design parameters in use can result in increased failures later in the life cycle of the system.

Electrical power distribution in many applications is subject to a number of challenges. Presently available systems for providing conversion between electric power and other power sources and loads suffer from a number of drawbacks. Variability in the load types, performance characteristics, and overall system arrangements lead to difficult integration issues that reduce the desirability of hybrid power utilization for many applications, and reduce the available system efficiencies as many aspects of an application are not integrated into the hybrid power arrangement. Additionally, many applications, such as off-road applications, and certain specific on-road applications that have unusual equipment or duty cycles, are low volume and are not economically justifiable to design and integrate a hybrid power system. Systems having a number of varying load and power devices and subsystems additionally create integration challenges, leading to a multiplicity of power conversion devices distributed around the system and customized for the particular system. Accordingly, it may not be economically justifiable to create a hybrid power system for such systems using presently known technologies.

SUMMARY

An example system includes an electric mobile application having a configurable charging circuit, the configurable charging circuit including an alternating current (AC) charging circuit couplable to a charging station on a first side of the AC charging circuit, a direct current (DC) charging circuit selectively couplable to a high voltage battery of the electric mobile application on a first side of the DC charging circuit, and a switch interposed between the AC charging circuit and the DC charging circuit, wherein the switch provides selective coupling between the AC charging circuit on a second side of the AC charging circuit and the DC charging circuit on a second side of the DC charging circuit, wherein the switch in a first position couples the AC charging circuit to the DC charging circuit through a first inductive coupling arrangement utilizing a magnetic component, and wherein the switch in a second position couples the AC charging circuit to the DC charging circuit through a second inductive coupling arrangement utilizing the magnetic component.

Certain further aspects of the example system are described following, any one or more of which may be present in certain embodiments. An example system includes the switch in the first position couples the AC charging circuit to a high voltage battery of the electric mobile application, and wherein the switch in the second position couples the AC charging circuit to a low voltage battery of the electric mobile application. The first inductive coupling arrangement includes a first winding arrangement sized in response to a voltage of a low voltage battery of the electric mobile application, and wherein the second inductive coupling arrangement includes a second winding arrangement sized in response to a voltage of a high voltage battery of the electric mobile application. A controller including a system description circuit structured to interpret a phase description of the charging station, a charge control circuit structured to determine a charging mode command value comprising a phase command for the AC charging circuit, a system configuration circuit structured to communicate the phase command to the AC charging circuit, and wherein the AC charging circuit is configured to select between a single phase rectification or a three-phase rectification in response to the phase command for the AC charging circuit. The system further including a second DC charging circuit selectively couplable to the high voltage battery, and a second switch interposed between the AC charging circuit and the second DC charging circuit, wherein the second switch in a first position couples the AC charging circuit to the second DC charging circuit through a third inductive coupling arrangement utilizing a second magnetic component, and wherein the second switch in a second position couples the AC charging circuit to the second DC charging circuit through a fourth inductive coupling arrangement utilizing the second magnetic component. The system further having a controller, including a system description circuit structured to interpret an electrical current value of the charging station, a charge control circuit structured to determine a charging mode command value comprising selected positions for at least one of the first switch or the second switch in response to the electrical current value of the charging station, a system configuration circuit structured to communicate the charging mode command value to the at least one of the first switch or the second switch, and wherein the at least one of the switch or the second switch is responsive to the charging mode command value. The system further including wherein the second inductive coupling arrangement electrically couples the DC charging circuit to a low voltage battery of the electric mobile application, and having a controller including a system description circuit structured to interpret a voltage of the low voltage battery, a charge control circuit structured to determine a charging mode command value comprising a selected position for the switch in response to the voltage of the low voltage battery, a system configuration circuit structured to communicate the selected position to the switch, and wherein the switch or the second switch is responsive to the selected position. The system further having a controller, including a system description circuit structured to interpret a voltage value of the charging station, a charge control circuit structured to determine a charging mode command value comprising selected positions for at least one of the first switch or the second switch in response to the voltage value of the charging station, a system configuration circuit structured to communicate the charging mode command value to the at least one of the first switch or the second switch, and wherein the at least one of the switch or the second switch is responsive to the charging mode command value. The charge control circuit determines the selected positions for the first switch and the second switch to couple the DC charging circuit and the second DC charging circuit to the high voltage battery in a series arrangement in response to the voltage value of the charging station exceeding a threshold value. The charge control circuit determines the selected positions for the first switch and the second switch to couple the DC charging circuit and the second DC charging circuit to the high voltage battery in a parallel arrangement in response to the electrical current value of the charging station exceeding a threshold value. The system description circuit is further structured to interpret a temperature value of the component of the configurable charging circuit, and to further determine the selected positions for the first switch and the second switch to couple the DC charging circuit and the second DC charging circuit to the high voltage battery in the parallel arrangement in response to the temperature value of the component of the configurable charging circuit being below a threshold value. The alternating current (AC) charging circuit is couplable to the charging station on the first side of the AC charging circuit with an electrical coupling including three phase couplings and a neutral coupling.

An example method includes determining a station charging description value for a charging station coupled to a mobile electric application, determining a charging command value in response to the charging description value, and configuring a charging circuit in response to the charging command value.

Certain further aspects of the example method are described following, any one or more of which may be present in certain embodiments. An example method includes determining the station charging description value includes performing at least one operation selected from the operations consisting of: determining a voltage provided by the charging station, determining a phase configuration of the charging station, determining a current capacity of the charging station, and determining a power output of the charging station. Determining the charging command value includes performing at least one operation selected from the operations consisting of determining an alternating current (AC) charging circuit switch configuration for a switch providing selective coupling between the AC charging circuit and at least one of two distinct direct current (DC) charging circuits, determining an alternating current (AC) charging circuit rectification configuration as one of a single phase rectification or a three-phase rectification, and determining a direct current (DC) charging circuit switch configuration, wherein the station charging description value includes a voltage provided by the charging station, and further determining the DC charging circuit switch configuration in response to the voltage provided by the charging station. Determining the charging command value includes determining an alternating current (AC) charging circuit switch configuration to provide a selected coupling configuration of two distinct direct current (DC) charging circuits, wherein the selected coupling configuration includes one of a serial configuration, a parallel configuration, and a split configuration comprising one of the two distinct DC charging circuits coupled to the charging station and the other one of the two distinct DC charging circuits decoupled from the charging station. Configuring the charging circuit in response to the charging command value includes performing at least one operation selected from the operations consisting of dividing a charging current between two distinct direct current (DC) charging circuits in a parallel arrangement, providing a charging current to two distinct direct current (DC) charging circuits in a series arrangement, providing a first charging current from the charging station to a high voltage battery of the mobile electric application, and a second charging current from the charging station to a low voltage battery of the mobile electric application, providing a first charging current from the charging station to a high voltage battery of the mobile electric application, and a second charging current from the high voltage battery of the mobile electric application to a low voltage battery of the mobile electric application, and configuring an alternating current (AC) charging circuit to rectify a selected one of a single phase charging current or a three-phase charging current from the charging station. The method further including determining a system charging condition value, and determining the charging command value further in response to the system charging condition value. Determining the system charging condition value includes performing at least one operation selected from the operations consisting of determining a temperature of a component of an alternating current (AC) charging circuit of the mobile electric application, determining a temperature of a component of a direct current (DC) charging circuit of the mobile electric application, determining a state-of-charge of a low voltage battery of the mobile electric application, determining a state-of-charge of a high voltage battery of the mobile electric application, determining a temperature of a low voltage battery of the mobile electric application, and determining a temperature of a high voltage battery of the mobile electric application. Configuring the charging circuit in response to the charging command value includes providing at least a portion of a charging current from the charging station through a first routing or a second routing of a direct current (DC) charging circuit, wherein the first routing includes a first inductive component coupled to a second inductive component across a magnetic component, and wherein the second routing includes the first inductive component coupled to a third inductive component across the magnetic component.

BRIEF DESCRIPTION OF THE DRAWINGS

The present disclosure will become more fully understood from the detailed description and the accompanying drawings, wherein.

DETAILED DESCRIPTION

Figure 1:
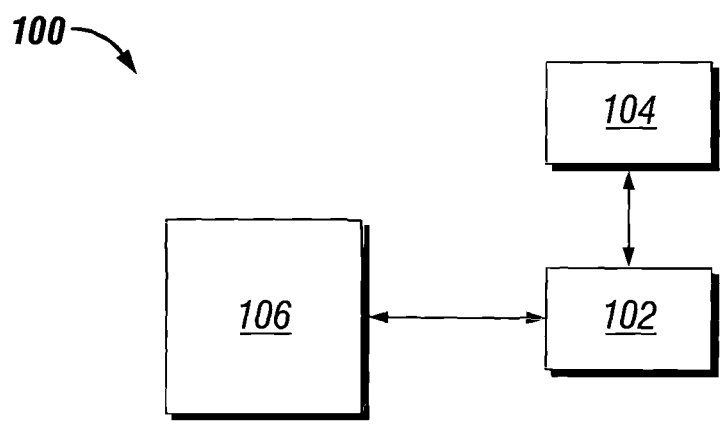
FIG. 1 shows an embodiment system schematically depicting a power distribution unit (PDU) operationally positioned between a power source and a load.

Referencing FIG. 1, an example system 100 is schematically depicted including a power distribution unit (PDU) 102 operationally positioned between a power source 104 and a load 106. The power source 104 may be any type—including at least a battery, generator, and/or capacitor. The power source 104 may include multiple sources or lines of power, which may be distributed according to the type of power (e.g., a battery input separated from a generator input) and/or may be distributed according to the devices powered (e.g., auxiliary and/or accessory power separated from main load power such as motive force power, and/or divisions within the accessories, divisions within the motive force power, etc.). The load 106 may be any type, including one or more motive force loads (e.g., to individual drive wheel motors, to a global motive drive motor, etc.), one or more accessories (e.g., on-vehicle accessories such as steering, fan, lights, cab power, etc.). In certain embodiments, the PDU 102 provides for ease of integration of the electrical system of the application including the system 100, such as by utilizing uniform input and output access, grouping all power distribution into a single box, single area, and/or to a single logically integrated group of components. In certain embodiments, the PDU 102 provides for protection of the electrical system, including fusing and/or connection or disconnection (manual and/or automated) of the electrical system or individual aspects of the electrical system. In certain embodiments, one or more power sources 104 may be high voltage (e.g., motive power sources, which may be 96V, 230V-360V, 240V, 480V, or any other value) or low voltage (e.g., 12V, 24V, 42V, or any other value). In certain embodiments, one or more power sources 104 may be a direct current (DC) power source or an alternating current (AC) power source, including multi-phase (e.g., three phase) AC power. In certain embodiments, the PDU 102 is a pass-through device, providing power to the load 106 approximately as configured by the power source 104—for example only as affected by sensing and other operations from the PDU 102 that are not provided for power configuration. In certain embodiments, the PDU 102 may include power electronics, for example rectifying, adjusting voltage, cleaning up noisy electrical power, etc. to provide selected electrical power characteristics to the load 106.

Controllers, circuits, or the like, as referenced herein, include and/or are communicatively coupled to one or more sensors and/or actuators, for example to determine current values, voltage values, and/or temperatures of any power source or input, fuse, connector, or other device in the system. Additionally or alternatively, a controller is communicatively coupled to the system, including for example a vehicle controller, engine controller, transmission controller, application controller, and/or network device or server (e.g., a fleet computer, cloud server, etc.). A controller may be coupled to an application network (e.g., a CAN, a datalink, a private or public network, etc.), an outside network, and/or another device (e.g., an operator's portable device, an in-cab computer for a vehicle, etc.). Controllers, circuits, or the like are depicted schematically as single devices for clarity of the present disclosure. It will be understood that controllers, circuits, and/or aspects of these may be distributed across multiple hardware devices, included within another hardware device (e.g., a controller for the power source, load, vehicle, application, etc.), and/or configured as hardware devices, logic circuits, or the like to perform one or more operations of the controller and/or circuit.

Figure 2:
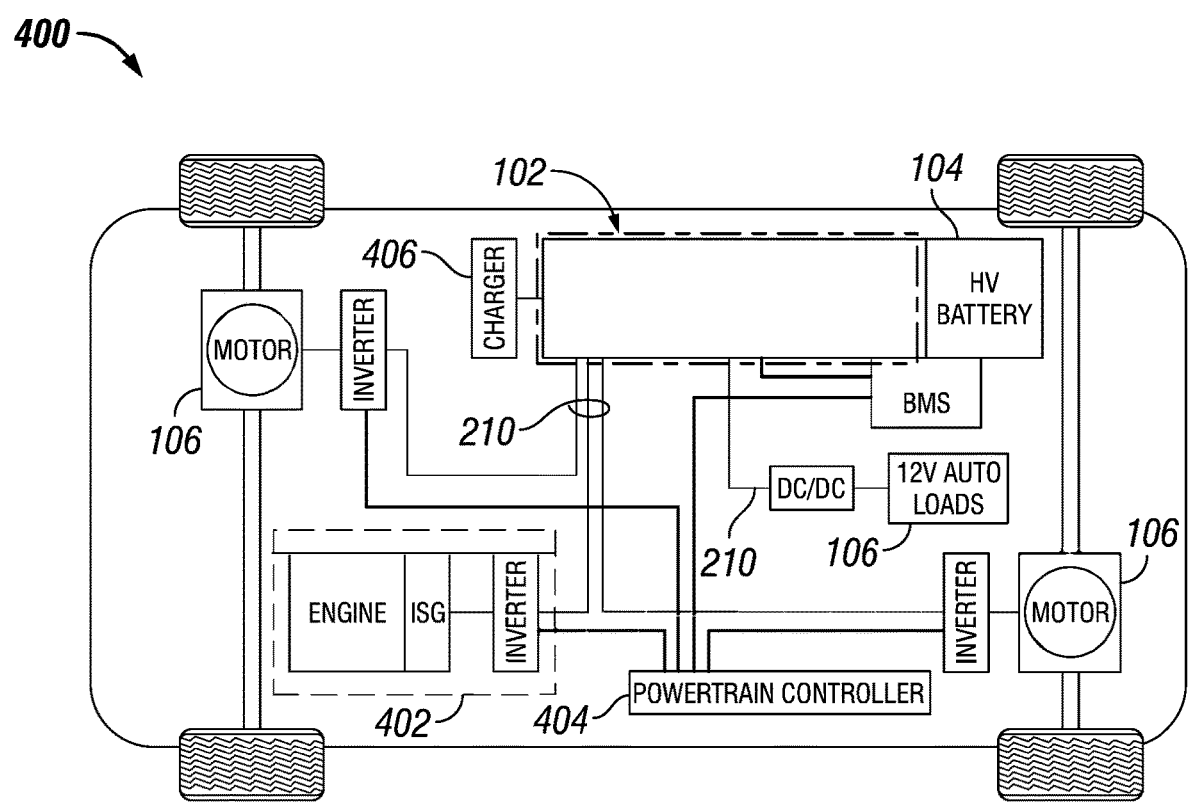
FIG. 2 depicts a non-limiting example system for mobile application such as a vehicle.

Referencing FIG. 2, an example system 400 is a mobile application such as a vehicle. The example system 400 includes the high voltage battery 104 electrically coupled to high voltage loads 106 through the PDU 102. In the example system 400, an auxiliary prime mover, such as an internal combustion engine 402 (with associated conversion electronics, such as a generator, motor-generator, and/or inverter) is additionally coupled to the PDU 102. It is understood that the high voltage battery 104 and/or the auxiliary prime mover 402 may act as a power source or a load during certain operating conditions of the system 400, and additionally the high voltage loads 106 (e.g., electric motors or motor-generators coupled to the wheels) may act as a load or a source during certain operating conditions. The description of loads 106 and sources 104 herein is non-limiting, and references only nominal operation, ordinary operation, and/or operational conditions selected for conceptual description, even if the described load 106 and/or source 104 often, usually, or always operates in a mode that is not the described name For example, the high voltage battery 104 may operate as a power source during motive operations where net energy is being taken from the battery, and/or as a load during charging operations, motive operations where the wheels or auxiliary prime mover are charging the battery, etc.

The example system 400 further includes a powertrain controller 404 to control operations of the powertrain, which may be associated with another component in the system 400, and/or part of another controller in the system (e.g., a vehicle controller, battery controller, motor or motor-generator controller, and/or engine controller). The example system 400 further includes a charger 406 coupled to the high voltage batter 404 through the PDU 102, and low voltage loads ("12V Auto Loads" in the example of FIG. 2) representing auxiliary and accessory loads in the system 400. One of skill in the art will recognize the system 400 as including a serial hybrid powertrain for a vehicle—for example where auxiliary power (e.g., the internal combustion engine) interacts only with the electrical system to re-charge batteries and/or provide additional real-time electrical power during operations, but does not mechanically interact with the drive wheels. Additionally or alternatively, a system may include a parallel hybrid system, where auxiliary power can interact mechanically with the drive wheels, and/or interact with the electrical system (either, or both). Additionally or alternatively, a system may be a fully electric system, where auxiliary power is not present, and/or where auxiliary power is present but does not interact with the high voltage/motive power system (e.g., an alternative power unit to drive accessories, refrigeration, or the like—which power may be communicated through the PDU 102 but separated from the motive power electrical system). In certain embodiments, motive systems such as vehicles experience highly transient load cycles—for example during acceleration, deceleration, stop-and-go traffic, emergency operations, and the like—and accordingly management of power in such system is complex, and certain devices such as fuses can be vulnerable to the highly transient load cycle. Additionally or alternatively, loss of operations for vehicles can result in costs for system down-time, loss or untimely delivery of cargo, and/or significant operational risks due to failures (e.g., stranding the operator and/or vehicle, loss of operations in traffic, loss of operations on a motor-way, etc.). In certain embodiments, other systems that may be hybrid electric and/or fully electric are additionally or alternatively subject to highly variable duty cycles and/or specific vulnerabilities to operational interruptions, such as, without limitation, pumping operations, process operations for a larger process (e.g., chemical, refining, drilling, etc.), power generation operations, mining operations, and the like. System failures for these and other operations may involve externalities such as losses associated with the process failure that go beyond the down-time for the specific system, and/or down-time for such systems can incur a significant cost.

Figure 3:
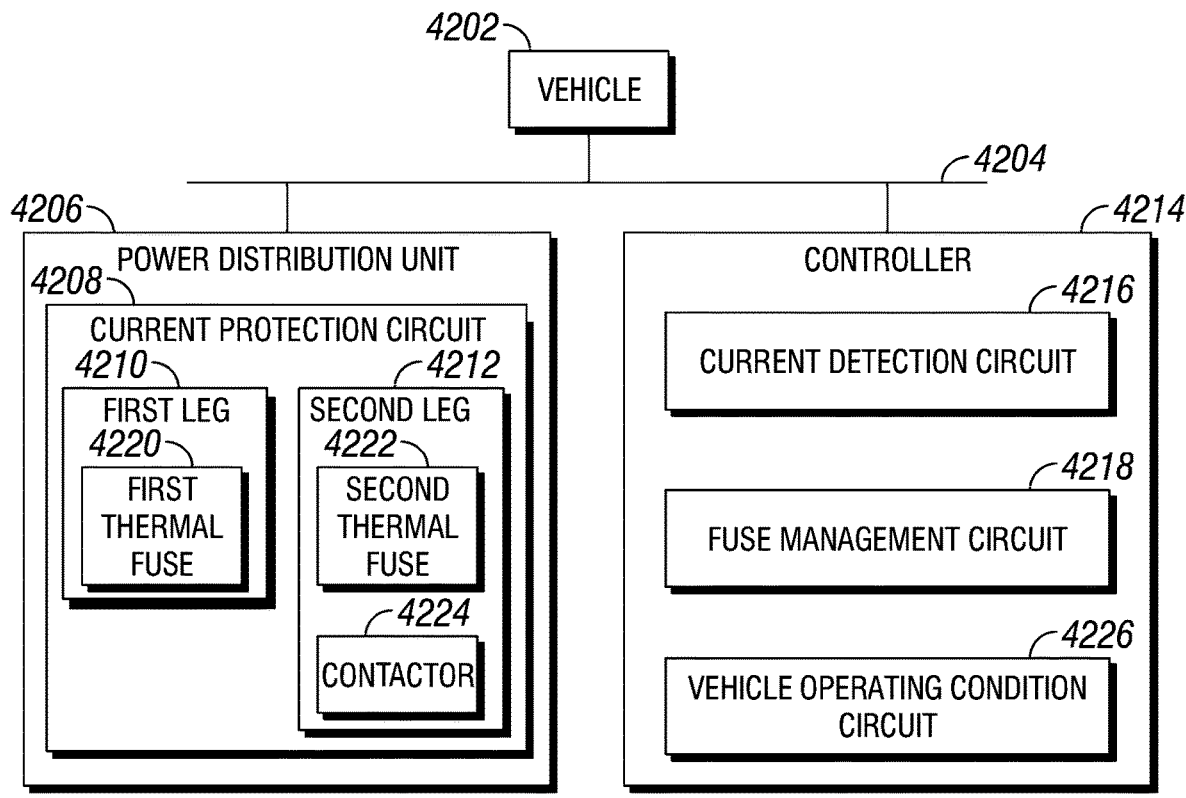
FIG. 3 depicts a schematic diagram of a vehicle having a PDU.

Referencing FIG. 3, an example system includes a vehicle having a motive electrical power path 4204; a power distribution unit 4206 having a current protection circuit 4208 disposed in the motive electrical power path 4204, where the current protection circuit includes a first leg 4220 of the current protection circuit 4208 including a first thermal fuse 4220, a second leg 4212 of the current protection circuit 4208 including a second thermal fuse 4222 and a contactor 4224, and where the first leg 4220 and the second leg 4212 are coupled in a parallel arrangement. The example system includes a controller, including: a current detection circuit 4216 structured to determine a current flow through the motive electrical power path 4204; and a fuse management circuit 4218 structured to provide a contactor activation command in response to the current flow. The contactor 4224 is responsive to the contactor activation command Certain further aspects of an example system are described following, any one or more of which may be present in certain embodiments. An example system includes where the contactor 4224 is open during nominal operations of the vehicle, and where the fuse management circuit 4218 is structured to provide the contactor activation command as a contactor closing command in response to determining that the current flow is a above a thermal wear current for the first thermal fuse 4220. An example system includes the fuse management circuit 4218 further structured to provide the contactor activation command as a contactor closing command in response to determining that the current flow is below a current protection value for the motive electrical power path 4204. An example system includes a vehicle operating condition circuit 4226 structured to determine an operating mode for the vehicle (e.g., moving, stopped, high performance, high economy, charging, quick charging, etc.), and where the fuse management circuit 4218 is further structured to provide the contactor activation command in response to the operating mode. An example system includes the fuse management circuit 4218 further structured to provide the contactor activation command as a contactor closing command in response to the operating mode including at least one operating mode selected from the operating modes consisting of: a charging mode; a quick charging mode; a high performance mode; a high power request mode; an emergency operation mode; and/or a limp home mode. An example system includes where the contactor 4224 is closed during nominal operations of the vehicle, and where the fuse management circuit 4218 is structured to provide the contactor activation command as a contactor opening command in response to determining that the current flow is above a current protection value for the motive electrical power path 4204. An example system includes where the contactor is closed during nominal operations of the vehicle, and where the fuse management circuit 4218 is structured to provide the contactor activation command as a contactor opening command in response to the operating mode; and/or where the fuse management circuit 4218 is further structured to provide the contactor activation command as a contactor opening command in response to the operating mode including at least one of an economy mode or a service mode. For example, during certain operating conditions such as an economy mode or during a service event, a reduced maximum power throughput through the motive electrical power path 4204 may be enforced, where the opening of the contactor 4224 is utilized to provide configured fuse protection for the reduced maximum power throughput.

Figure 4:
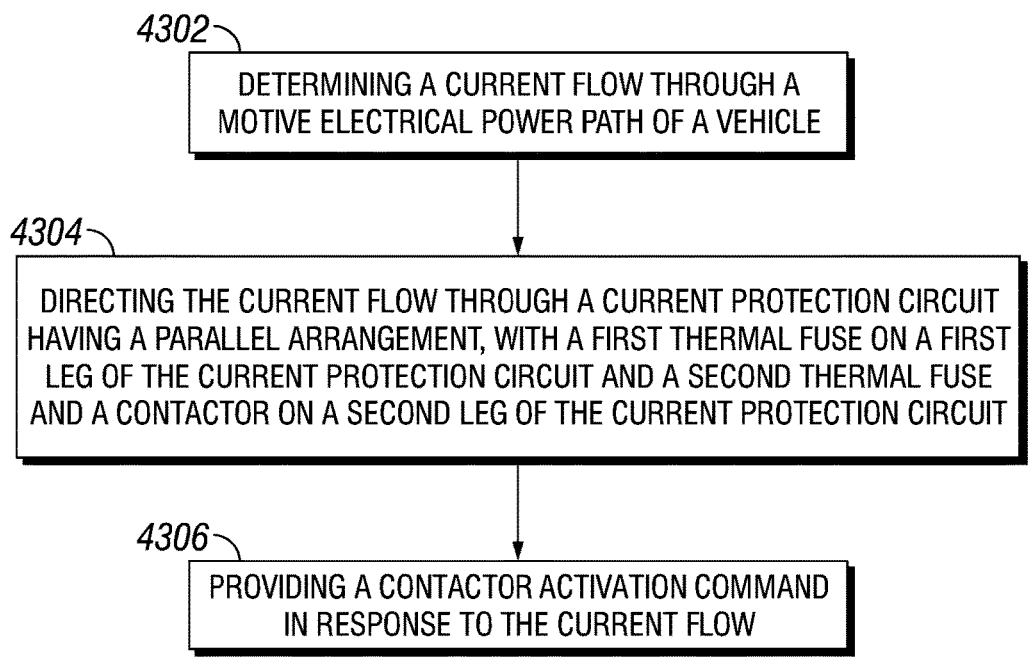
FIG. 4 depicts a schematic flow diagram of a procedure to operate parallel thermal fuses.

Referencing FIG. 4, an example procedure includes an operation 4302 to determine a current flow through a motive electrical power path of a vehicle; an operation 4304 to direct the current flow through a current protection circuit having a parallel arrangement, with a first thermal fuse on a first leg of the current protection circuit and a second thermal fuse and a contactor on a second leg of the current protection circuit; and an operation 4306 to provide a contactor activation command in response to the current flow.

Certain further aspects of an example procedure are described following, any one or more of which may be present in certain embodiments. An example procedure further includes an operation to close the contactor in response to the current flow being above a thermal wear current for the first thermal fuse; and/or closing the contactor further in response to the current flow being below a current protection value for the motive electrical power path. An example procedure includes an operation to determine an operating mode for the vehicle, and providing the contactor activation command further in response to the operating mode. An example procedure includes an operation to provide the contactor activation command as a contactor closing command in response to the operating mode including at least one operating mode selected from the operating modes consisting of: a charging mode; a high performance mode; a high power request mode; an emergency operation mode; and a limp home mode. An example procedure includes an operation to provide the contactor activation command as a contactor opening command in response to determining that the current flow is above a current protection value for the motive electrical power path; and/or provide the contactor activation command as a contactor opening command in response to the operating mode including at least one of an economy mode or a service mode.

Figure 5:
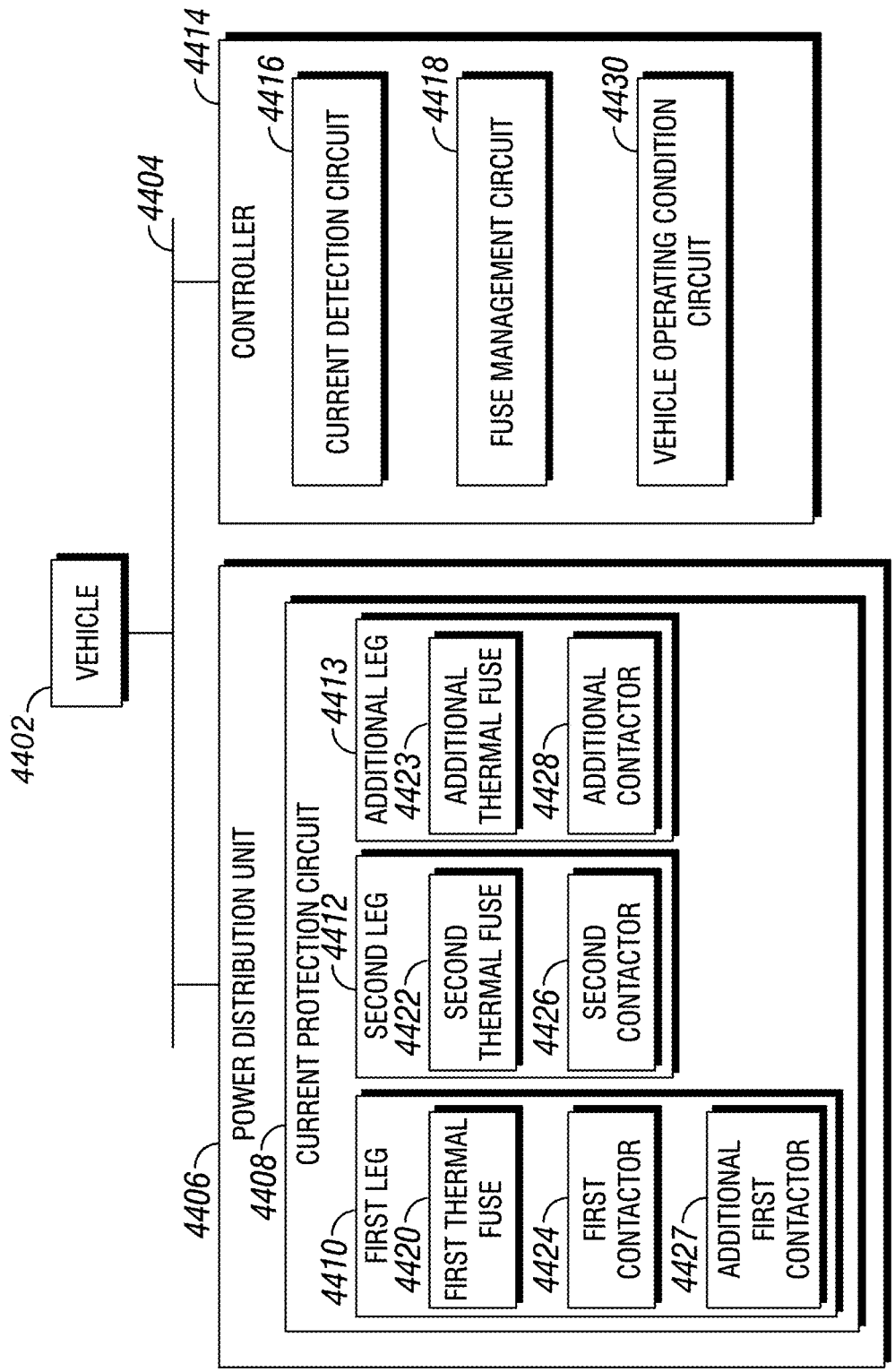
FIG. 5 depicts a schematic diagram of a vehicle having a PDU.

Referencing FIG. 5, an example system includes a vehicle 4402 having a motive electrical power path 4404; a power distribution unit 4406 having a current protection circuit 4408 disposed in the motive electrical power path 4404, where the current protection circuit includes: a first leg 4410 of the current protection circuit 4408 including a first thermal fuse 4420 and a first contactor 4424; a second leg 4412 of the current protection circuit 4408 including a second thermal fuse 4422 and a second contactor 4426; and where the first leg 4410 and the second leg 4412 are coupled in a parallel arrangement. The example system includes a controller 4414 including a current detection circuit 4416 structured to determine a current flow through the motive electrical power path 4404; and a fuse management circuit 4418 structured to provide a plurality of contactor activation commands in response to the current flow. The first contactor 4424 and the second contactor 4426are responsive to the contactor activation commands, thereby providing a selected configuration of the current protection circuit 4408.

Certain further aspects of an example system are described following, any one or more of which may be present in certain embodiments. An example system includes where the current protection circuit further includes: one or more additional legs 4413, where each additional leg 4413 includes an additional thermal fuse 4423 and an additional contactor 4428; and where each additional contactor 4428 is further responsive to the contactor activation commands, thereby providing the selected configuration of the current protection circuit 4408. An example system includes a vehicle operating condition circuit 4430 structured to determine an operating mode for the vehicle, and where the fuse management circuit 4418 is further structured to provide the contactor activation commands in response to the operating mode. An example fuse management circuit 4418 is further structured to determine an active current rating for the motive electrical power path 4404 in response to the operating mode, and to provide the contactor activation commands in response to the active current rating. An example system includes where the first leg 4410 of the current protection circuit 4408 further includes an additional first contactor 4427 in a parallel arrangement with the first thermal fuse 4420, where the current detection circuit 4416 is further structured to determine a first leg current flow, where the fuse management circuit 4418 is further structured to provide the contactor activation commands further in response to the first leg current flow, and where the additional first contactor 4427 is responsive to the contactor activation commands An example system includes the additional first contactor 4427 being open during nominal operations of the vehicle, and where the fuse management circuit 4418 is structured to provide the contactor activation commands including an additional first contactor closing command in response to determining that the first leg current flow is a above a thermal wear current for the first thermal fuse 4420. An example system includes the fuse management circuit 4418 structured to provide the additional first contactor closing command in response to determining at least one of: that the first leg current flow is below a first leg current protection value, or that the current flow is below a motive electrical power path current protection value. An example system includes where the additional first contactor 4427 is closed during nominal operations of the vehicle, and where the fuse management circuit 4418 is structured to provide the contactor activation commands including an additional first contactor opening command in response to determining at least one of: that the first leg current flow is above a first leg current protection value, or that the current flow is above a motive electrical power path current protection value. The example system may further include additional contactors 4428 positioned on any one or more of the legs 4410, 4412, 4413. Any one or more of the contactors 4424, 4426, 4428 may be configured in series and/or parallel with the associated thermal fuse 4420, 4422, 4423 on the associated leg.

Figure 6:
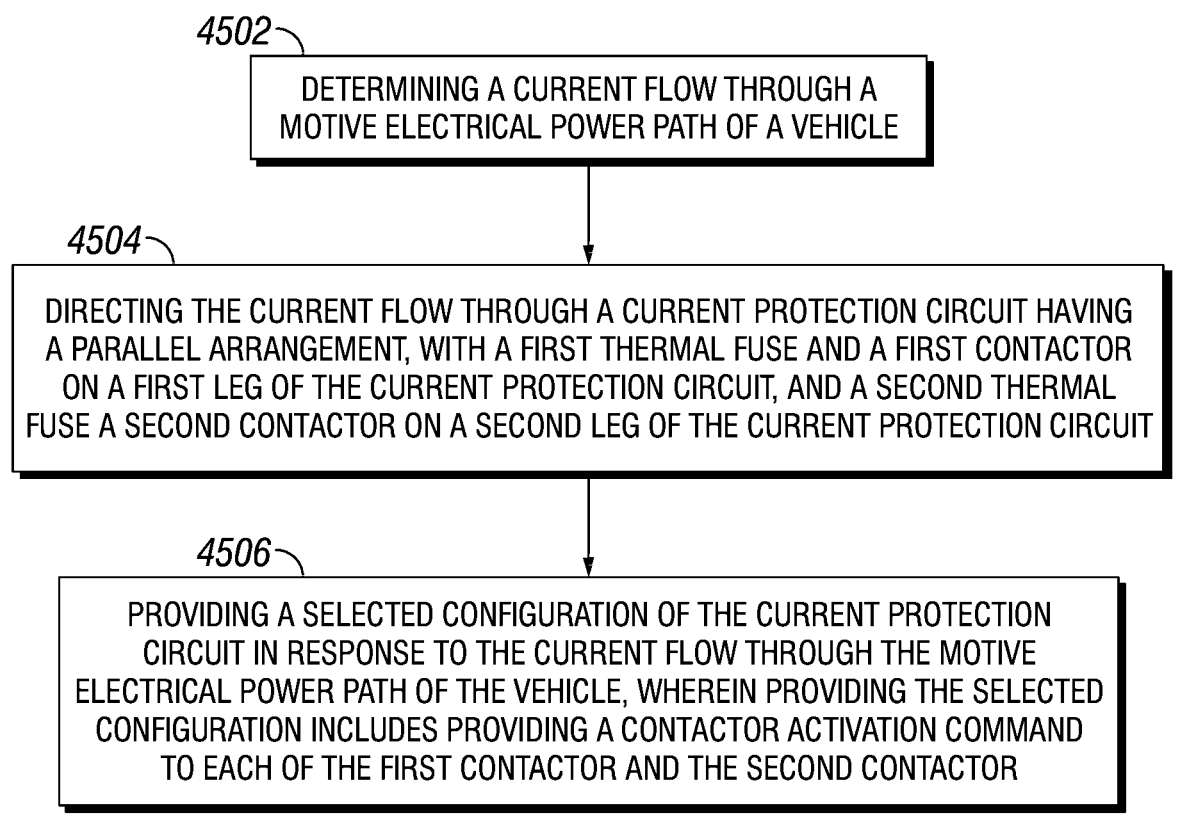
FIG. 6 depicts a schematic flow diagram of a procedure to selectively configure a current protection circuit.

Referencing FIG. 6, an example procedure includes an operation 4502 to determine a current flow through a motive electrical power path of a vehicle; an operation 4504 to direct the current flow through a current protection circuit having a parallel arrangement, with a first thermal fuse and a first contactor on a first leg of the current protection circuit, and a second thermal fuse and a second contactor on a second leg of the current protection circuit; and an operation 4506 to provide a selected configuration of the current protection circuit in response to the current flow through the motive electrical power path of the vehicle, where providing the selected configuration includes providing a contactor activation command to each of the first contactor and the second contactor.

Certain further aspects of an example procedure are described following, any one or more of which may be present in certain embodiments. An example procedure includes an operation further including at least one additional leg of the current protection circuit, each additional leg of the current protection circuit having an additional thermal fuse and an additional contactor, and where the providing the selected configuration of the current protection circuit includes providing a contactor activation command to each additional contactor. An example procedure includes an operation to determine an operating mode for the vehicle, and providing the selected configuration further in response to the operating mode; and/or an operation to determine an active current rating for the motive electrical power path in response to the operating mode, and where providing the selected configuration of the current protection circuit is further in response to the active current rating. An example procedure includes an operation to determine an active current rating for the motive electrical power path, and where providing the selected configuration of the current protection circuit is further in response to the active current rating. An example procedure includes an operation where the first leg of the current protection circuit further includes an additional first contactor in a parallel arrangement with the first thermal fuse, the procedure further including: determining a first leg current flow, and where providing the selected configuration further includes providing a contactor activation command to the additional first contactor; an operation to close the additional first contactor in response to determining that the first leg current flow is a above a thermal wear current for the first thermal fuse; an operation to close the additional first contactor further in response to determining at least one of: that the first leg current flow is below a first leg current protection value, or that the current flow is below a motive electrical power path current protection value; and/or an operation to open the additional first contactor in response to determining at least one of: that the first leg current flow is above a first leg current protection value, or that the current flow is above a motive electrical power path current protection value.

Figure 7:
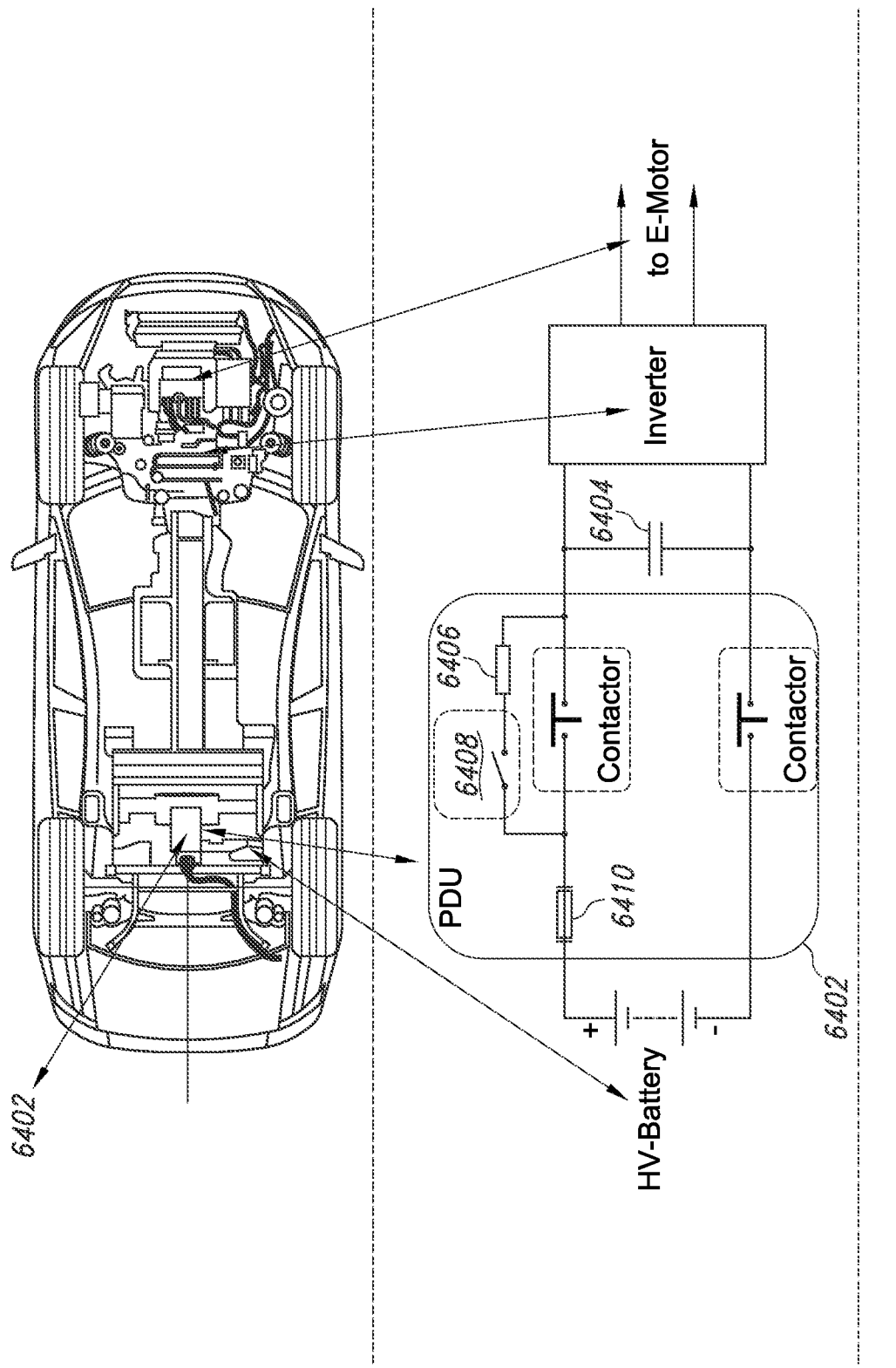
FIG. 7 depicts a schematic diagram of a vehicle having a PDU.

Referencing FIG. 7, an example previously known system is depicted having a contactor and fuse combination. The example system, for purposes of illustration, is provided as a part of a power distribution unit (PDU) 6402 for an electric or partially electric vehicle. The system includes electrical storage (e.g., a battery) and a motor providing motive power for the vehicle. The electrical storage (or power storage) device may be of any type, including a battery, a fuel cell, and/or a capacitor (e.g., a super-capacitor or a hyper-capacitor), and combinations of these (e.g., a capacitor included in the circuit to assist in peak power production or management of transient operations). In certain embodiments, the electrical storage device is rechargeable (e.g., any rechargeable battery technology such as lithium ion, nickel metal-hydride, or nickel-cadmium) or recoverable (e.g., a chemical based fuel cell having reversible chemistry to recover charge generating capability). In the example system, the battery operates as a DC device and the motor operates as an AC device, with an inverter positioned therebetween to condition power for the motor. The example system includes filter capacitors 6404 providing conditioning for the main power circuit. The example system includes a low side contactor and a high side contactor. The high side contactor is in series with a fuse 6410 providing overcurrent protection for the circuit. The example system further includes a pre-charge circuit, depicted as a pre-charge relay 6408 and a pre-charge resistor 6406. In certain embodiments, the pre-charge relay 6408 is engaged before the high side contactor is engaged, allowing capacitive elements of the overall circuit to energize through the pre-charge resistor 6406, limiting in-rush currents or other charge-up artifacts on system start-up. It can be seen that overcurrent protection is provided by the system through the fuse 6410, and the characteristics of the fuse 6410 set the overcurrent protection for the motive circuit through the PDU. Additionally, the contactors are exposed to connection and disconnection events, including arcing, heating, and other wear.

Figure 8:
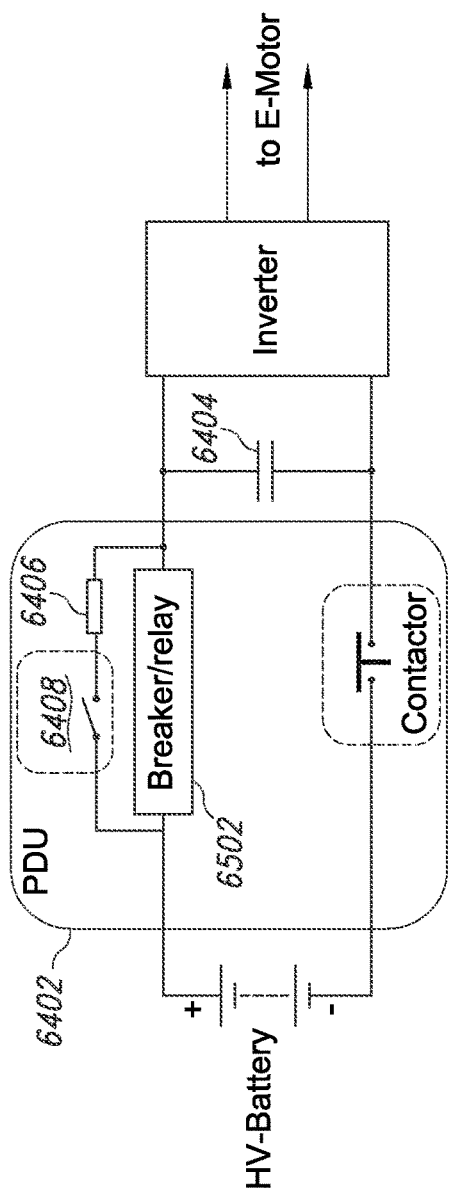
FIG. 8 depicts a schematic diagram of a breaker-relay and pre-charge relay.

Referencing FIG. 8, an example PDU 6402 of the present disclosure is schematically depicted. The example PDU 6402 is utilizable in a system such as that depicted in FIG. 7. The example PDU of FIG. 8 includes a breaker/relay 6502 component on the high side. The example arrangement of FIG. 8 is non-limiting, and any arrangement of the breaker/relay 6502 that provides designed overcurrent protection for a system using any of the principles described throughout the present disclosure is contemplated herein. The example PDU 6402 of FIG. 8 omits a fuse in series with a contactor, utilizing the breaker/relay 6502 for overcurrent protection. Any breaker/relay 6502 as described throughout the present disclosure may be utilized in a system such as that depicted in FIG. 8. The PDU 6402 of FIG. 8 additionally utilizes a pre-charge relay 6408 and a pre-charge resistor 6406, similar to that depicted in FIG. 7. In the example of FIG. 8, the breaker/relay 6502 is in parallel with the pre-charge circuit, and the relay portion of the breaker/relay 6502 may be engaged after the system has charged through the pre-charge circuit. As described throughout the present document, the breaker/relay 6502 provides for continuous and selectable overcurrent protection, while providing for full rated operation throughout range of designed operating current for the system. In previously known systems, a contactor/fuse arrangement necessarily provides for a gap in the operating range, either pushing fuse activation at least partially down into the operating current range, or moving fuse activation away from the rated range and providing for a gap in overcurrent protection above the rated current for the system. Additionally, as described throughout the present disclosure, the breaker/relay 6502 can provide for multiple current protection regimes, selectable current protection based on operating conditions, and provides for reduced wear on the contact elements of the breaker/relay relative to previously known contactors. Accordingly, a system such as that depicted in FIG. 8 can provide reliable, responsive, and recoverable overcurrent protection relative to previously known systems.

Figure 9:
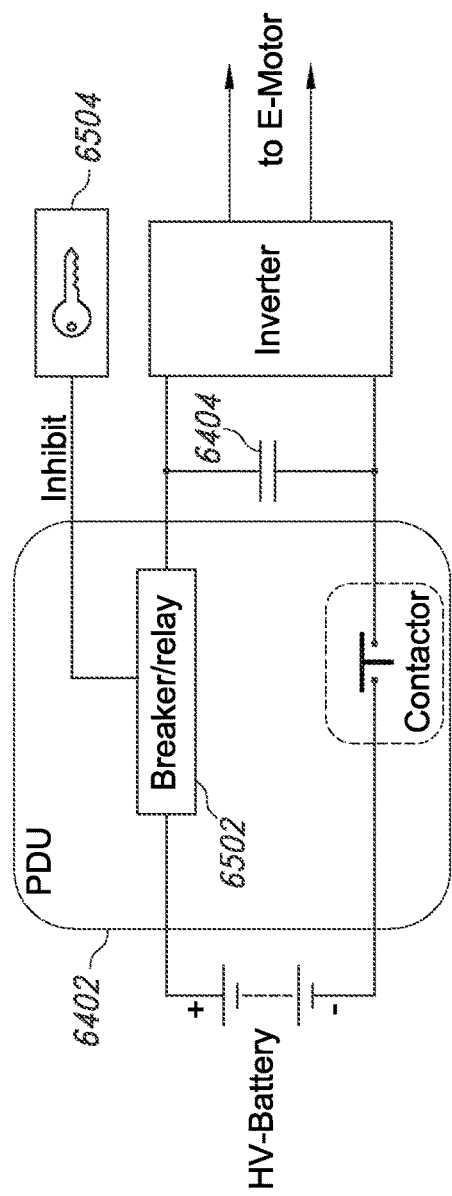
FIG. 9 depicts a schematic diagram of a breaker-relay and inhibit.

Referencing FIG. 9, an example PDU 6402 is schematically depicted. The example PDU 6402 is utilizable in a system such as that depicted in FIG. 1, and has features that may be additional to or alternative to features described with regard to FIG. 8. The example of FIG. 9 depicts an external input to the breaker/relay 6502 (Inhibit, with a schematic depiction of a keyswitch input 6504, in the example). The breaker/relay 6502 is responsive to the external signal in a configurable manner For example, a keyswitch ON operation may be utilized to energize the breaker/relay 6502— either directly (e.g., hard-wiring the keyswitch circuit through a coil of the breaker/relay) or indirectly (e.g., receiving a network value representing the keyswitch position, receiving a voltage signal representing the keyswitch position, etc.), thereby charging the motive power circuit. In another example, a keyswitch OFF operation may be utilized to de-energize the breaker/relay 6502, thereby removing power from the motive power circuit. The external signal may be of any type or of several types, including external commands generated from any portion of the system, calculated values indicating whether power should be supplied or cut (e.g., a service event, a maintenance event, an accident indicator, an emergency shutdown command, a vehicle controller request, a device protection request for some device on the vehicle, a calculation that a temperature, voltage value, or current value has exceeded a threshold, etc.). The external signal may be supplied as a hard-wired signal (e.g., an electrical connection with a voltage representing the signal value), and/or as a communication (e.g., a datalink or network communication) which may be a wired or wireless communication, and may be generated by a controller on the PDU 6402 or external to the PDU 6402 (e.g., a vehicle controller, a power management controller, or the like). The example of FIG. 9 does not depict a pre-charge circuit for convenience of illustration, but embodiments such as those depicted in FIG. 8 or FIG. 9 may have a pre-charge circuit or omit a pre-charge circuit depending upon the characteristics of the system, the design goals and requirements for the system, and the like.

Figure 10:
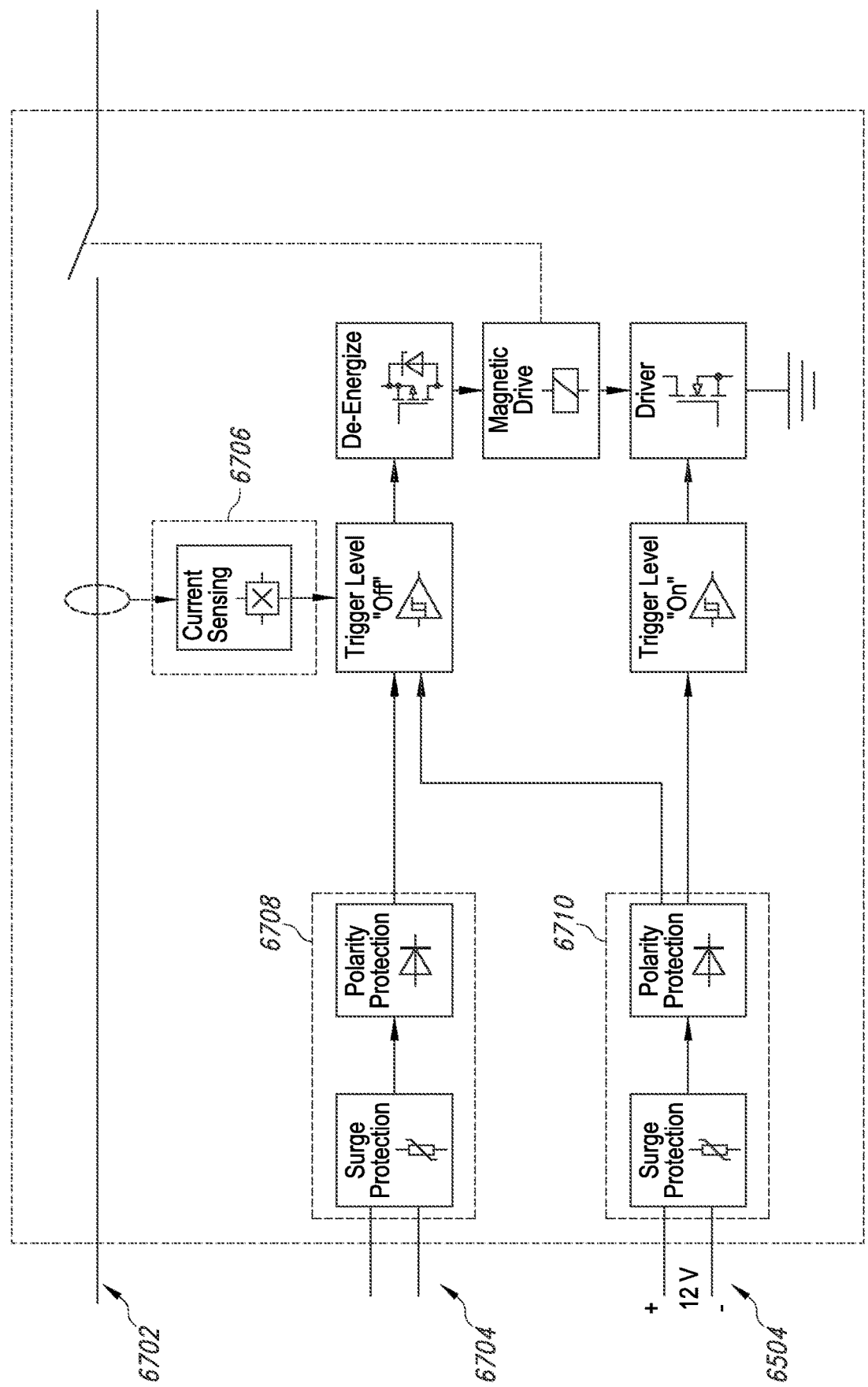
FIG. 10 depicts a schematic diagram of a power bus protection configuration.

Referencing FIG. 10, an example schematic block diagram of a breaker/relay is depicted. The example breaker/relay of FIG. 10 includes a power bus 6702 (e.g., the high voltage, motive power, load power, etc.) that operates the high voltage throughput and is connected or disconnected through a contact which is schematically depicted. A voltage that is a "high voltage" on the power bus may be any value, and depends upon the load being driven and other selection parameters for the system. In certain embodiments, a high voltage is any voltage above 42V, above 72V, above 110V, above 220V, above 300V, and/or above 360V. The voltage range may be different for a motive power load versus an auxiliary load (e.g., a PTO device, pump, or the like) and may be higher or lower than these ranges. In the example, the standard on/off 6504 or control voltage is depicted on the left side (depicted as 12 V, although any value such as 6 V, 12 V, 24 V, 42 V may be utilized). The standard voltage 6504 is depicted for purposes of illustration, although the standard voltage may additionally or alternatively be a datalink or network input (e.g., where the breaker/relay has independent access to control power) in communication with a controller of the breaker/relay. In certain embodiments, the standard voltage 6504 will be the same voltage as experienced at the keyswitch, by a vehicle controller, by auxiliary (e.g., not-motive or non-load) components in a system, or the like. In certain embodiments, the standard voltage 6504 will be the keyswitch 6504 signal. The standard voltage 6504 may be configured to be received through an input control isolation 6710.

Further in the example of FIG. 10, an auxiliary off isolation 6708 is depicted, which provides an input for auxiliary control of the breaker/relay. In certain embodiments, the auxiliary off isolation 6708 is coupled to an electrical input 6704, such as a selectable input at the standard voltage, an output from a controller (e.g., the controller providing electrical power as an output at a selected voltage to the auxiliary off isolation). In certain embodiments, the auxiliary off isolation 6708 may utilize a datalink or network input. In certain embodiments, for example where the breaker/relay has an internal controller, the standard on/off 6504 and the auxiliary off isolation input 6704 may be the same physical input—for example where a datalink input, network input, and/or controllable electrical signal (e.g., a controlled voltage value) provide the breaker/relay with information to determine the current requested state of the breaker/relay. In certain embodiments, the breaker/relay is a hardware only device that accepts a first voltage value at the standard on/off position, a second voltage value at the auxiliary off position, and responds through the hardware configuration of the breaker/relay to perform selected operations.

In the example of FIG. 10, the standard on/off input 6504 and the auxiliary off input 6704 include circuit protection components (e.g. isolations 6708, 6710), such as surge protection and polarity protection. The example breaker/relay includes a logic circuit that provides for energizing the relay (closing the contact on the power bus) when the standard on/off input 6504 is high, and de-energizing the relay (opening the contact on the power bus) when either the standard on/off input 6504 is low or the auxiliary off input is low 6704. In the example of FIG. 10, the logic circuit is depicted schematically, and may be implemented as hardware elements in the breaker/relay. Additionally or alternatively, a controller in the breaker/relay may interpret input voltages, datalink signals, and/or network communications to implement the logic and determine whether to open or close the relay. The logic in the present system is depicted as a "normally-open" relay that utilizes power to close (make contact), although the breaker/relay may be configured as a "normally-closed", latching, or any other logical configuration. Additionally or alternatively, the standard on/off inputs 6504 and/or the auxiliary off inputs 6704 may utilize logical highs or logical lows to implement operations of the breaker/relay.

The example breaker/relay of FIG. 10 additionally depicts a current sensing device 6706 ("current sensing") which may be a current sensor on the bus, a calculated current value based on other system parameters, a current value passed to the breaker/relay and/or a controller operatively coupled to the breaker/relay, or any other device, mechanism, or method to determine current values on the bus. In the example of FIG. 10, the current sensing device 6706 is coupled to the "trigger level 'off'" portion of the logical circuit, and operates to de-energize the relay when a high current value is sensed. The sensed high current value may be either a single threshold, for example as determined by the hardware in the logic circuit, and/or a selectable threshold, for example determined by a controller based on operating conditions or other values in the system. It can be seen that, either through hardware or utilizing a controller, functions of the sensed current value such as a rate of change, accumulated current value over a threshold, etc. may be utilized additionally or alternatively to the single sensed current value. It can be seen that a breaker/relay such as that depicted in FIG. 10 provides for controllable opening of the power bus circuit at a selected threshold current value and/or functions thereof, allowing for continuous operation throughout the range of rated current for the system. Additionally, a breaker/relay such as that depicted in FIG. 10 provides for a controllable disconnection of the power bus for any selected parameter which may not be current related, such as emergency shutdown operations, a request from somewhere else in the system (e.g., a vehicle controller), service or maintenance operations, or any other selected reason. Certain embodiments throughout the present disclosure provide for additional features of the breaker/relay, any one or more of which may be included in an embodiment such as that depicted in FIG. 10.

Figure 11:
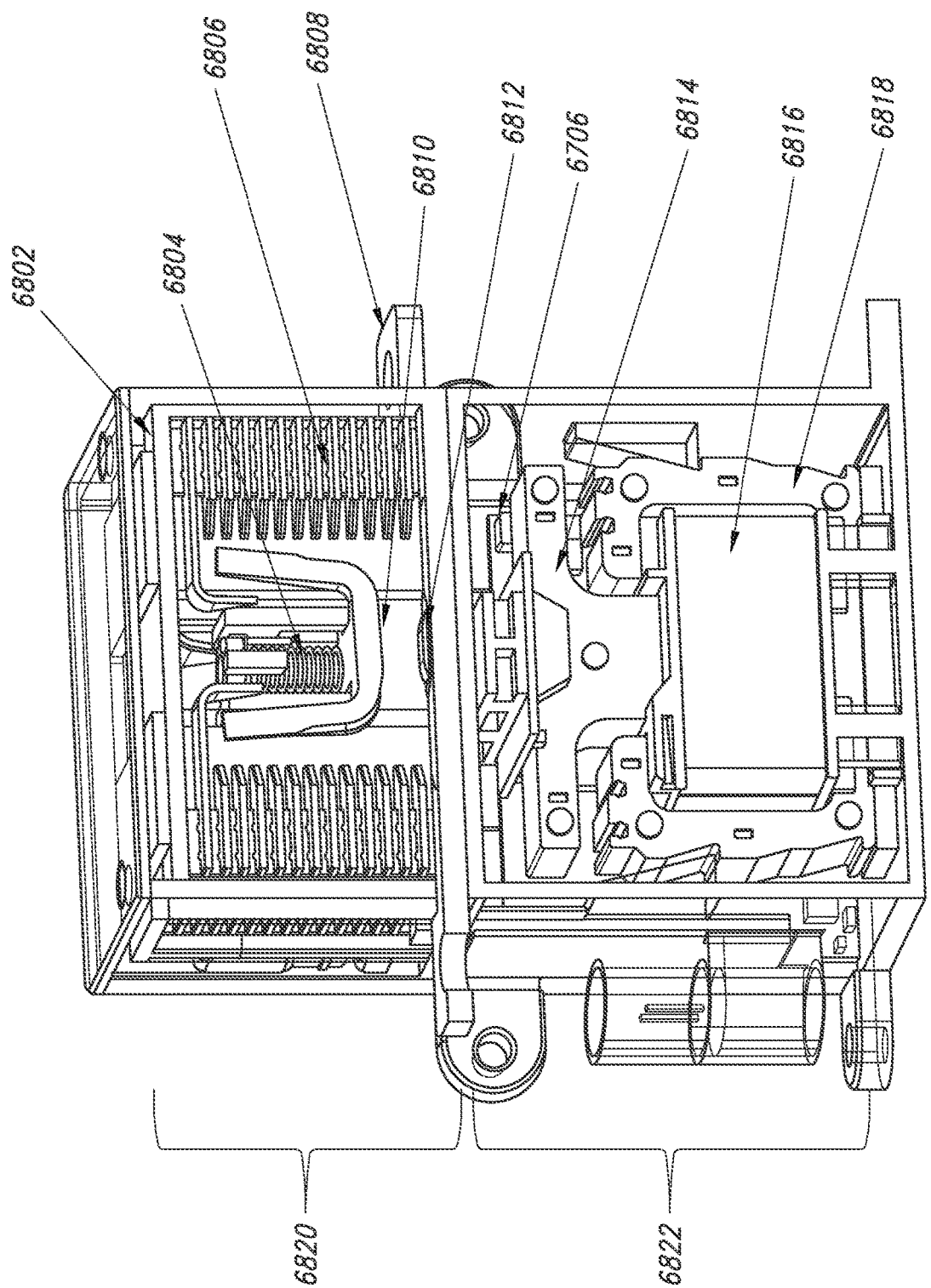
FIG. 11 depicts an embodiment detail of a breaker-relay component.

Referencing FIG. 11, an example breaker/relay is depicted schematically in a cutaway view. The example breaker/relay includes generally a switching portion 6820 (upper half, or "breaker") and an actuating portion 6822 (lower half, or "relay"). A few example components of the breaker/relay are depicted and described for illustration. The example breaker/relay includes a coil 6816 and magnet core 6818 in the relay portion. In the example, energizing the coil 6816 actuates the relay, pulling the armature 6814 down to the magnet core 6818. The armature 6814 is coupled to the movable contact 6810 in the upper portion, and is thereby moved into contact with the fixed contact 6812, completing the circuit and allowing current flow through the power bus. In the example of FIG. 11, the movable contact 6810 is pressed into the fixed contact 6812 by a contact force, which is a biasing spring 6804 of a selectable biasing force in the example of FIG. 11. The movable contact 6810 can be lifted from the fixed contact 6812 with sufficient force, compressing the contact force spring 6804, even if the armature 6814 is in the engaged (lower) position. The example of FIG. 11 depicts the armature 6814 in the disengaged (upper) position, where the movable contact 6810 is open or not in contact with the fixed contact 6812.

The breaker portion 6820 of the breaker/relay includes a number of splitter plates 6806 in proximity to a body of the main contact, and a permanent magnet system 6802 surrounding the splitter plates 6806 and/or the arcing path between the contact gap and the splitter plates 6806. During engagement or disengagement of the movable contact 6810 when the power bus is energized, the body of the main contact cooperates with the splitter plates 6806, in the presence of the magnetic fields provided by the permanent magnet system 6802, to dissipate and distribute the resulting arc, greatly reducing wear, degradation, and damage of the contacts. It has been shown that the combined aspects of the breaker portion greatly extend the life of the contacts and the switching chamber (e.g., due to lower arcing heat load over the life of the breaker/relay).

The current passing through the power bus generates a repulsive force between the contacts, or a Lorentz force. The Lorentz force is a complex function of the contact area of the contacts and the current value through the power bus. When the current is very high, the Lorentz force between the contacts sufficiently compresses the contact force spring 6804 to force the movable contact 6810 to lift off of the fixed contact 6812 and cause the relay to momentarily open. It has been found that the contact force spring 6804 can be readily tuned to provide for a physical disconnect of the contacts at a selectable value. Additionally or alternatively, the contact area between the contacts and other geometric aspects of the contacts can be manipulated to select or adjust the physical disconnect current. However, in certain embodiments, selection of the contact force spring 6804 provides for a straightforward tuning of the physical disconnect current. In certain embodiments, selection of the contact force spring 6804 includes changing the spring to change the physical disconnect current. Additionally or alternatively, the contact force spring 6804 can be adjusted in situ (e.g., compressing or releasing the spring axially) to adjust the physical disconnect current.

In certain embodiments, after the physical disconnect event (e.g., the movable contact 6810 is forced away from the fixed contact 6812, compressing the contact force spring 6812, while the armature 6814 is in the lower or contact position), the current through the power bus falls rapidly, and the Lorentz force decreases, causing the movable contact 6810 to be pushed by the contact force spring 6804 back toward an engaged position. In certain embodiments, the current sensor 6706 will have detected the high current event, triggering the coil 6816 to de-energize, and moving the armature 6814 back up to the disengaged position. Accordingly, as the movable contact 6810 returns to the engaged position, the armature 6814 has already moved it away such that the movable contact 6810 does not touch the fixed contact 6812 after a physical disconnect event. In certain embodiments, the threshold detected by the current sensor 6706 to disengage the armature 6814 is lower than the physical disconnect current, giving the armature 6814 a "head start" and decreasing the likelihood of a re-contact of the movable contact 6810 with the fixed contact 6812. In many systems, a re-contact between the movable contact 6810 and the fixed contact 6812 during a very high current event can result in significant damage to the breaker/relay and/or welding of the contacts.

Figure 12:
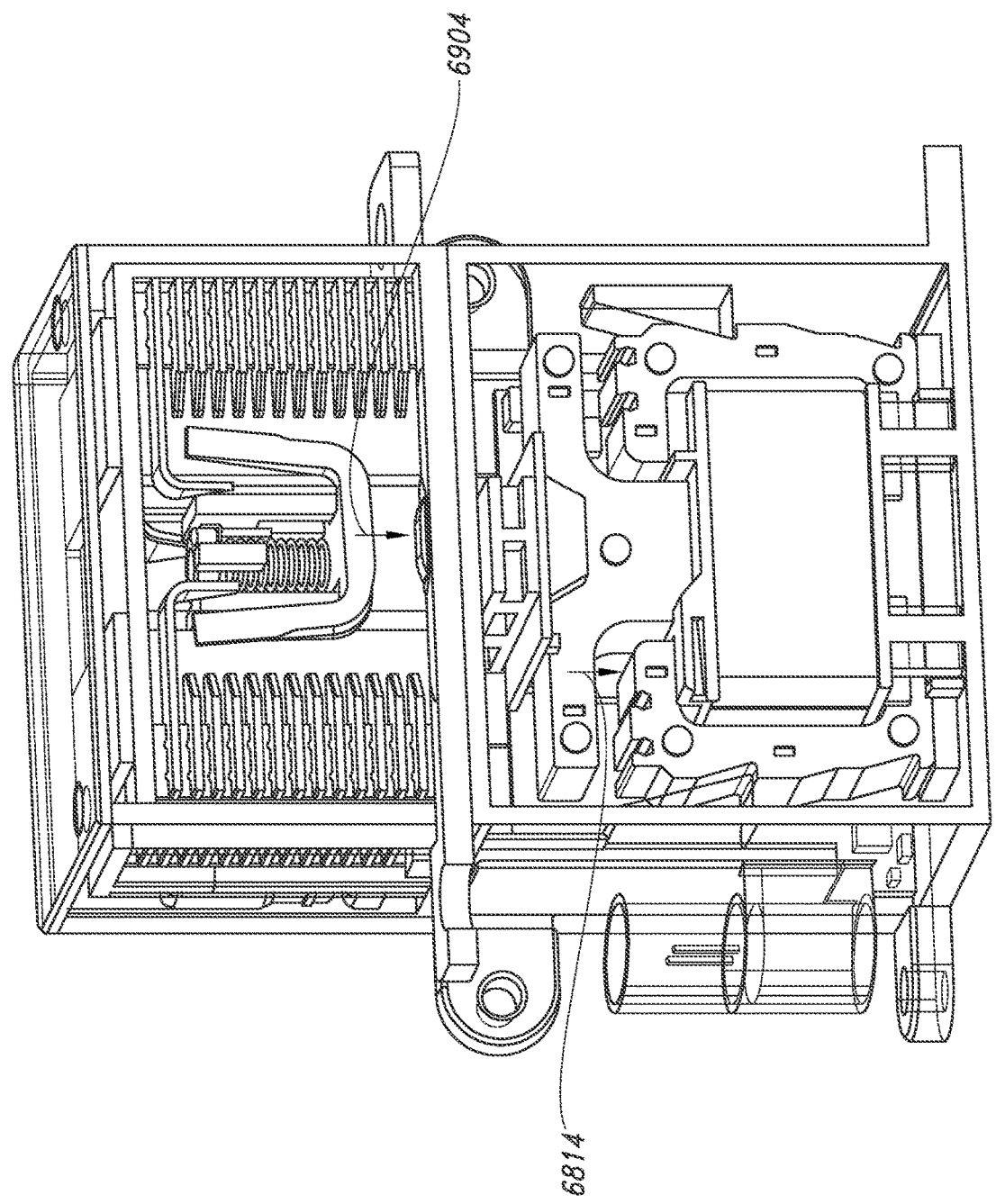
FIG. 12 depicts an embodiment detail of a breaker-relay component.

Referencing FIG. 12, an example breaker/relay is depicted showing the relative movement of the armature and the movable contact. In the example, the armature at the top enforces the movable contact away from the fixed contact, resulting in a disconnection of the power bus. The armature at the bottom pulls the moving contact down to engage the fixed contact, resulting in a connection of the power bus. The motion arrow 6904 in FIG. 12 references the movement of the armature that will occur as the armature moves from the open state to the closed state after the coil is energized. Any reference throughout the disclosure to "up" or "down" are for clarity of description, and do not reference actual vertical relationships of any components of the breaker/relay. A breaker/relay may be positioned such that movement of the armature is along any axis, including up-down, down-up, a horizontal orientation, and/or any other orientation. In certain embodiments, the armature returns to the up or disengaged position utilizing a passive element, such as a biasing spring or reverse spring (e.g., positioned between the armature and the permanent magnet, and/or a housing of one or more of these), resulting in a "normally-open" logical operation for the breaker/relay. The biasing spring or reverse spring does not appear in the schematic cutaway view of FIG. 12. As described throughout the present disclosure, the breaker/relay may be normally-open, normally-closed, latching, or in any other logical configuration, with appropriate adjustments to the hardware and/or control elements to provide such a configuration.

Figure 13:
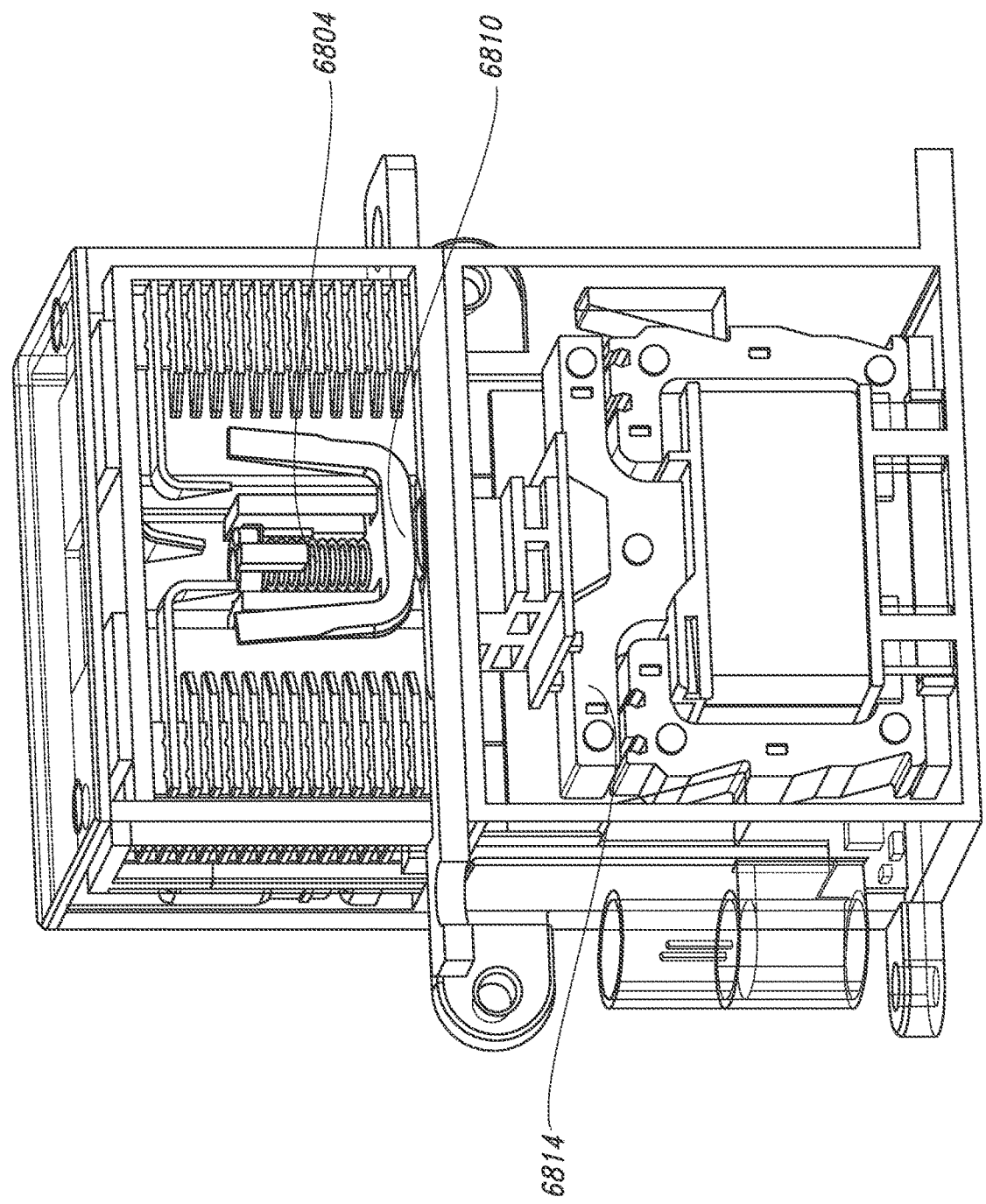
FIG. 13 depicts an embodiment detail of a breaker-relay component.

Referencing FIG. 13, an example breaker/relay is depicted in a closed position. The armature in the example of FIG. 13 has moved down, and the movable contact 6810 has additionally moved down with the armature 6814 to an engaged position with the fixed contact, closing the circuit and allowing power to pass through the power bus. The contact force spring 6804 in the position depicted in FIG. 13 is compressed, providing a contact force to the movable contact 6810 against the fixed contact. It can be seen that the movable contact is provided with movement space, where a force sufficient to overcome the contact force 6804 spring can lift the movable contact 6810 off of the fixed contact, thereby opening the circuit and preventing power to pass through the power bus.

Figure 14:
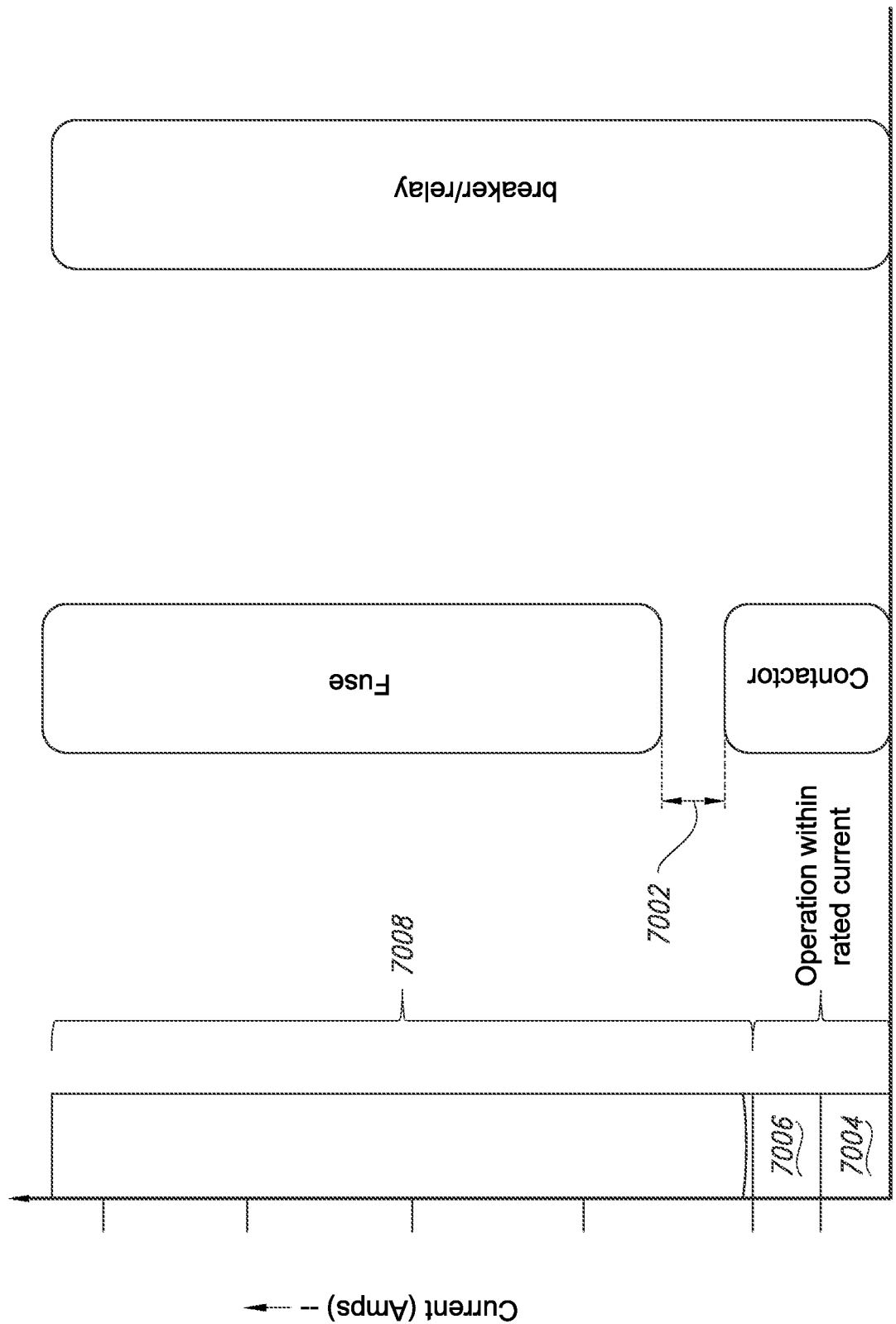
FIG. 14 depicts a current plot for a contactor-fuse and breaker-relay.

Referencing FIG. 14, an operating diagram for a previously known contactor-fuse system and a breaker/relay system consistent with embodiments of the present disclosure are depicted schematically. In the example of FIG. 14, an operating current bar is depicted at the left, having two general operating regimes—operation within rated current values (e.g., within designed current limits for a system, such as regions 7004, 7006) and operation above rated current values (e.g., region 7008). Additionally, in the example of FIG. 14, operations within the rated current are sub-divided into a lower region 7004 and an upper region 7006. In the example of FIG. 14, the lower region 7004 and upper region 7006 are illustrative examples to depict operating modes within the rated current region—for example the lower region 7004 may be associated with lower power operation such as operation of accessories and the upper region 7006 may be associated with higher power operation such as provision of motive power or pumping power. The regions 7004, 7006 provide for a notional distinction between operating conditions, and the actual operations that occur within the lower region 7004 and upper region 7006 are not important for the illustration of FIG. 14. For example, an upper region 7006 for one illustrative system may be motive power to move a vehicle (e.g., where the lower region 7004 is another function such as power to communications or accessories), where a lower region 7004 for another illustrative system may be motive power to move a vehicle (e.g., where the upper region 7006 is another function such as charging or high performance motive power).

In the example of FIG. 14, an operation region for the contactor-fuse system is depicted in the middle. The contactor provides for full operation up to the rated power. A design choice may allow for the contactor to provide operation slightly above rated power (e.g., where system risk is accepted to provide higher capability) or slightly below rated power (e.g., where system performance is compromised to protect the system components). The contactor-fuse system further includes an operating region for the fuse, where the fuse activates at a selected current value. It can be seen that an operational gap 7002 occurs, where the fuse does not activate due to the low current value, but the contactor also does not support operations in the gap 7002 region. The gap 7002 can only be closed by overlapping operation of the contactor and/or the fuse, necessarily compromising the system risk profile or performance. If the fuse region is extended lower, then rated operation under certain duty cycles may trigger a fuse event and loss of mission. Additionally, as the contactor and fuse experience wear or degradation, the operating region for the contactor-fuse system will move, resulting in inconsistent system performance, loss of protection, and/or unnecessary fuse events. Additionally, the failure mode of a fuse results in extended exposure of the system to high currents due to the fuse melt period and extended arcing time through the activating fuse. Finally, operations of the contactor at the upper range of the contactor operating region results in undesirable heating and degradation of the contactor.

In the example of FIG. 14, an operating region for a breaker/relay consistent with certain embodiments of the present disclosure is depicted. The breaker/relay provides for a smooth and selectable functionality throughout the operating current bar. The breaker/relay provides for a highly capable contact that does not operate near the upper region of its current capacity, reducing heating and degradation from high, within rated range, operations, such as in the upper region 7006. Additionally, the current sensor and related disconnect operations allow for a selectable disconnection when operation is above the rated current for the system. Further, a physical disconnect current is available (e.g., reference FIG. 11 and the associated disclosure) that provides for immediate disconnection of the power bus at very high current values. In certain embodiments, arc dissipation features of the breaker/relay additionally provide for a faster and less damaging disconnect event than experienced by previously known contactor-fuse arrangements. Additionally, the breaker/relay provides for a recoverable disconnect operation, where a mere command to the breaker/relay will again provide connection without a service event. Accordingly, if the system failure causing the high current event is resolved or consistent with a restart, the system can resume operations with the breaker/relay as soon as desired, without having to diagnose a fuse event or change out the fuse.

Figure 15:
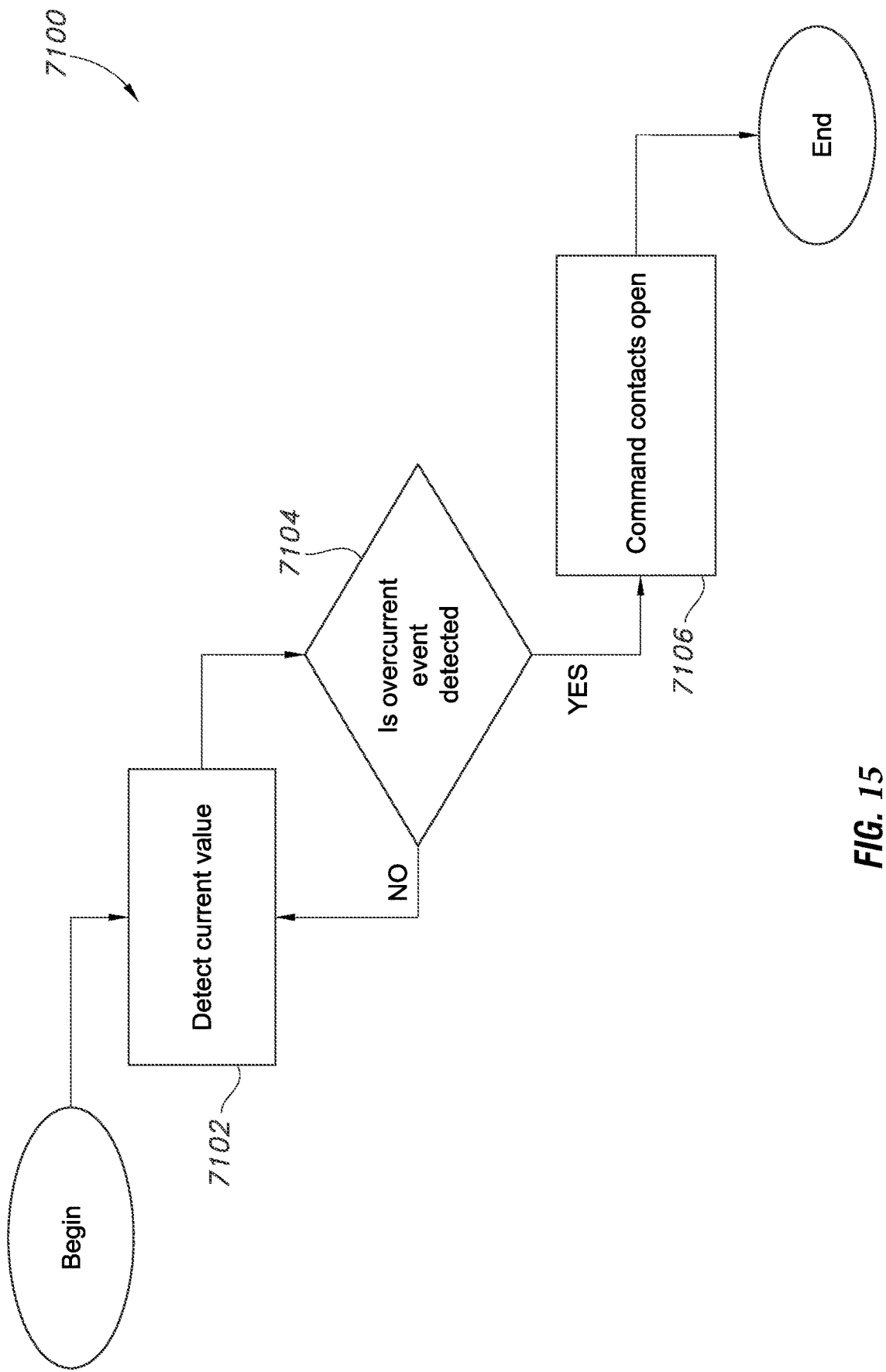
FIG. 15 depicts an embodiment flow diagram for current protection.

Referencing FIG. 15, an example procedure 7100 is depicted to disconnect a power bus. The example procedure 7100 includes an operation 7102 to detect a current value, for example utilizing a current sensor (reference FIG. 11). The procedure 7100 further includes an operation 7104 to determine if an overcurrent event is detected. For example, the detected current value, a function thereof, or a calculated parameter determined in response to the current value, can be compared to a threshold value to determine if an overcurrent event is detected. The example procedure 7100 further includes an operation 7106 to command the contacts open, for example by de-energizing a coil and thereby moving an armature to a position that opens the contacts. The overcurrent threshold may be any value, and may be modified in real-time and/or in accordance with operating conditions. The value for the overcurrent threshold depends upon the application and the components in the system. Example and non-limiting overcurrent values include 100 A, 200 A, 400 A, 1 kA (1,000 amps), 1.5 kA, 3 kA, and 6 kA.

Figure 16:
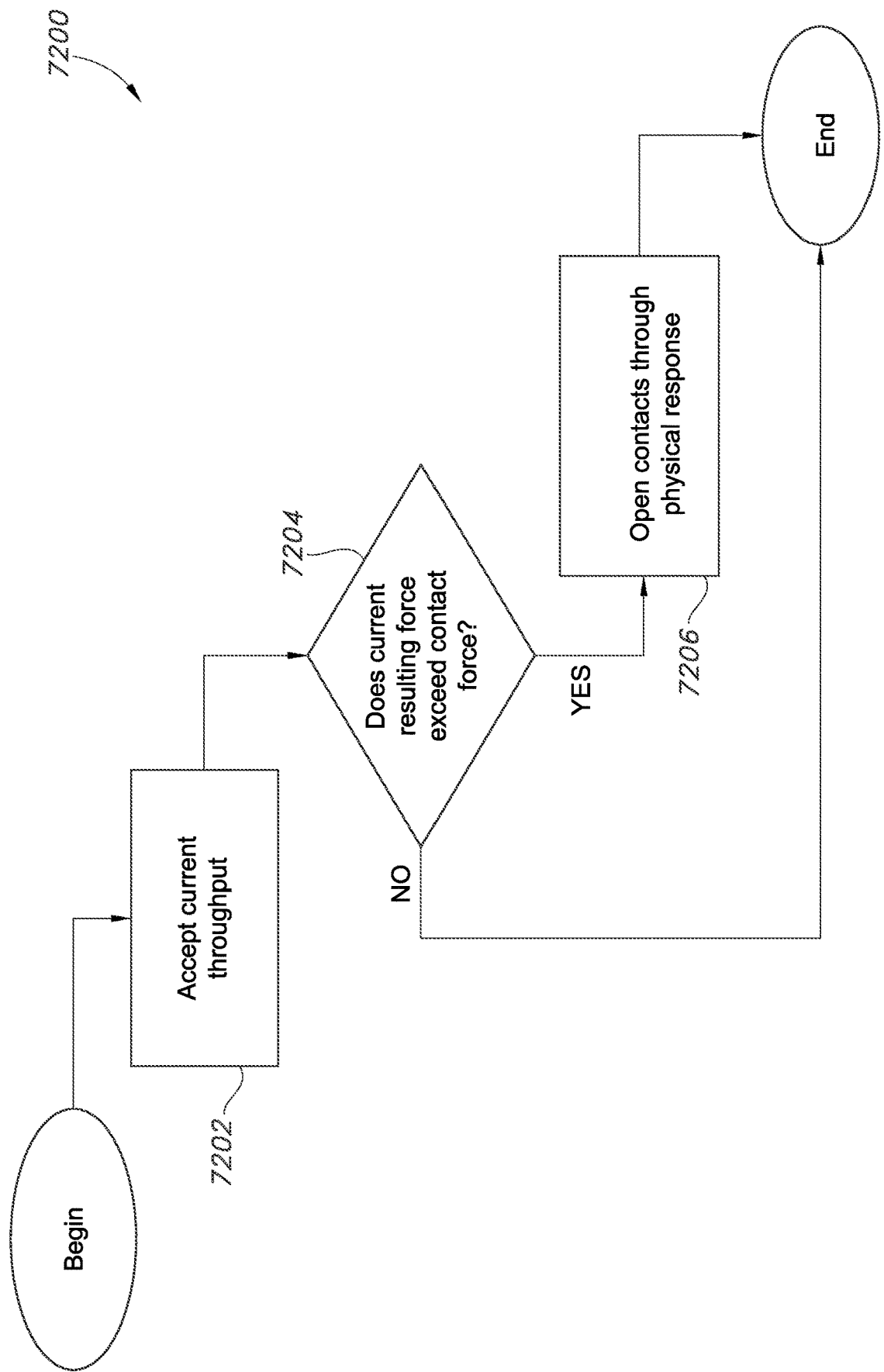
FIG. 16 depicts an embodiment flow diagram for current protection.

Referencing FIG. 16, an example procedure 7200 is depicted to perform a physical disconnect. The example procedure 7200 includes an operation 7202 to accept current throughput, for example as current passing through coupled contacts in a power bus. The example procedure 7200 further includes an operation 7204 to determine whether the current resulting force (e.g., a Lorentz force between a movable contact and a fixed contact) exceeds a contact force (e.g., as provide by a contact force spring). The example procedure 7200 further includes an operation 7206 to open the contacts through a physical response—for example as the Lorentz force overcoming the contact force spring and moving the movable contact away from the fixed contact. The physical disconnect current may be any value, and depends upon the application and the components in the system. Example and non-limiting physical disconnect currents include 400 A, 1 kA, 2 kA, 4.5 kA, 9 kA, and 20 kA.

Figure 17:
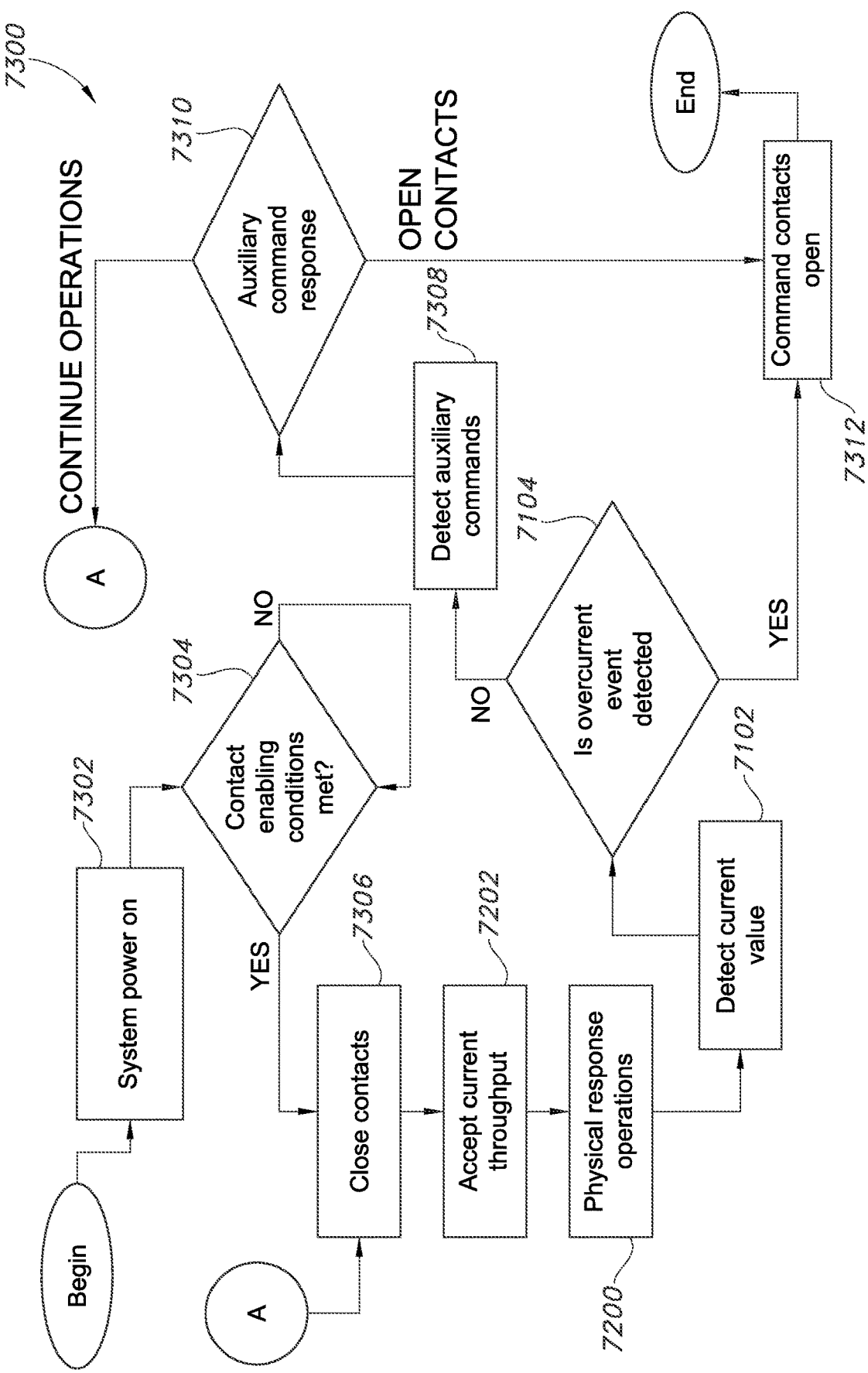
FIG. 17 depicts an embodiment flow diagram for current protection.

Referencing FIG. 17, an example procedure 7300 is depicted to open contacts in response to an overcurrent event, and/or in response to any other selected parameters. The example procedure 7300 includes an operation 7302 to power a system on, for example via a keyswitch or other circuit, and/or via recognition of a keyswitch ON condition. The procedure 7300 further includes an operation 7304 to determine whether contact enabling conditions are met, for example immediately after the keyswitch ON, after a selected time period, after a system pre-charge event is determined to be completed, and/or according to any other selected conditions. In certain embodiments, where the operation 7304 determines that contact enabling conditions are not met, the procedure 7300 holds on operation 7304 until contact enabling conditions are met. Any other response to operation 7304 determining that contact enabling conditions are not met is contemplated herein, including requesting a permission to enable contact conditions, setting a fault code, or the like. In response to operation 7304 determining that contact conditions are met, procedure 7300 further includes an operation 7306 to close the contacts (e.g., energizing a coil to move an armature), and an operation 7202 to accept current throughput. The example procedure 7300 further includes operation 7200 performing a physical disconnect if the accepted current is high enough, and proceeds to operation 7102 to detect a current value through the power bus. The procedure 7300 further includes an operation 7104 to determine if an overcurrent event is detected (operation 7104, in certain embodiments, may be set at a lower current value than the physical disconnect current tested at operation 7200). In response to the operation 7104 determining that an overcurrent event is detected, procedure 7300 includes an operation 7312 to command the contacts open. In response to operation 7104 determining that an overcurrent event is not detected, procedure 7300 includes an operation 7308 to detect auxiliary commands (e.g., an auxiliary off input), and an operation 7310 to determine if an auxiliary command is present to open the contacts (e.g., a logical high, logical low, specified value, lack of a specified value, etc.). In response to the operation 7310 determining that an auxiliary command is present to open the contacts, procedure 7300 includes the operation 7312 to command the contacts open. In response to the operation 7310 determining that an auxiliary command is not present to open the contacts (e.g., branch "CONTINUE OPERATIONS" in the example of FIG. 17) procedure returns to operation 7306.

Figure 18:
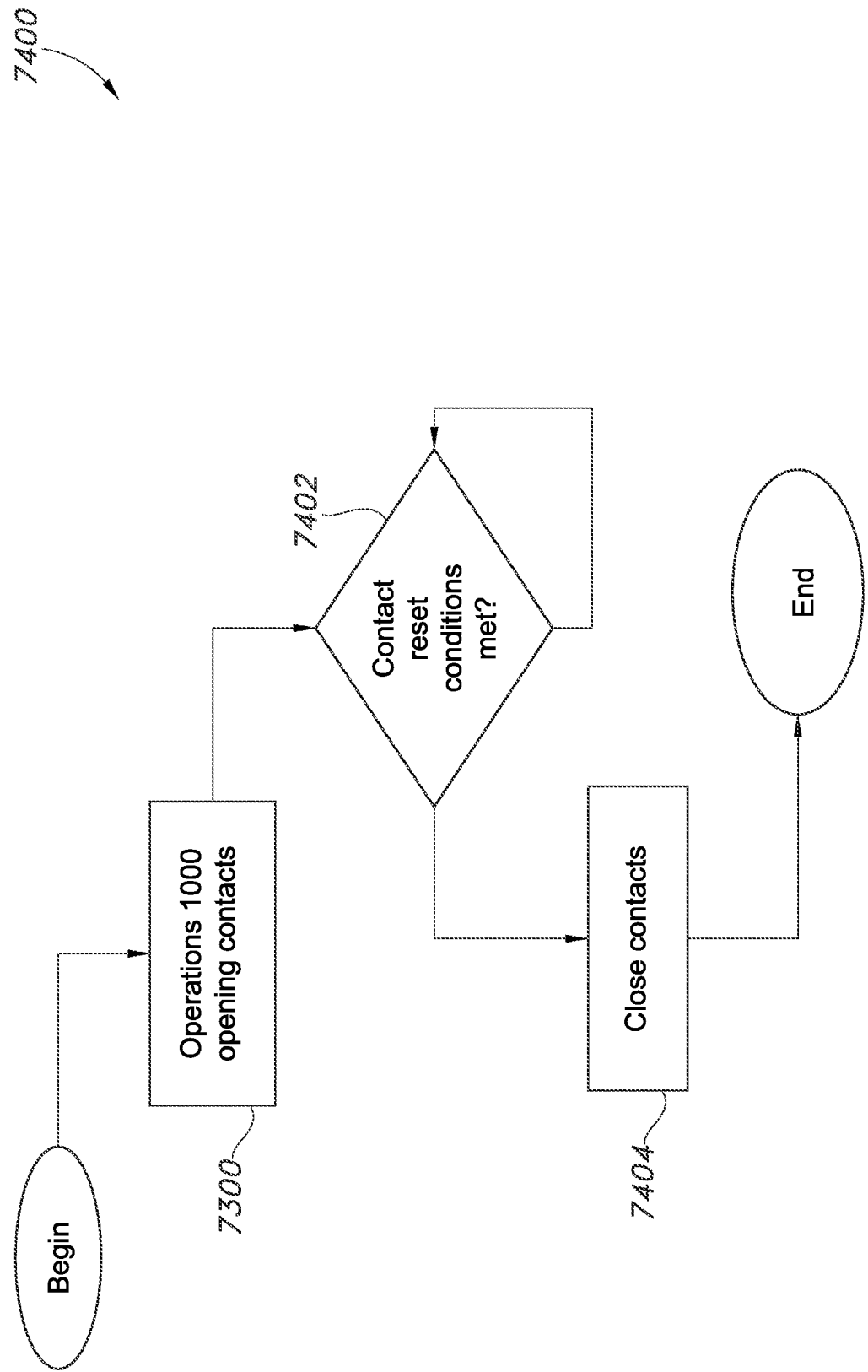
FIG. 18 depicts an embodiment flow diagram for current protection.

Referencing FIG. 18, an example procedure 7400 to restore operations of a breaker/relay after a contact opening event. The example procedure 7400 includes an operation 7300 to open the contacts of the breaker/relay, for example an operation wherein the contacts are opened due to a physical disconnect, an overcurrent detection, and/or an auxiliary off command The procedure 7400 further includes an operation 7402 to determine if contact reset conditions are present. Example and non-limiting operations 7402 include determining that contact enabling conditions are met, determining that a fault code value has been reset, determining that a system controller is requesting a contact reset, and/or any other contact reset conditions. The procedure 7400 further includes an operation 7404 to close the contacts, for example by providing power to the coil to move the armature.

Figure 19:
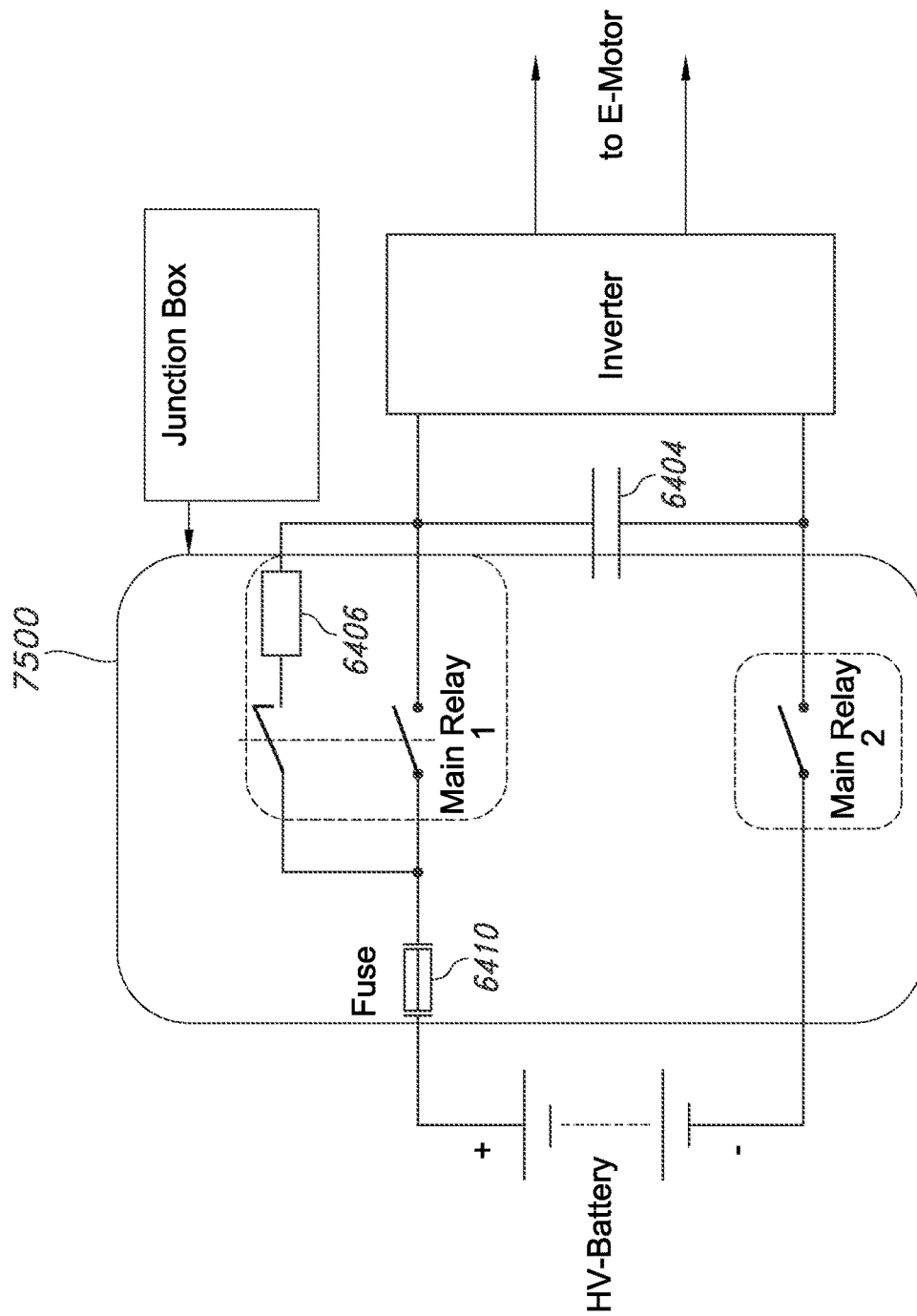
FIG. 19 depicts a schematic diagram of a power protection configuration between a battery and an inverter.

Referencing FIG. 19, an example previously known mobile power circuit is depicted. The example mobile power circuit is similar to the mobile power circuit depicted in FIG. 7. The example of FIG. 19 includes a junction box housing the pre-charge circuit, a high side relay, and a low side relay. In certain embodiments, the pre-charge circuit and the high side relay are provided in a housing within the junction box. In the example of FIG. 19, a fuse 6410 provides overcurrent protection on the high side, and is housed with the main relays and the precharge resistor 6406 within a PDU housing 7500.

Figure 20:
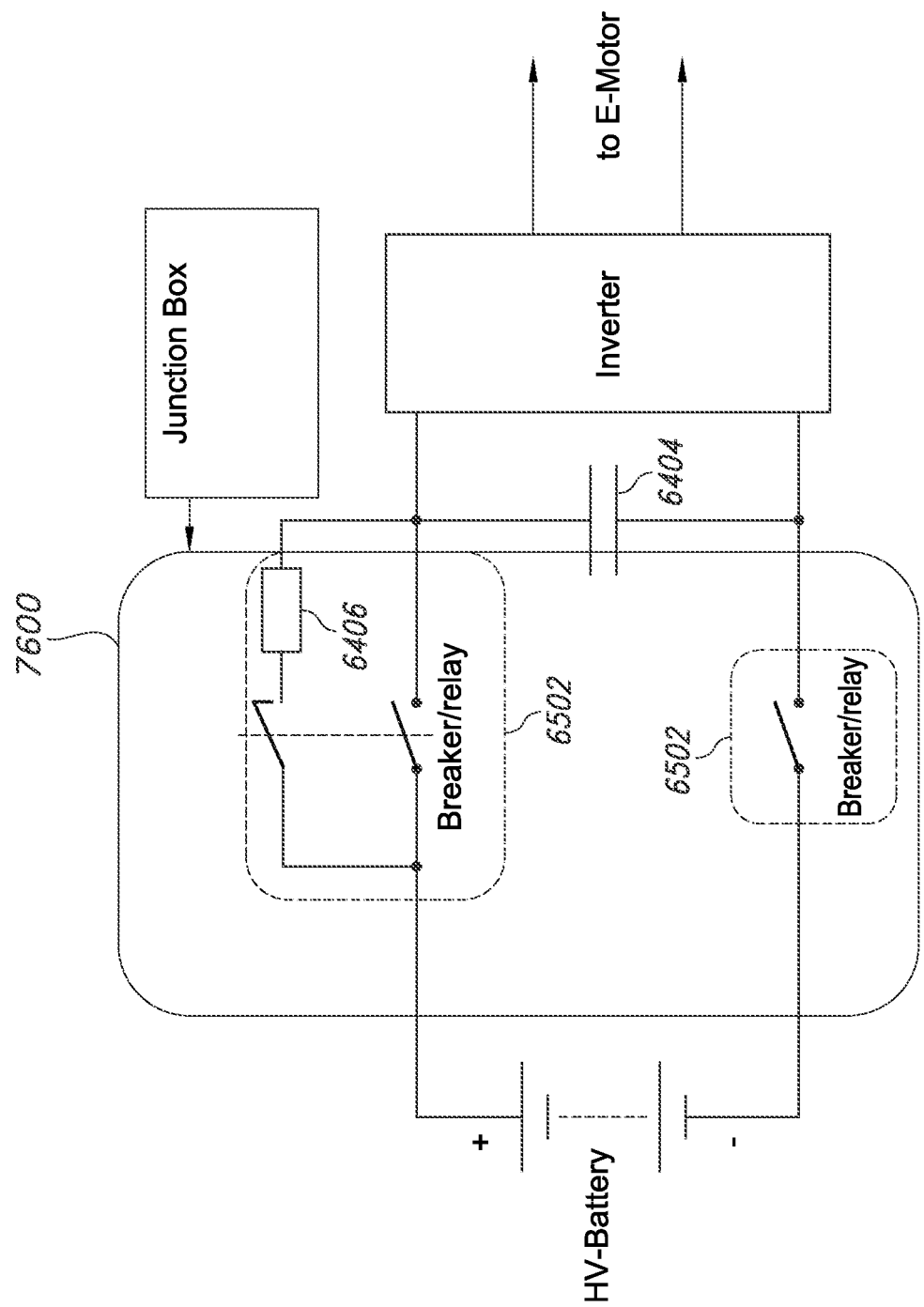
FIG. 20 depicts a schematic diagram of a power protection configuration between a battery and an inverter.

Referencing FIG. 20, an example mobile power circuit including a breaker/relay 6502 disposed in the high side circuit, and a second breaker/relay 6502 positioned in the low side circuit. Each breaker/relay 6502, in certain embodiments, provides continuous overcurrent control throughout the operating region of the mobile application as described throughout the present disclosure. Additionally, it can be seen that the low side breaker/relay 6502 provides for overcurrent protection in all operating conditions, including during a pre-charge operation when the high side breaker/relay 6502 may be bypassed so the mobile power circuit can pre-charge through the pre-charge resistor 6406. In certain embodiments, both the high side breaker/relay 6502 and the low side breaker/relay 6502 provide additional benefits such as rapid arc dispersion, low wear during connection and disconnection events, and improved heating characteristics during high, but in rated range, current operation of the mobile circuit.

Figure 21:
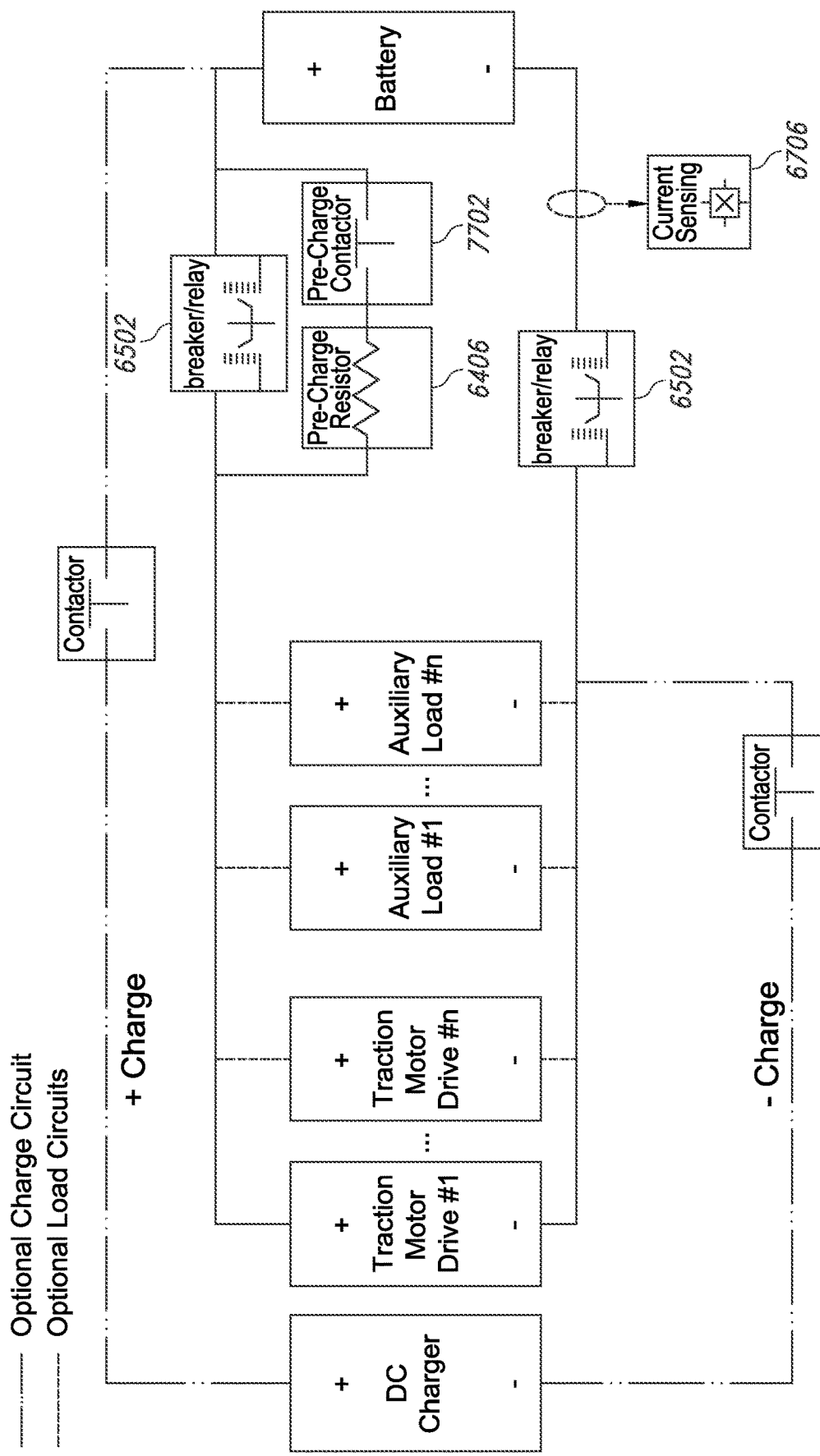
FIG. 21 depicts a schematic diagram of a power protection configuration between a battery and loads.

Referencing FIG. 21, an example power distribution arrangement for a mobile application is depicted. The embodiment of FIG. 21 is similar to the embodiment of FIG. 20, with a high side breaker/relay 6502 and a low side breaker/relay 6502. Four operating regimes of the embodiment of FIG. 21 are described herein, including pre-charge operations (e.g., at system power-on for the mobile application), powering operations for loads (e.g., providing motive power or auxiliary power for the mobile application), regeneration operations (e.g., recovering power from a motive load or auxiliary load), and charging operations (e.g., connection of a dedicated charger to the system). In the example of FIG. 21, the low side breaker/relay 6502 has an associated current sensor 6706. In the example of FIG. 21, the low side breaker/relay 6502 is in the loop during all operations, and can provide current protection for any operating conditions. To save costs, a current sensor for the high side breaker/relay 6502 can be omitted. In certain embodiments, for protection of the breaker/relay contacts 6502, a local current sensor may be included for each breaker/relay 6502, to provide for operations to protect the contacts in the event of a physical current disconnection (e.g., reference FIG. 14). It can be seen that additional contactors and/or breaker/relays may be provided beyond those shown—for example to isolate the charge circuit, to route power through selected ones of the motive loads and/or auxiliary loads, and/or to prevent power flow through an inverter (not shown) during charging operations. Additionally or alternatively, certain components depicted in FIG. 21 may not be present in certain embodiments. For example, a low-side contactor on the charge circuit may not be present, and any one or more of the motive loads (traction motor drive) or auxiliary loads may not be present. During a pre-charge operation, a pre-charge contactor 7702 may be closed while the high-side breaker/relay 6502 is open, where the low-side breaker/relay 6502 provides for current protection (in addition or as an alternative to a pre-charge fuse) during pre-charge operations. During charging operations, the low-side breaker/relay 6502 provides current protection, while the high-side breaker/relay 6502 is bypassed by the charging circuit.

Figure 22:
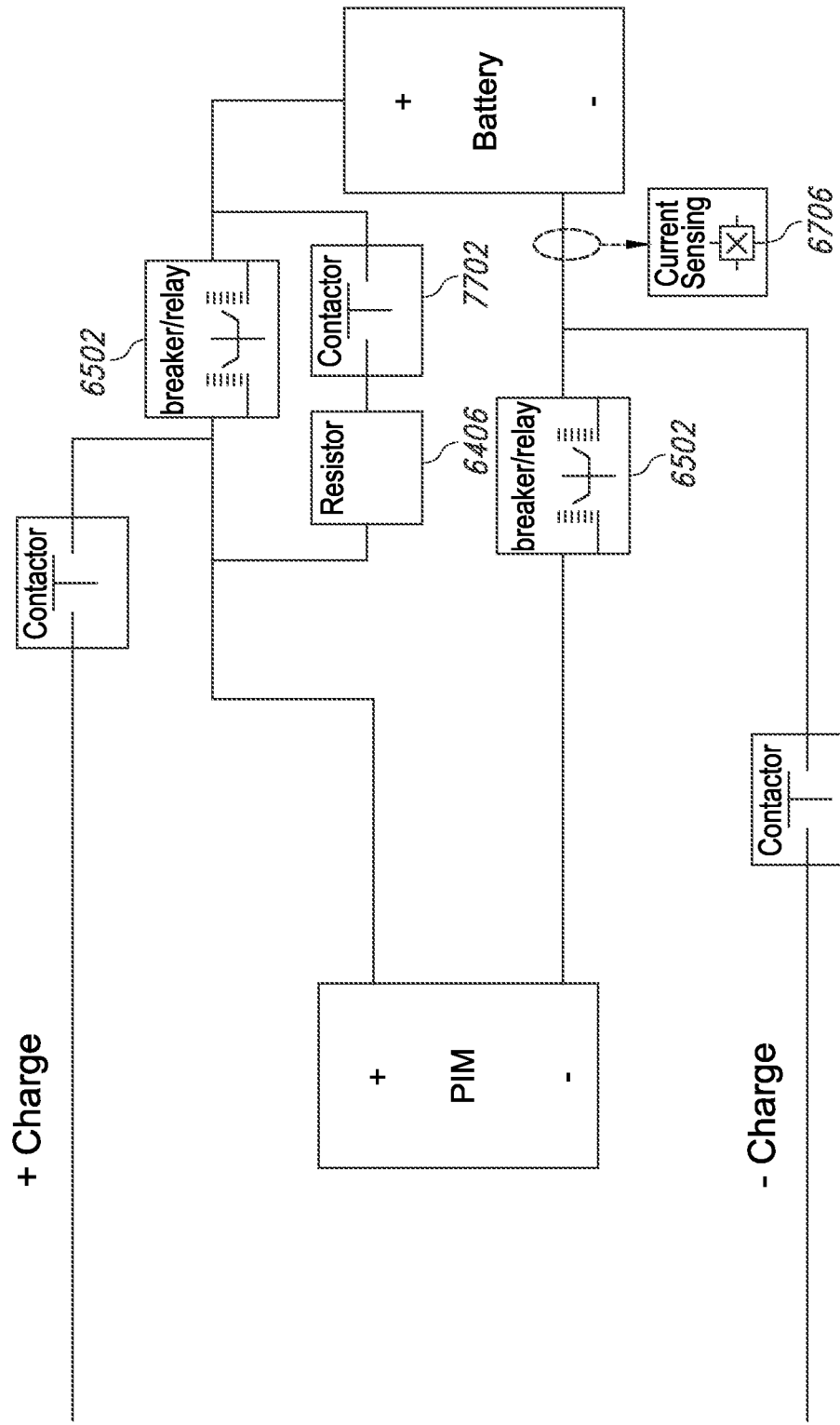
FIG. 22 depicts a schematic diagram of a power protection configuration.

Referencing FIG. 22, an example power distribution management for a mobile application is depicted. The embodiment of FIG. 22 is similar to the embodiment of FIG. 21, except that the high side breaker/relay 6502 is in the loop during all operations, and the low side breaker/relay 6502 is not in the loop during charging operations. In the example of FIG. 22, the high side breaker/relay 6502 may include current sensing associated therewith to provide protection for the contacts during a physical current disconnection. In certain embodiments, depending upon the circuit dynamics of the mobile application, the current sensor 6706 depicted on the low side may be sufficient to provide protection for the contacts of the high side breaker/relay 6502 without a dedicated current sensor for the high side breaker/relay 6502. During pre-charge operations for the embodiment of FIG. 22, current protection is not present, or is provided by a pre-charge fuse. During charging operations for the embodiment of FIG. 22, current protection is provided by the high-side breaker/relay 6502.

Figure 23:
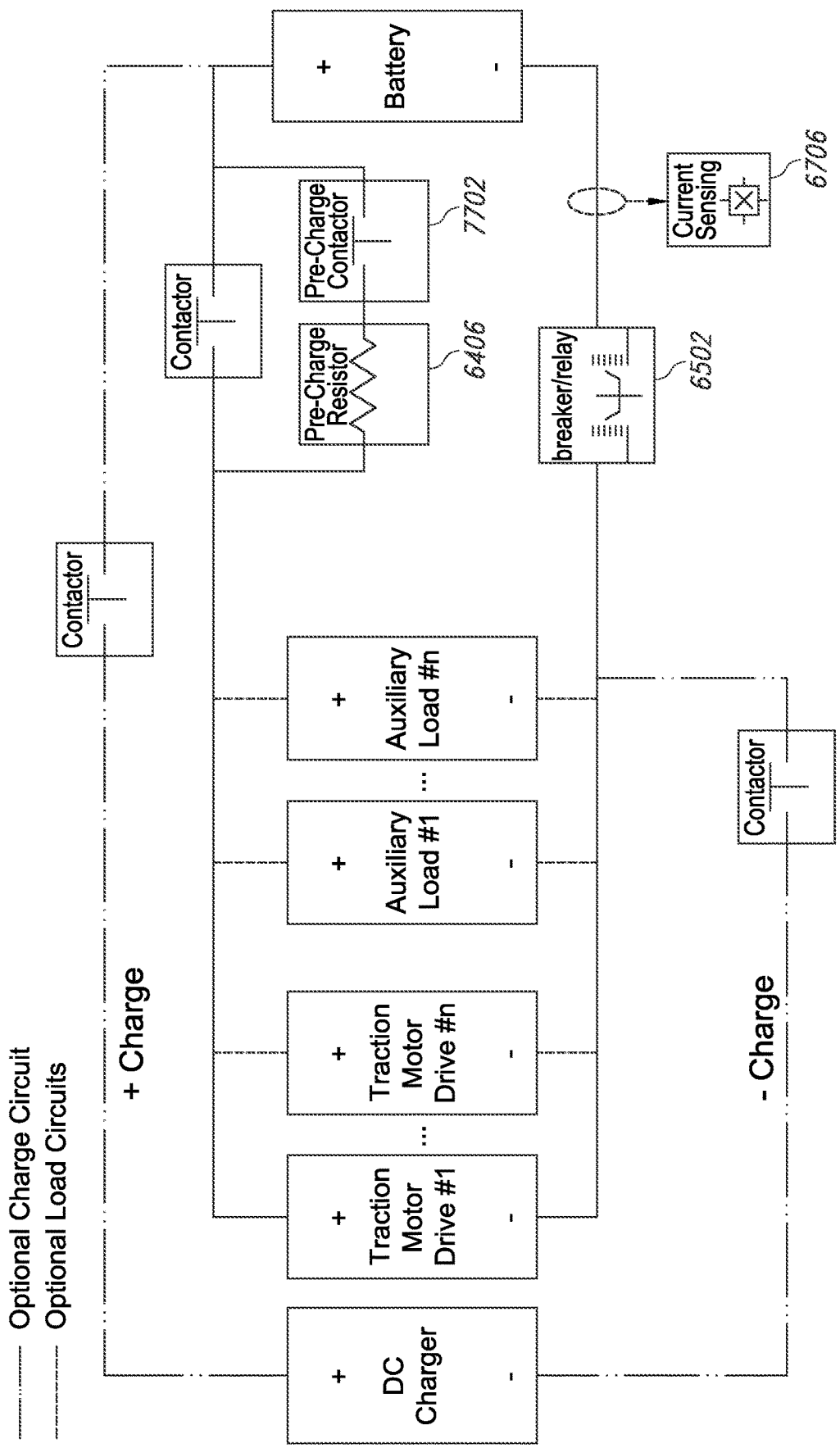
FIG. 23 depicts a schematic diagram of a power protection configuration between a battery and loads.

Referencing FIG. 23, an example power distribution management for a mobile application is depicted. The embodiment of FIG. 23 is similar to the embodiment of FIG. 21, except that the high side breaker/relay 6502 is exchanged for a standard contactor. In the example of FIG. 23, the low side breaker/relay 6502 provides for current protection during all operating conditions, and the system otherwise uses conventional components. In certain embodiments, improved current protection capability is desirable, but contactor wear may not be as much of a concern, and a trade-off for inexpensive contactors at other positions in the mobile power circuit away from the low side breaker/relay 6502 may be an acceptable solution. Additionally, the presence of the low side breaker/relay 6502 in the circuit for all operating conditions can reduce the wear on the conventional contactors in the mobile power circuit through timing of connections such that the low side breaker/relay 6502 reduces the number of connection and disconnection events on other contactors while the system is charged.

Figure 24:
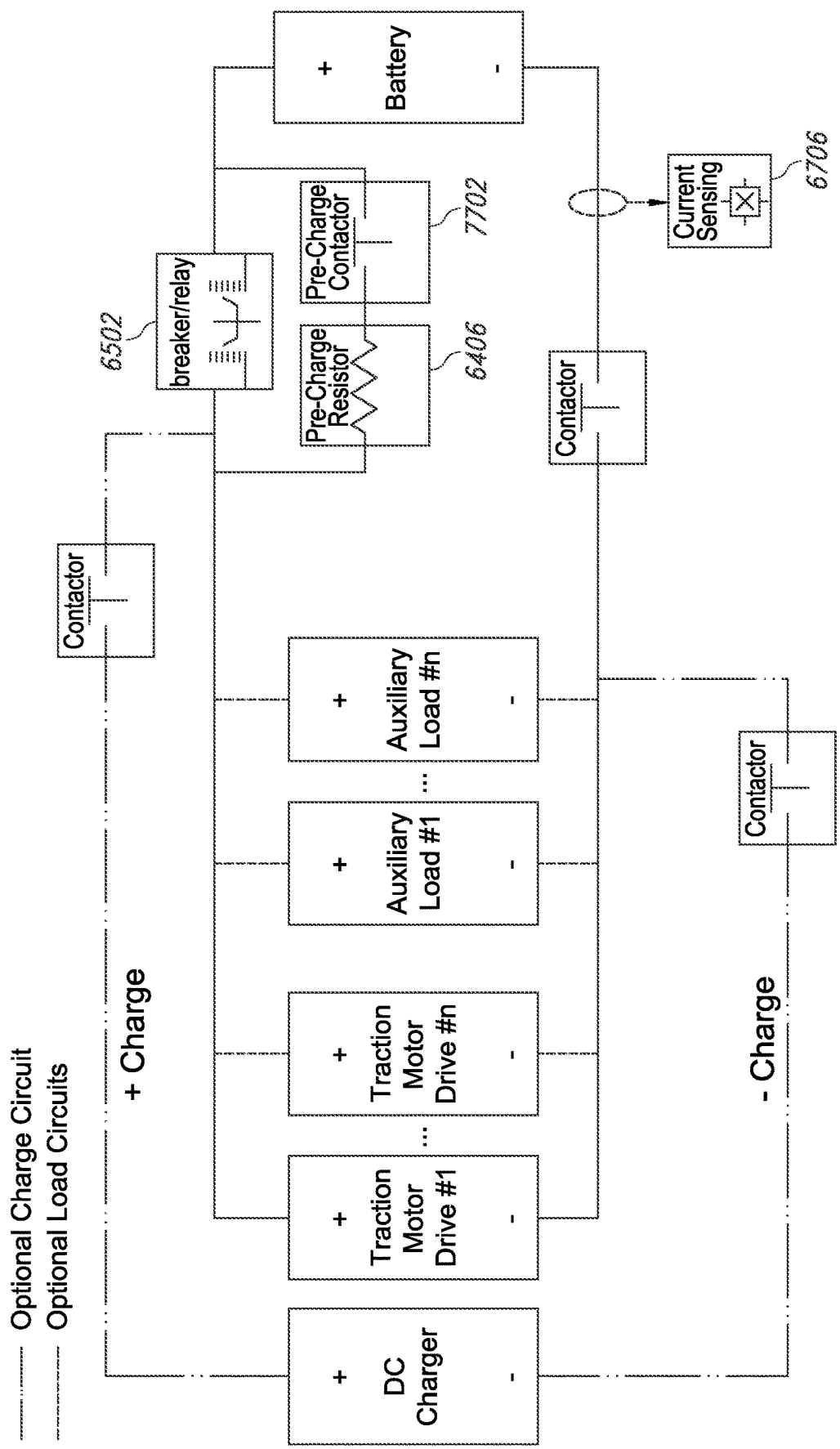
FIG. 24 depicts a schematic diagram of a power protection configuration between a battery and loads.

Referencing FIG. 24, an example power distribution management for a mobile application is depicted. The embodiment of FIG. 24 is similar to the embodiment of FIG. 22, except that the low side breaker/relay is replaced with a contactor, and the low side charging circuit is routed through the low side contactor. The low side charging circuit may bypass the low side contactor in certain embodiments, similar to the embodiment of FIG. 22. It can be seen in FIG. 24 that a circuit path lacking short-circuit protection exists through the pre-charge circuit during pre-charging operations when the high side breaker/relay 6502 is being bypassed, unless protection is provided by a pre-charge fuse. In certain embodiments, a fuse in the pre-charge circuit (not shown) may be provided to provide for short-circuit protection during the pre-charge operating condition, and/or the unprotected pre-charge operation may be an acceptable risk. In any of the embodiments depicted throughout the present disclosure, fuses may be included, potentially in-line with a breaker/relay 6502, depending upon the benefits sought from the breaker/relay 6502 for the particular embodiment. In certain embodiments, an included fuse with a breaker/relay 6502 may be configured to activate at a very high current value that is expected to be higher than the physical disconnection current of the breaker/relay 6502, for example as a redundant protection for the circuit, and/or to provide for a long-life fuse that is expected to last for a selected period, such as the service life of the electric mobile application.

Figure 25:
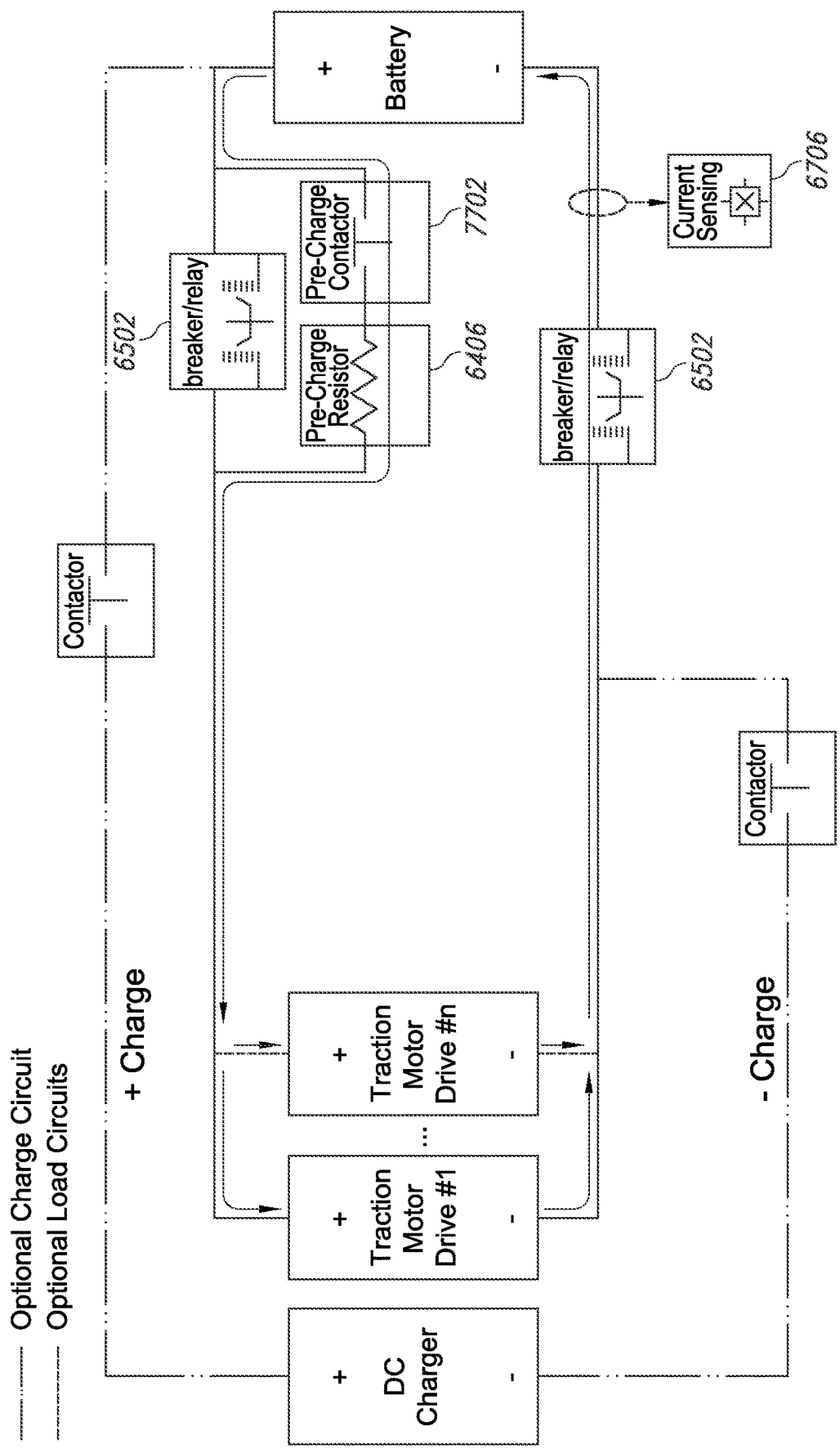
FIG. 25 depicts a schematic diagram of a power protection configuration between a battery and loads with current path depiction.

Referencing FIG. 25, an example power distribution management for a mobile application is depicted, consistent with the embodiment depicted in FIG. 21. Power flow during pre-charge operations is depicted schematically in FIG. 25, with arrows showing the power flow path. The operations described in relation to FIG. 25 can be understood in the context of any of the embodiments described throughout the present disclosure. During pre-charge operations, the pre-charge contactor 7702 is closed and the low side breaker/relay 6502 is closed, providing power through the mobile circuit and through the pre-charge resistor 6406. The pre-charge operation allows for capacitive elements of the mobile circuit to be charged before the high side breaker/relay 6502 is closed. During pre-charge operations in the embodiment of FIG. 25, the low side breaker/relay 6502 provides for overcurrent protection of the circuit. After the pre-charge operation is complete, which may be determined in an open loop (e.g. using a timer) manner or in a closed loop (e.g., detecting a voltage drop across the batter terminals, or detecting the current through the circuit), the high side breaker/relay 6502 is closed and the pre-charge contactor 7702 may be opened.

Figure 26:
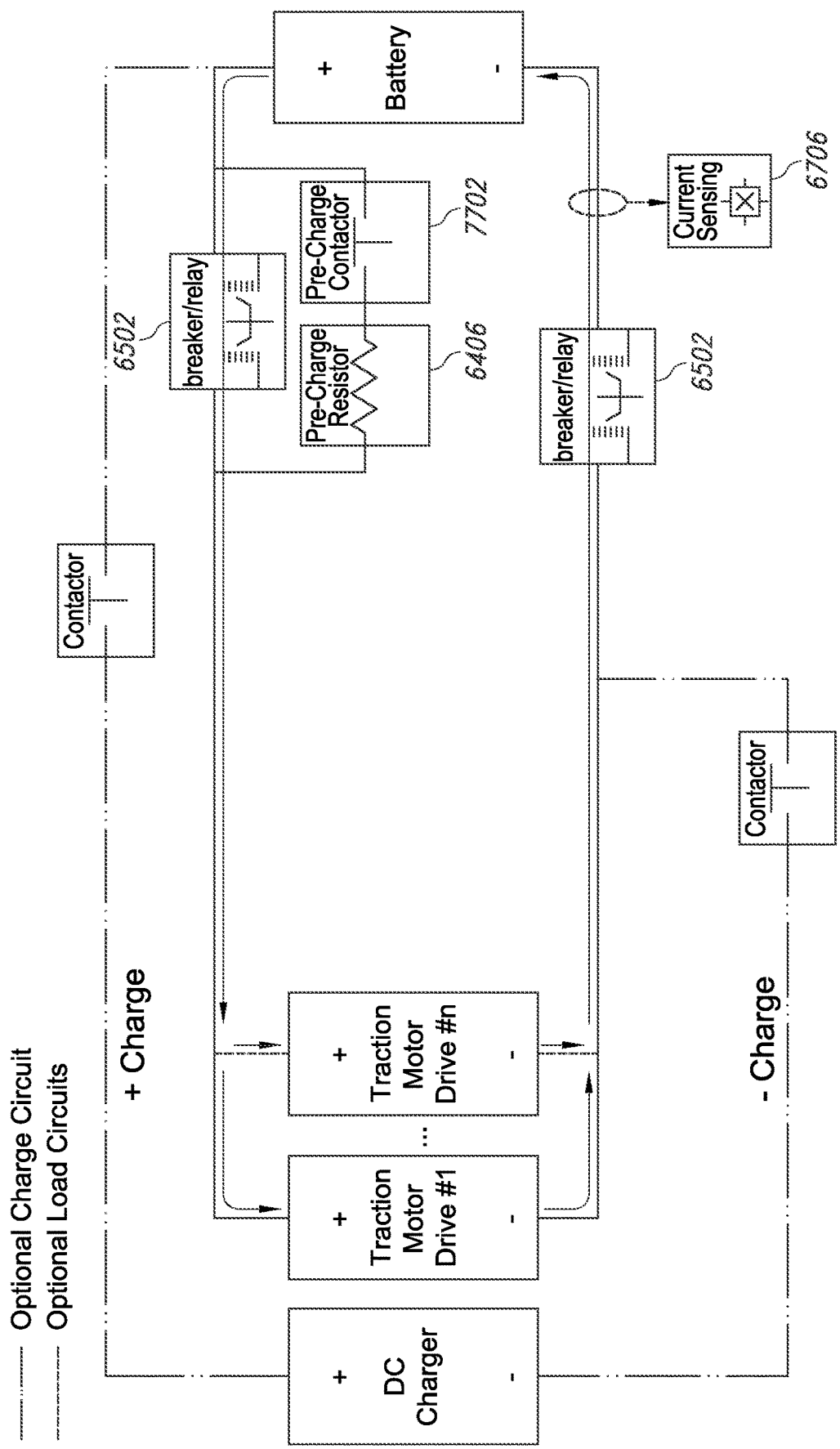
FIG. 26 depicts a schematic diagram of a power protection configuration between a battery and loads with current path depiction.

Referencing FIG. 26, an example power distribution management for a mobile application is depicted, consistent with the embodiment depicted in FIG. 21. Power flow during load powering operations is depicted in FIG. 26, with arrows showing the power flow path. The operations described in relation to FIG. 26 can be understood in the context of any of the embodiments described throughout the present disclosure. During load powering operations, in the example the pre-charge contactor 7702 is open, and power flows through the high side breaker/relay 6502 and the low side breaker/relay 6502. The embodiment of FIG. 26 depicts a traction motor load being powered, but one or more auxiliary loads may additionally or alternatively be powered in a similar manner During load powering operations, both the high side breaker/relay 6502 and the low side breaker/relay 6502 provide overcurrent protection. In certain embodiments, the high side breaker/relay 6502 and the low side breaker/relay 6502 may have the same or distinct current ratings. For example, where one of the high side breaker/relay 6502 or low side breaker/relay 6502 are easier to service or less expensive, that one of the breaker/relays 6502 may have a lower overall current rating to provide for a system where a predictable one of the breaker/relays 6502 fails first. Additionally or alternatively, certain operations on the system may have a higher current rating—for example charging operations where the charging circuit is routed only through one of the breaker/relays 6502 (e.g., the low side breaker/relay in the embodiment of FIG. 26), and thus one of the breaker/relays 6502 may have a higher current rating than the other. In certain embodiments, a breaker/relay 6502 current rating may be reflected in the contact materials of the movable contact and the fixed contact, by a contact surface area of the movable contact and the fixed contact, by threshold settings for the controlled operations in response to detected current, by a number or arrangement of splitter plates, by splitter plate materials and geometry, by the magnet strength and geometry of the permanent magnet system around the splitter plates, by the contact force of the contact force spring, and/or by the breaker/relay design elements (e.g., contact surface area and contact spring force) determining the physical disconnection current due to the Lorentz force on the contacts.

Figure 27:
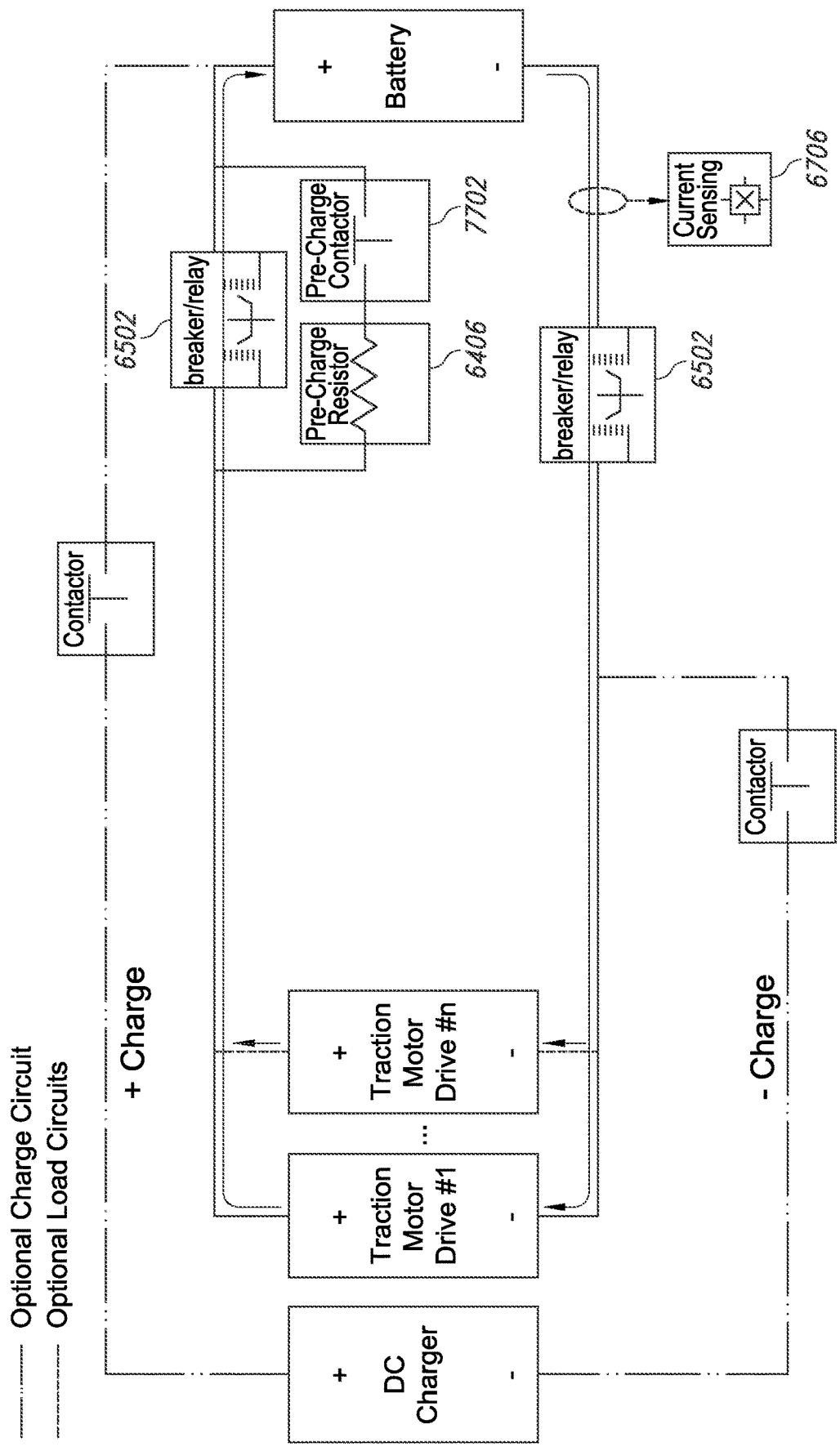
FIG. 27 depicts a schematic diagram of a power protection configuration between a battery and loads with current path depiction.

Referencing FIG. 27, an example power distribution management for a mobile application is depicted, consistent with the embodiment depicted in FIG. 21. Power flow during regeneration operations is depicted in FIG. 27, with arrows showing the flow path. Regenerative operations from motive loads are depicted, for example as might be experienced during regenerative braking, but any regenerative operations from any loads in the system are contemplated herein. During regeneration operations, the high side breaker/relay 6502 and the low side breaker/relay 6502 are closed, and the pre-charge contactor 7702 may be open. Accordingly, both the high side breaker/relay 6502 and the low side breaker/relay 6502 provide overcurrent protection during regeneration operations of the system.

Figure 28:
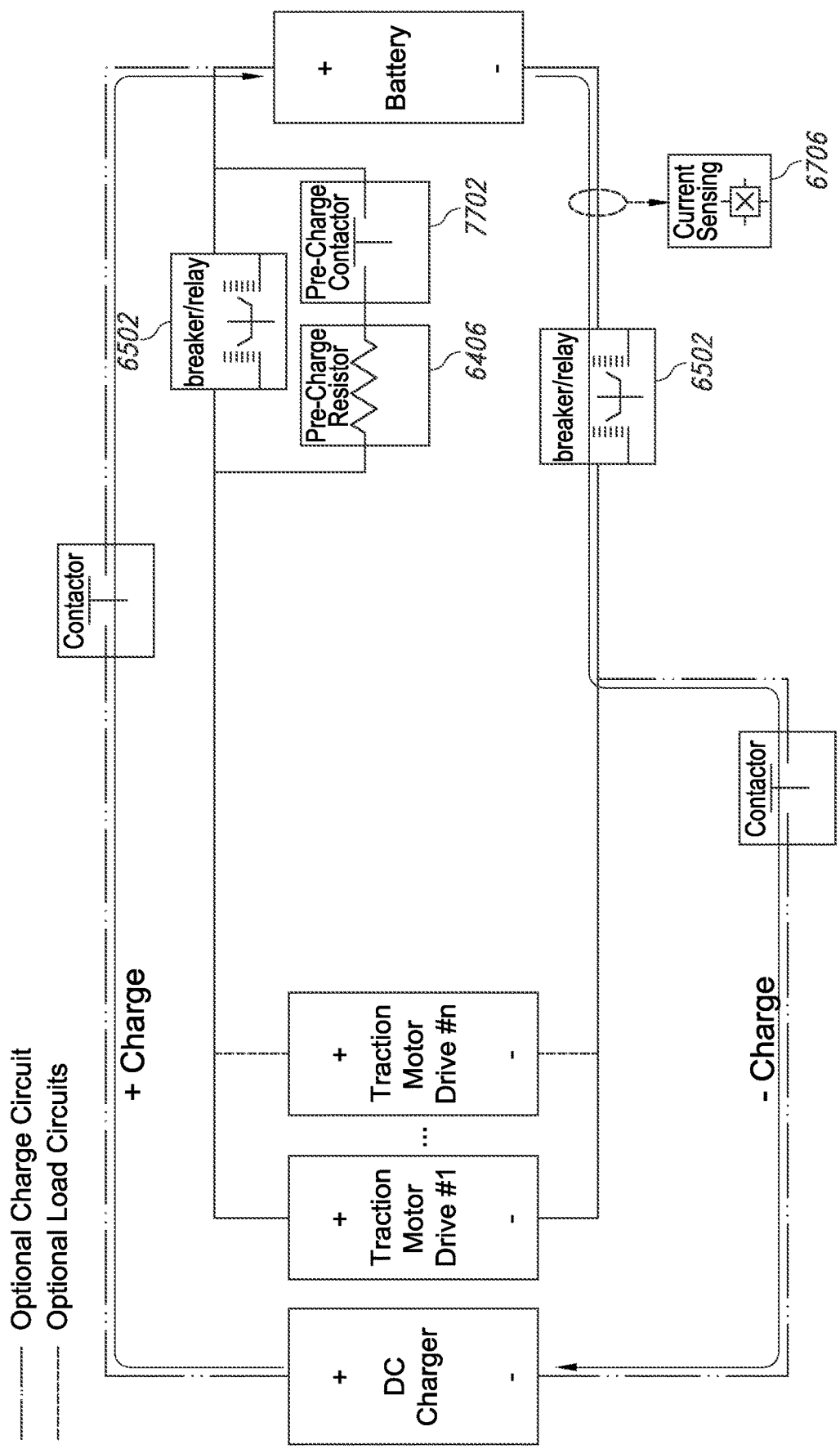
FIG. 28 depicts a schematic diagram of a power protection configuration between a battery and loads with current path depiction.

Referencing FIG. 28, an example power distribution management for a mobile application is depicted, consistent with the embodiment depicted in FIG. 21. Power flow during charging operations is depicted in FIG. 28, with arrows showing the flow path. Charging may be with an external charging device, and may include a high current quick charging operation which may provide for higher current operations than is associated with a rated power for the load(s). In the operations depicted in FIG. 28, the low side breaker/relay 6502 is closed, and contactors in the charging circuit are closed, providing the power flow path as depicted. In certain embodiments, the high side breaker/relay 6502 and the pre-charge relay 7702 may be open, for example to isolate an inverter (not shown) from the circuit during charging operations. In certain embodiments, the high side breaker/relay 6502 may be closed, for example where isolation of the inverter during charging operations is not required, and/or where rapid operation without a pre-charging cycle after the charging may be desired. During charging operations, the low side breaker/relay 6502 provides overcurrent protection in the example of FIG. 28.

Figure 29:
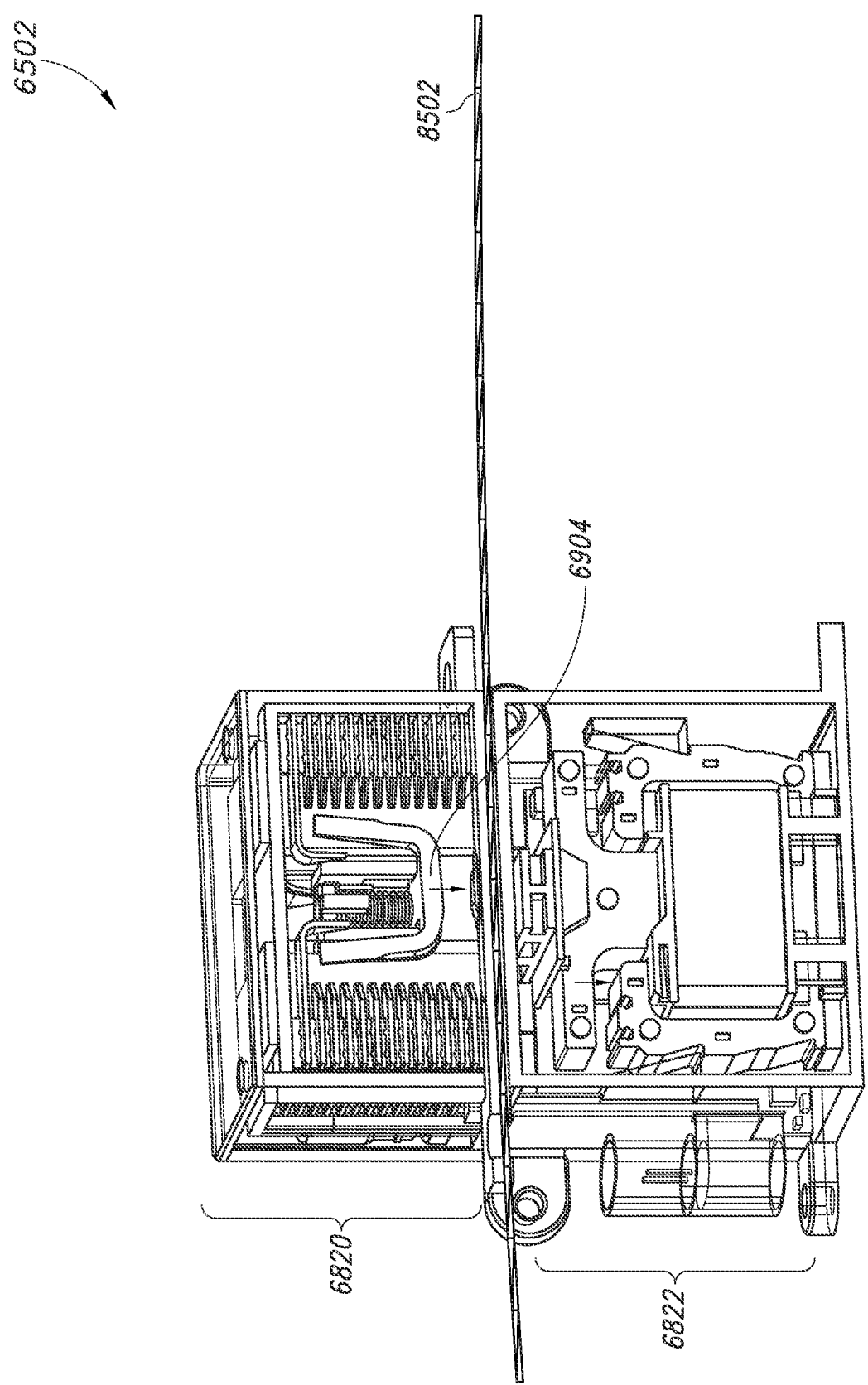
FIG. 29 depicts an embodiment detail of a breaker-relay component.

Referencing FIG. 29, another cutaway schematic view of a breaker/relay is depicted. In the example of FIG. 29, circuit breaking and connecting components are depicted on the breaker side 6820, and contactor operation components are depicted on the relay side 6822. The depicted breaker/relay is an example and depicts a single pole, single throw breaker relay. Additionally or alternatively, a breaker/relay may be a dual pole (e.g., operating two distinct circuits, a parallel path for one of the circuits to provide additional current capability, and/or one pole providing high-side coupling and the other pole providing low-side coupling). In certain embodiments, a breaker/relay having more than one pole can control the poles independently, or they may be operated together utilizing the same armature. In certain embodiments, both poles have arc diffusion protection provided by the same splitter plates, or by independent sets of splitter plates. In certain embodiments, both poles have arc diffusion protection provided by the same permanent magnet system, or by independent permanent magnet systems.

Figure 30:
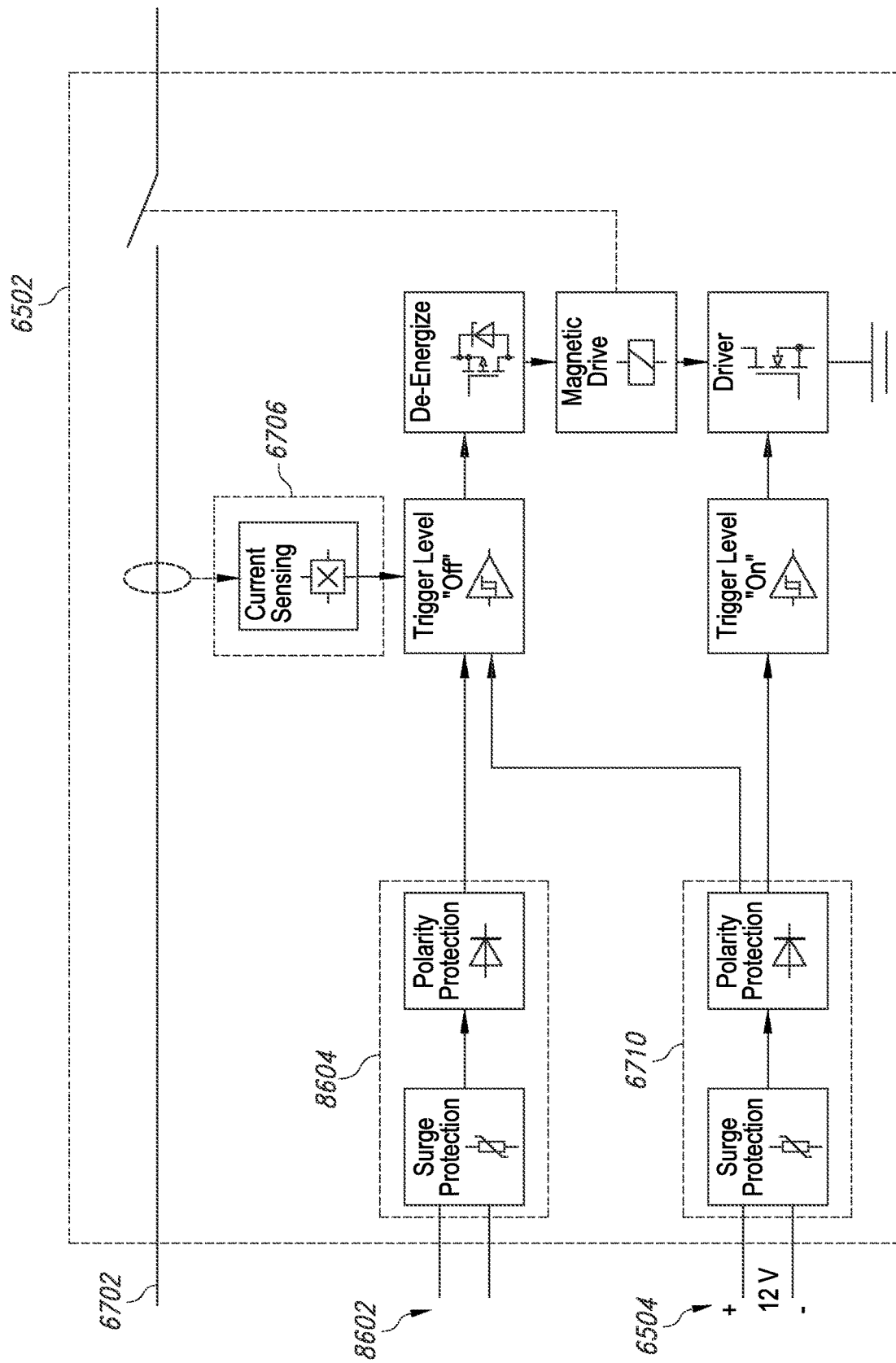
FIG. 30 depicts a schematic diagram of a power bus protection configuration.

Referencing FIG. 30, another example of a schematic logic diagram for a breaker/relay is depicted. The example of FIG. 30 includes an emergency or auxiliary input 8602, which is processed by an input isolation 8604. The emergency or auxiliary input 8602 may replace or be in addition to any other auxiliary input, and provides for the capability of a particular application to control operations of the breaker/relay for a selected response to any desired aspect of the system—including without limitation, allowing for a disconnect assurance during service, during an emergency, and/or according to any desired control logic.

Figure 31:
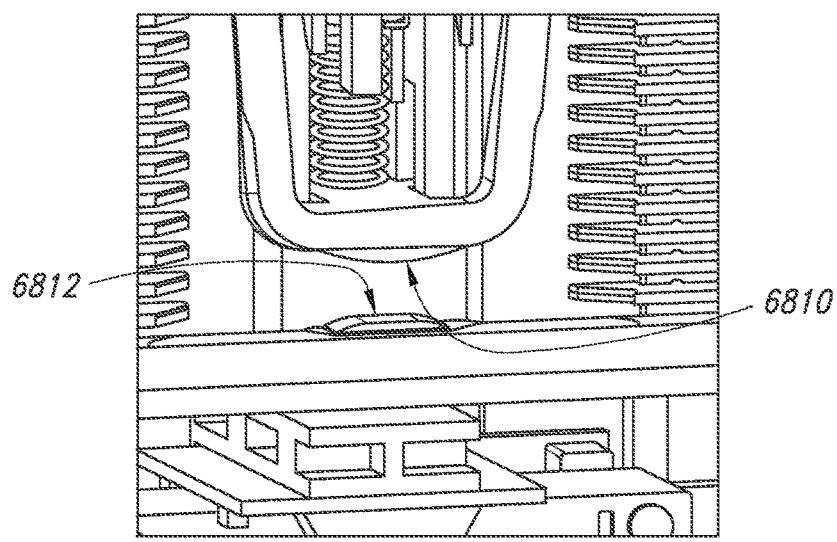
FIG. 31 depicts an embodiment detail of a contact in a breaker-relay component.

Referencing FIG. 31, a detailed cutaway view of a contact portion of an example breaker/relay is depicted. The contact portion of FIG. 31 includes an example configuration for the contact surface of the moveable contact 6810 and the fixed contact 6812. The configuration of the contacts is a part of the system that contributes to the physical opening force of the contacts, and can be configured with any shape or area to provide the desired response to high currents occurring in the associated circuit.

Figure 32:
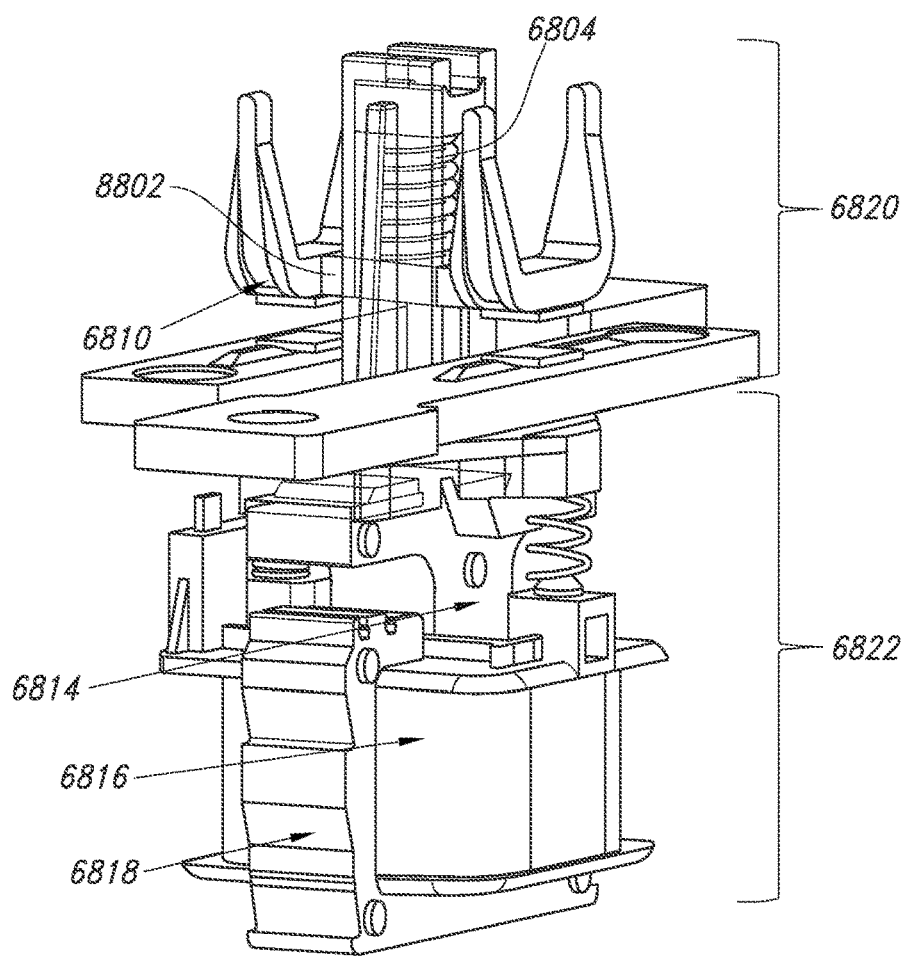
FIG. 32 depicts an embodiment detail of a breaker-relay component.

Referencing FIG. 32, an example breaker/relay is depicted with portions of the housing removed for illustration. The example breaker/relay includes two moveable contacts engaging two fixed contacts. In the example of FIG. 32, the moveable contacts are coupled and operated by the same armature 6814, with contact force provided by the contact spring 6804. In the example of FIG. 32, the contacts are electrically coupled through a bus bar 8802. In the example, the bus bar 8802 transitions directly between the contacts, and is not significantly exposed to the current carrying portion of the bus bar including the fixed contacts. In certain embodiments, the bus bar 8802 can include a trajectory that exposes a portion of the bus bar 8802 into proximity with the current carrying member of the fixed contacts, thereby contributing to the Lorentz force that provides the physical disconnect of the breaker/relay. In certain embodiments, both of the area of the bus bar 8802 exposed to the fixed contact current carrying portion, and the proximity of the bus bar 8802 to the fixed contact current carrying portion are design elements that allow for configuration of the Lorentz force response.

Figure 33:
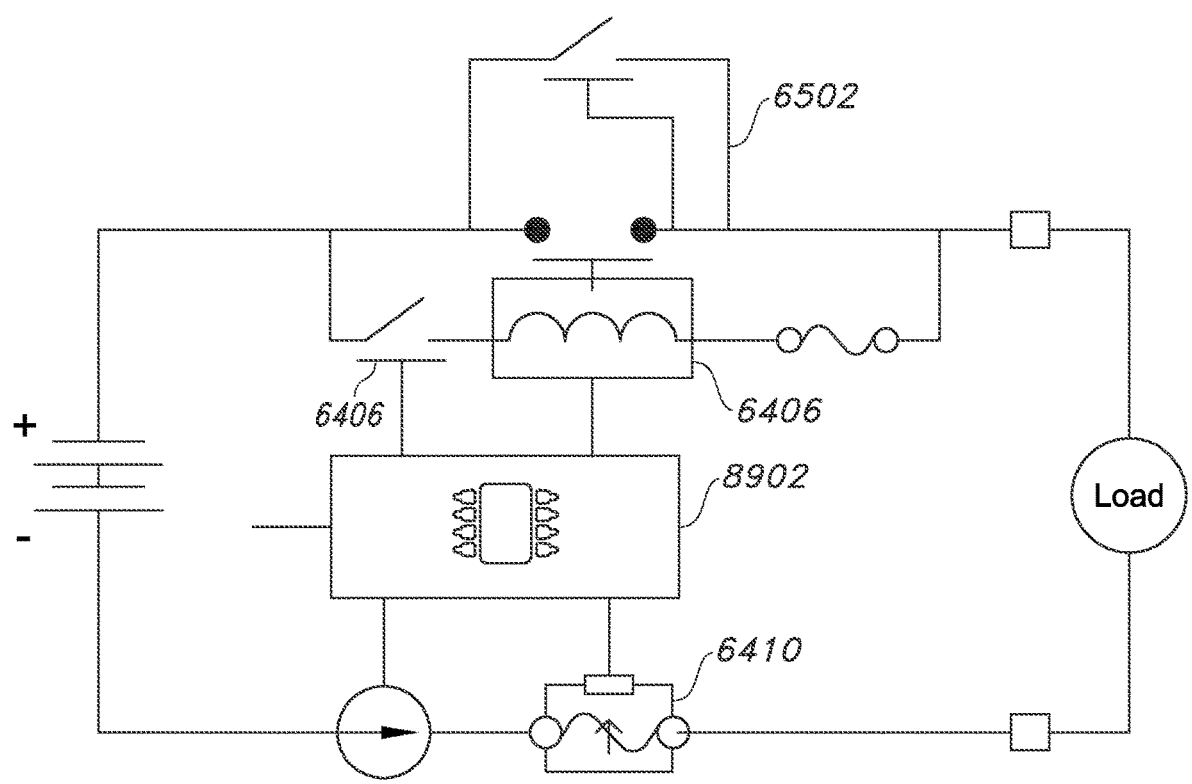
FIG. 33 depicts a schematic diagram of a power protection configuration with controller.

Referencing FIG. 33, an example power management arrangement for a mobile application is depicted. The example of FIG. 33 includes a breaker/relay 6502 disposed on the high side of the power circuit, and a pre-charge contactor, resistor, and fuse, coupled in parallel to the high side breaker/relay 6502. In the example of FIG. 33, the breaker/relay 6502 is a dual pole breaker/relay 6502, for example to provide additional current capability through the contacts for the power circuit. In the example of FIG. 33, a controller 8902 is depicted that performs control functions for the breaker/relay 6502 and for the power management arrangement. For example, the controller 8902 receives a keyswitch input, performs pre-charge operations, operates the closing of the breaker/relay, and responds to a high current event by opening the contacts of the breaker/relay. In another example, the controller 8902 performs shutdown operations of the power management arrangement, such as opening the breaker/relay after the keyswitch is off, or in response to an auxiliary, emergency, or other input requesting that power be disconnected.

Further referencing FIG. 33, an example power distribution management for a mobile application is depicted schematically, which may be utilized in whole or part with any other systems or aspects of the present disclosure. An example power distribution management system includes a dual pole breaker/relay—the example of FIG. 33 includes a dual pole breaker/relay (e.g., using one set of contacts per pole) having a single magnetic drive (e.g., a magnetic actuator). In certain embodiments, both contacts are mechanically linked such that they open or close together (e.g., operating as a dual pole single throw contactor). In certain embodiments, the contactors may share one or more arc suppression aspects (e.g., splitter plates and/or permanent magnet), and/or may have individual arc suppression aspects. In certain embodiments, arc suppression aspects may be partially shared (e.g., some splitter plates in proximity to both contacts) and/or partially individual (e.g., some splitter plates in proximity to only one or the other of the contacts). In certain embodiments, various features of the contactors may be shared and other features of the contactors individually supplied—such as control commands or actuation (e.g., a dual pole, dual throw arrangement), arc suppression aspects, and/or housings. The example of FIG. 33 additionally depicts a separate contactor (e.g., the lower left of the three (3) depicted contacts) which is separately controllable to provide contact management for a pre-charge circuit for the power distribution management system. In certain embodiments, the pre-charge contactor may be integrated with the dual pole contacts—for example within a same housing as the dual pole contacts and/or with pre-charge coupling provided as one of the dual pole contacts. The example of FIG. 33 depicts a fuse on the pre-charge circuit, and a further overall fuse on a battery low side. The presence of fuses depicted is optional and non-limiting, and fuses may be present in other locations, omitted, and/or replaced (e.g., by a breaker/relay as described throughout the present disclosure, and/or as a pole on a dual pole or multi-pole breaker/relay). In certain embodiments, a pre-charge circuit may be contained within a power distribution unit separate from the breaker/relay and/or containing the breaker/relay, as a solid state pre-charge circuit, and/or as a mechanical/electrical circuit positioned elsewhere in the system and/or within the breaker/relay housing.

The electrical arrangement of poles in FIG. 33 is a schematic example, and not limiting to arrangements of the system for particular embodiments. In certain embodiments, each pole of the dual pole breaker/relay (and/or each pole or a subset of poles in a multi pole breaker/relay) may provide selectable electrical coupling for a same circuit, for separate circuits, and/or for a selected circuit (e.g., using controllable switches or connectors elsewhere in the system—not depicted). In certain embodiments, the power distribution management system further includes a high resolution current sensor, and/or current sensing on more than one pole of the dual pole or multi pole breaker/relay. In certain embodiments, a controller is communicatively coupled to the one or more high resolution current sensors, and utilizes the one or more high resolution current sensors for any operations described throughout the present disclosure (e.g., to command one or more of the contacts to an open position to avoid re-contact after opening) and/or to communicate information determined from the current sensor (e.g., the electrical current, or other information derived therefrom) to another controller in the system such as a vehicle controller. In certain embodiments, each contactor of the dual pole or multi-pole breaker/relay includes an arrangement configured to open the contact with a Lorentz force response due to high current through the circuit of the contactor as described throughout the present disclosure. In certain embodiments, one contact has an arrangement to open with a Lorentz force response, and the other contactor opens due to mechanical linkage to the responding contactor. In certain embodiments, each contact has an arrangement to open with a Lorentz force response, for example to provide circuit protection redundancy. In certain embodiments, each contact has an arrangement to open with a Lorentz force response, where each contact has a separate configured threshold for opening response, and/or where each contact is separably controllable (e.g., with a separate magnetic actuator or other controlled actuator).

In embodiments, an architecture topology and method for a charger and DC-TO-DC combined module may be provided, such as for an electric mobile application. The topology provides bi-directional high voltage ("HV") power flow that enables (1) AC power grid to HV battery power flow, (2) HV battery to AC power grid, and (3) HV battery to AC loads. The topology also provides HV to Low Voltage ("LV") DC-to-DC conversion functions.

An electric vehicle (e.g., battery electric vehicle (BEV) or plug-in hybrid electric vehicle (PHEV)) can have an on-board charger to charge the battery from the power grid or can have an on-board generator to provide power from HV battery to AC loads. This may be referred to as a bidirectional on-board charger (OBC). By adding a grid synchronization function, the bi-directional charger may also send power to the grid. In BEV or PHEV vehicles, a DC-TO-DC converter can be included to convert HV battery voltage to low voltage for controllers, and the like, such as a typical low voltage bus is 9V to 14V for passenger vehicles. In embodiments, a DC-to-DC converter and bi-directional OBC may be separate parts, with separate cooling systems and control board/driver boards, and the like.

Figure 34:
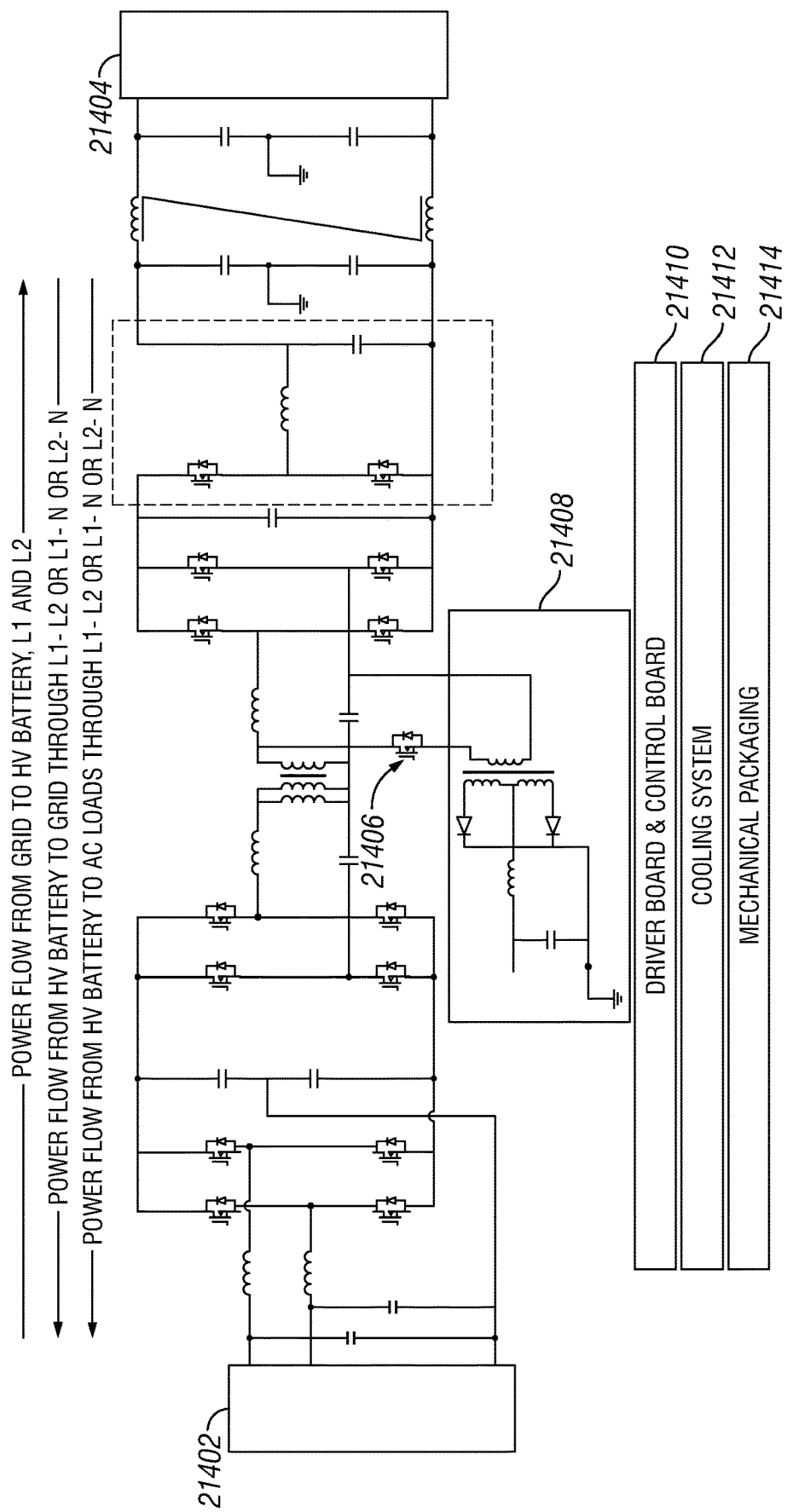
FIG. 34 depicts an embodiment topology for a charger and DC-to-DC combined module.

In embodiments, an architectural topology may combine a bi-directional OBC and a DC-TO-DC converter into one package by simplifying the electrical and electronic circuitry, such as depicted in FIG. 34. A Switch S0 21406 is added with a DC-TO-DC converter 21408 connected to bidirectional OBC circuitry as shown in the Figure. Switch S0 can be controlled to make sure there is no interference of the electric circuitry operations. Power can be flowing from grid 21402 to HV battery 21404, HV battery 21404 to AC loads or grid 21402 (where element 21402 represents a connection point to the AC power grid and/or to AC loads). A DC-TO-DC converter 21408 function is provided, which allows power flow from HV battery 21404 to LV DC loads (not shown, but connected to the output of the DC-to-DC converter 21408). Driver board & control board 214010 and cooling system 21412 may be further simplified since the bi-directional OBC and LV DC-TO-DC are integrated into one package 21414, where at least three power electronics switches can be saved. Although FIG. 34 shows a single phase application, the teachings herein can also be applied to the AC input of a three phase circuit with or without neutral.

In an aspect, a power control circuit may include a combined bi-directional OBC and DC-TO-DC converter. A control method for a combined charger and DC-TO-DC converter 21408 may be provided that can switch between modes: Mode 1 (Driving): the OBC will not be used. Mode 1 may be enabled by disabling the operation of left side of FIG. 34 (the AC side) by closing switch SO 21406, allowing power to flow to the DC-TO-DC converter 21408 by right side circuit. Mode 2 (Charging to HV battery): In mode 2 the system relies on the low voltage battery (e.g., 12V) to power the driver board and controller board for the OBC function. Switch SO 21406 is open to fully disconnect the DC-TO-DC converter 21408 from the circuit. Control of the OBC may be in a resonant mode, such as an LLC resonant mode. If the low voltage battery voltage is too low, it is possible to switch to Mode 1 to charge the 12V battery system. When the state of charge is high enough, it is possible to switch back to Mode 2 to use the OBC to charge the HV battery. Mode 3: HV battery to grid or AC load.

In an aspect, a power control method may be provided for a combined charger and DC-TO-DC converter 21408 that can switch between modes. Mode 1 (Driving): OBC will not be used. By disabling the operation of left side of FIG. 34 (the AC side) by closing switch S0 21406, allowing power to flow to the DC-TO-DC converter 21408 by right side circuit. Mode 2.1: Charging the HV battery (e.g., when the low voltage battery's state of charge (SOC) is high and relying on the low voltage battery in the system to power the driver board and control board for the OBC function. Switch SO 21406 is open to fully disconnect the DC-TO-DC converter 21408 from the circuit, and control of the OBC is in a resonant mode. Mode 2.2: If the low voltage battery voltage is below a threshold SOC, switch SO is closed to operate the DC-TO-DC converter 21408 to charge the low voltage battery and pause HV battery charging. Mode 2.1 and Mode 2.2 can be switched back and forth depending on SOC level of LV battery. Mode 3.1 HV battery to grid or AC load: Power is flowing from HV battery to the grid or AC loads 21402 and switch SO 21406 is open when the LV battery SOC is high. Mode 3.2 HV battery charges the LV battery by closing switch S0 21406, which pauses the power flowing back to grid or AC load 21402. When the LV battery SOC is high, the system transitions back to Mode 3.1 to resume power back to the grid or AC load 21402.

In embodiments, an integrated on-board charger (OBC) and DC-to-DC converter configuration may be provided. Example and non-limiting examples of OBC and DC/DC converter configurations include aspects set forth in FIGS. 34, 37, 39, 40, 42-68, 70, 72-76, and 80 and the related descriptions. Without limitation to any other aspect of the present disclosure, an integrated topology may be configured for charging of a low voltage (LV) battery on the same magnetic transformer as used for charging a high voltage (HV) battery. Two transformers may be included and control logic may switch between upper and lower circuits connected to the transformers. Grid power may be supplied to an upper transformer and then switched to a lower transformer when a threshold temperature is reached. Package reduction may be achieved through shared magnetics. In an example, the circuit can be configured to switch between 400V & 800V. The switch may be moved real-time or may be hard-wired. The switch may configure the upper circuit parallel to the lower circuit, or the switch may configure the upper circuit serial with the lower circuit. There may be a linear reduction of OBC power when the DC-to-DC converter is working. It may be possible to upgrade the combined OBC and DC-to-DC power when the charging station supports upgrade and when the cooling temp is acceptable. The combined OBC and DC-to-DC may provide improved DC-to-DC efficiency at low loads. The circuit may provide OBC phase switching between one and three-phase, where the same combined OBC and DC-to-DC circuit may be used in both one-phase and three-phase circuits. Grid power may be divided to charge the LV and HV batteries. Rather than run both an upper and a lower circuit inefficiency at a divided power, the upper circuit may receive grid power for charging the LV and HV batteries. When the upper circuit is at or near its set point for handling grid power, or when the on-board charging requires more power than the upper circuit can provide, then the lower circuit may be used to complete charging of the HV and LV batteries. In this way, the upper circuit can be run efficiently at its highest power setting, and inefficient use of the lower circuit can be delayed or avoided. The lower circuit can be used in instances when the upper circuit is not enough to charge the batteries.

Figure 42:
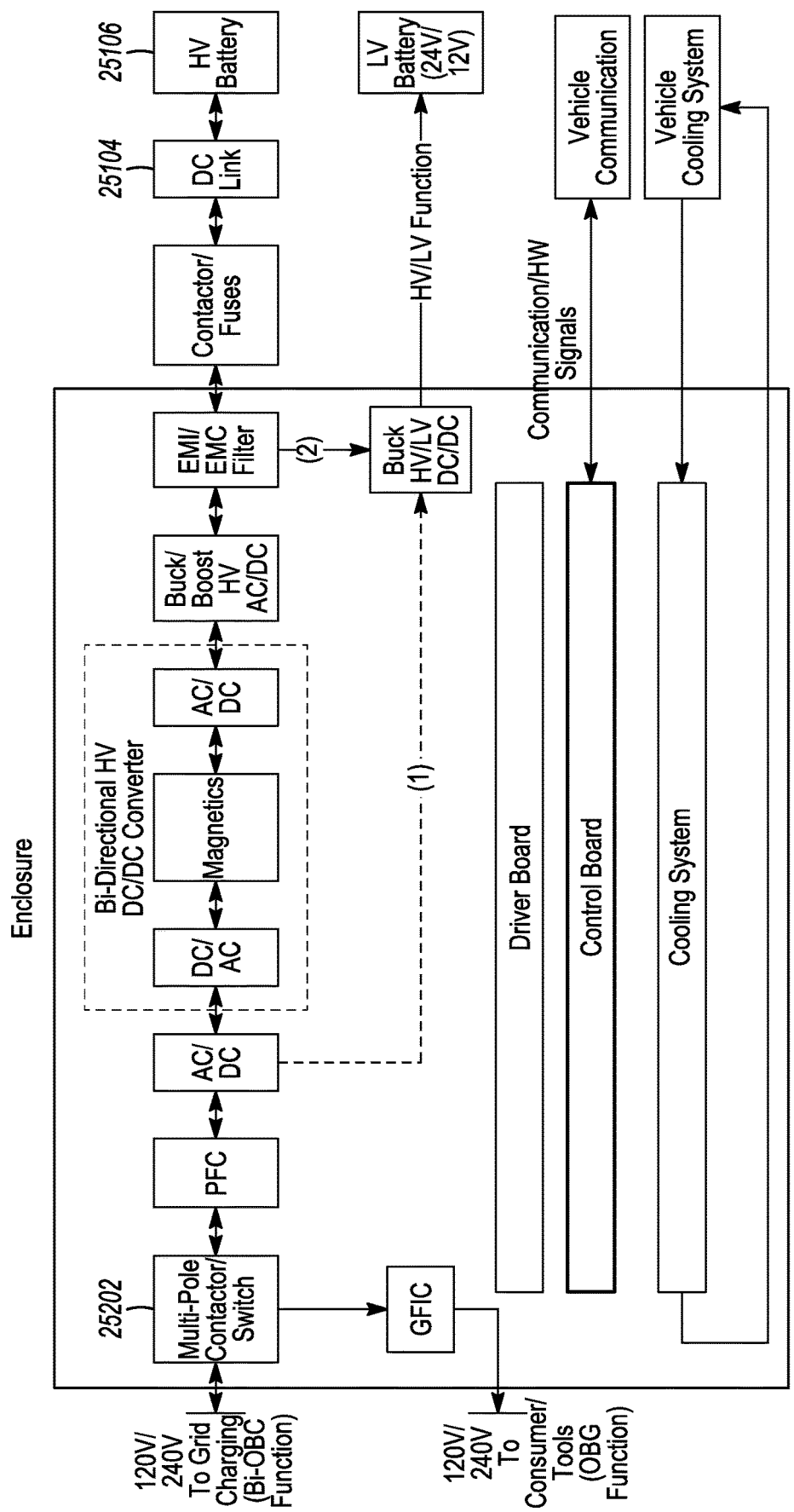
FIG. 42 depicts an embodiment functional block diagram for the alternate embodiment topology.
Figure 43:
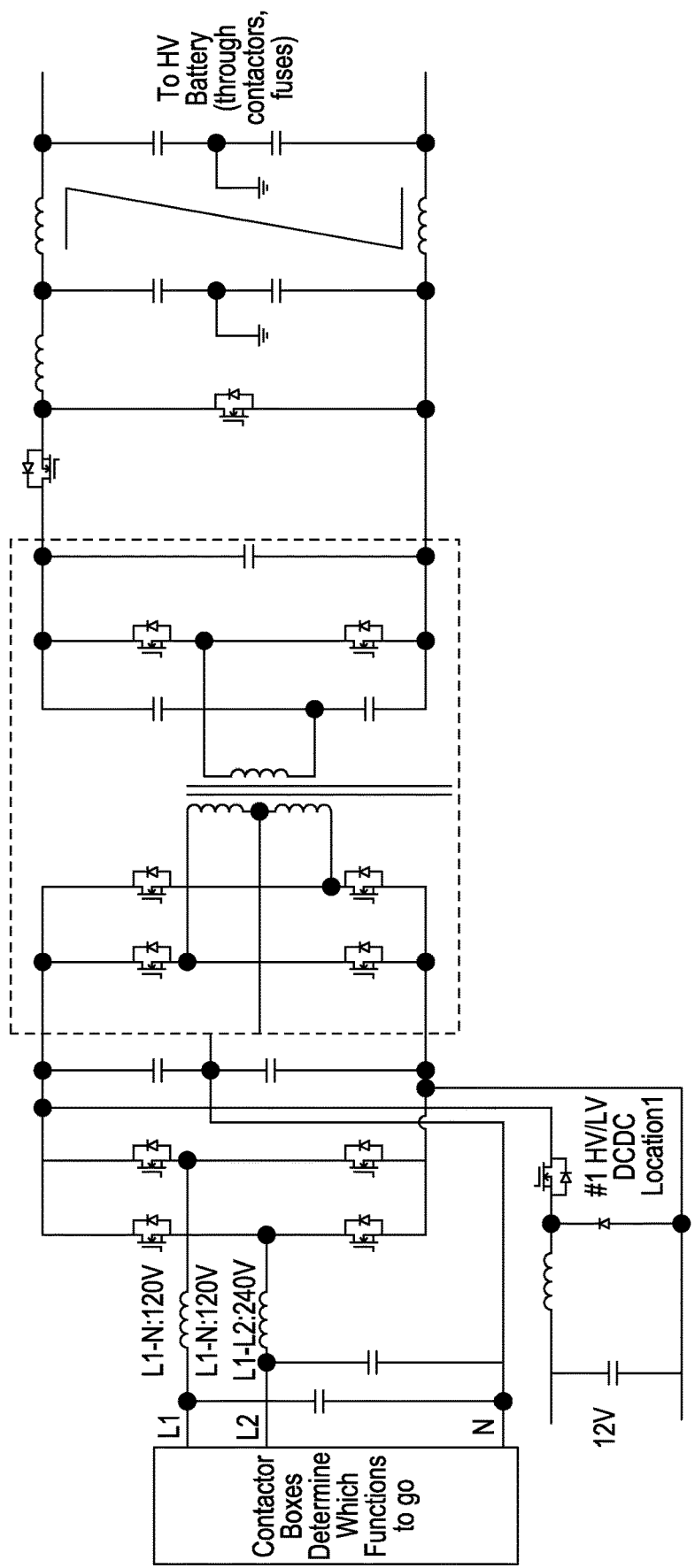
FIG. 43 depicts an embodiment representational schematic diagram for the alternate embodiment topology.

FIGS. 42-43 depict an embodiment block diagram for the integrated on-board charger and DC-to-DC converter. The integrated OBC and DC-to-DC converter magnetics may reduce size, support one and three phase inputs, provide full operation with or without neutral connection, be limited to AC input power, have OBC power linearly reduced by DC power requirement, be compatible with 400V or 800V battery systems, have bidirectional OBC and DC-to-DC converter, have improved 12V DC converter efficiency with light loads, and the like.

Figure 39:
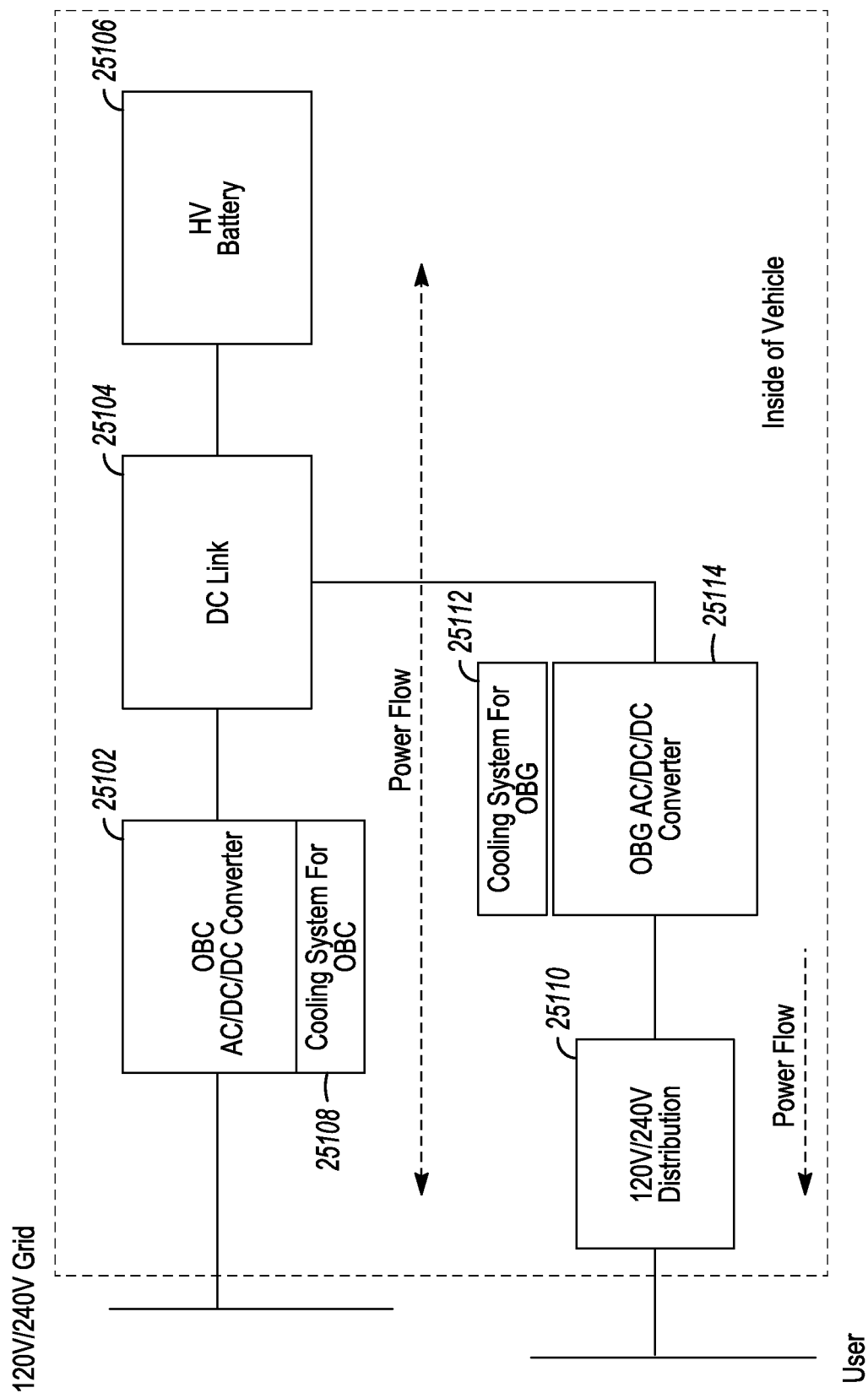
FIG. 39 depicts an embodiment topology for charging and power generation in an electric mobile application.

In embodiments, a topology for electric vehicle power conversation system that enables multiple functions to be integrated in the same circuitry may be provided, such as where the topology reduces cost and weight of the system. FIG. 39 depicts an embodiment topology for charging and power generation in an electric mobile application, which illustrates an electric vehicle (BEV or PHEV) with a module called an on board charger (OBC), which converts the power from grid (120V/240V) to vehicle high voltage battery 25106 through an OBC AC-DC converter 25102 and DC link 25104. This topology may also permit two way power flow design by allowing power to flow from the high voltage battery 25106 to the grid through the DC link 25104, on board generator (OBG) DC-AC converter 25114 and 120/240V converter 25110. Commercial vehicle and passenger trucks/SUV may provide an OBG function, which is to provide power socket 120V/240V AC for tools or consumer electronics. It is shown in FIG. 39 that the OBC and OGB are separate components and use two sets of power electronics components and controllers and cooling systems 25108 and 25112.

Figure 40:
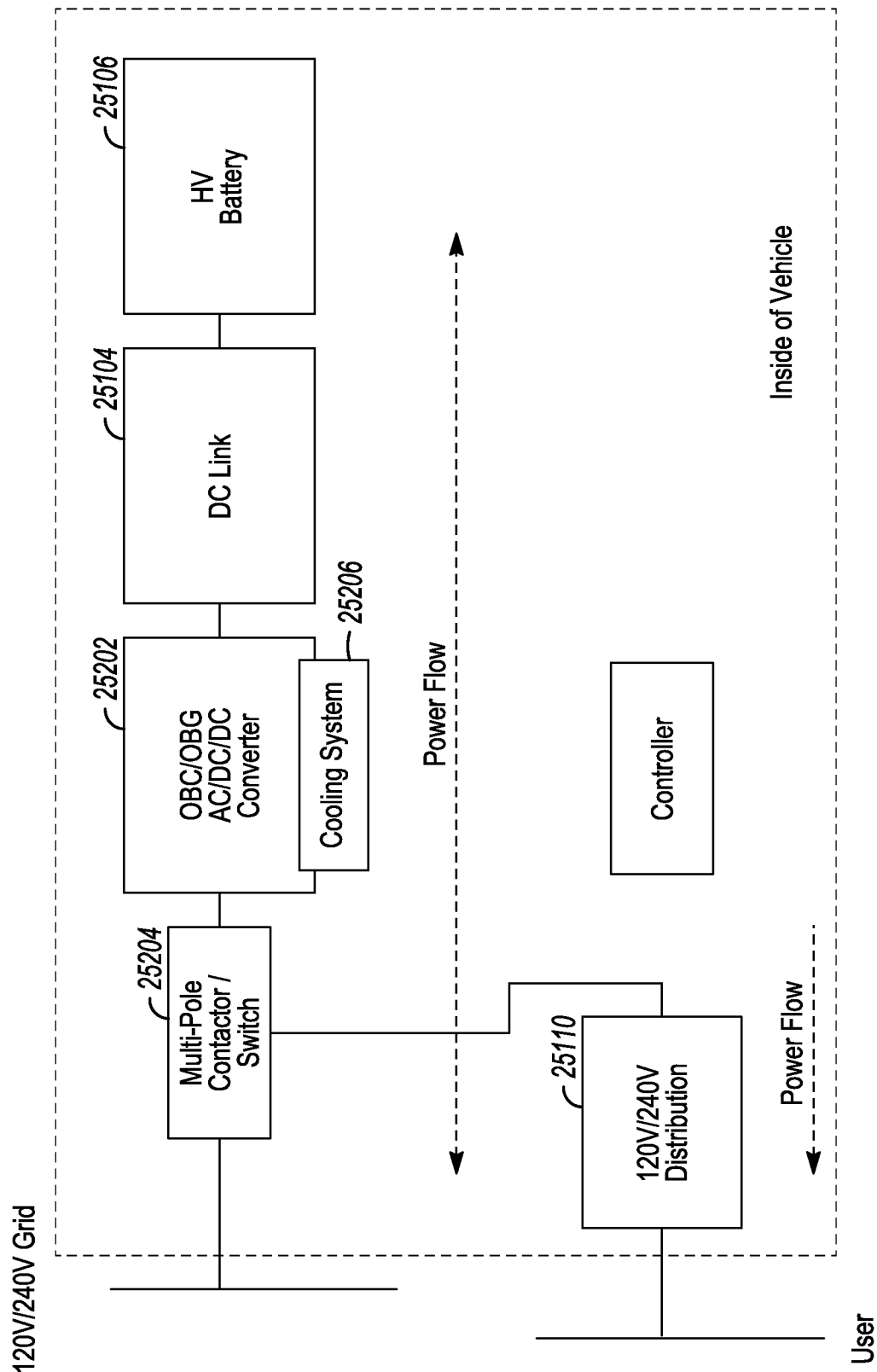
FIG. 40 depicts an alternate embodiment topology for charging and power generation in an electric mobile application.

FIG. 40 depicts an alternate embodiment topology for charging and power generation in an electric mobile application with a combined OBC/OBG converter 25202. This configuration provides a simplified topology to achieve FIG. 39 functions as shown in FIG. 40. The same OBC/OBG AC/DC/DC converter (Bi-directional) component 25202 can be used both for charging and power generation, so one set of AC/DC/DC converter hardware is saved. To make the system work, a multi-pole contactor/switch 25204 is added into the system, which can be a separate part or can be integrated to OBC/OBG AC/DC/DC converter component 25202. So the power can flow from grid to HV battery, or can flow from HV battery to 120/240V distribution or grid. In the topology of FIG. 39, two cooling systems 25108 and 25112 have to be used to cool OBC and OBG. Since OBC and OBG functions shown in FIG. 40 are not used at the same time, one cooling system 25206 is needed and system cost is dropped and efficiency is improved.

Figure 41:
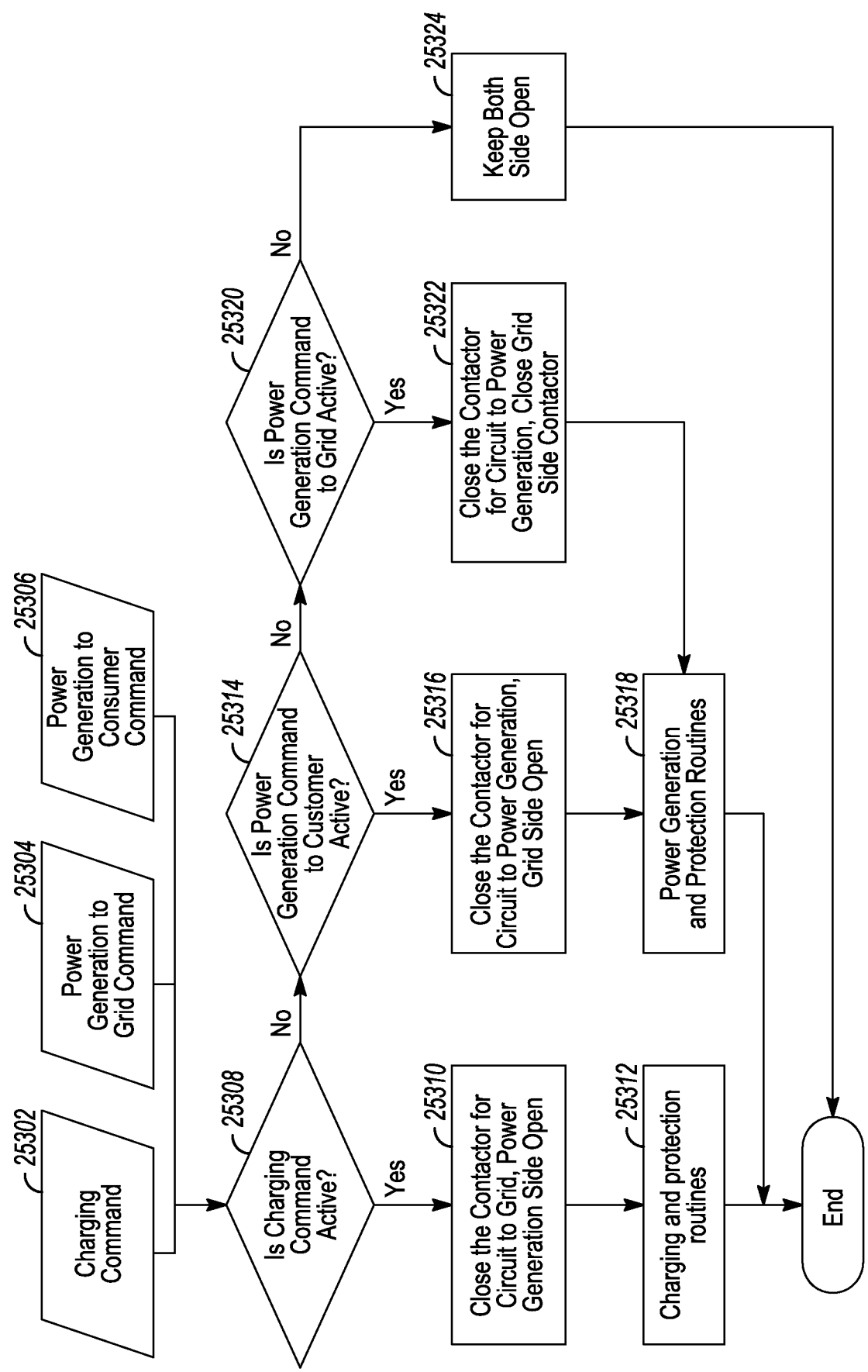
FIG. 41 depicts an embodiment control method for the alternate embodiment topology.

FIG. 41 depicts an embodiment control method for the alternate embodiment topology, where the control algorithm is waiting to receive a higher level charging command or power generation command (to grid and to consumers). This control method may be described with respect to four working modes. Mode 1: charging only, with power flow to battery pack, and only grid side contactor closed. Mode 2: consumer power generation only, where power flows to distribution from the high voltage battery, and where the power generation contactor is closed. Mode 3: High voltage battery generating power to the consumer and the grid at the same time, with both contactors closed. Mode 4: no power flow. In embodiments, the higher level command may be a charging command 25302, a power generation to grid command 25304, a power generation to consumer command 25306, and the like. Once the command is received the algorithm walks though determining the appropriate response and configuration, such as for example first determining if the charging command is active 25308, and if yes, closing the contactor for the circuit to grid with power generation side open 25310 and invoke charging and protection routines 25312. If no, then the algorithm may then determine if a power generation command to grid command is active 25314, and if yes, closing the contactor for the circuit to power generation with the grid side open 25316 and invoke generation and protection routines 25318. If no, then the algorithm may then determine if a power generation command to grid is active 25320, and if yes, closing the contactor for circuit to power generation and close the grid side contactor 25322. If no, to keep both sides open.

Advantages to the alternate topology with integrated to OBC/OBG AC/DC/DC converter component 25202 may include a simplified vehicle high voltage topology, shared circuitry and major component for both on board charger and on board power generator for cost reduction and weight reduction, simplified cooling system for cost reduction and weight reduction, adding less expensive contactors for robust control and meet multiple power flow management, and the like.

FIG. 42 depicts an embodiment functional block diagram for the alternate embodiment topology, and FIG. 43 depicts an embodiment representational schematic diagram for the alternate embodiment topology.

Figure 44:
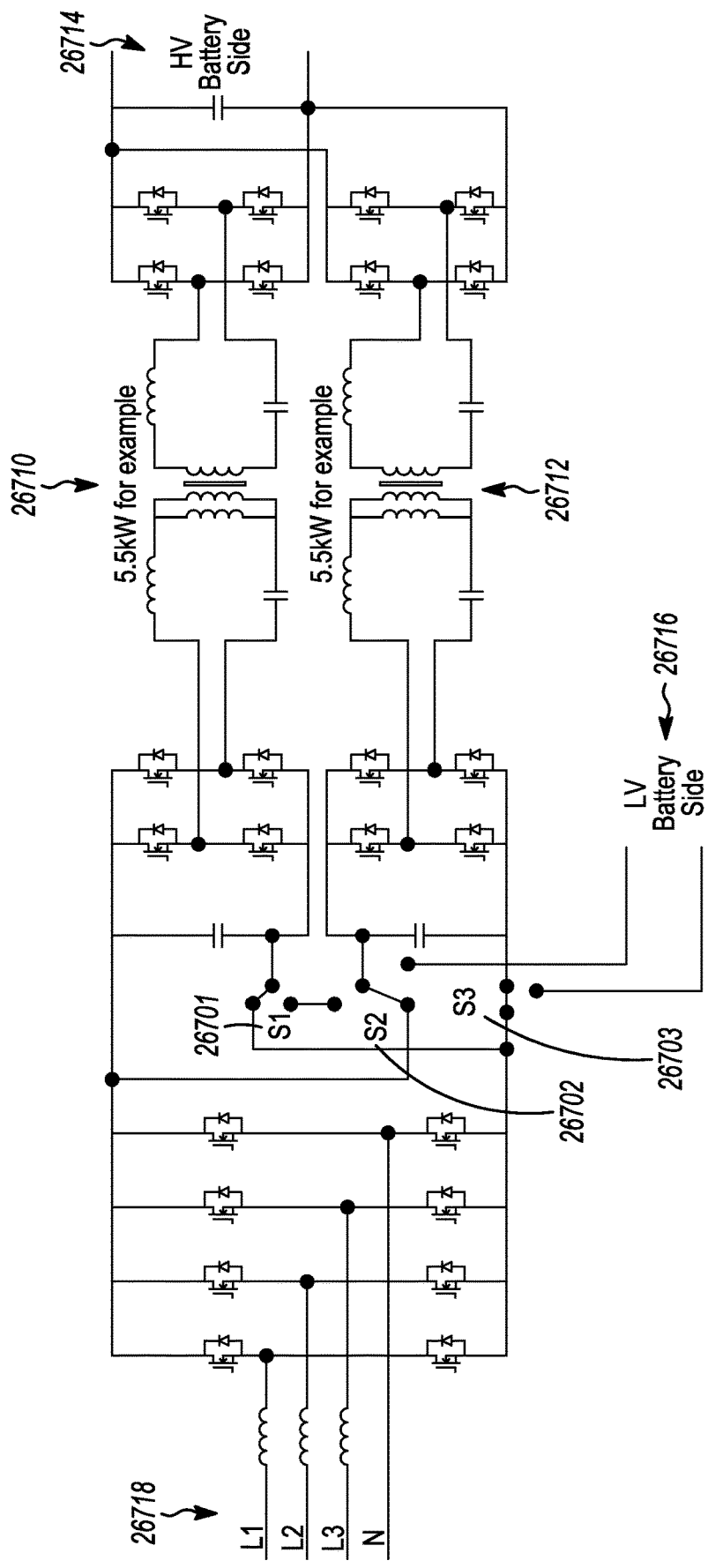
FIG. 44 depicts an embodiment combined bi-directional on-board charger and bi-directional DC-to-DC converter control topology in a first mode for charging the high voltage battery from AC side of the circuit.

In embodiments, and referring to FIG. 44, a new topology for combined OBC and DC-to-DC converter may be provided to reduce cost and weight and to improve power density, where the topology configuration enables different modes for different operational conditions, and including separate circuit isolation circuits 26710 and 26712 for providing independent power flow paths. In embodiments, there may be a first mode for charging the high voltage battery 26714 from the AC side 26718 of the circuit, a second mode for simultaneously charging the high voltage battery 26714 from the AC side 26718 of the circuit and the high voltage battery supplying power to the low voltage batter side 26716 of the circuit, a third mode (e.g., for driving an electric vehicle) where the high voltage battery 26714 supplies power to the low voltage battery side 26716 of the circuit, a fourth mode for a low voltage battery from the low voltage battery side 26716 of the circuit suppling power to the high voltage battery 26714, and the like. The separate circuit isolation circuits 26710 and 26712 for providing independent power flow paths enable greater control of power flow during operational modes. Mode switching is executed through configuration of switch one 26701 (e.g., a 2-pole switch), switch two 26702 (e.g., a 3-pole switch), and switch three 25703 (e.g., a 2-pole switch, and although switch three is depicted on the −DC side of the low voltage batter side of the circuit, switch three may also be operated on the +DC side).

In reference to FIG. 44, an embodiment switching topology is depicted with combined bi-directional on-board charger and bi-directional DC-to-DC converter control topology in a first mode for charging the high voltage battery 26714 from the AC side 26718 of the circuit, where through the depicted switching configuration for switch one 25701, switch two 25702, and switch three 25703, power is enabled to flow through both circuit isolation circuits 26710 and 26712 from the AC side 26718 to the high voltage battery 26714. As depicted, in the first mode switch three is closed to the high voltage DC−, and switches one and two are operating to charge the high voltage battery, such as per single or three phase inputs. In embodiments, this mode of operation may enable the high voltage battery of an electric vehicle to be charged from an external charging source connected to the AC side of the circuit, where the low voltage battery currently does not need charging due to the low voltage battery currently having a high state of charge.

Figure 45:
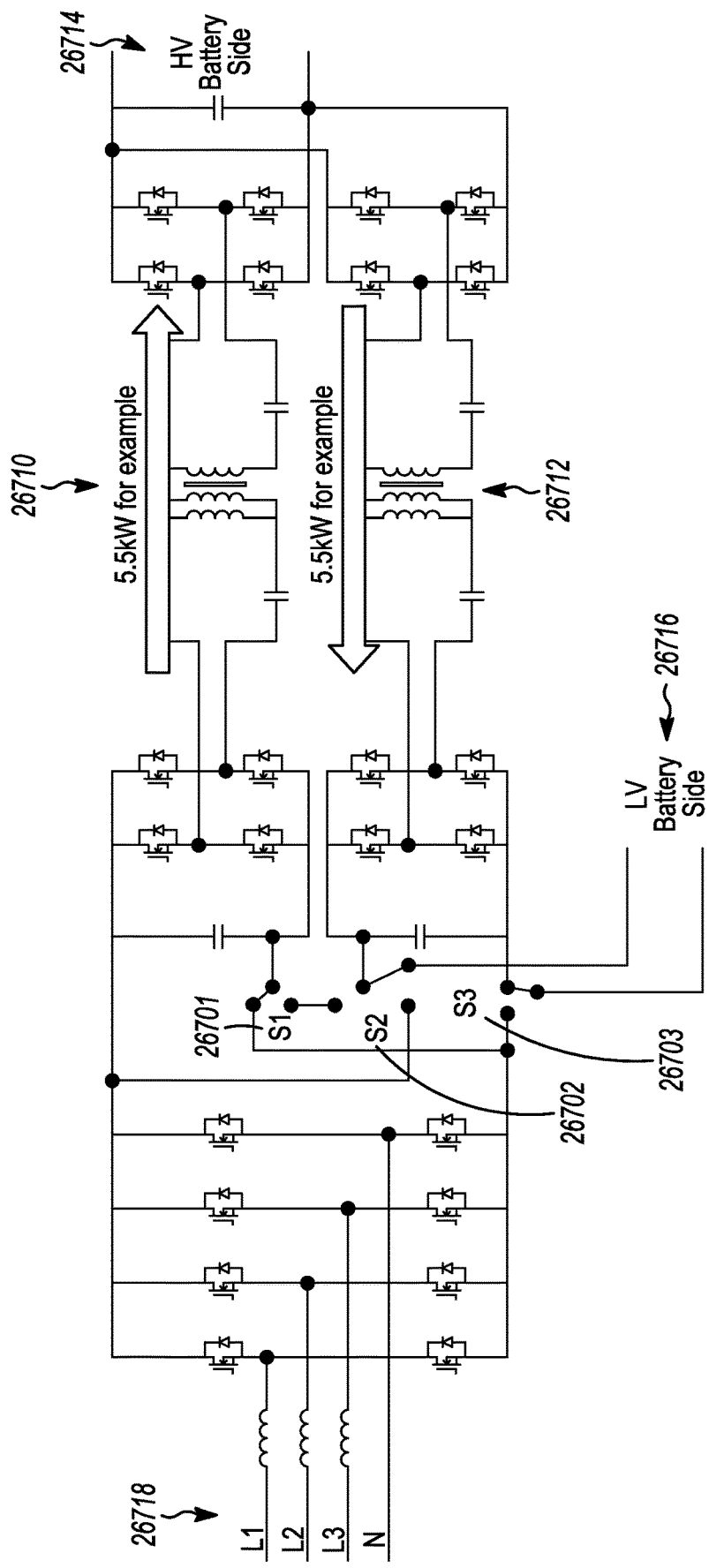
FIG. 45 depicts an embodiment combined bi-directional on-board charger and bi-directional DC-to-DC converter control topology in a second mode for simultaneously charging the high voltage battery from the AC side of the circuit and the high voltage battery supplying power to the DC-to-DC converter and connected low voltage loads, such as when the low voltage battery is in a low state of charge.

In reference to FIG. 45, an embodiment switching topology is depicted with the combined bi-directional on-board charger and bi-directional DC-to-DC converter control topology in a second mode for simultaneously charging the high voltage battery 26714 from the AC side 26718 of the circuit and the high voltage battery supplying power to the low voltage battery side of the circuit 26716 (e.g., to a DC-to-DC converter and connected to a low voltage battery and low voltage loads). As depicted, in the second mode switch three 26703 is closed to low voltage DC−, switch one 26701 is closed to high voltage DC−, and switch two closes to full bridge DC+. In embodiments, the second mode may be utilized when the low voltage battery is in a low state of charge, and where the switching configuration allows for power to simultaneously flow from the AC side 26718 of the circuit to the high voltage battery 26714 through the upper isolation circuit 26710 while also allowing power to flow from the high voltage battery 26714 to the low voltage battery side 26716 of the circuit through the lower isolation circuit 26712. In embodiments, the second mode may be maintained until the low voltage battery's state of charge reaches a threshold level, at which point the configuration is switched to another mode of operation (e.g., back to the first mode to fully charge to the high voltage battery).

Figure 46:
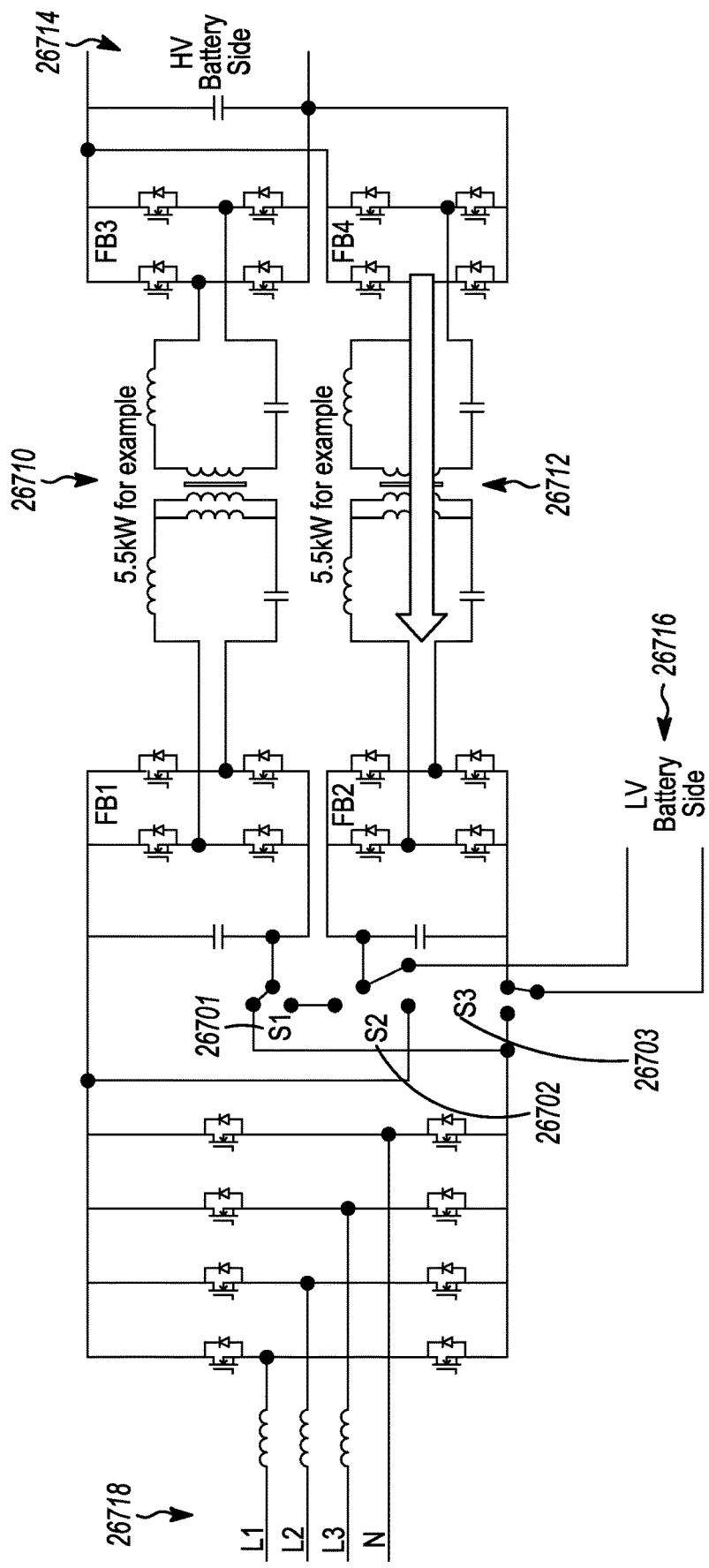
FIG. 46 depicts an embodiment combined bi-directional on-board charger and bi-directional DC-to-DC converter control topology in a third mode for driving an electric vehicle where the high voltage battery supplies power to the DC-to-DC converter and connected low voltage loads.

In reference to FIG. 46, an embodiment switching topology is depicted with the combined bi-directional on-board charger and bi-directional DC-to-DC converter control topology in a third mode for driving an electric vehicle where the high voltage battery 26714 supplies power to the low voltage battery side of the circuit 26716. As depicted, in the third mode switch three 26703 is closed to low voltage DC−, switch one 26701 is closed to high voltage DC−, switch two 26702 is closed to full bridge DC+, where the high voltage battery 26714 is charging the low voltage battery through the lower isolation circuit 26712 while the vehicle is driving (and thus unplugged from an external AC charging source).

Figure 47:
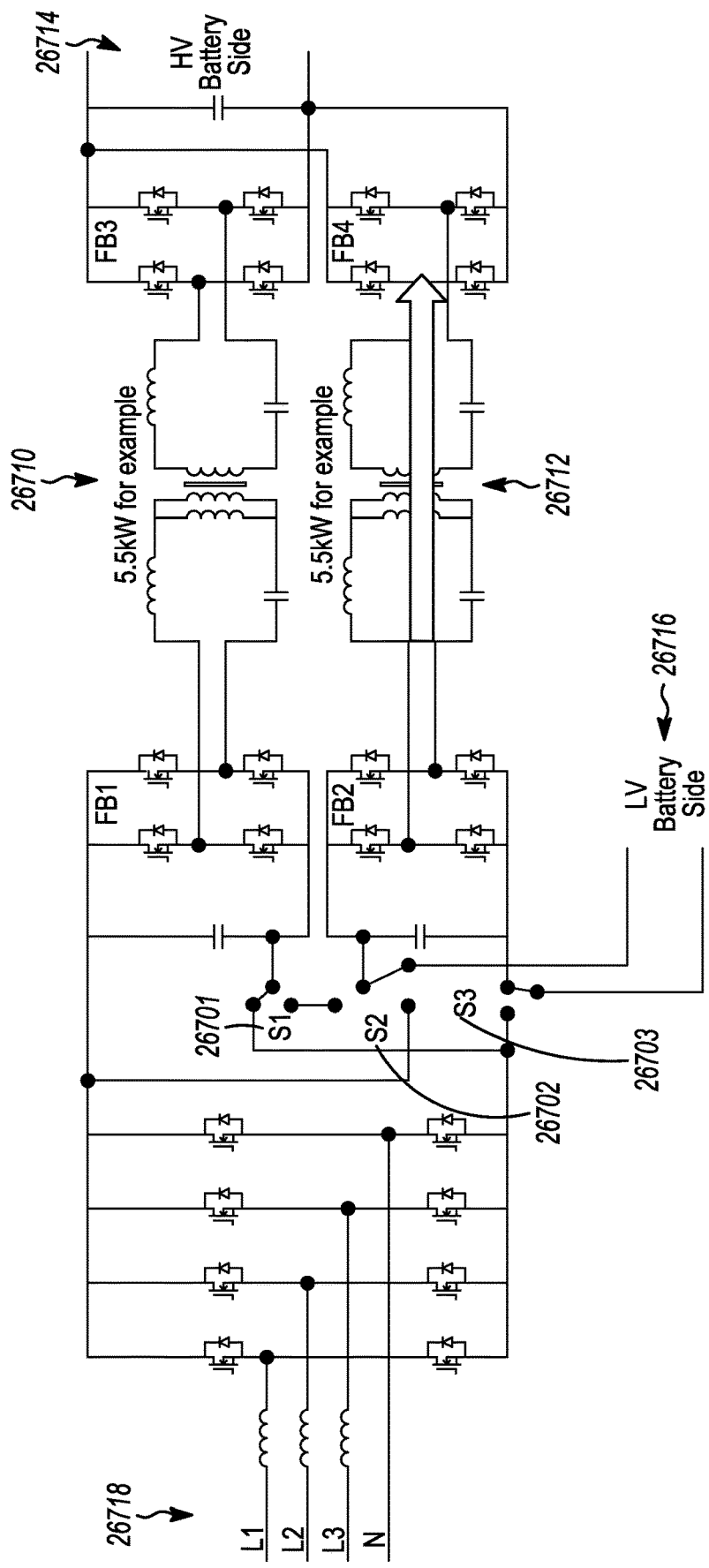
FIG. 47 depicts an embodiment combined bi-directional on-board charger and bi-directional DC-to-DC converter control topology in a forth mode for the low voltage battery supplies power to the high voltage battery such as in a pre-charge configuration.

In reference to FIG. 47, an embodiment switching topology is depicted with the combined bi-directional on-board charger and bi-directional DC-to-DC converter control topology in a fourth mode for the low voltage battery side 26716 supplies power from the low voltage side 26716 to the high voltage battery 26714 such as in a pre-charge configuration. As depicted, in the fourth mode switch three 26703 is closed to low voltage DC−, switch one 26701 is closed to high voltage DC−, switch two 26702 is closed to full bridge DC+.

Figure 48:
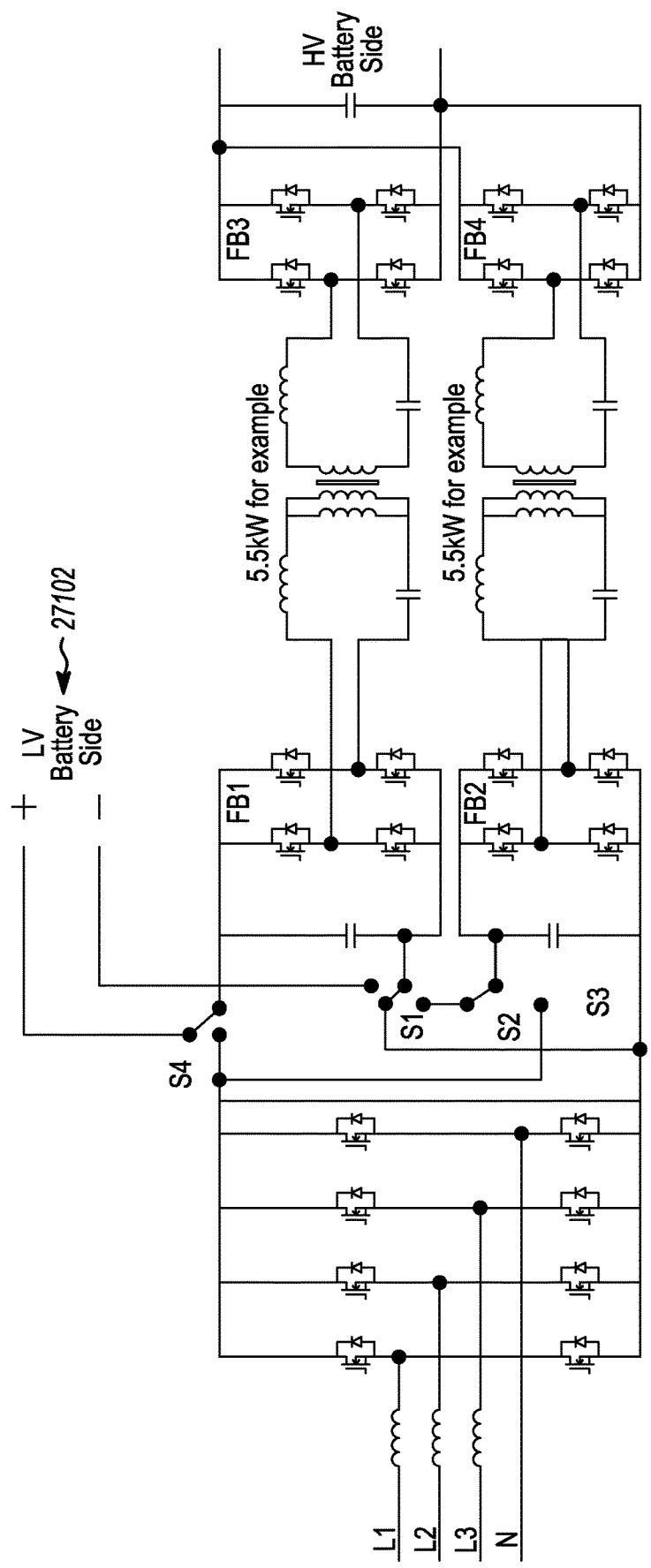
FIG. 48 depicts an embodiment combined bi-directional on-board charger and bi-directional DC-to-DC converter control topology in a first alternate configuration with the DC-to-DC converter connections on the top portion of the circuit.

FIG. 48 depicts an embodiment combined bi-directional on-board charger and bi-directional DC-to-DC converter control topology in a first alternate configuration with low voltage connections on the top portion of the circuit.

Figure 49:
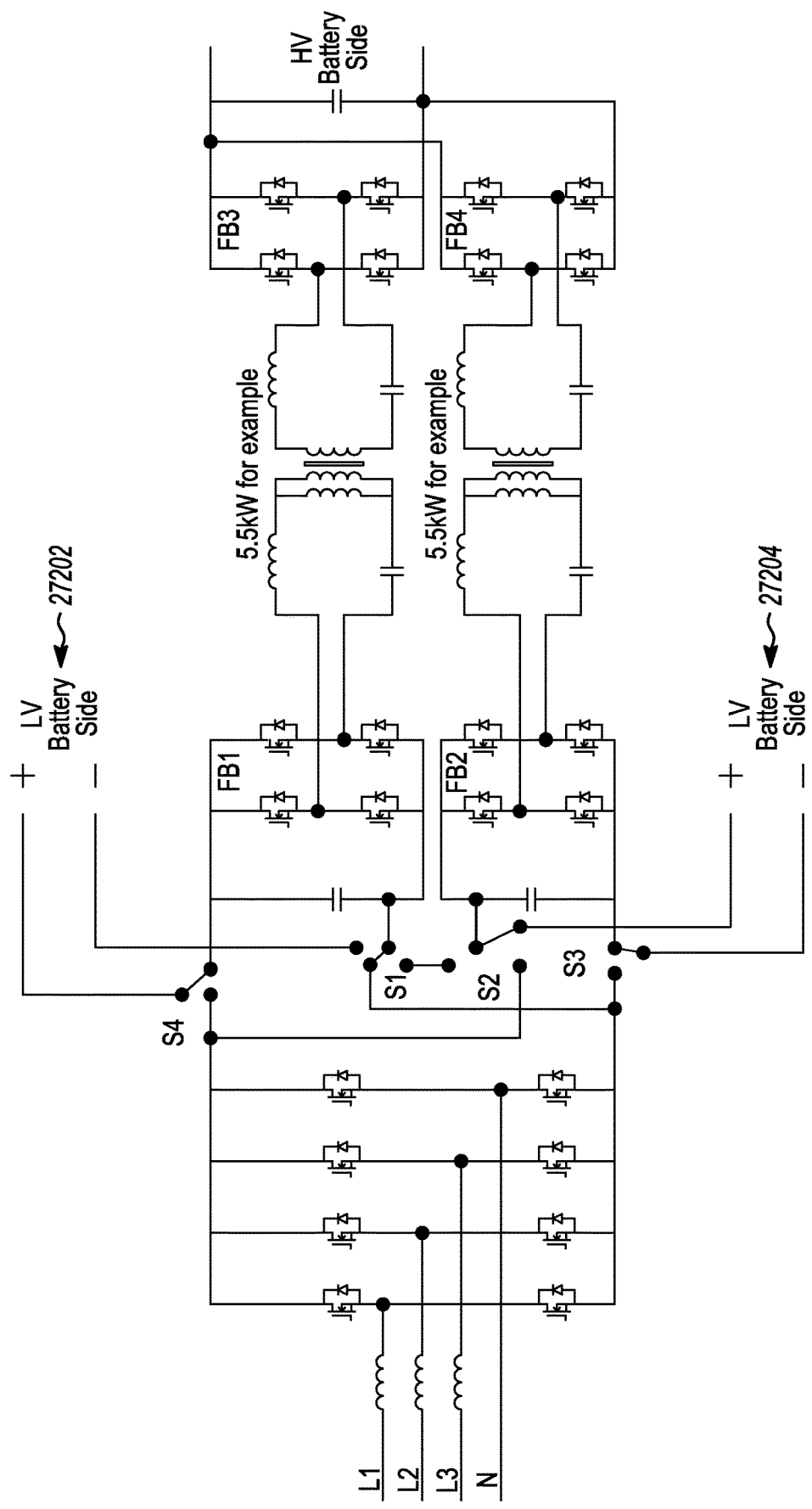
FIG. 49 depicts an embodiment combined bi-directional on-board charger and bi-directional DC-to-DC converter control topology in a second alternate configuration with the DC-to-DC converter connections on the both the top and bottom portions of the circuit.

FIG. 49 depicts an embodiment combined bi-directional on-board charger and bi-directional DC-to-DC converter control topology in a second alternate configuration with the DC-to-DC converter connections on the both the top and bottom portions of the circuit.

Figure 50:
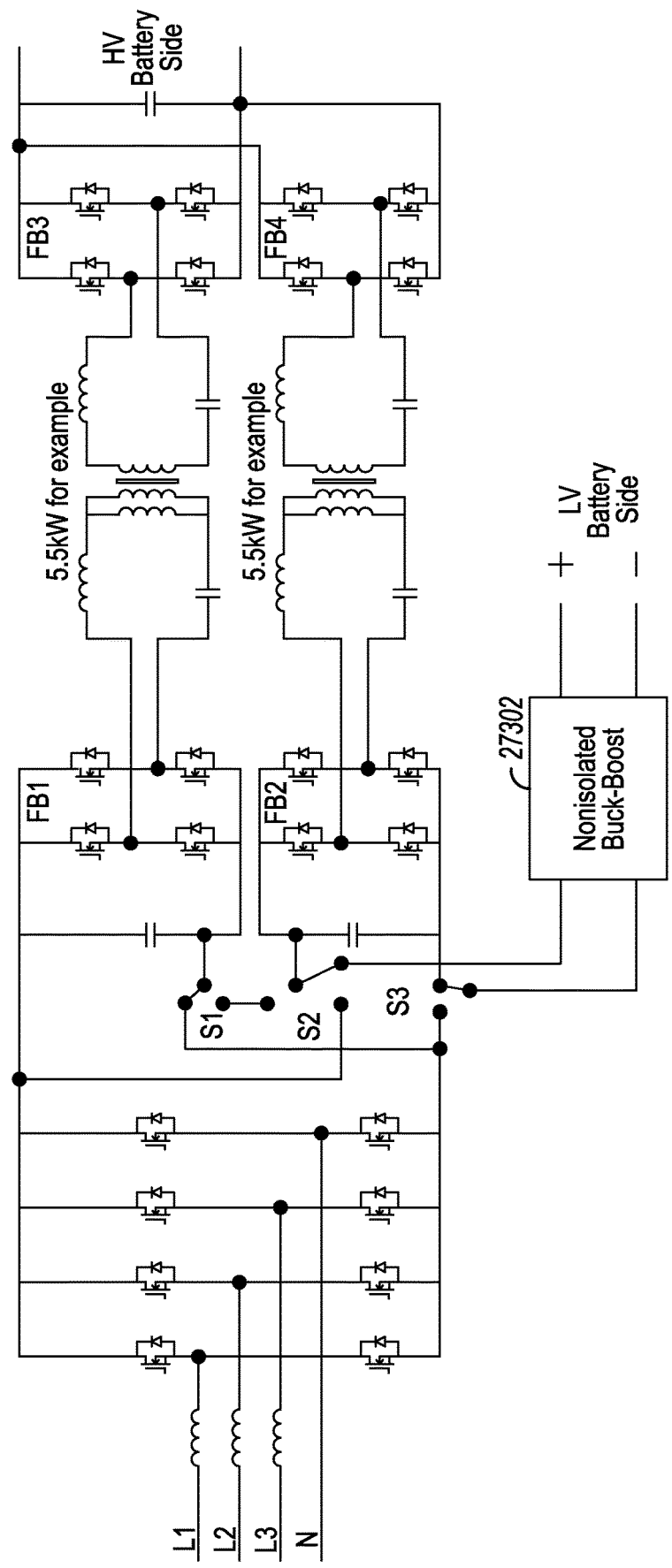
FIG. 50 depicts an embodiment combined bi-directional on-board charger and bi-directional DC-to-DC converter control topology in a third alternate configuration that adds a non-isolated buck-boost converter as the DC-to-DC converter providing low voltage power to low voltage loads.

FIG. 50 depicts an embodiment combined bi-directional on-board charger and bi-directional DC-to-DC converter control topology in a third alternate configuration that adds a non-isolated buck-boost converter as the DC-to-DC converter providing low voltage power to low voltage loads.

Figure 35:
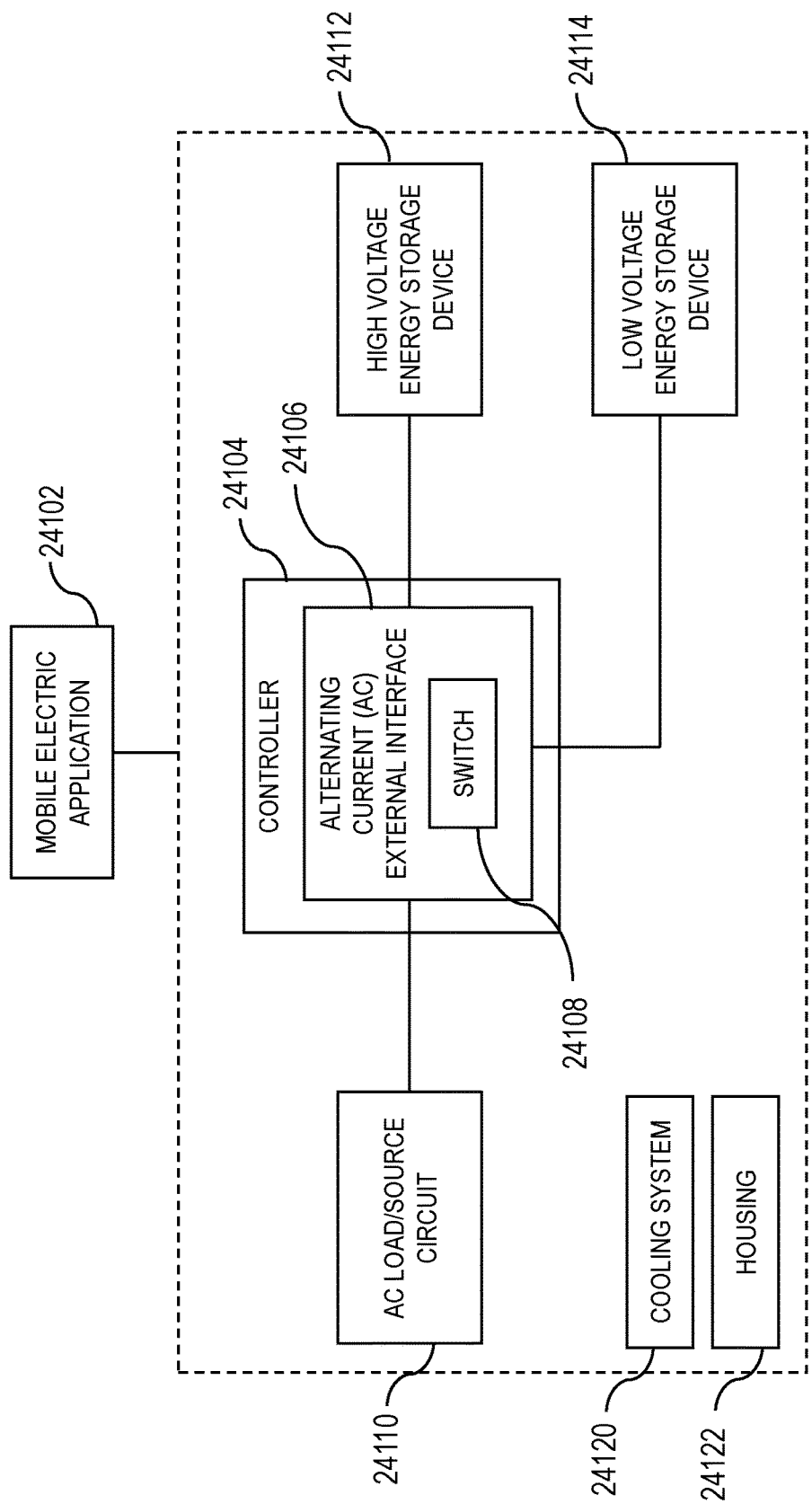
FIG. 35 depicts an embodiment example system for power distribution includes a mobile electric application.

Referencing FIG. 35, an example system for power distribution includes a mobile electric application 24102, including a high voltage (HV) energy storage device 24112 (e.g., a high-voltage battery), a low voltage (LV) energy storage device 24114 (e.g., a relatively low-voltage battery, and a controller 24104 including an alternating current (AC) external interface 24106 configured to selectively couple a plurality of AC load/source components 24110, wherein the AC external interface comprises a switch 24108 having a first position that electrically couples the plurality of AC load/source components to the high voltage energy storage device, and a second position that electrically isolates the plurality of AC load/source components from the high voltage energy storage device. The example system may be representative of an architectural topology, system, and method for an electric vehicle combined module that provides bi-directional high voltage power flow (e.g., grid to HV battery, HV battery to Grid, HV battery to AC loads, and the like) through the same power electronics, or at least partially through shared power electronics. The topology may also provide high voltage to low voltage DC-to-DC conversion functions, AC/DC conversion (e.g., with a rectifier, inverter, and the like), cooling system 24120, a modular structure, a housing 24122, and the like.

An electric vehicle, such as a battery electric vehicle (BEV) or plug-in hybrid electric vehicle (PHEV), can have an on-board charger to charge the HV energy storage device from the power grid or can have an on-board generator to provide power from HV energy storage device to AC loads. This sometimes can be called a bidirectional on-board charger (OBC). Adding a grid synchronization function, the bi-directional charger can also send the power to the grid, such as through the AC external interface. In BEV or PHEV vehicles, a DC-to-DC converter may be included to convert HV energy storage device voltage to low voltage for controllers, and the like. For instance, a low voltage bus may include 9V to 14V for passenger vehicles. The DC-to-DC converter and bi-directional OBC may be separate parts, with separate cooling system, electronics (e.g., control board, driver board, and the like), housing, and the like. The DC-to-DC converter and bi-directional OBC may be combined (e.g., into one package), which may lead to simplified and/or reduced component count for electrical and electronic circuitry in the system. For instance, a switch 24108 may be added with a DC-to-DC converter connected to bidirectional OBC circuitry. Switch 24108 may be controlled to make sure there is no interference of the electric circuitry operations, and to allow for sharing of power electronics by separating aspects of the system depending upon the current operating mode. Power can be flowing from the grid to the HV energy storage device, HV energy storage device to AC loads or grid. A DC-to-DC converter function may be provided which allows power flow from HV energy storage device to LV DC loads. In this instance, a driver board, control board, and/or cooling system may be further simplified since the bi-directional OBC and LV DC-to-DC converter may be integrated into one package. In this instance, several power electronics switches can be eliminated.

Certain further aspects of an example system are described as follows, any one or more of which may be present in certain embodiments. An example system includes a plurality of AC load/source components 24110 such as including a grid connection, an AC load connection, and the like. The grid connection may include a charging connection, a 3-phase AC connection, a consumer AC access, and the like. The switch 24108 in the second position may electrically couple the HV energy storage device to the LV energy storage device. The second position of the switch 24108 may include a closed position, such as where the closed position of the switch bypasses a coupling inductor between the HV energy storage device and the AC external interface.

Figure 36:
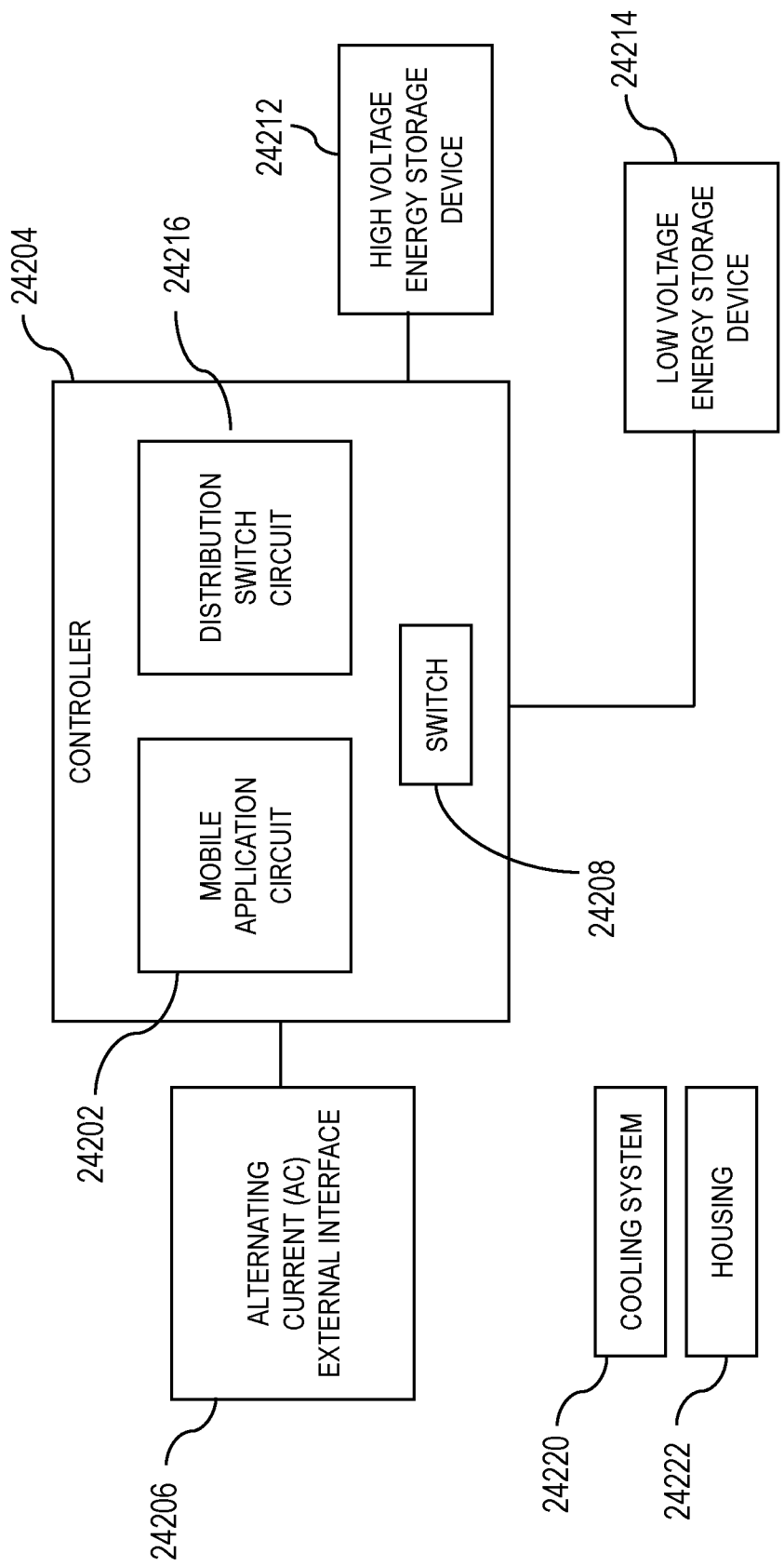
FIG. 36 depicts an embodiment example system for controlling power distribution includes a controller in control communication with a mobile application circuit.

Referencing FIG. 36, an example system for controlling power distribution includes a controller 24204 in control communication with a mobile application circuit 24202 structured to interpret an electrical distribution mode, a distribution switch circuit 24216 structured to provide a switch position command in response to the electrical distribution mode; and a switch 24208 configured to be responsive to the switch position command, where the switch 24208 includes a first position that electrically couples a HV energy storage device 24212 to an AC external interface 24206 and electrically isolates the HV energy storage device from a LV energy storage device 24214, and a second position that electrically couples the HV energy storage device to the LV energy storage device and electrically isolates the HV energy storage device from the AC external interface. In embodiments, the controller 24204 may include a cooling system 24220, a housing 24222, and the like. The example system depicted in FIG. 36 is compatible with certain embodiments of the mobile electric application 24102 depicted in FIG. 35, and/or with other mobile applications depicted throughout the present disclosure.

Certain further aspects of an example controller are described as follows, any one or more of which may be present in certain embodiments. An example electrical distribution mode may include at least one mode, such as selected from a discharging mode providing power from the HV energy storage device to the AC external interface, a charging mode providing power from the AC external interface to the HV energy storage device, a low voltage charging mode providing power from the HV energy storage device to the LV energy storage device, and the like. The electrical distribution mode may include a discharging mode providing power from the HV energy storage device to the AC electrical interface, the controller further including a power configuration circuit structured to synchronize power provided from the HV energy storage device with a grid electrically coupled to the AC external interface.

Figure 37:
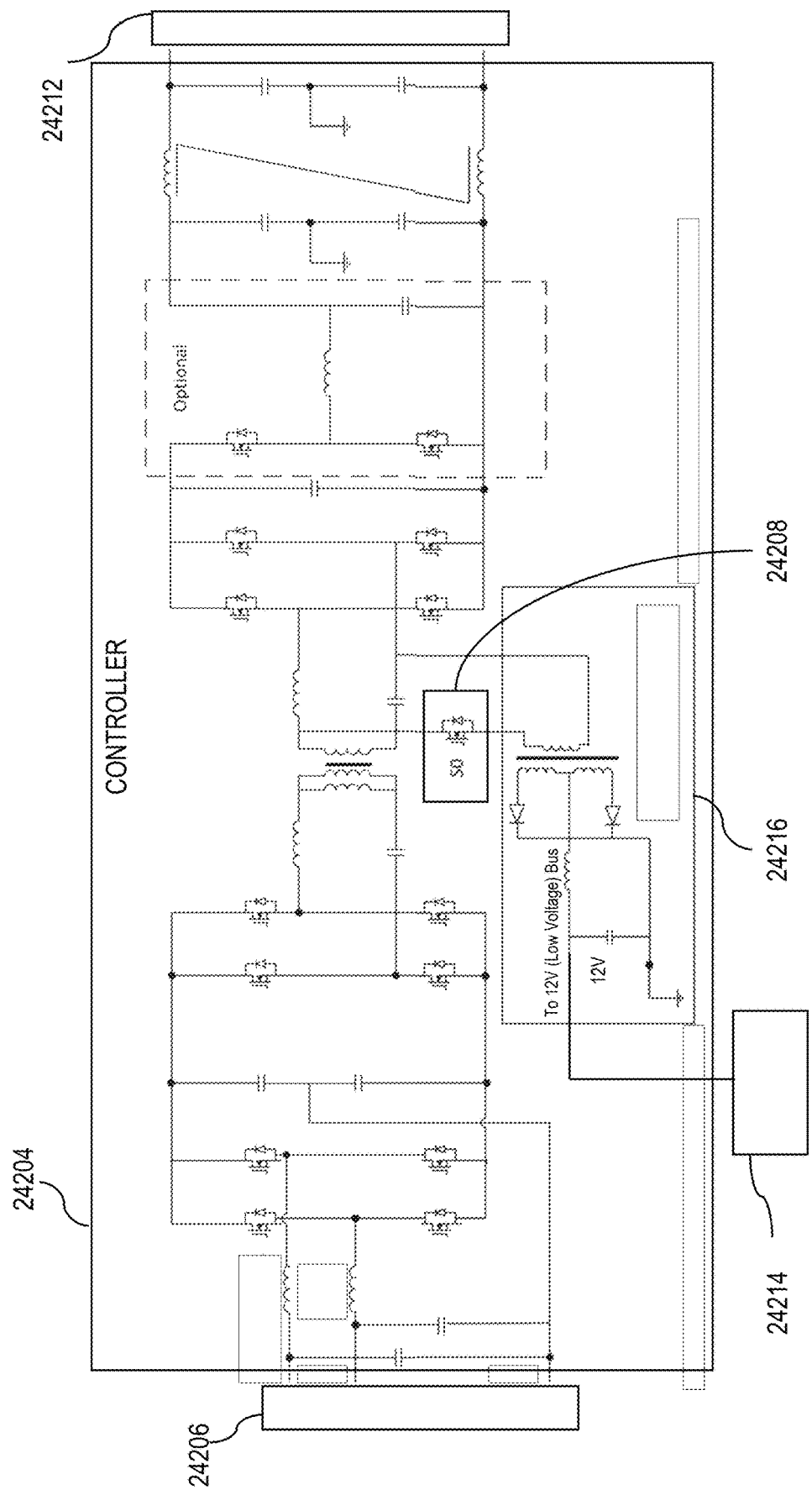
FIG. 37 depicts an embodiment example controller for power distribution in control communication with a mobile application circuit.

Referencing FIG. 37, a detailed example of the controller 24204, consistent with the depiction of FIG. 36, includes a switch 24208 in control communication with an AC external interface 24206, a HV energy storage device 24212, and a LV energy storage device 24214. Although FIG. 37 depicts a single-phase application, one skilled in the art will appreciate that the configuration can also be applied to the AC input of a three-phase circuit with or without neutral. Operations of an example electronics portion of an architecture such as depicted are shown for purposes of illustration. It will be understood that components of a system such as in FIG. 37 may be implemented in hardware, software, logic circuits, and/or may be combined or distributed about a system.

In embodiments, an example power distribution system, method, and controller may comprise a number of operating modes. For instance, a first example mode may be utilized when a vehicle is driving, where the OBC is not utilized, and by disabling the operation of AC external interface portion of the system (e.g., the left side of FIG. 37) by closing the switch 24208, the controller 24204 can control power flow with the DC-to-DC converter 24216 such as for charging the LV energy storage device 24214. A second example mode may be for charging the HV energy storage device 24212 in the system, such as to power electronics (e.g., a driver board and controller board) for the OBC function. In this example second mode, the switch 24208 is open to fully disconnect the DC-to-DC converter 24216 from the OBC and to enable control of the OBC in a resonant mode (e.g., in an LLC resonant mode). However, if the LV energy storage device voltage is too low, it may be possible to switch modes, such as to the first example mode, to charge the LV energy storage device. When the state of charge of the LV energy storage device is high enough, it is possible to switch back to the example second mode to use the OBC to charge the HV energy storage device. In embodiments, while the system is charging to HV energy storage device, such as when the LV energy storage device is in a high state of charge, the system may rely on the LV energy storage device in the system to power the electronics for the OBC function, where the switch is open to fully disconnect the DC-to-DC portion from the OBC circuit. If the LV energy storage device voltage is below a certain threshold state of charge, the switch may be closed to operate the DC-to-DC converter to charge the LV energy storage device and pause charging the HV energy storage device. These two modes may be switched back and forth depending on the state of charge level of the LV energy storage device. A third example mode may be for connecting the HV energy storage device to provide power to the AC external interface, where power is flowing from the HV energy storage device to the grid or AC components and where the switch is open (e.g., when LV energy storage device state of charge is high). By then closing the switch, the system can pause power being provided to AC external interface (e.g., to the grid or AC load) to charge the LV energy storage device. When the LV energy storage device stage of charge is sufficiently high (reaching a predetermined threshold), the system can re-open the switch to resume power flow back to the grid or AC load.

Figure 38:
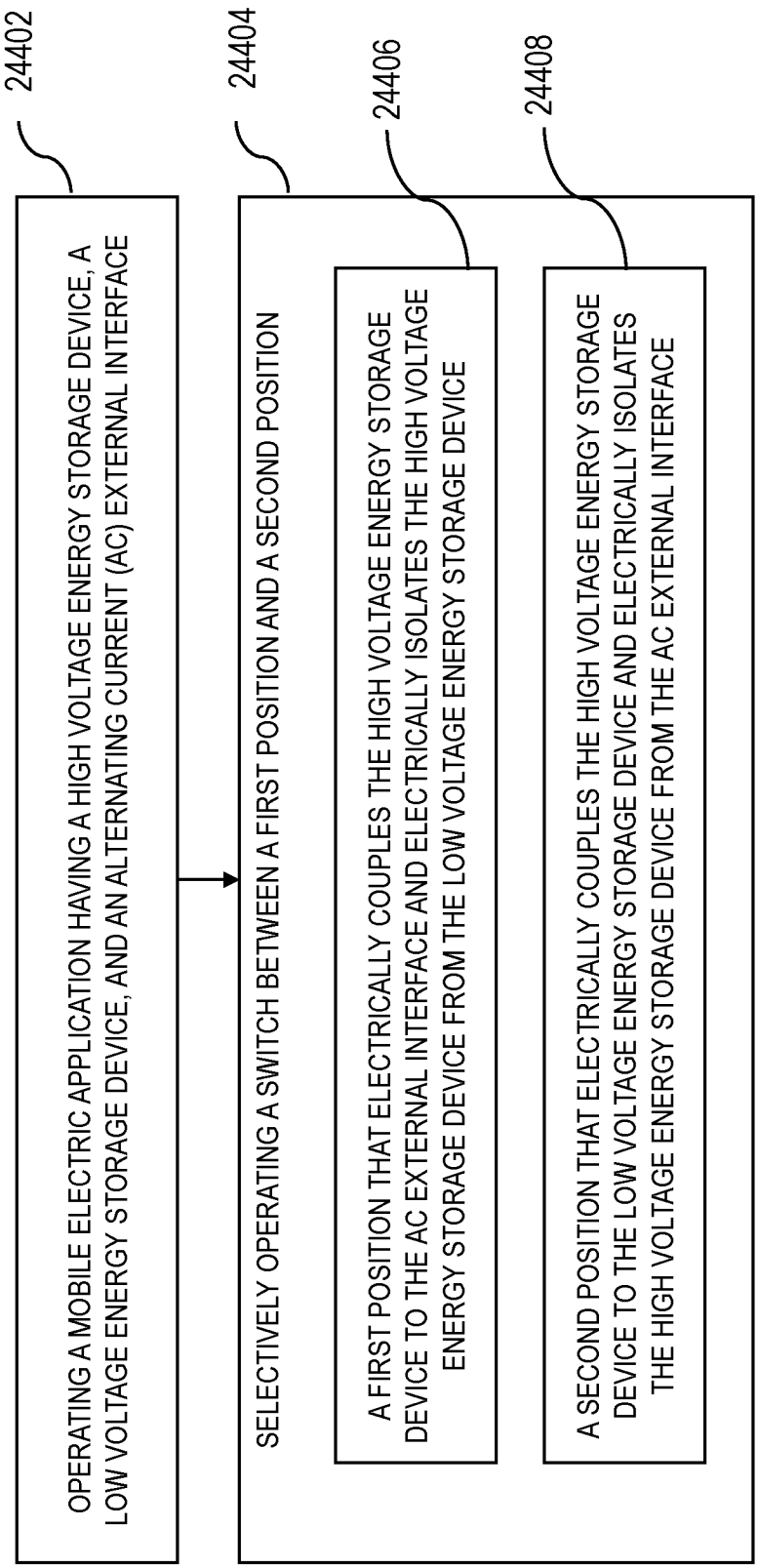
FIG. 38 depicts an embodiment example procedure for controlling the distribution.

Referencing FIG. 38, an example procedure for controlling the distribution is depicted, including in a first step 24402 operating a mobile electric application having a HV energy storage device, a LV energy storage device, and an alternating current (AC) external interface. In a second step 24404 selectively operating a switch between (1) a first position 24406 that electrically couples the HV energy storage device to the AC external interface and electrically isolates the HV energy storage device from the LV energy storage device, and (2) a second position 24408 that electrically couples the HV energy storage device to the LV energy storage device and electrically isolates the HV energy storage device from the AC external interface. Alternately, a procedure may switch off all external AC with a single switching action while not necessarily changing or isolating a low voltage relationship at the same time.

Certain further aspects of an example procedure may include operating in a driving mode by selectively operating the switch to the first position, and controlling direct current conversion between the HV energy storage device and the LV energy storage device, such as controlling the DC-to-DC conversion by powering a controller with the HV energy storage device, controlling the DC-to-DC conversion by powering a controller with the LV energy storage device, and the like. The operating mode may include a charging mode by selectively operating the switch to the second position and controlling charging from the AC external interface to the HV energy storage device, such as by controlling the charging by powering a controller with the LV energy storage device. Controlling the charging by pausing the charging in response to the LV energy storage device state of charge may be determined by detecting a state of charge below a threshold state of charge, operating the switch in the second position to charge the LV energy storage device, and returning to the charging mode in response to the LV energy storage device having a state of charge exceeding a second threshold state of charge. Operations may include a discharging mode by selectively operating the switch to the second position and controlling discharging from the HV energy storage device to the AC external interface, such as by controlling the discharging by synchronizing the discharging to a grid coupled to the AC external interface. Controlling the discharging may be implemented by providing power to the grid or an AC load coupled to the AC external interface.

The term power distribution (and similar terms) as utilized herein should be understood broadly. Without limitation to any other aspect or description of the present disclosure, a power distribution system, such as related to a mobile electric application, includes components such as an on-board charger, DC-to-DC converter, HV energy storage device, and LV energy storage device. Certain components may not be considered power distribution individually, but may be considered power distribution in an aggregated system—for example an energy storage device (e.g., a battery) may not be considered a power distribution system, but may be a part of a larger system and/or be accumulated with a number of other related components to be considered a power distribution system and/or a part of a power distribution system. In certain embodiments, a system may be considered a power distribution system for some purposes but not for other purposes—for example an alternating current (AC) external interface may not be considered a power distribution system, but when used to interface a power source (e.g., a high-voltage storage device) through an inverter and AC external interface to an AC power load or a grid connection would be considered part of a power distribution system. Additionally, in certain embodiments, otherwise similar looking systems may be differentiated in determining whether such systems are power distribution systems, and/or which type of power distribution system. For example, a switch used to connect and disconnect a low-voltage energy storage device from a circuit may not be considered part of a power distribution system, but when the switch connects the LV energy storage device to on-board charging components in a mobile electric application, the switch would be considered part of a power distribution system. Accordingly, the benefits of the present disclosure may be applied in a wide variety of systems, and any such systems may be considered a power distribution system herein, while in certain embodiments a given system may not be considered a power distribution system herein. One of skill in the art, having the benefit of the disclosure herein and knowledge about a contemplated system ordinarily available to that person, can readily determine which aspects of the present disclosure will benefit a particular system, how to combine processes and systems from the present disclosure to enhance operations of the contemplated system. Certain considerations for the person of skill in the art, in determining whether a contemplated system is a power distribution system and/or whether aspects of the present disclosure can benefit or enhance the contemplated system include, without limitation: the accessibility of portions of the system to energy storage devices; connectivity to power loads; connectivity to power conversion components; the presence of an on-board charger, the use of an inverter between DC and AC power components; and the like. While specific examples of power distribution systems and considerations are described herein for purposes of illustration, any system benefitting from the disclosures herein, and any considerations understood to one of skill in the art having the benefit of the disclosures herein, are specifically contemplated within the scope of the present disclosure.

Figure 70:
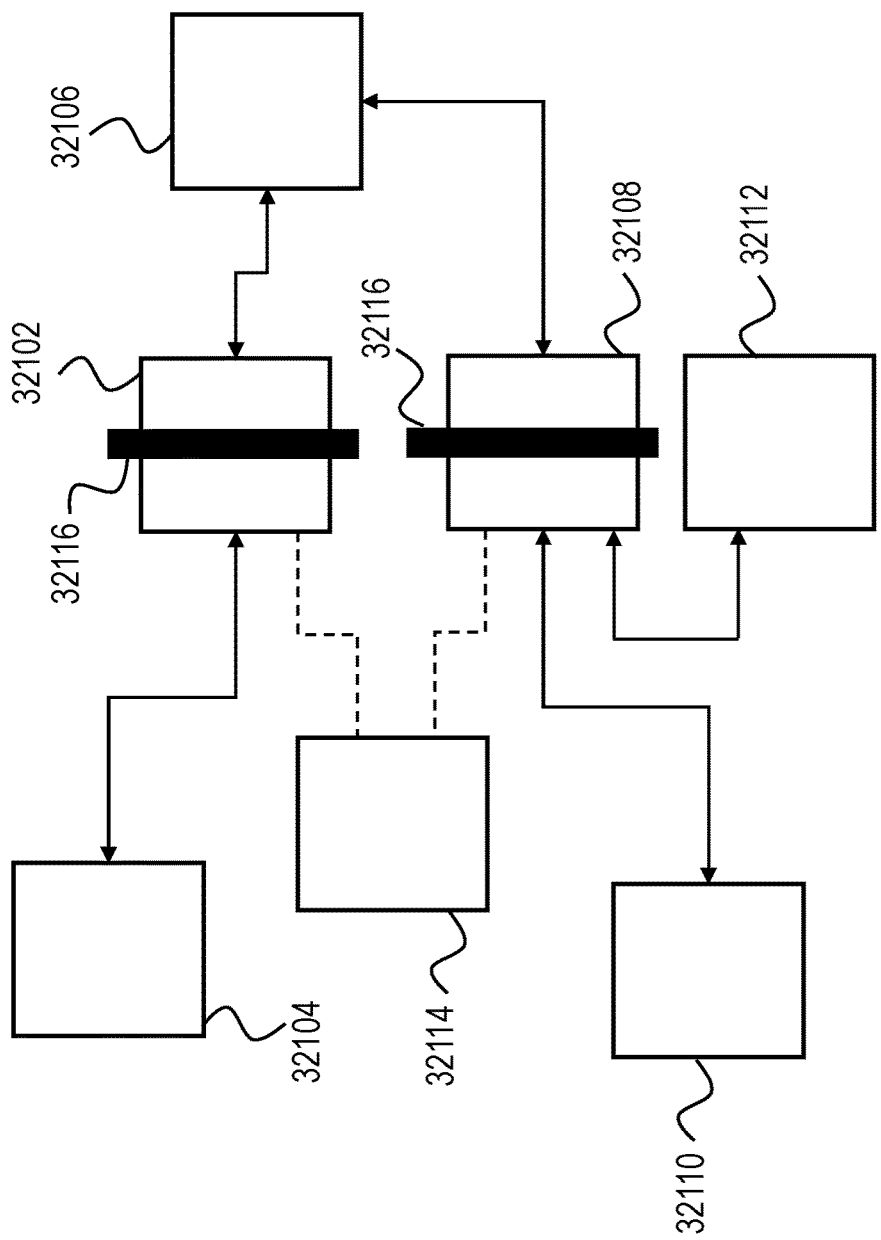
FIG. 70 depicts an embodiment example power electronic assembly for a mobile application.

Referencing FIG. 70, an example power electronic assembly for a mobile application is depicted. The example of FIG. 70 is a schematic depiction, and provides capability for high capacity charging of a high voltage battery, low capacity charging of the high voltage battery, and selective charging of a low voltage battery. The example of FIG. 70 includes a first power electronics component 32102 that selectively couples to high source 32104 (e.g., a high capacity charging device) on a first side, and selectively couples to the high voltage battery 32106 on a second side. The example of FIG. 70 further includes a second power electronics component 32108 selectively coupled to either a low load 32110 or a low voltage battery 32112 on a first side, and to the high voltage battery 32106 on a second side. Example switching arrangement and details that may be utilized to implement the selection operations are depicted, for example, in FIGS. 43 and 44 of the present disclosure.

The example of FIG. 70 further includes a controller 32114 having a number of circuits thereon configured to functionally execute operations of the controller 32114. The example controller 32114 includes an operating mode circuit that determines a discharge operating mode for the mobile application (e.g., high capacity charging, high capacity discharging, charging a low voltage battery, powering a low load, etc.), and a power electronics configuration circuit that provides a switch state value for the first power electronics component and the second power electronics component in response to the discharge operating mode. The first power electronics component 32102 and second power electronics component 32108 are responsive to the switch state value to couple selected ones of the high source 32104, low load 32110, and/or low voltage battery 32112 to the high voltage battery 32106 in a DC/DC converter arrangement. In certain embodiments, the arrangement of FIG. 70 allows for simultaneous high capacity charging of the high voltage battery, and either powering of a low load 32110 or charging of the low voltage battery 32112. In certain embodiments, for example where a voltage of the low voltage battery 32112 and the low load are compatible, the arrangement of FIG. 70 allows for simultaneous high capacity charging of the high voltage battery, and powering of a low load 32110 and charging of the low voltage battery 32112. In certain embodiments, the low voltage battery 32112 and low load 32110 interface to separate winding interfaces in the second power electronics component 32108, and may both be coupled to the high voltage battery 32106 simultaneously, even where the voltages are not compatible. In the example of FIG. 70, the first electronics component 32102 and the second power electronics component 32108 have separate magnetic components 32116. In certain embodiments, for example when the low voltage battery 32112 does not require charging, the arrangement of FIG. 70 allows for high capacity charging of the high voltage battery 32106, and powering of the controller 32114 and switching operations of the electrical components 32102, 32108 from the low voltage battery 32112, and further allows powering of the low load 32110 from the high voltage battery 32106 or from the low voltage battery 32112 (e.g., if the voltages are compatible, and/or are coupled with separate windings, and if the power capacity of the low voltage battery 32112 and requirements of the low load 32110 are appropriate).

An example arrangement includes the first power electronics component 32102 having a higher power rating than the second power electronics component 32108. For example, the first power electronics component 32102 may have a power rating such as 5.5 kW, 8 kW, or 11 kW. In another example, the second power electronics component 32108 may have a power rating such as 3 kW or 5.5 kW. The example ratings are non-limiting, and the charging and load specifications of the mobile application may be supported by other ratings of the power electronics components 32102, 32108.

In certain embodiments, the high source may include one or more of a motive power load for the mobile application (e.g., to provide regenerative braking during motive operations), a grid source and/or charging station source, or a vocational load for the mobile application (e.g., to provide regenerative recovery of working loads, such as lowering heavy objects, releasing stored pressure, and/or recovering kinetic energy such as from spinning components or loads). In certain embodiments, the first power electronics component 32102 may be selectively couplable to a high load (not shown) on the first side, which may be a same coupling as to the high source 32104 (e.g., where the high source 32104 may operate as a source or load). Example and non-limiting high loads include a motive power load (e.g. to provide motive power to the mobile application), a grid load (e.g., providing power to a grid), and/or a vocational load for the mobile application. It will be understood that, in certain embodiments, the configuration of FIG. 70 provides primarily for charging operations and DC/DC conversion operations, and separate electronics may be provided for interfacing with certain loads, such as a motive power load and/or a vocational load. However, the configuration of FIG. 70 is capable of providing or supporting such loads, and/or accepting power from such loads in a regenerative capacity, which may require, for example, additional interfaces to the high load (e.g., rectification, AC inversion, voltage conversion, and the like). An example first power electronics component 32102 includes a power rating sufficient to provide rated power to a motive power motor for the mobile application. An example second power electronics component 32108 includes a power rating sufficient to support a consumer power interface for the mobile application (e.g., an available power outlet or other device), and/or to support an electrical accessory for the mobile application.

In certain embodiments, the second power electronics component 32112 is further selectively couplable to the high source 32104 on the first side (not shown). The selective coupling of the second power electronics component 32108 to the high source 32104 may be provided by a separate winding utilizing the same magnetic components 32116 that are utilized for the low load 32110 and/or low voltage battery 32112 coupling. In certain embodiments, the additional winding of the second power electronics component 32108 is configured for a voltage provided at the high source 32104, and/or particularly for a voltage provided at the high source 32104 during operations when the second power electronics component 32108 is also utilized for high capacity charging. For example, the first power electronics component 32102 may have a first capacity rating such as 5.5 kW or 8 kW, and the second power electronics component 32108 may have a second capacity rating such as 3 kW or 5.5 kW. In the examples, the additional of the second electronics component 32108 to the high capacity charging can provide a total high capacity charging of 8+ kW, 11 kW, or higher, and therefore increase the charging speed as well as increase compatibility of the arrangement with a wider array of chargers and charging modes. In one example, an 11 kW charger may have a known voltage rating, and accordingly the additional winding of the second power electronics component 32108 may be configured for the known voltage rating of the 11 kW charger (e.g., with a coupling that is configured to be close to a resonant coupling at the known voltage rating), as the second power electronics component 32108 will only be utilized when charging from the 11 kW (or other charging capacity enabled only with the utilization of the second power electronics component 32108). In certain embodiments, the low voltage battery 32112 and low load 32110 are de-coupled from the second power electronics component 32108 when the second power electronics component 32108 is supporting high capacity charging.

In certain embodiments, the first power electronics component 32112 may be configured with a winding for interfacing with the high source that is configured for a lower capacity charger consistent with the power rating of the first power electronics component 32102, configured for the higher capacity charger (e.g., providing a resonant frequency at a voltage close to a voltage of the higher capacity charger, to maximize charging efficiency at the highest rate charging), or configured for an intermediate voltage value between those voltage values. Additionally or alternatively, the first power electronics component 32102 may have more than one winding (not shown, but see, e.g., FIG. 34 DC-DC coupling 21408 for an example configuration) for coupling with the high source 32104, where the controller 32114 provides appropriate switching commands to the first power electronics component 32102 to couple the appropriate winding to the high source 32104 based on the high source 32104 voltage and/or charging mode. Resonant frequency selections for the first power electronics component 32102 and second power electronics component 32108 may be determined based on a most likely voltage, a most common voltage, a highest voltage value, and/or voltage corresponding to a highest current value (e.g., a high capacity charger may have differing voltages at a similar power throughput, for example where a first high capacity charger is a 3-phase, and a second high capacity charger is a single phase). In certain embodiments, the high source 32104 may be a quick charging source, or a high power charging source.

Example and non-limiting voltage values for the low voltage battery 32112 include nominal voltages such as 12V, 24V, 42V, and 48V. For example, where a nominal voltage is 12V, the low voltage battery 32112 may operate in a range of about 9V to about 14V. Example and non-limiting voltage values for the high voltage battery 32106 include nominal voltages such as: 240V, 400V, 480V, 600V, 800V, 1000V, and 1200V. The high voltage battery 32106 may similarly operate within a range around the nominal voltage, such as between about 225V to 270V for a nominal voltage of 240V.

In certain embodiments, the first power electronic component 32106 is capable to operate bi-directionally, for example passing power between the high voltage battery 32106 and the high source 32104. In certain embodiments, the second power electronic component 32108 is capable to operate bi-directionally, for example passing power between the high voltage battery 32106 and one or more of the low voltage battery 32112, the low load 32110, and/or the high source 32104. In certain embodiments, the second power electronic component 32108 is capable to pass power between the low voltage battery 32112 and the low load 32110. In certain embodiments, a low source (not shown) may be present, for example selectively couplable to the second electronic component 32108 on the first side. In certain embodiments, the low source may include one or more of a trickle charger, a consumer charger, an electrical accessory capable of providing regenerative power, and/or a consumer device capable of providing regenerative power.

Figure 71:
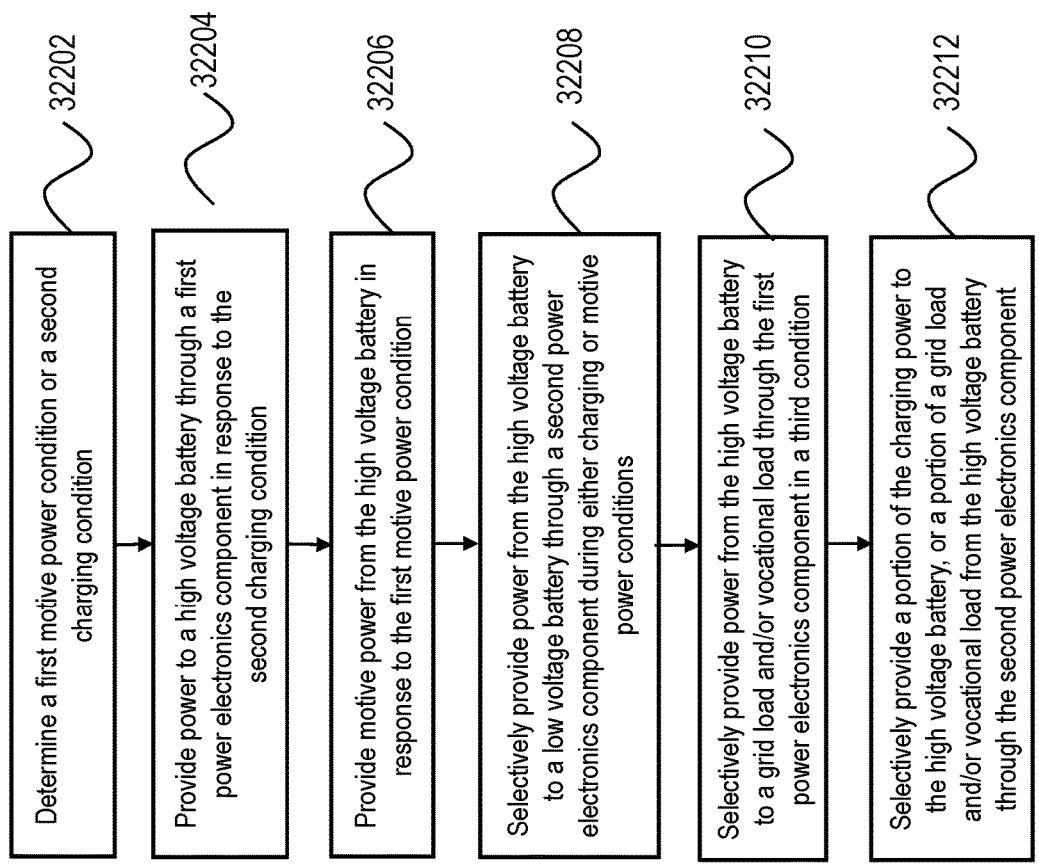
FIG. 71 depicts an embodiment example procedure for configuring charging power electronics for a mobile application.

Referencing FIG. 71, an example procedure for configuring charging power electronics for a mobile application is depicted. The example procedure includes an operation 32202 to determine whether the mobile application is operating in a first operating condition comprising a motive power condition or a second operating condition comprising a charging power condition. The procedure includes an operation 32204 to provide charging power to a high voltage battery through a first power electronics component from a high power source in response to the second operating condition. The procedure includes an operation 32206 to provide motive power to a motive power motor from the high voltage battery in response to the first operating condition. Operation 32206 may include providing the motive power through the first power electronics component, or through a separate power electronics component. The example procedure further includes an operation 32208 to selectively providing low voltage charging power from the high voltage battery to a low voltage battery through a second power electronics component in response to a state of charge of the low voltage battery, which may be performed during either the first operating condition or the second operating condition. The example procedure further includes an operation 32210 to determine whether the mobile application is operating in a third operating condition such as providing power to a grid and/or vocational load, and to provide power for the grid and/or vocational load from the high voltage battery to a high load in response to the third operating condition. The example procedure further includes an operation 32212 to provide at least a portion of the charging power to the high voltage battery, or to provide at least a portion of the grid and/or vocation load from the high voltage battery, through the second power electronics component.

Figure 72:
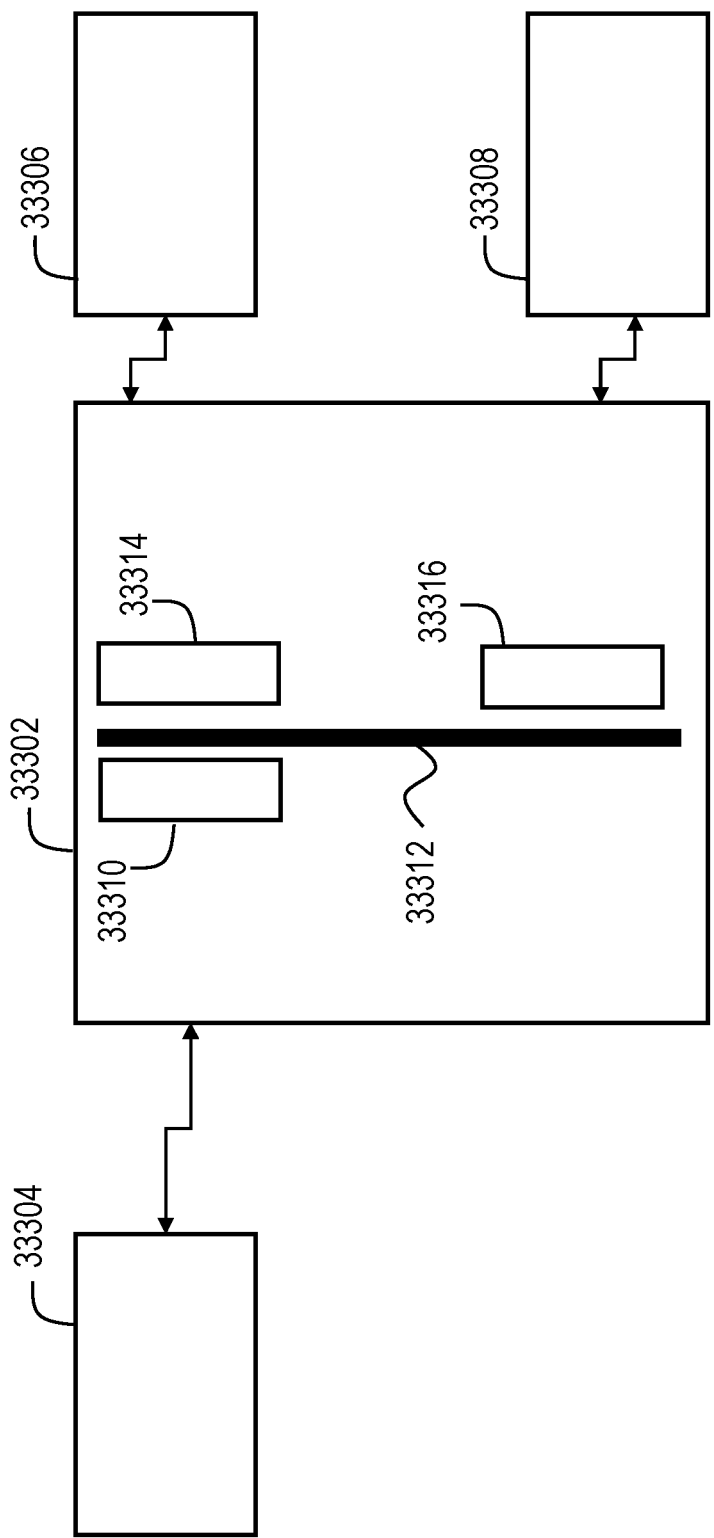
FIG. 72 depicts an embodiment example apparatus for providing power to transfer in a DC/DC converter assembly for a mobile application

Referencing FIG. 72, an example apparatus for providing power to transfer in a DC/DC converter assembly 33302 for a mobile application. The example apparatus includes the DC/DC converter assembly selectively coupled to a power source 33304 on a first side, to a high voltage battery 33306 on a second side, and to a low voltage battery 33308 on a third side. Each side of the DC/DC converter assembly 33302 may include a configurable interface for the coupling of the various sources and/or loads, and further may correspond to a position relative to a magnetic component of the DC/DC converter assembly 33302, and may not correspond to a geometric side of the DC/DC converter assembly 33302. The example DC/DC converter assembly 33302 includes a first winding 33310 positioned on the first side, and configured for a selected power source voltage (e.g., a voltage for a target power source, such as a grid power connection, a particular charging device, or the like). The first winding 33310 configured for the selected power source voltage indicates that the winding configuration and related electronic components (e.g., associated inductors and/or capacitors providing the voltage change and power transfer across the magnetic component 33312) are selected to provide an efficient power exchange, for example providing a resonant frequency that is determined in response to the selected voltage. The voltage at the power source 33304 varies considerably depending upon the charging device, and accordingly a single best winding configuration is not possible. However, the first winding 33310 configuration may be selected intelligently based upon a most likely power source 33304 configuration, to minimize inefficiency (e.g., for a worst reasonable case match of the power source 33304), and/or to maximize efficiency (e.g., for a best reasonable case match of the power source 33304, a most common power source 33304 configuration, and/or a recommended power source 33304 configuration). The example DC/DC converter assembly 33302 further includes a second winding 33314 positioned on a second side, and configured for a selected high voltage battery 33306 voltage. For example, the second winding 33314 and related electronic components may be configured to provide a resonant frequency determined at a voltage of the high voltage battery 33306 corresponding to a mean charging state of the battery (e.g., determined from historical data, related application data, according to a planned duty cycle of the mobile application, and/or a modeled or simulated value), and/or corresponding to a maximum charging rate (e.g., a minimum voltage of the battery that supports a maximum charging rate). The example DC/DC converter assembly 33302 further includes a third winding 33316 positioned on the second side, and configured for a selected low battery voltage 33308. For example, the third winding 33316 and related electronic components may be configured to provide a resonant frequency at a voltage of the low voltage battery 33308 corresponding to a mean charging state of the battery (e.g., determined from historical data, related application data, according to a planned duty cycle of the mobile application, and/or a modeled or simulated value), and/or corresponding to a maximum charging rate (e.g., a minimum voltage of the battery that supports a maximum charging rate). In the example of FIG. 72, the first winding 33310, second winding 33314, and third winding 33316 share magnetic components 33312. In the example of FIG. 72 as depicted, the high voltage battery 33306 cannot charge the low voltage battery 33308 while charging from the power source 33304 without the third winding 33316 exposed to the same voltage variability inherent to the power source 33304. Accordingly, in certain embodiments, a separate magnetic component may be provided that allows isolated power transfer from the high voltage battery 33306 to the low voltage battery 33308 (e.g., reference FIGS. 43, and 70).

Figure 73:
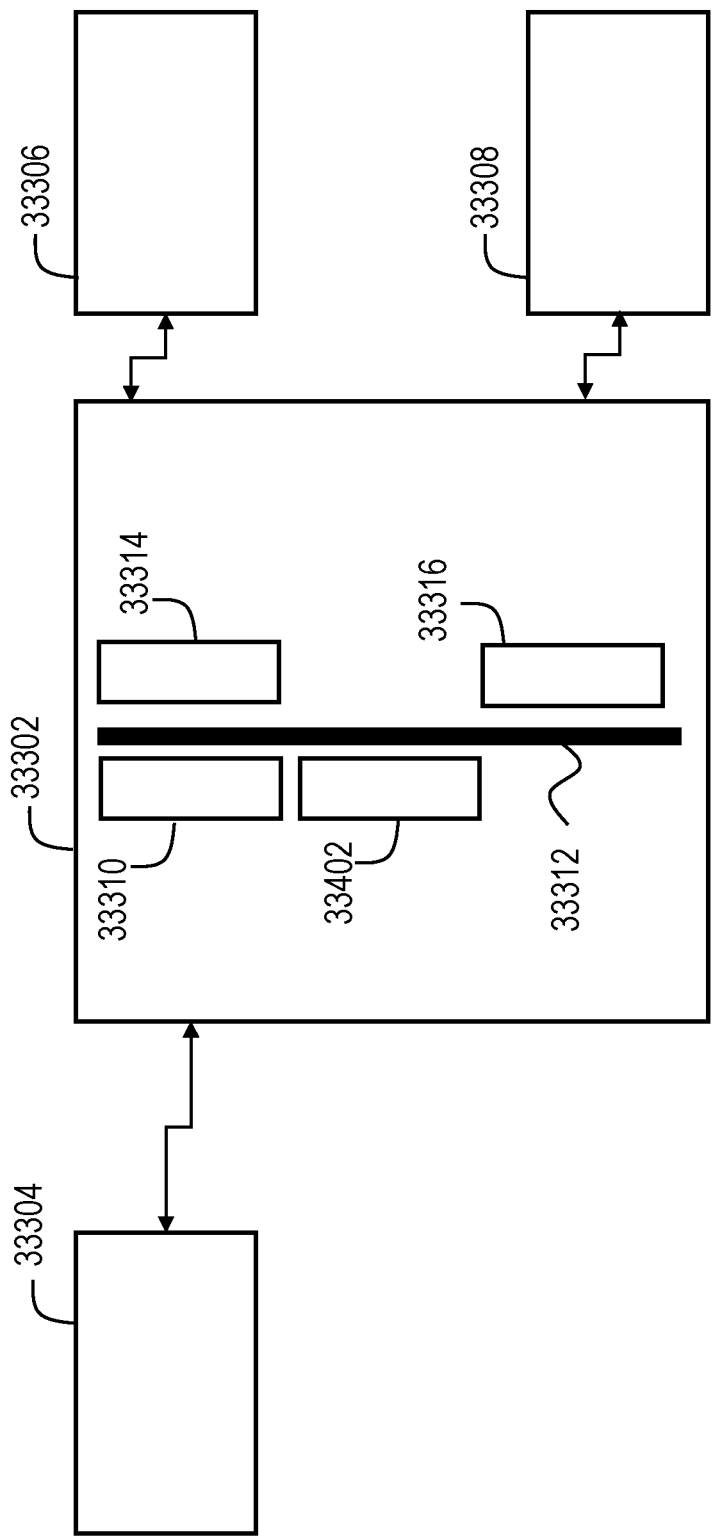
FIG. 73 depicts an embodiment example DC/DC converter assembly.

Referencing FIG. 73, an example DC/DC converter assembly 33302 further includes a fourth winding 33402 positioned on the first side, where the fourth winding 33402 is configured for a second selected power source voltage. For example, the first winding 33310 configuration may be an optimized configuration for a first power source 33304 (e.g., a high capacity charger, a common charging device, etc.) and the second winding 33402 configuration may be an optimized configuration for a second power source 33304. It can be seen that, with two input windings 33310, 33402, the winding configuration of the first winding 33310 may be distinct in the embodiment of FIG. 73 relative to the embodiment of FIG. 72, because the first winding 33310 of FIG. 72 is necessarily a compromised design to accommodate the possibility of multiple power source 33304 voltages, while at least one of the windings 33310, 33402 can be optimized, if desired, for a target power source 33304. In certain embodiments, for example where multiple significantly distinct voltage levels of power sources 33304 may be applicable to a mobile application, both windings 33310, 33402 may be compromise designs to situate best within the available power source 33304 space. In certain embodiments, each winding 33310, 33402 may be configured to support voltage ratings at each end of a range, and/or close to each end of a range, to minimize the net voltage gain across a range of charging devices and/or charging events. For example a first selected power source voltage (e.g., used to configure the first winding 33310) may be a power source voltage corresponding to a maximum current operation for high voltage battery charging with a single phase power component for a designated power rating, and a second selected power source voltage (e.g., used to configure the fourth winding 33402) may be a power source voltage corresponding to a maximum current operation for high voltage battery charging with a three-phase power component for a designated power rating (the second selected power source voltage would be 2×-3× the first power source voltage for power components having a similar power delivery rating in the example).

Figure 74:
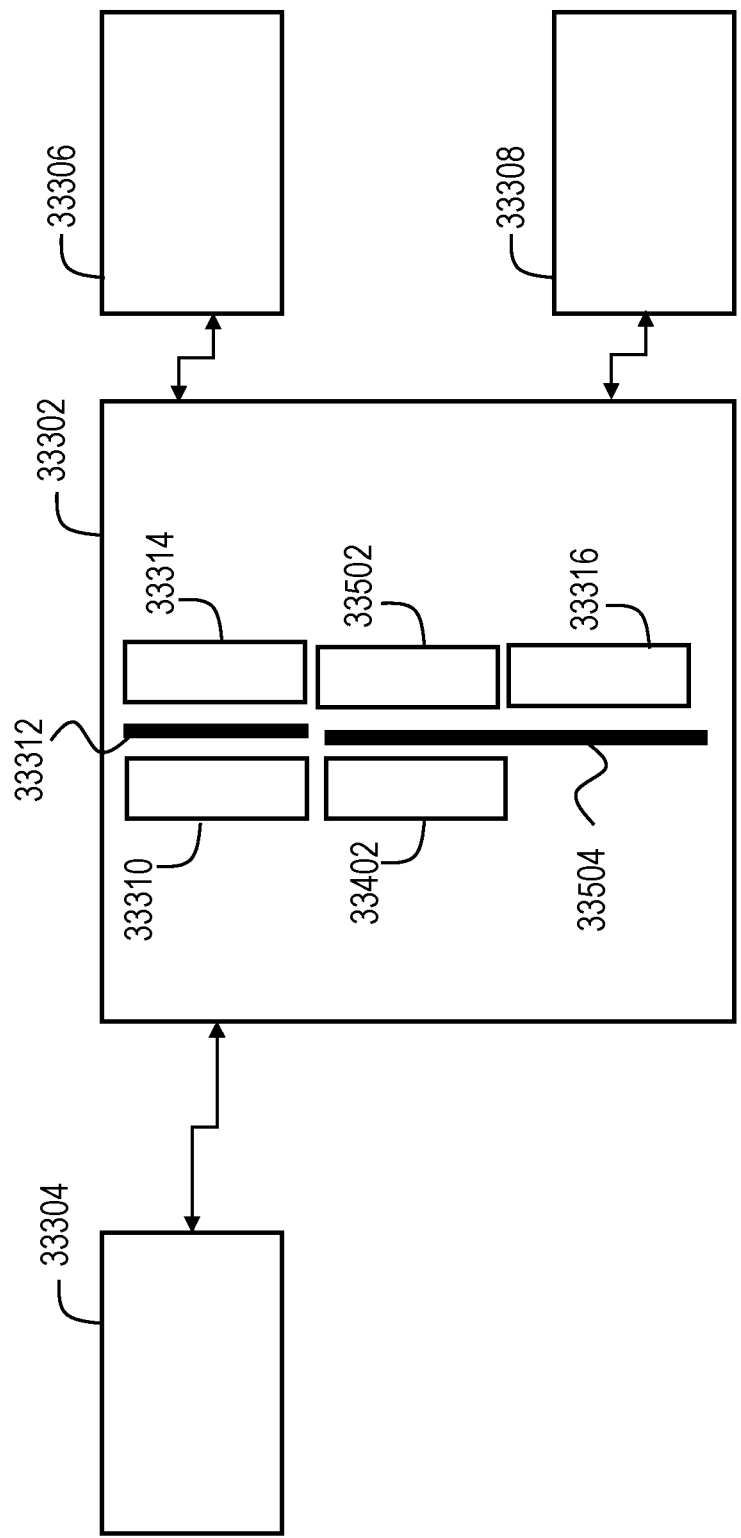
FIG. 74 depicts an embodiment example DC/DC converter assembly.

Referencing FIG. 70, an example DC/DC converter includes a first winding and a fourth winding (e.g., the power source side windings of the first power electronics component 32102 and the second power electronics component 32108 of FIG. 70) having separate magnetic components 32116, and may share a same power transfer rating, or may have distinct power transfer ratings. In another embodiment, referencing FIG. 74, the first winding 33310 and fourth winding 33402 may have separate magnetic components 33312, 33504, where the DC/DC converter would utilize a fifth winding 33502 on the second side coupling the fourth winding 33402 to the high voltage battery 33306. In the example of FIG. 74, the third winding 33316 is depicted as coupled to the magnetics 33504, but could alternately be coupled to the magnetics 33312, or have a dedicated coupling the to high voltage battery 33306 as described previously. In certain embodiments, the example of FIG. 74 allows partial or full charging capability of the high voltage battery 33306 from the power source 33304 through the first winding 33310, depending upon the rating of the first winding 33310 and the power source 33304.

Figure 75:
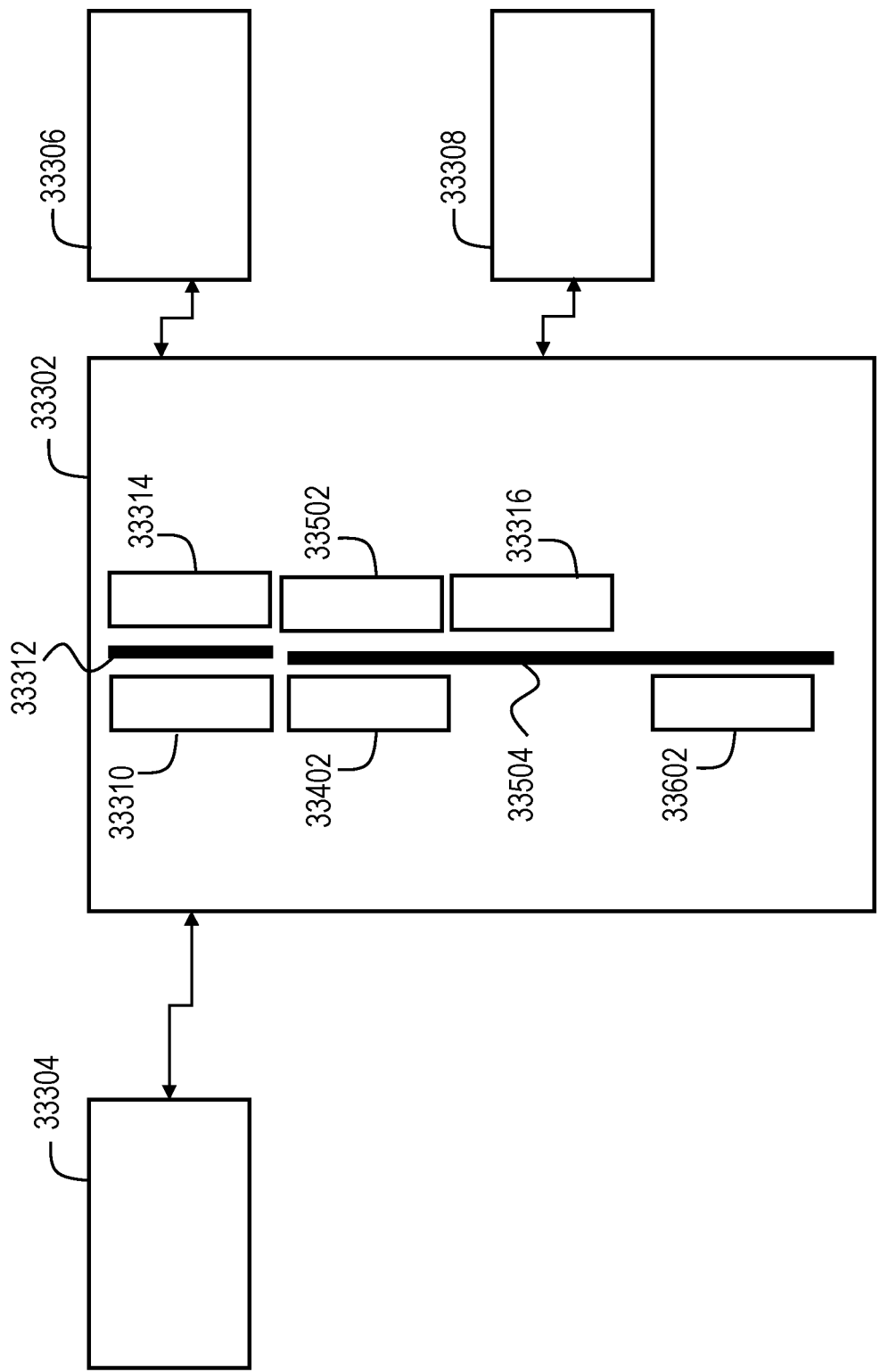
FIG. 75 depicts an embodiment example DC/DC converter assembly.

Referencing FIG. 75, an example DC/DC converter 33302 includes a sixth winding 33602 positioned on the first side, where the sixth winding 33602 is configured for a selected wireless charging source (e.g., the sixth winding 33602 and related components are configured for a wireless charging voltage, and related pickup components are tuned for maximum inductive coupling with a wireless charging device, including location, resonant frequency selection of the pickup, and the like). The sixth winding 33602 is depicted as coupled to the magnetic components 33504, but may be coupled with any of the magnetics in the system, provided with dedicated magnetics, or the like. In the example of FIG. 75, the magnetic components 33504 allow coupling between the wireless charging device and either the low voltage battery 33308 or the high voltage battery 33306.

With reference to any one of FIGS. 73, 74, 75, an example charging circuit (e.g., on a controller—not shown—such as a controller configured to perform switching operations to perform selective coupling functions for power transfers through the DC/DC converter assembly 33302) interprets a high voltage battery charging condition (e.g., which power device 33304 is connected, and/or which charging modes are supported or allowed) and provides charging through a selected one of the first winding 33310 or the fourth winding 33402 in response to the high voltage battery charging condition.

Figure 51:
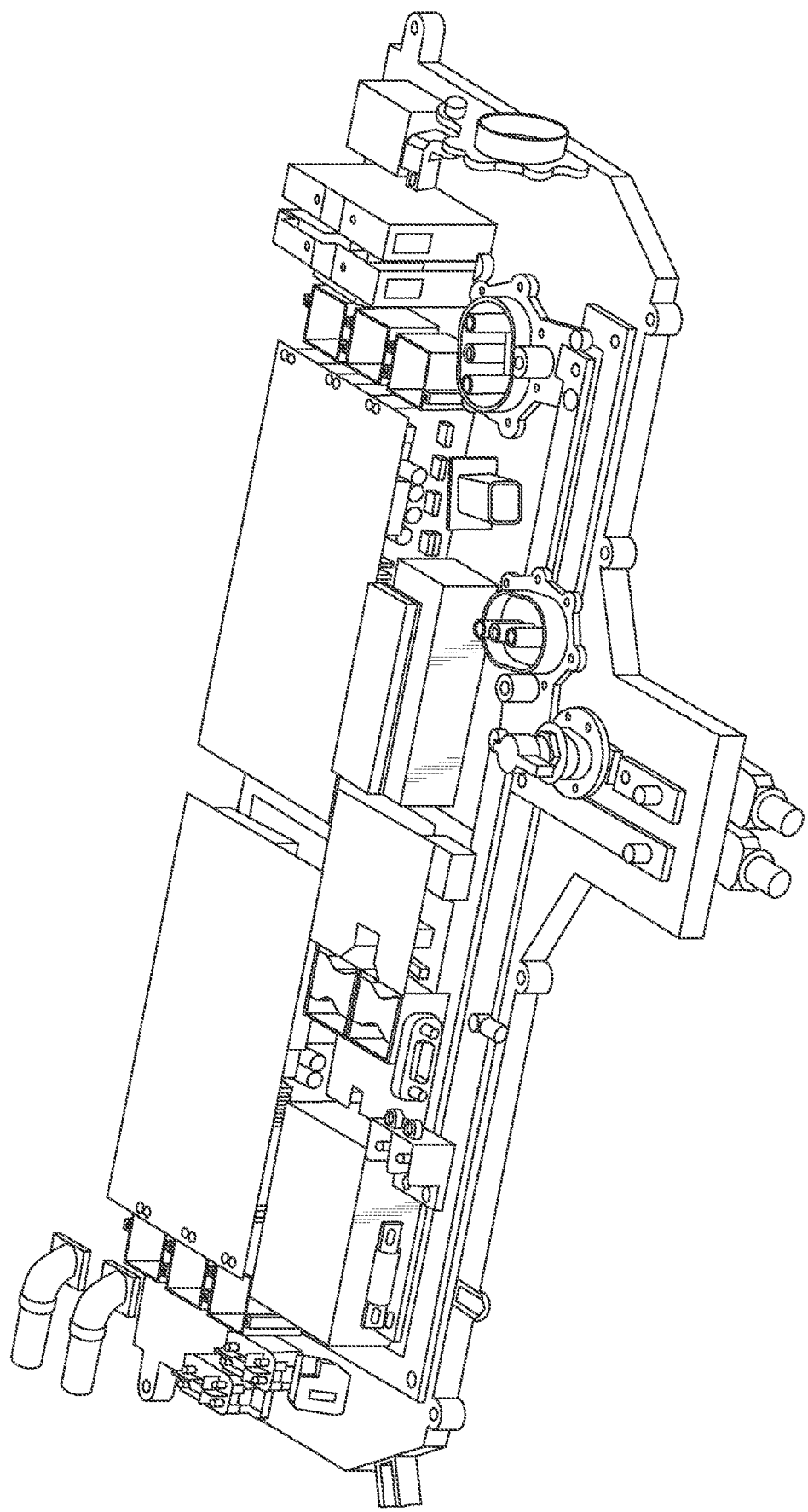
FIG. 51 depicts an embodiment power distribution system isometric view.
Figure 52:
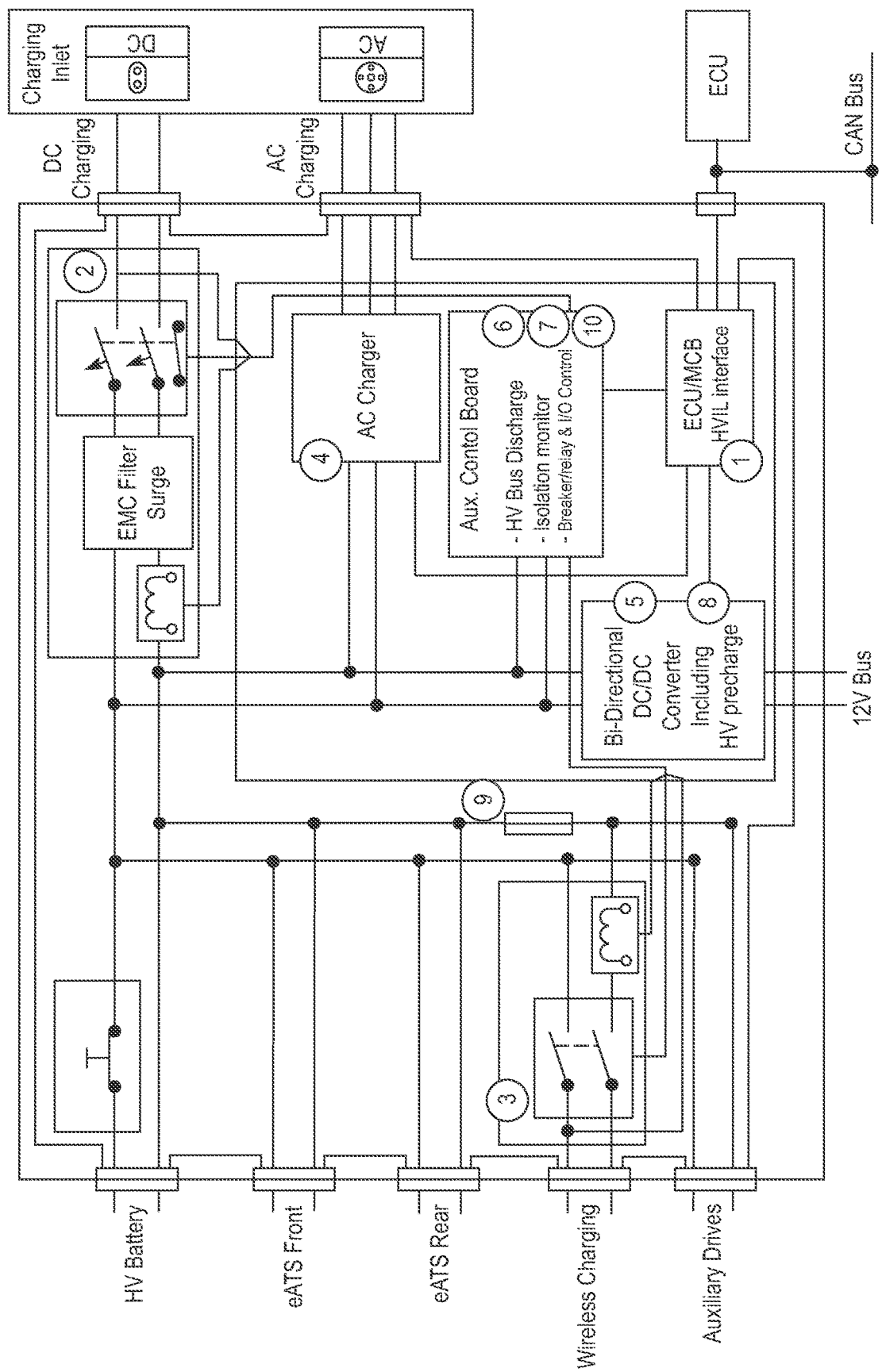
FIG. 52 depicts an embodiment power distribution system functional block diagram.
Figure 53:
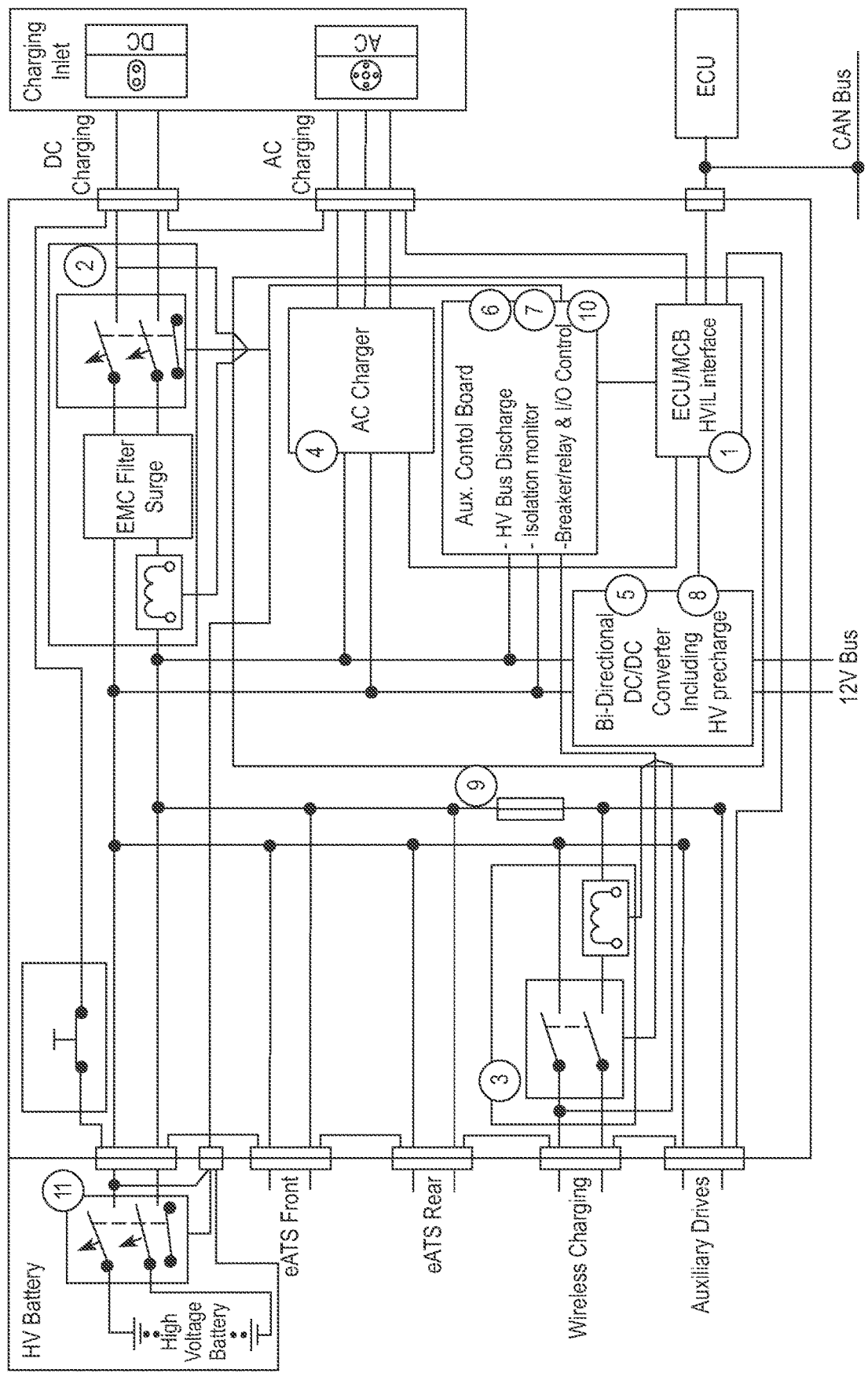
FIG. 53 depicts an embodiment power distribution system functional block diagram.
Figure 54:
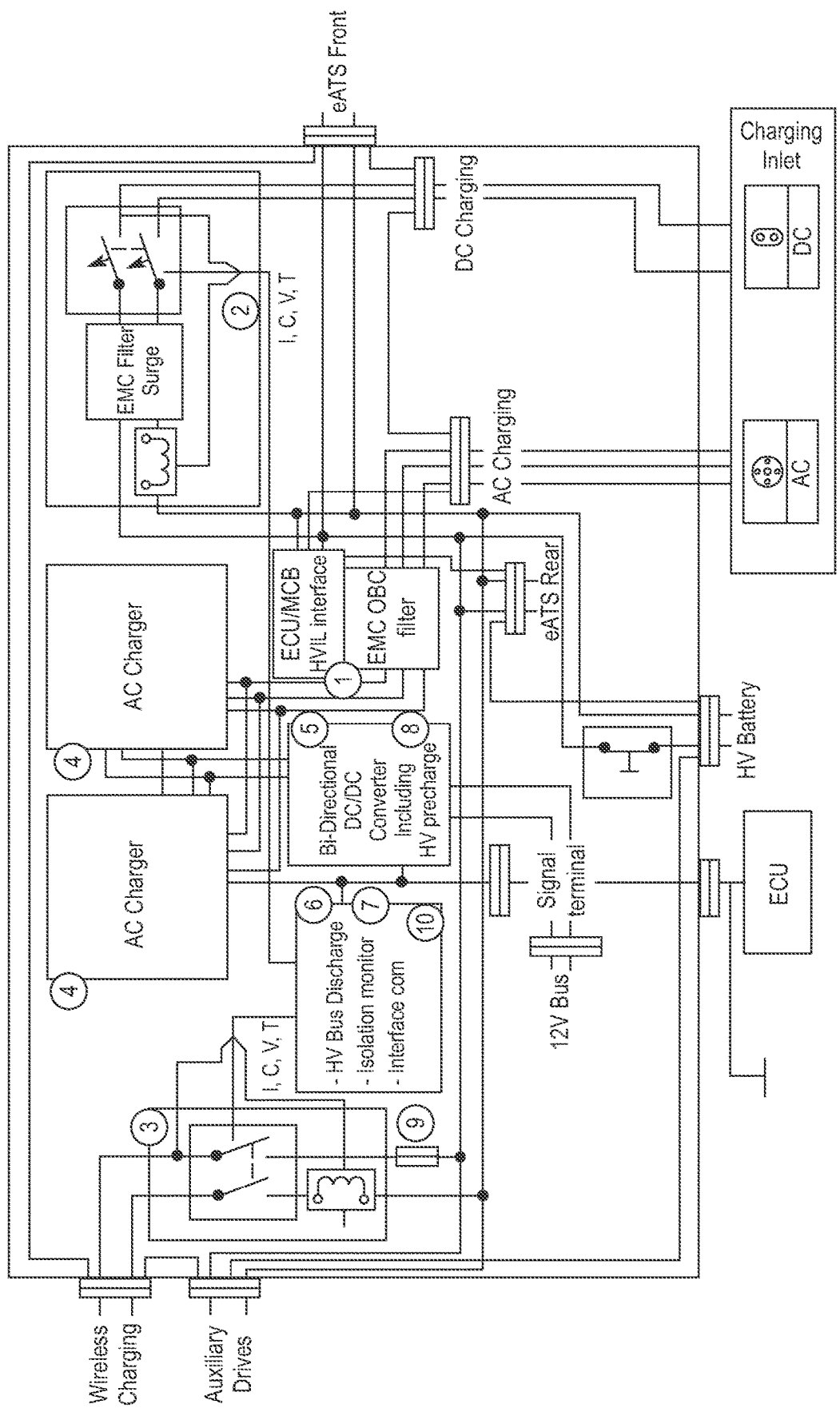
FIG. 54 depicts an embodiment power distribution system functional block diagram.

Referencing FIG. 51, a schematic perspective view of a DC/DC converter assembly having a number of features and aspects set forth in the present disclosure. The example assembly provides capability to connect to an 11 kW charging device for charging a high voltage battery pack, and provides for 3.7 kW of charging to the low voltage battery. The example DC/DC converter assembly includes breaker/relay circuit protection to provide for controlled power circuit protection response, combined with a physical response, for example if opening controls and/or a current sensor fail to operate properly. The example DC/DC converter assembly provide for compact packaging, and a low number of interfaces. Referencing FIG. 52, a simplified block diagram view of a DC/DC converter assembly is depicted having a number of features and aspects set forth in the present disclosure, and generally consistent with the embodiment depicted in FIG. 51. Referencing FIG. 53, a simplified block diagram view of a DC/DC converter assembly is depicted having a number of features and aspects set forth in the present disclosure. Relative to the embodiment depicted in FIG. 52, the embodiment of FIG. 53 includes breaker/relay circuit protection for the high voltage battery, and the service disconnect has been moved to a high voltage interlock loop to reduce personnel exposure to potential live connections. FIG. 54 provides a simplified view of certain sub-assemblies consistent with the embodiment depicted in FIG. 52.

Figure 55:
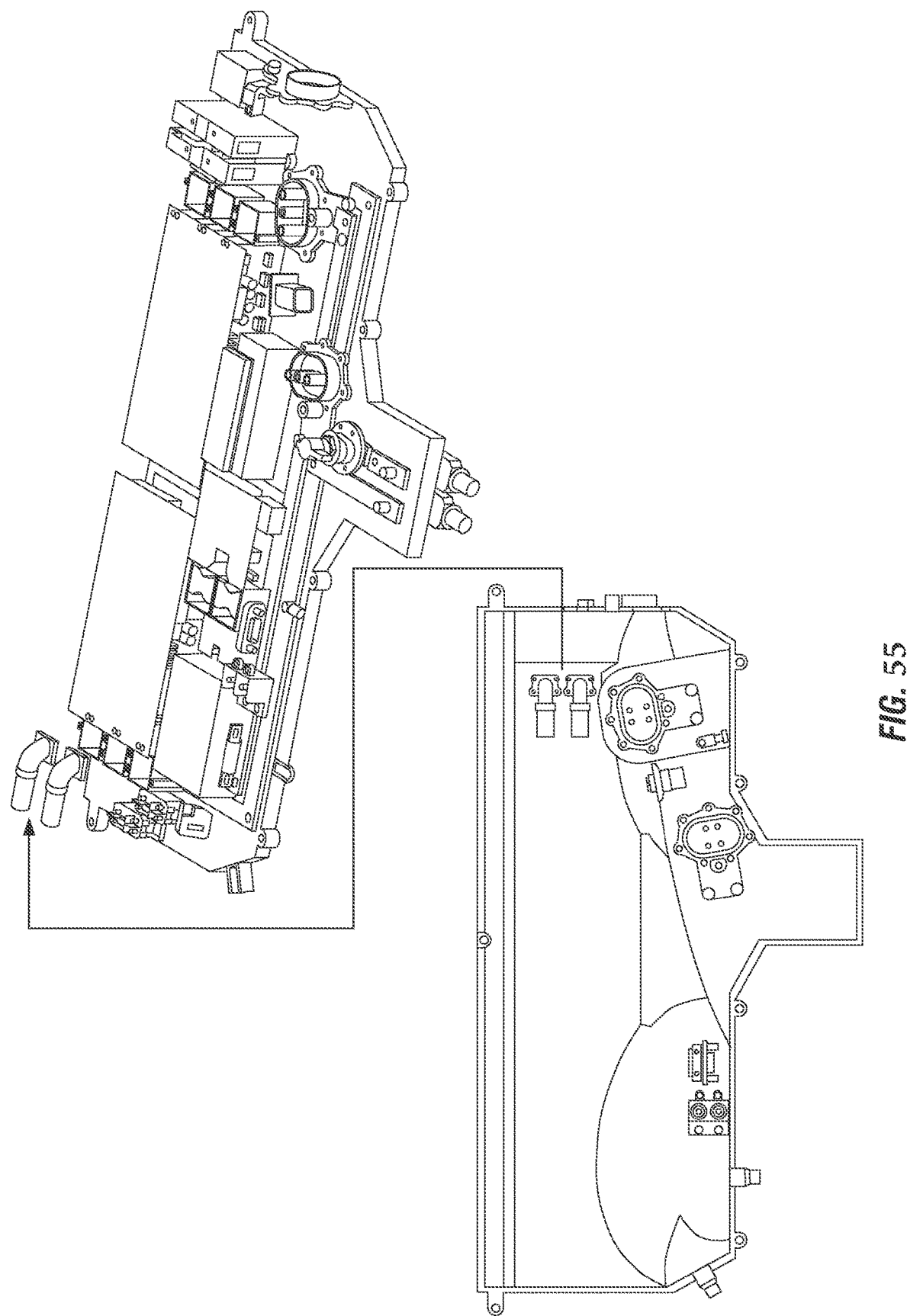
FIG. 55 depicts an embodiment power distribution system isometric view with connector positions.
Figure 56:
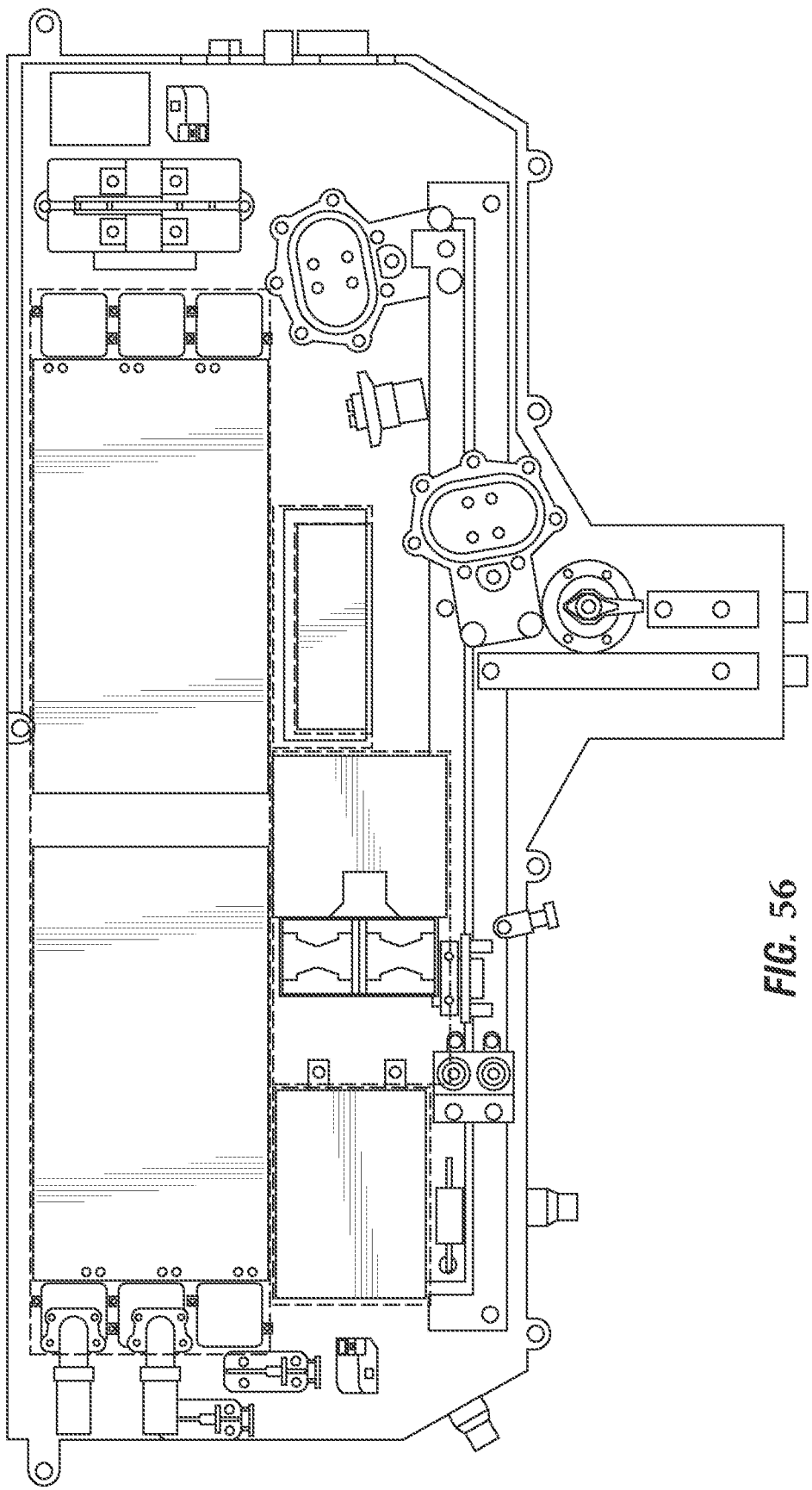
FIG. 56 depicts an embodiment power distribution system layout.
Figure 57:
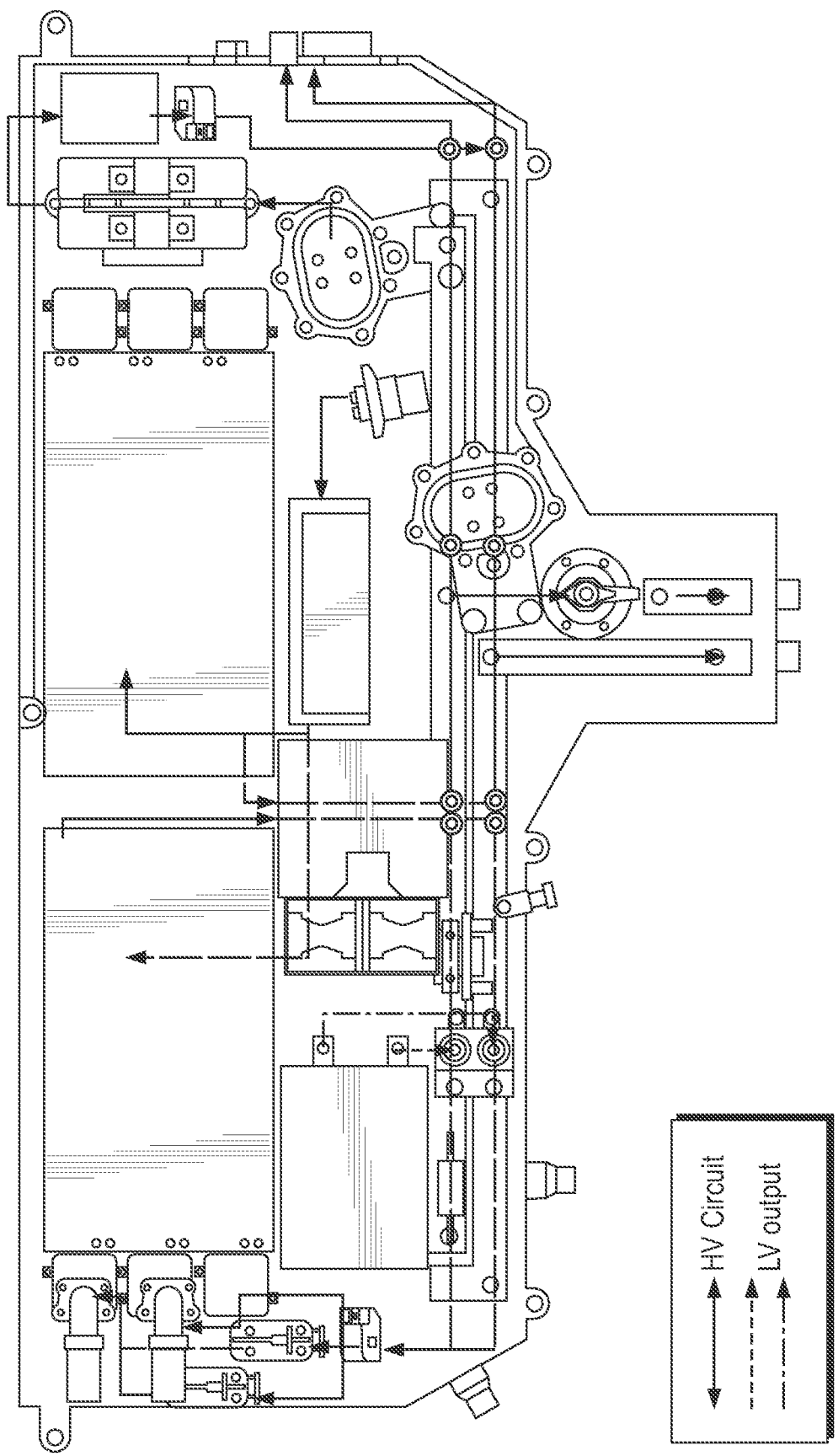
FIG. 57 depicts an embodiment power distribution system layout with power circuit indications.
Figure 58:
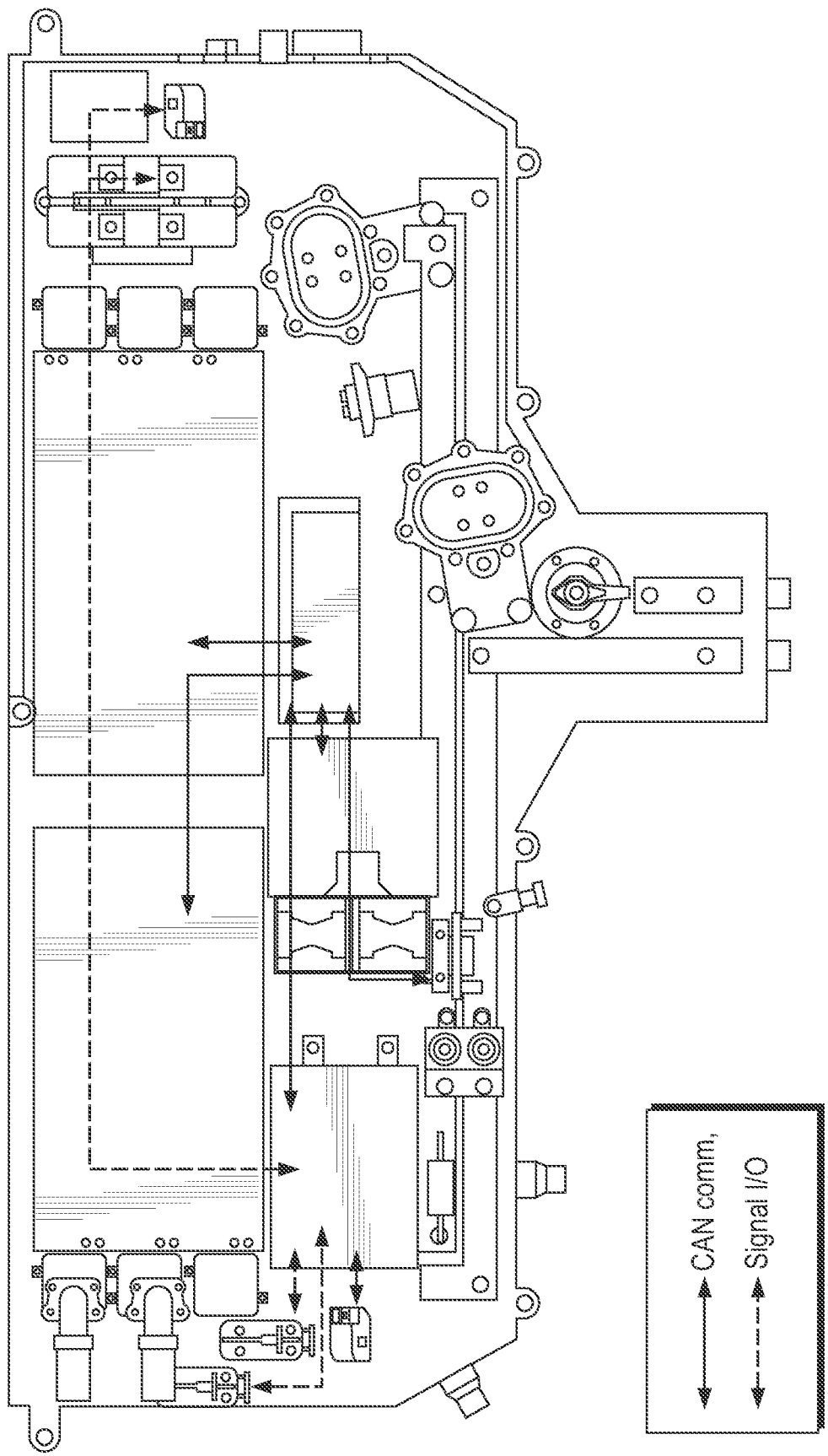
FIG. 58 depicts an embodiment power distribution system layout with power circuit indications.
Figure 59:
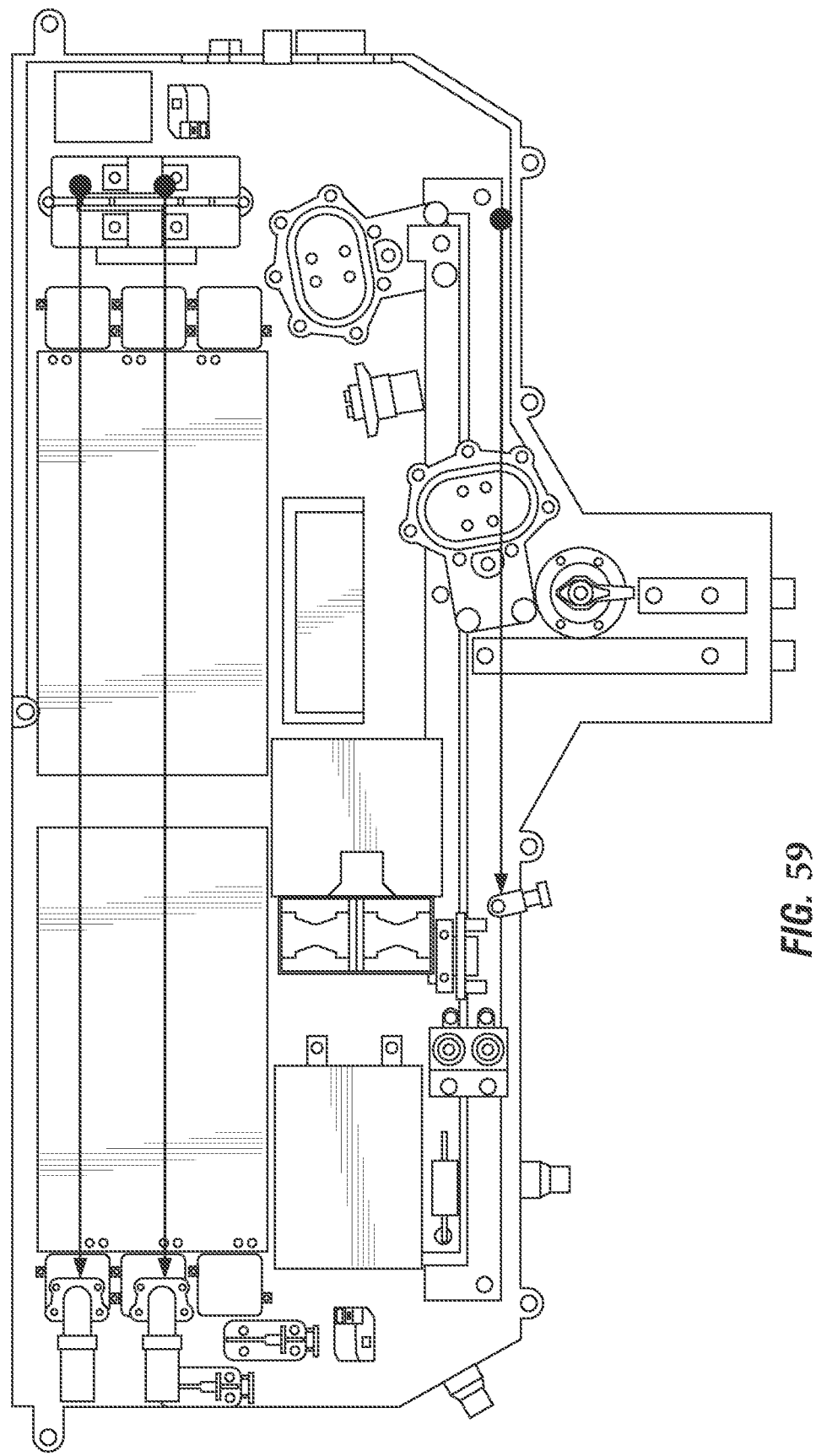
FIG. 59 depicts an embodiment power distribution system layout with power circuit indications.
Figure 60:
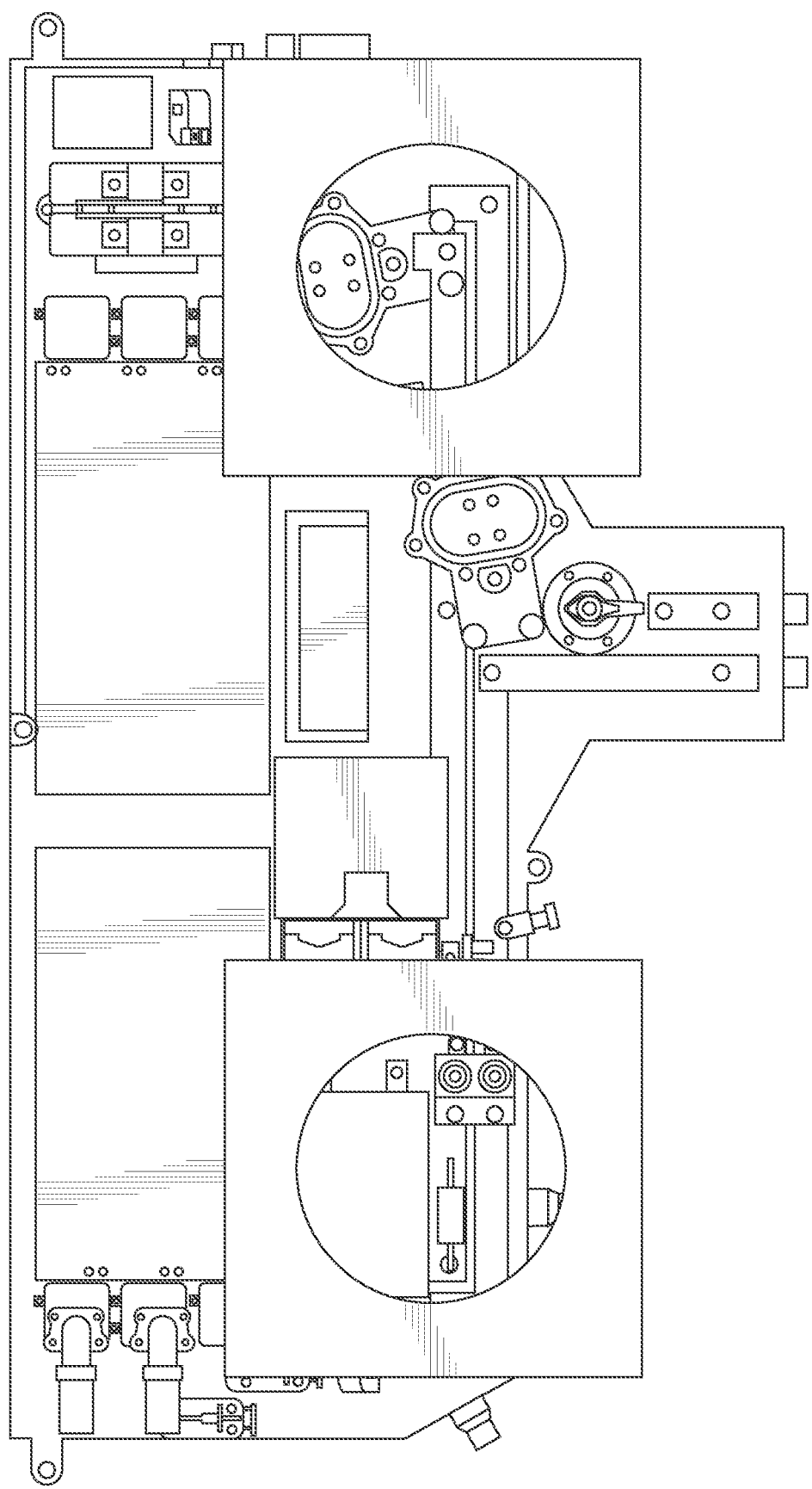
FIG. 60 depicts an embodiment power distribution system layout with housing and service flaps.

FIG. 55 provides a perspective view and a simplified top view of a DC/DC converter assembly having a number of features and aspects set forth in the present disclosure. FIG. 56 is a top view showing the layout of certain components of the DC/DC converter, consistent with the embodiment depicted in FIG. 55. FIG. 57 is a top view showing aspects of the power flow through a DC/DC converter assembly consistent with the embodiments depicted in FIGS. 55 and 56. FIG. 58 is a top view showing the communication pathing for certain control signals of the DC/DC converter, consistent with the embodiment depicted in FIG. 58. FIG. 59 is a simplified top view of the DC/DC converter, consistent with the embodiment depicted in FIGS. 55-58, and showing optional positions for some of the terminals for certain embodiments. FIG. 60 depicts an example service configuration of a DC/DC converter consistent with the embodiment depicted in FIGS. 55-58.

Figure 61:
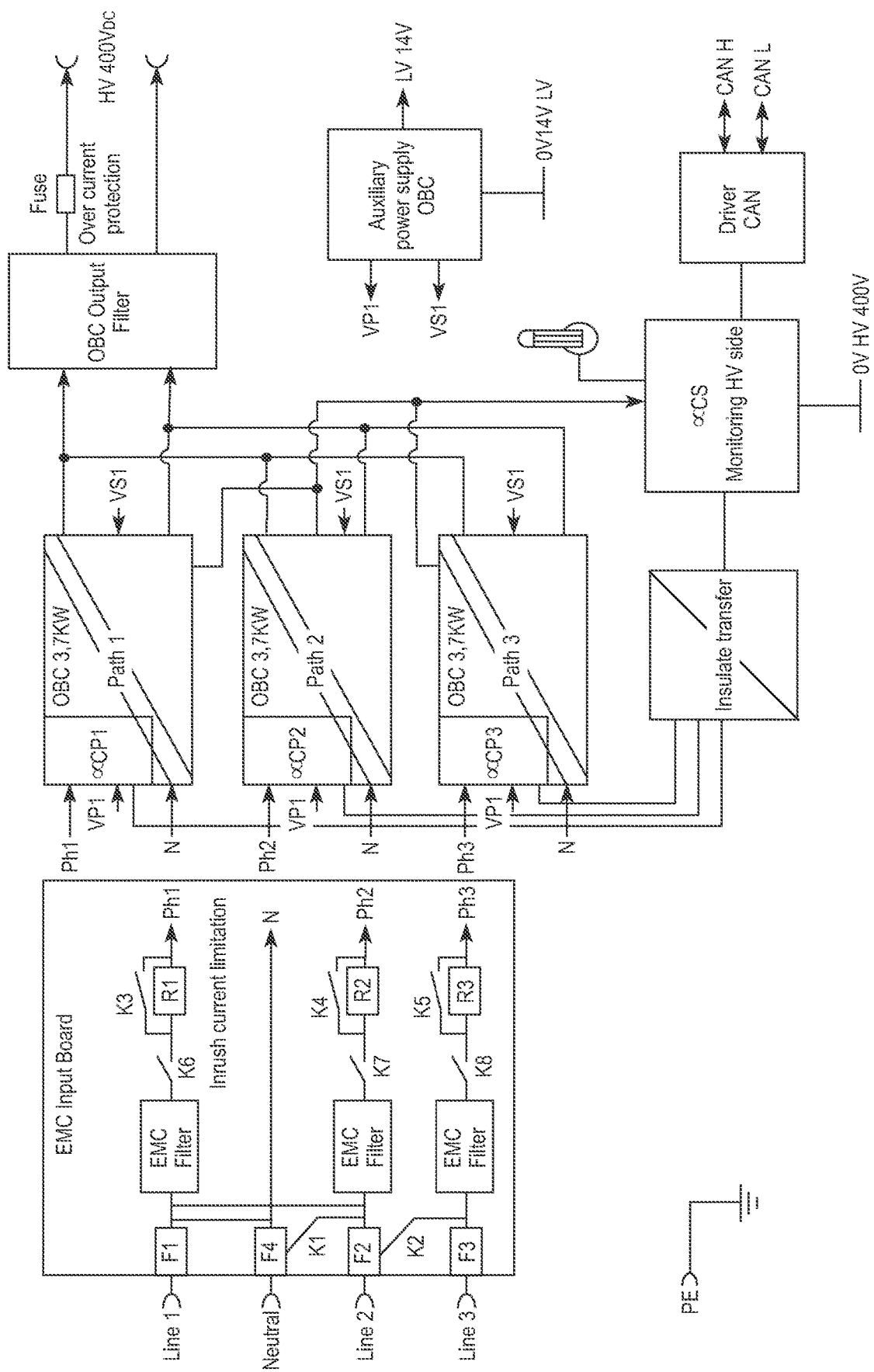
FIG. 61 depicts an embodiment on-board charger functional diagram.
Figure 62:
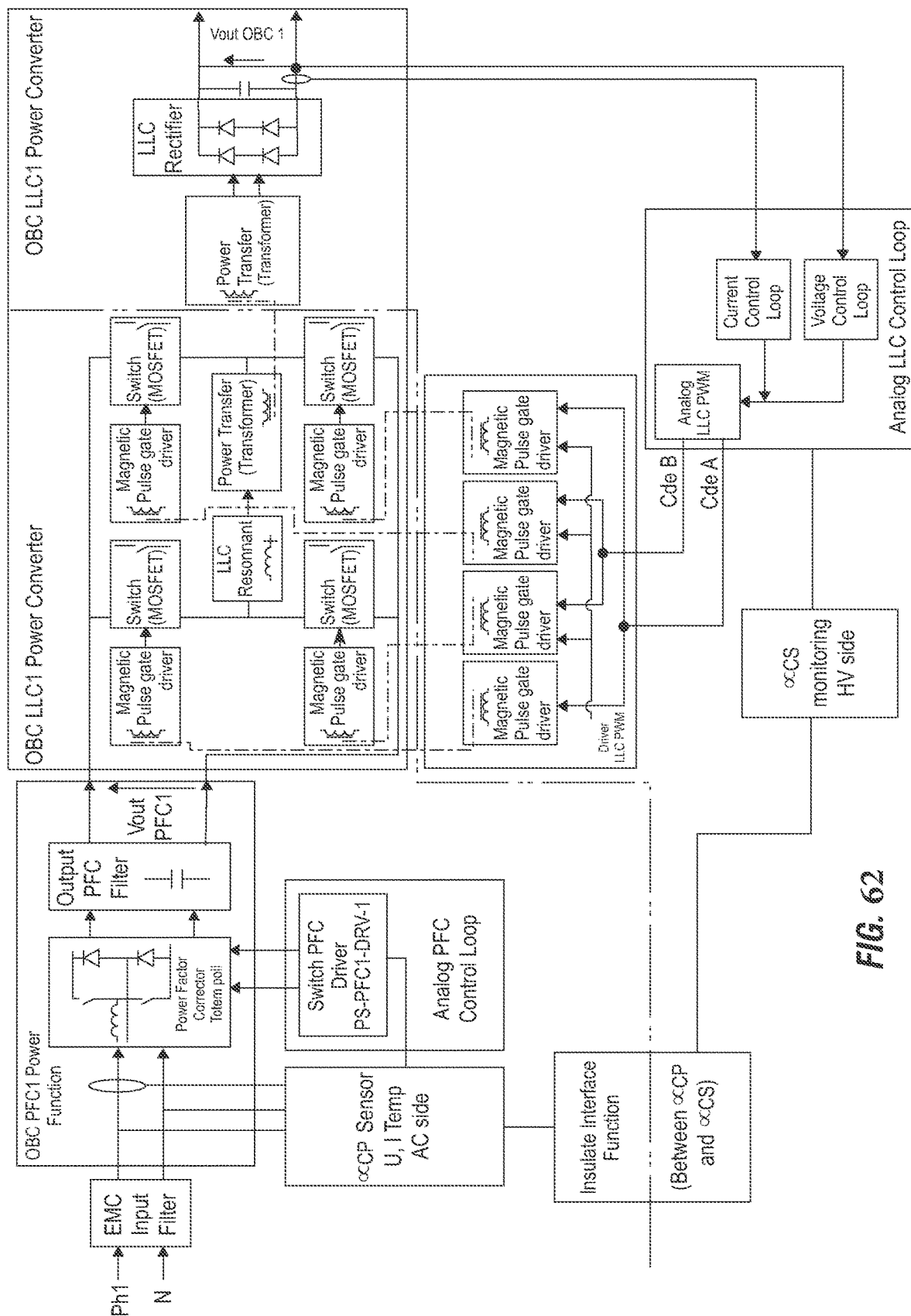
FIG. 62 depicts an embodiment on-board charger functional diagram.
Figure 63:
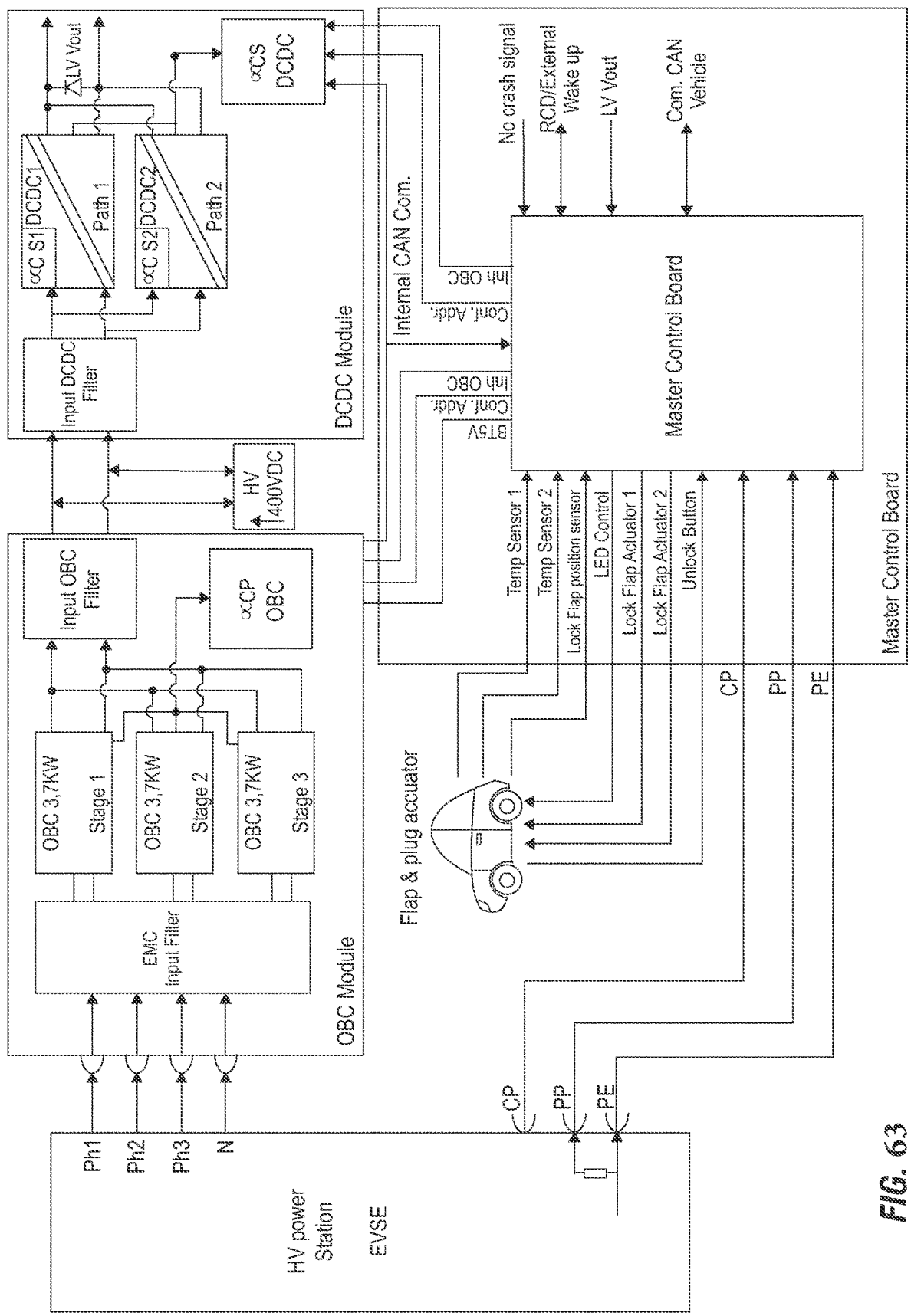
FIG. 63 depicts an embodiment on-board charger functional diagram.
Figure 64:
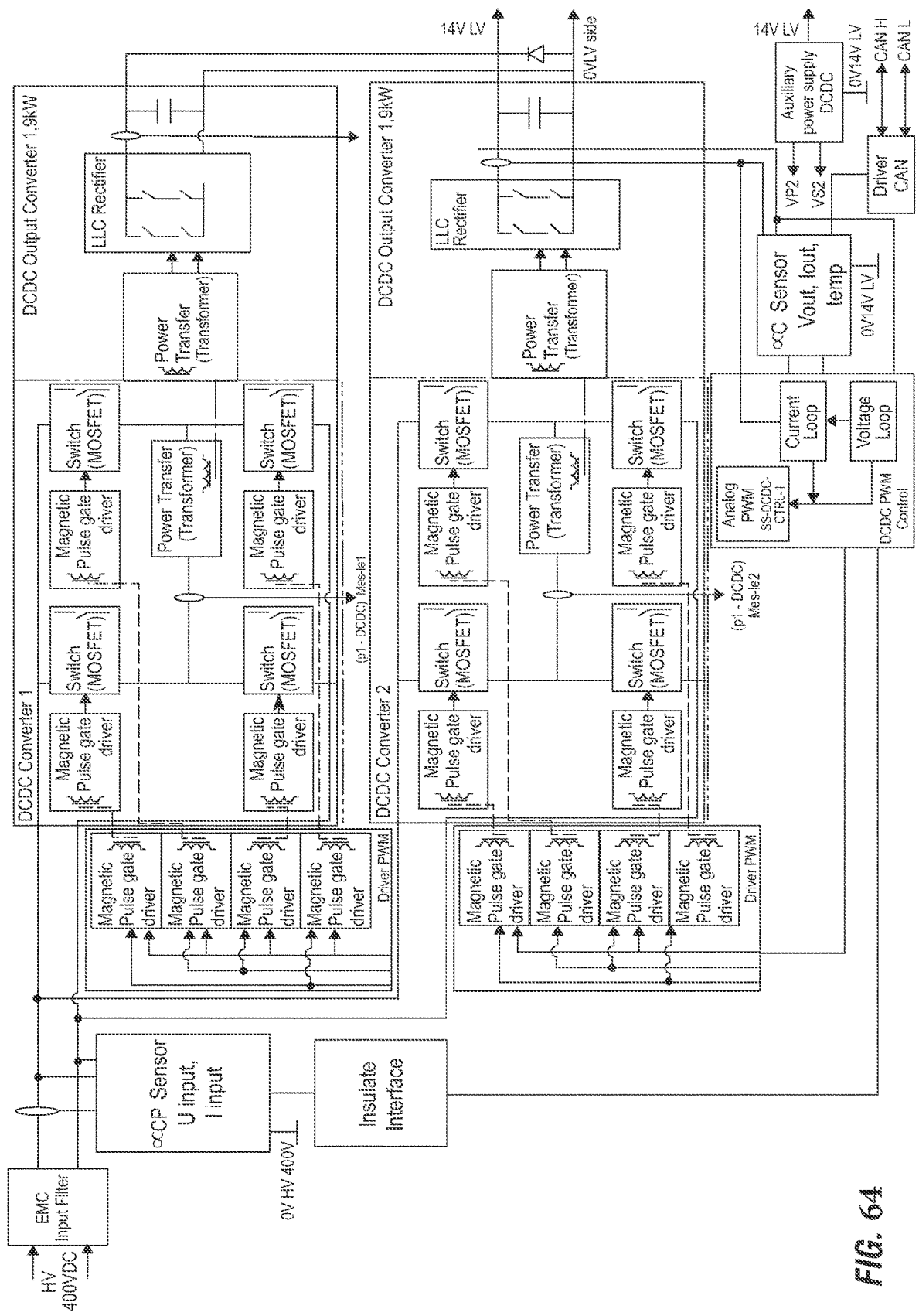
FIG. 64 depicts an embodiment DC converter functional diagram.
Figure 65:
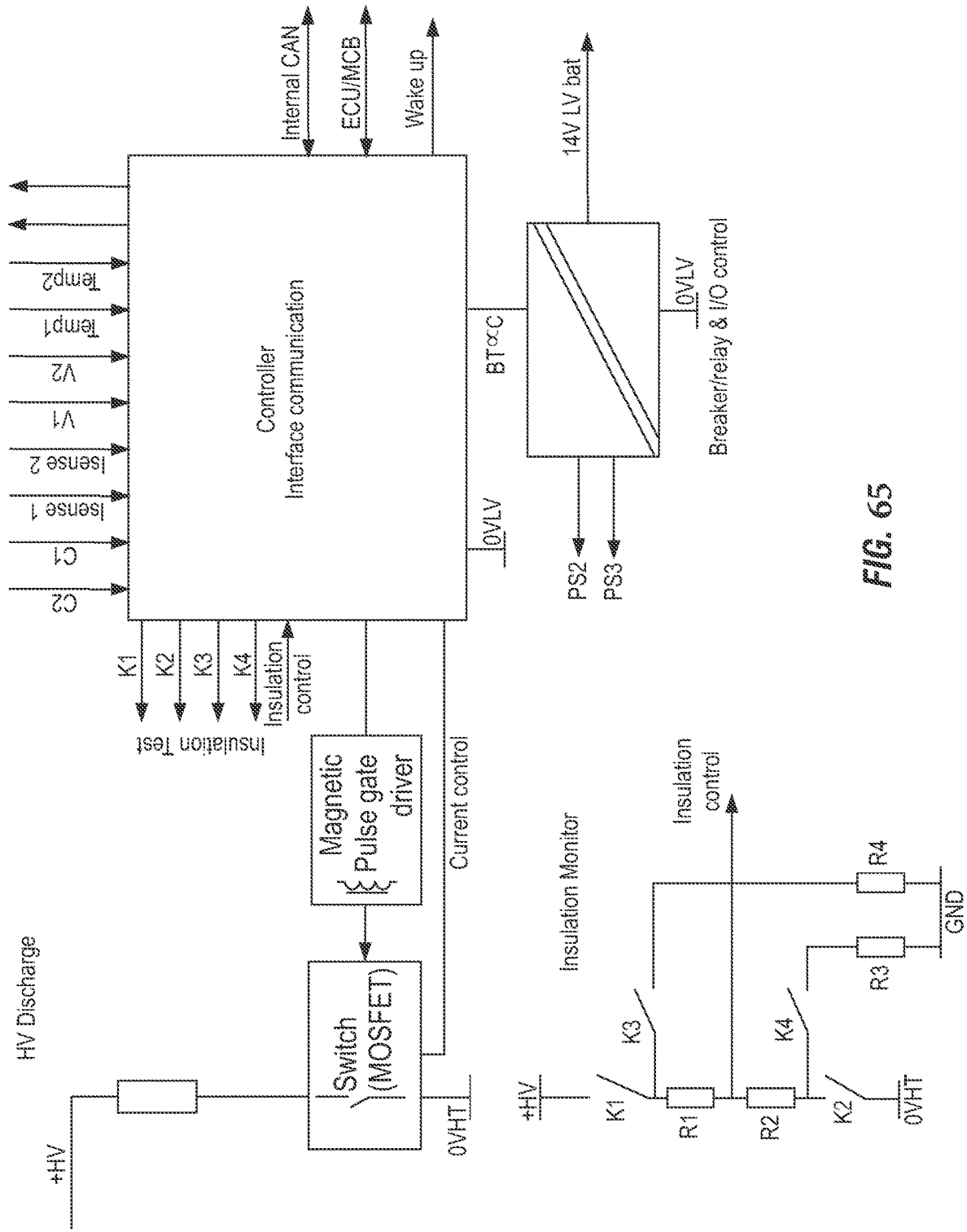
FIG. 65 depicts an embodiment auxiliary board functional diagram.
Figure 66:
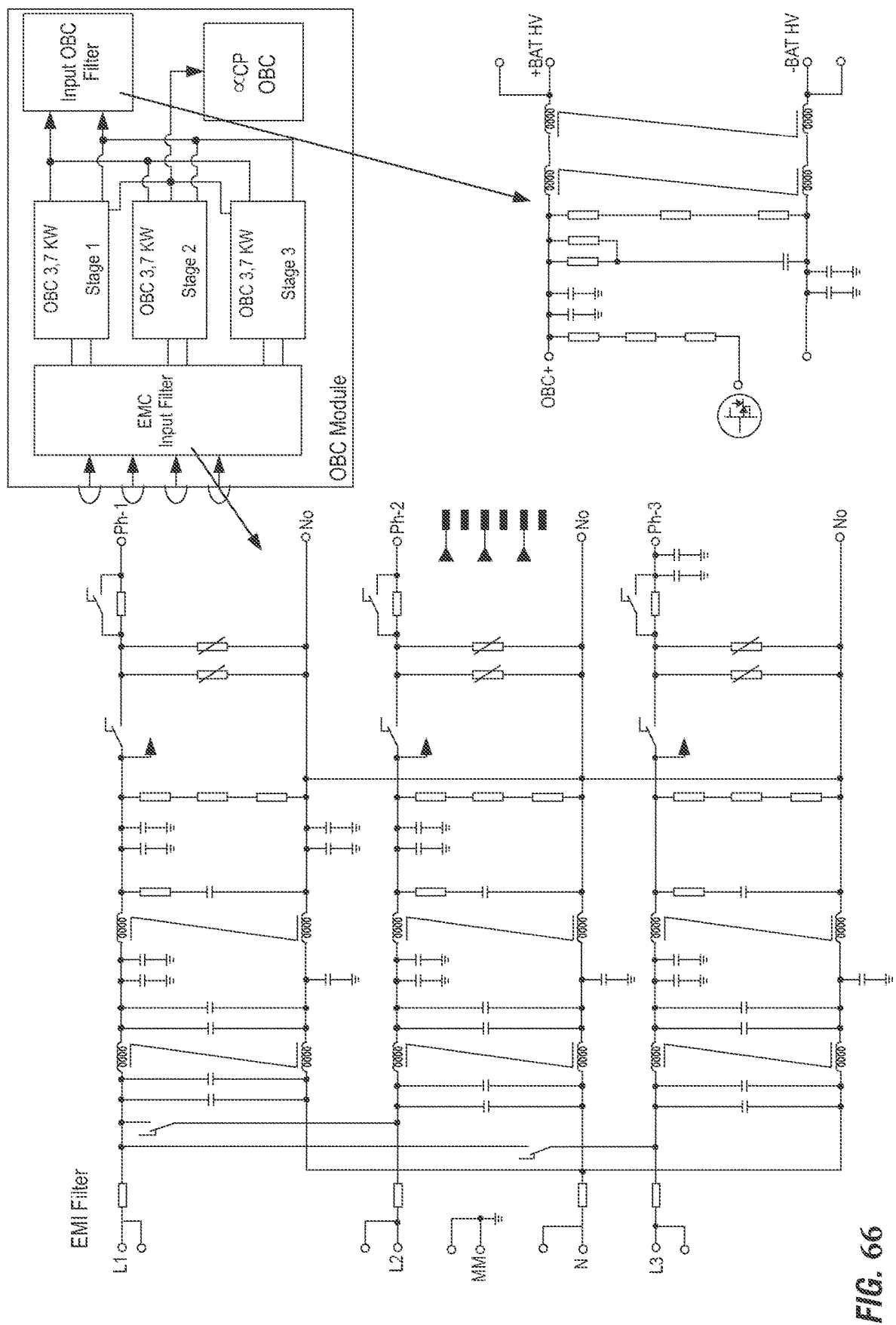
FIG. 66 depicts an embodiment EMI configuration.
Figure 67:
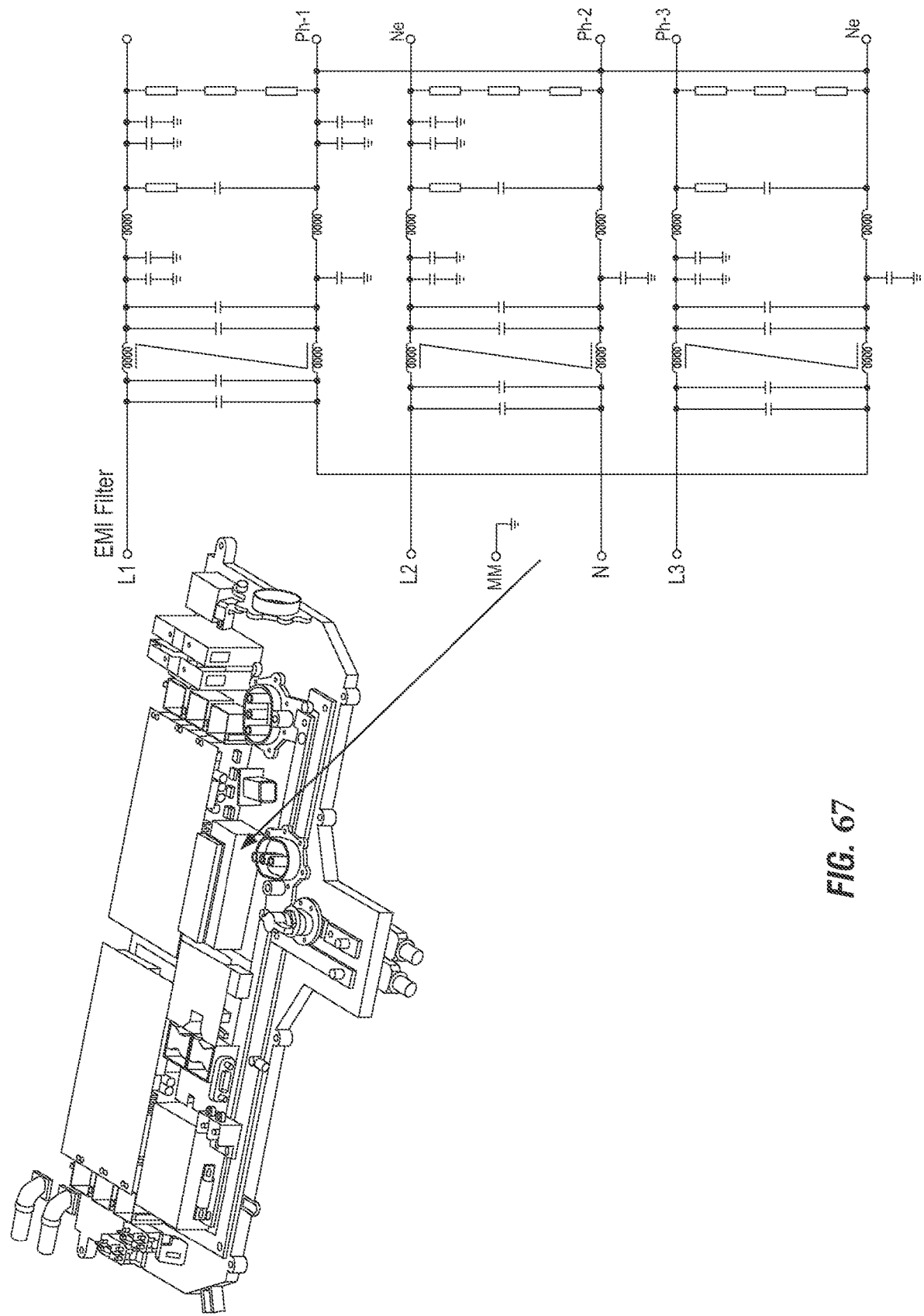
FIG. 67 depicts an embodiment EMI configuration.
Figure 68:
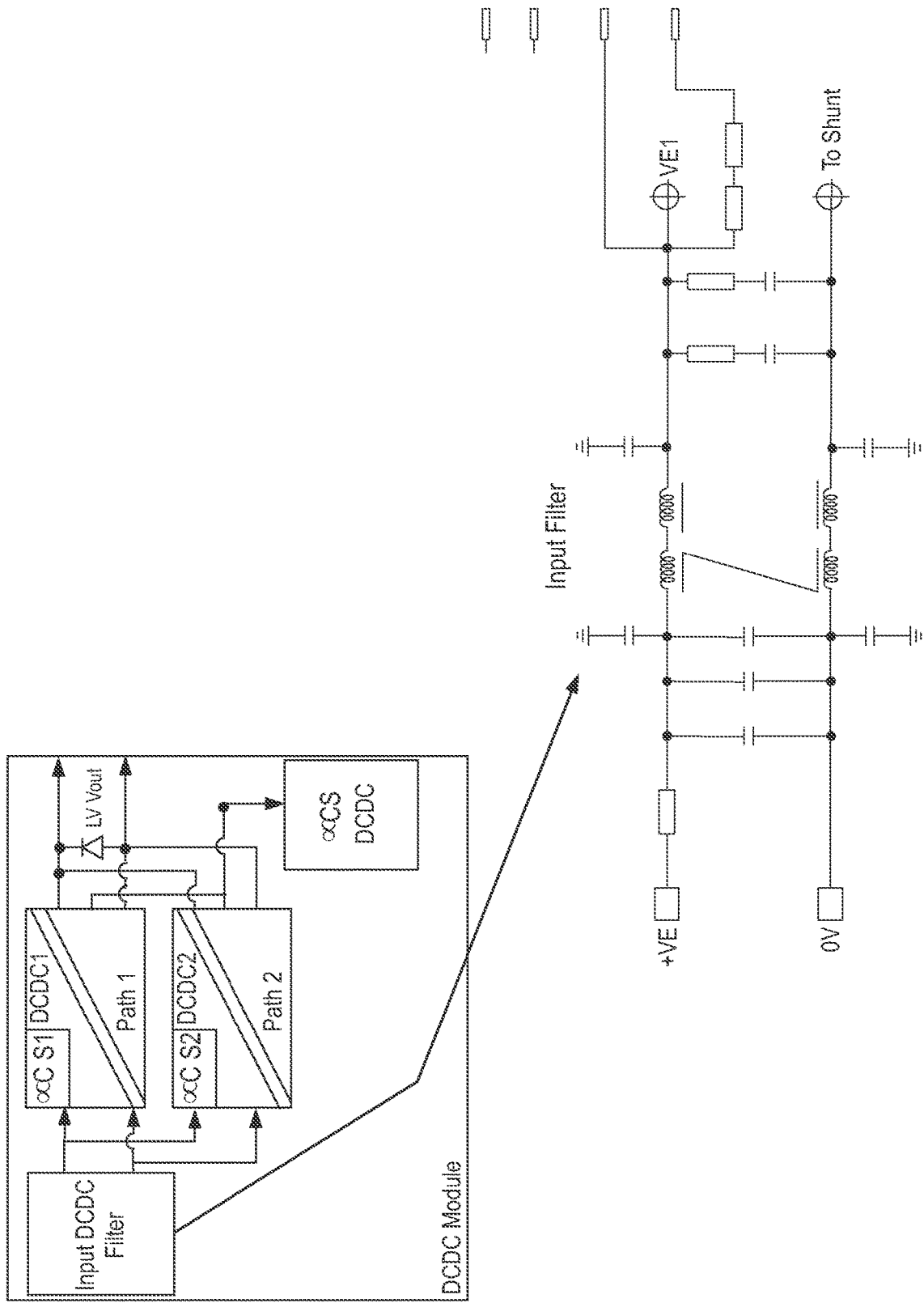
FIG. 68 depicts an embodiment EMI configuration.
Figure 69:
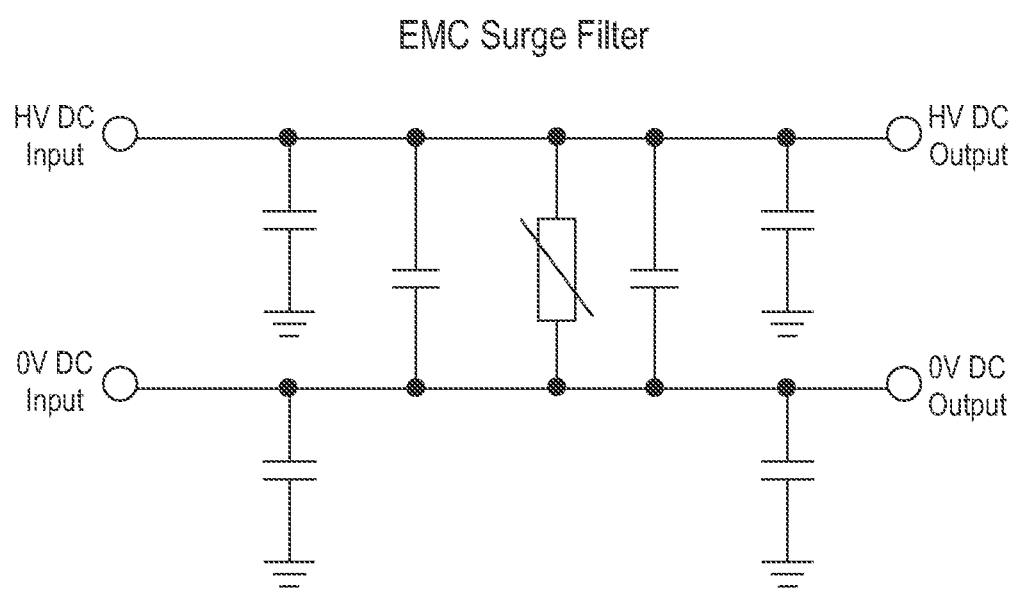
FIG. 69 depicts an embodiment surge filter circuit.

FIG. 61 depicts a schematic block diagram of a modular on-board charger consistent with aspects of the present disclosure. FIG. 62 depicts a schematic block diagram of a modular on-board charger consistent with aspects of the present disclosure. FIG. 63 depicts communication flow-paths of an example modular on-board charger consistent with aspects of the present disclosure. FIG. 64 is a schematic block diagram of a DC converter consistent with aspects of the present disclosure. FIG. 65 depicts an auxiliary control board for a DC/DC converter with aspects of the present disclosure. FIG. 66 is a schematic circuit depiction of a DC converter assembly consistent with aspects of the present disclosure. FIG. 67 depicts a perspective view and a portion of a schematic circuit depiction of a DC/DC converter consistent with aspects of the present disclosure. FIG. 68 depicts a schematic block diagram of a DC converter element and a schematic circuit depiction consistent with aspects of the present disclosure. FIG. 69 is a schematic circuit depiction of an EMC surge filter consistent with DC converter elements of the present disclosure.

Figure 76:
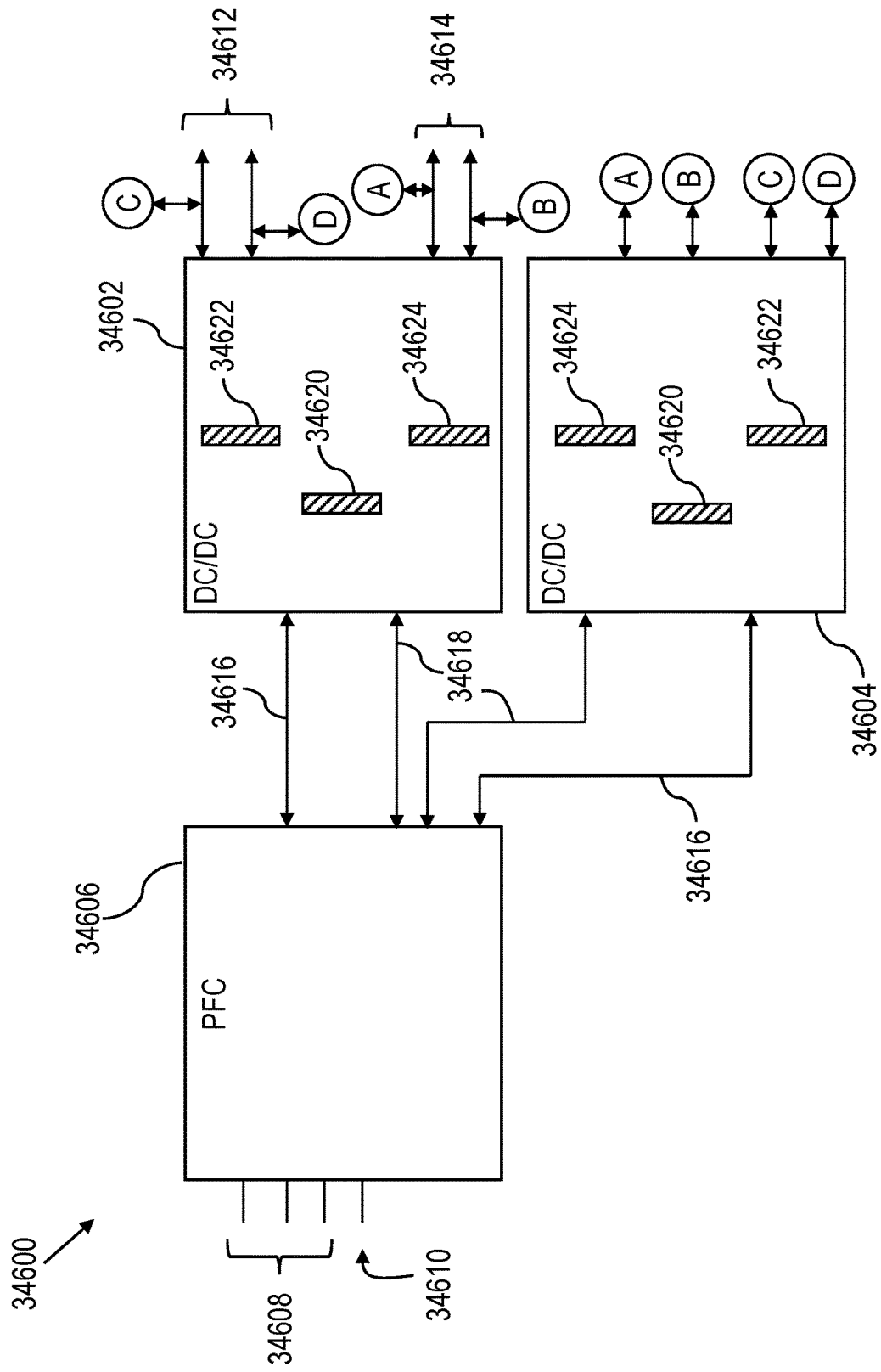
FIG. 76 depicts an example DC/DC converter assembly having DC/DC converter elements with shared magnetics.

Referencing FIG. 76, an example system includes on-board charging and DC/DC conversion components for an electric mobile application (e.g., such as depicted in FIG. 2).

The example DC/DC converter assembly 34600 includes an AC charging circuit 34606 having components therein capable to convert AC power to DC power (e.g., to charge a high voltage battery and/or low voltage battery of the electric mobile application, and/or to power a load on the electric mobile application), and/or to convert DC power to AC power (e.g., to power an AC device electrically coupled to the electric mobile application, and/or to provide power to an external device such as a power grid). The example DC/DC converter assembly 34600 include a first DC charging circuit 34602 that is selectively couplable to a high voltage battery (e.g., interface 34612) and/or to a low voltage battery (e.g., interface 34614). The example of FIG. 76 includes two interfaces 34612, 34614 to DC power devices on the electric mobile application, but a given embodiment may include any number of interfaces 34612, 34614, or a single interface, e.g. to the high voltage battery. The example DC/DC converter assembly 34600 further includes an optional second DC charging circuit 34604 that is selectively couplable to the high voltage battery and/or low voltage battery. In the example of FIG. 76, the DC charging circuits 34602, 34604 have common coupling to the interfaces 34612, 34614. It will be understood that the DC charging circuits 34602, 34604 may have separate connections to interfaces 34612, 34614, switched connections to interfaces (not shown), and can be connected to distinct devices at a given time or operating condition, whether utilizing shared interfaces 34612, 34614 or separate interfaces.

The DC charging circuits 34602, 34604 include inductive coupling arrangements, each having a first winding 34620 that is selectively couplable to either a second winding 34622 providing a first inductive coupling arrangement or to a third winding 34624 providing a second inductive coupling arrangement. In the example of FIG. 76, each inductive coupling arrangement utilizes a shared magnetic component (not shown, but see FIGS. 78, 79). The utilization of a shared magnetic component reduces the cost and footprint (e.g., size, weight, number of components and/or failure points, and/or integration cost reductions) of the DC/DC converter assembly 34600, and provides for improved power transfer efficiency of the DC/DC converter assembly 34600, for example with the second winding 34622 having an optimized or improved sizing for a first voltage value (e.g., for the high voltage battery voltage), and the third winding 34622 having an optimized or improved sizing for a second voltage value (e.g., for the low voltage battery voltage). The description herein enumerating windings (e.g., first winding, second winding, etc.) is utilized for reference, and is not limiting to the present description. For example, the windings of the second DC/DC charging circuit 34604 may be referenced as a first winding 34620, second winding 34622, and third winding 34624 (e.g., for description referencing common aspects between the circuits 34602, 34604), or as a fourth winding 34620, fifth winding 34622, and sixth winding 34624 (e.g., for description referencing distinct aspects between the circuits 34602, 34604). The examples are non-limiting illustrations, and any winding nomenclature and/or enumeration scheme is contemplated herein. The example of FIG. 76 depicts two windings on the battery side of the DC charging circuits 34602, 34604, and a single winding on the AC charging circuit 34606 side of the DC charging circuits 34602, 34604, but a given DC charging circuit 34602, 34604 may have any number of windings in any selectably couplable arrangement, and may include all windings, a subset of the windings, and/or subgroups of the windings sharing magnetic components.

The example of FIG. 76 includes the AC charging circuit 34606 couplable to a charging station at interface 34608 (e.g., depicting a 3-phase connection in the example), which may further include a neutral 34610. The embodiments described herein are capable to operate with a neutral 34610, or with the neutral 34610 omitted or not coupled. In certain embodiments, the interface 34608 may include a different number of phases, such as a single phase, and/or the AC charging circuit 34606 may be configured to determine a number of phases present, and to configure rectification and/or inverter operations accordingly. The example of FIG. 76 depicts connections 34616, 34618 between the DC charging circuits 34602, 34604 and the AC charging circuit 34606, with a first logical set of the connections 34618 (e.g., high side or low side) positioned inside of a second logical set of the connections 34616 (e.g., low side or high side). The depicted arrangement is non-limiting, and may provide certain advantages such as ease of switching operations of the AC charging circuit 34606 to perform certain operations herein, reduction in wiring complexity, and/or reduction in wiring path lengths. It will be noted that the arrangement of FIG. 76 includes the DC charging circuits 34602, 34604 having certain differences (e.g., compare the arrangement of windings 34622, 34624), and in certain embodiments, the DC charging circuits 34602, 34604 may have a same configuration, with associated wiring configuration changes for the interfaces 34612, 34614, 34616, 34618, for example to promote commonality of parts between the DC charging circuits 34602, 34604. Aspects set forth herein as "wiring" are understood to include any electrical coupling arrangements, including wires, board traces, connected elements on a printed circuit board, and/or any other electrical coupling arrangements. Components herein (e.g., resistors, switches, etc.) may be analog components, solid state components, logic circuits, integrated circuits, and/or combinations of these. Embodiments of the DC/DC converter assembly 34600 and/or any components thereof may include sensor related to any component and/or connection, such as current sensing, temperature sensing, and/or voltage sensing. The number and position of sensors are not depicted herein to promote clarity of the figures, but it will be understood that any component and/or connection herein may have sensors associated therewith, of whatever type required, to support operations and procedures of the present disclosure. Sensors may include direct measurement (e.g., a current sensor electrically coupled to an interface 34608, 34616, 34618, 34612, 34614), and/or may include modeled, estimated, or virtual sensors providing a sensed value based on other values available in the system (e.g., a current determined in response to a detected voltage, and/or a temperature, resistance/impedance value, etc.).

Figure 77:
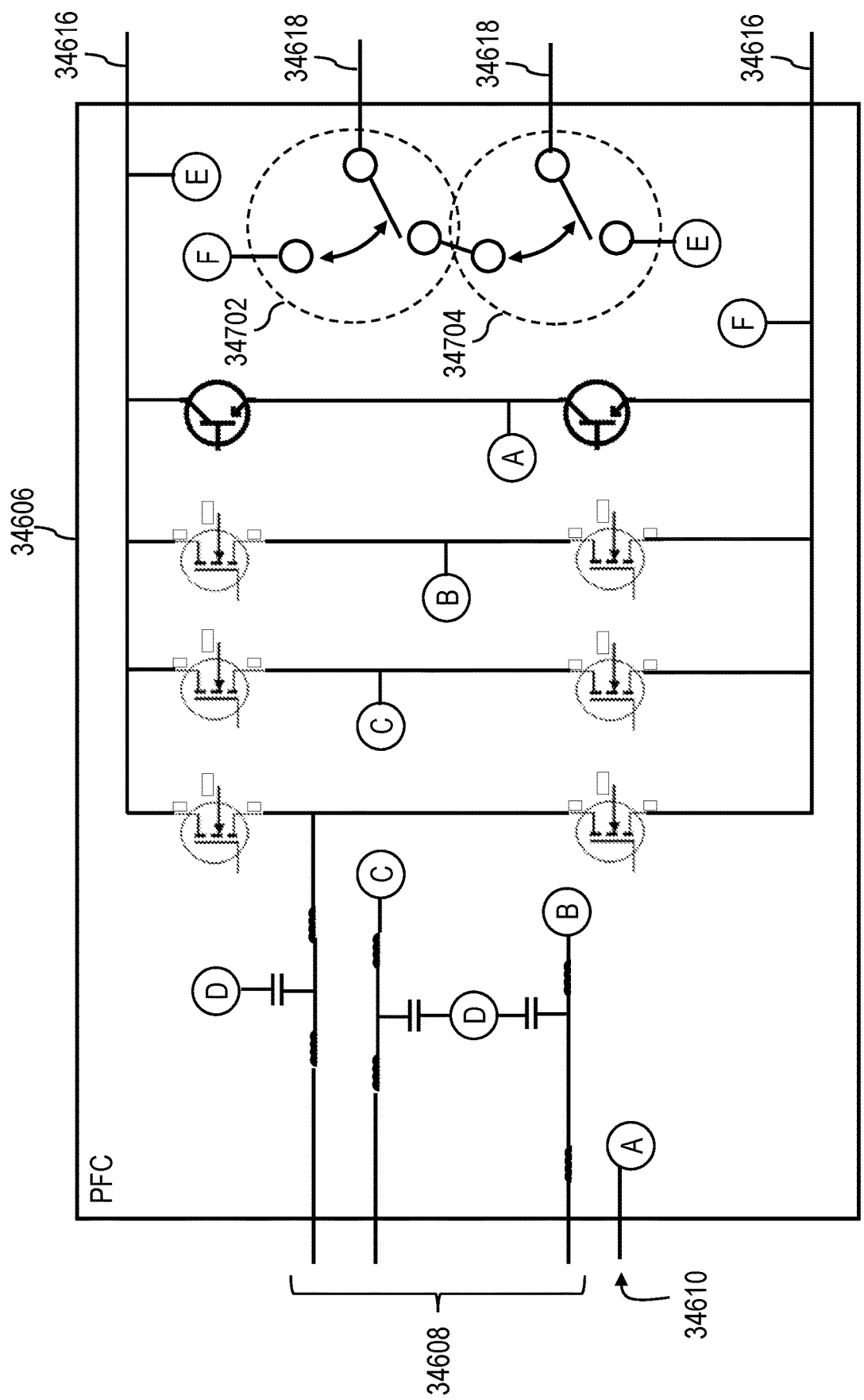
FIG. 77 depicts an example AC portion of a DC/DC converter assembly for a mobile application.

Referencing FIG. 77, a more detailed but schematic depiction of an example AC charging circuit 34606 is provided. The example AC charging circuit 34606 is consistent with the embodiment depicted in FIG. 76, but may be provided for any system of the present disclosure. The example AC charging circuit 34606 includes a first switch 34702 that switches the active winding (e.g., 34622 vs. 34624) of an associated DC charging circuit 34602, 34604. The example of FIG. 77 includes a second switch 34704 that, where present, switches the active winding of the other associated DC charging circuit 34602, 34604. The example of FIG. 77 depicts two switches, each having an associated DC charging circuit, but it will be understood that, in certain embodiments, only some of the DC charging circuits may be switchable, and/or that a given switch 34602, 34604 may be associated with more than one DC charging circuit. The example AC charging circuit 34606 includes a circuit capable to rectify and/or invert a single AC phase, or up to three AC phases, but the number of phases present in a given embodiment is not limited. The arrangement of filtering and/or conditioning elements in the example of FIG. 77 (e.g., inductors and/or capacitors) is not limiting, and a given embodiment may be configured according to the components in the system, the current, voltage, and/or power throughput of the system, and the like. The number and type of transistor elements depicted is not limiting. In certain embodiments, the transistor elements are controllable (e.g., reference FIG. 80), but control connections are not depicted for clarity of the depicted elements.

Figure 78:
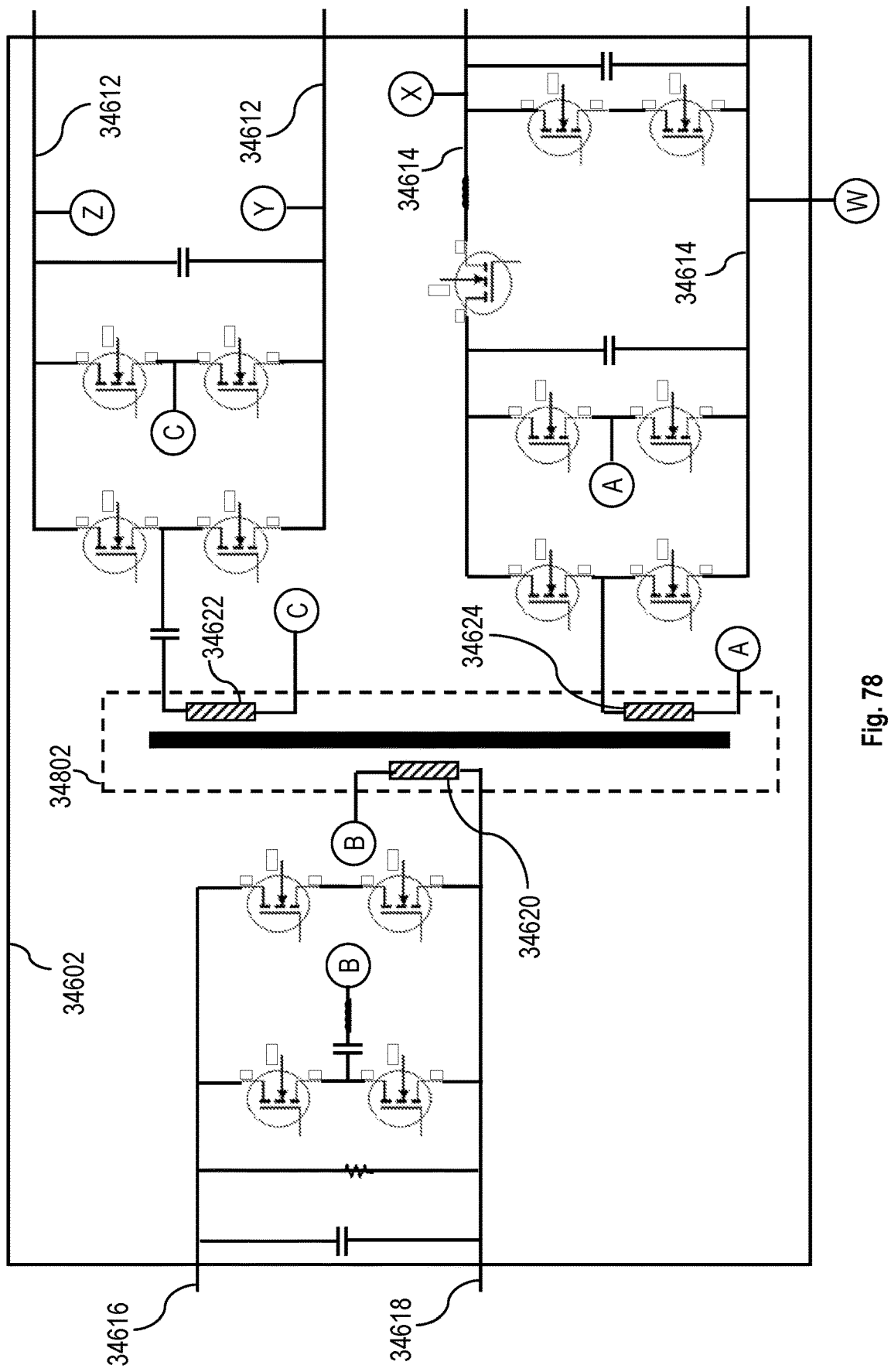
FIG. 78 depicts an example first DC/DC converter portion of a converter assembly for a mobile application.
Figure 79:
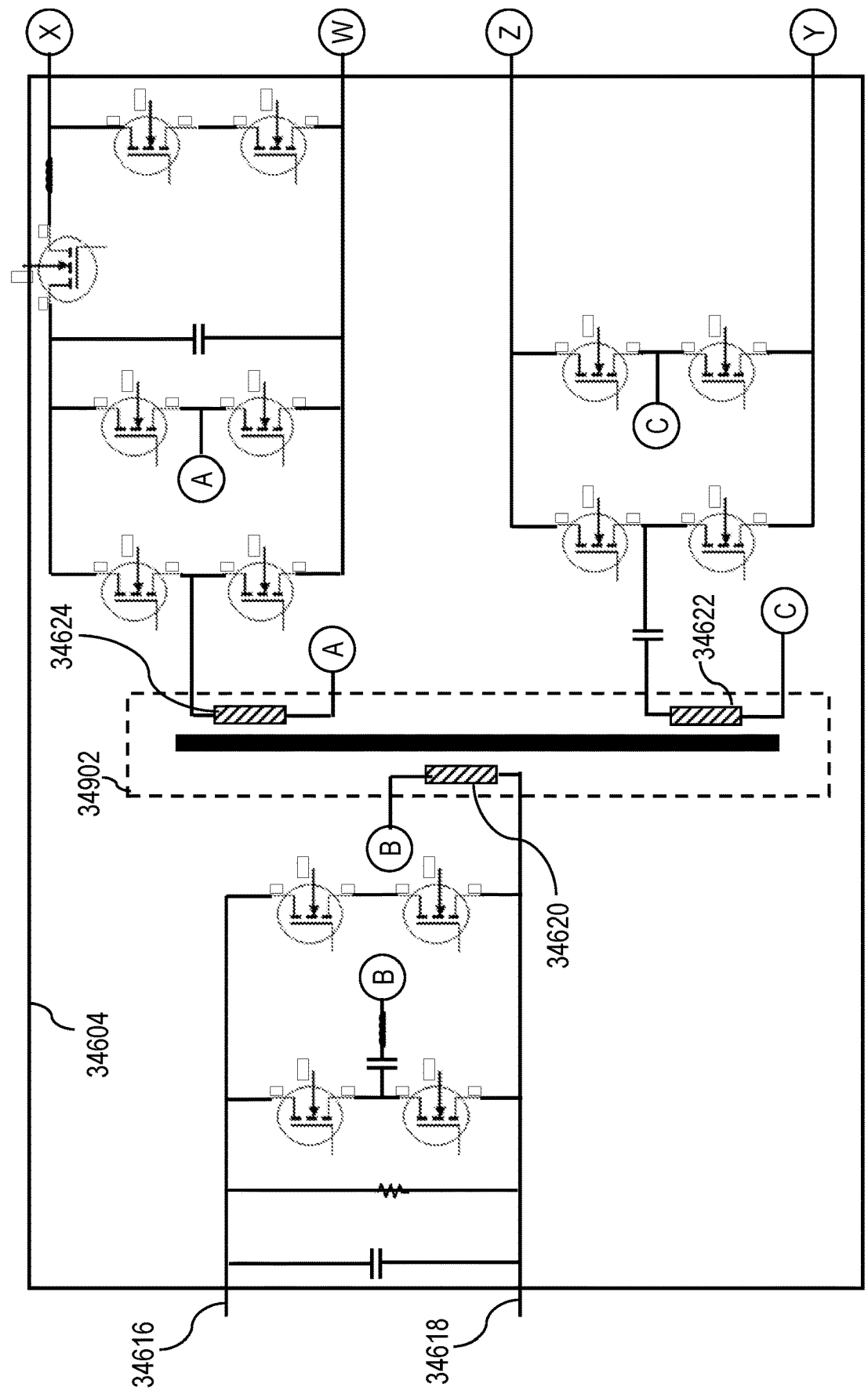
FIG. 79 depicts an example second DC/DC converter portion of a converter assembly for a mobile application.

Referencing FIG. 78, a more detailed but schematic depiction of an example DC charging circuit 34602 is provided. The example DC charging circuit 34602 is consistent with the embodiment depicted in FIG. 76, but may be provided for any system of the present disclosure. The example of FIG. 78 depicts shared magnetic components 34802 between the windings 34622, 34624, and interfaces 34616, 34618, 34612, 34614. The connections W, X, Y, Z couple the depicted elements of DC charging circuit 34602 with DC charging circuit 34604 (reference FIG. 79), but may be omitted, switched, and/or provided externally to the DC charging circuit 34602, for example as described in reference to FIG. 76. The example of FIG. 78 allows for high voltage DC charging and discharging through a first winding 34622, and low voltage DC charging and discharging through a second winding 34624, allowing for configuration of the windings 34622, 34624 in response to the planned voltages, and accordingly improving the conversion efficiency of the DC charging circuit 34602 and associated DC/DC converter assembly 34600. Referencing FIG. 79, a more detailed but schematic depiction of an example second DC charging circuit 34604 is provided. The example second DC charging circuit 34604 differs from the DC charging circuit 34602 in the reversal of the winding positions 34622, 34624, but may also differ in the winding configurations (e.g., tuned for distinct voltages relative to the DC charging circuit 34602, such as when only one of the DC charging circuits 34602, 34604 interfaces with certain voltages, such as the low voltage battery voltage). The example second DC charging circuit 34604 utilizes shared magnetic components 34902 for the windings 34622, 34624.

Figure 80:
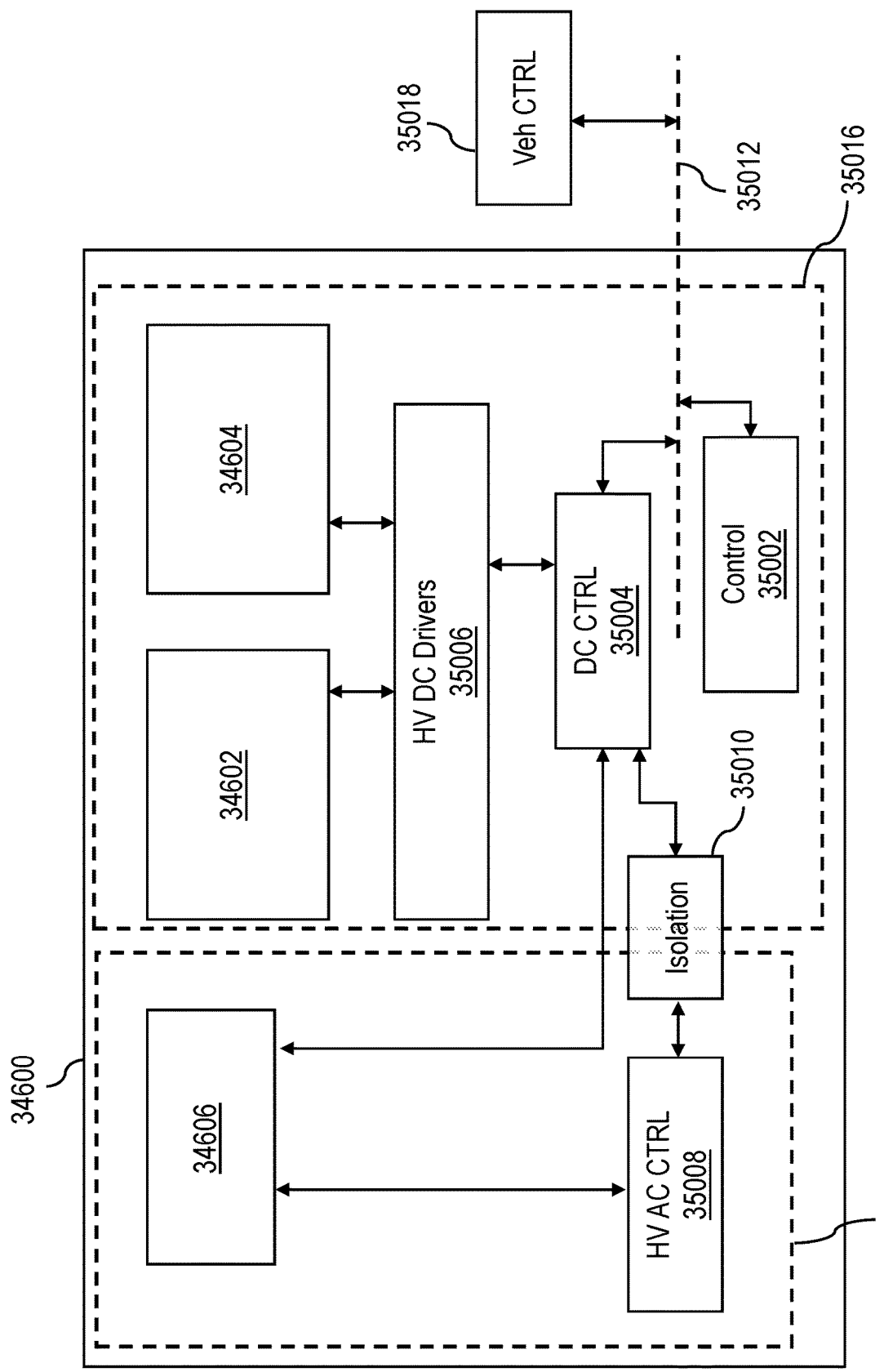
FIG. 80 depicts an example DC/DC converter assembly having DC/DC converter elements with shared magnetics.

Referencing FIG. 80, an example DC/DC converter assembly 34600 includes a schematic block diagram of control elements configured to perform certain operations of the present disclosure. The example of FIG. 80 includes an AC side 35014 (which may be high voltage), and a DC side 35016, which may be low voltage, high voltage, or a combination. The DC side 35016 may be further divided into high voltage and low voltage aspects (not shown). In the example, a DC controller 35004 performs operations for the DC charging circuits 34602, 34604, such as control operations for transistors, switches, or other components thereof. In certain embodiments, the DC controller 35004 further controls DC operations for the AC side 35014, such as control of switches 34702, 34704 or the like. In the example of FIG. 80, the DC controller 35004 communicates with a high voltage AC controller 35008, for example passing command values, electrical signals, or the like, and an isolation component 35010 (which may be a solid state component) protects the DC controller 35004 from high voltages of the AC side 35014. The example of FIG. 80 includes a controller 35002 that performs operations for the DC/DC converter assembly 34600, and may further includes one or more circuits configured to functionally execute operations related to the DC/DC converter assembly 34600. In the example of FIG. 80, the controller 35002 communicates with the DC controller 35004 and/or with external controllers 35018 (a vehicle controller, in the example) utilizing a network 35012 such as a CAN bus. The controller 35002 may additionally or alternatively have direct electrical connections to the DC controller 35004 or other components of the DC/DC converter assembly 34600 or the electric mobile application. In the example of FIG. 80, the DC controller 35004 commands high voltage DC drivers 35006, such as gate drivers or the like, to perform high voltage operations on the DC side 35016. The arrangement of FIG. 80 is for purposes of illustration, and aspects of the DC controller 35004, controller 35002, HV AC controller 35008, or other components, may be combined in whole or part, further subdivided, or the like. In certain embodiments, the DC/DC converter assembly 34600 includes one or more integrating components, such as one or more PCBs, with components mounted on the integrating components, and/or having electrical connections, cooling connections, or the like included in the integrating components. In certain embodiments, the DC/DC converter assembly 34600 may be provided within a single housing, and/or may be distributed in more than one housing, and/or may have portions positioned with other components of the electric mobile application.

Figure 81:
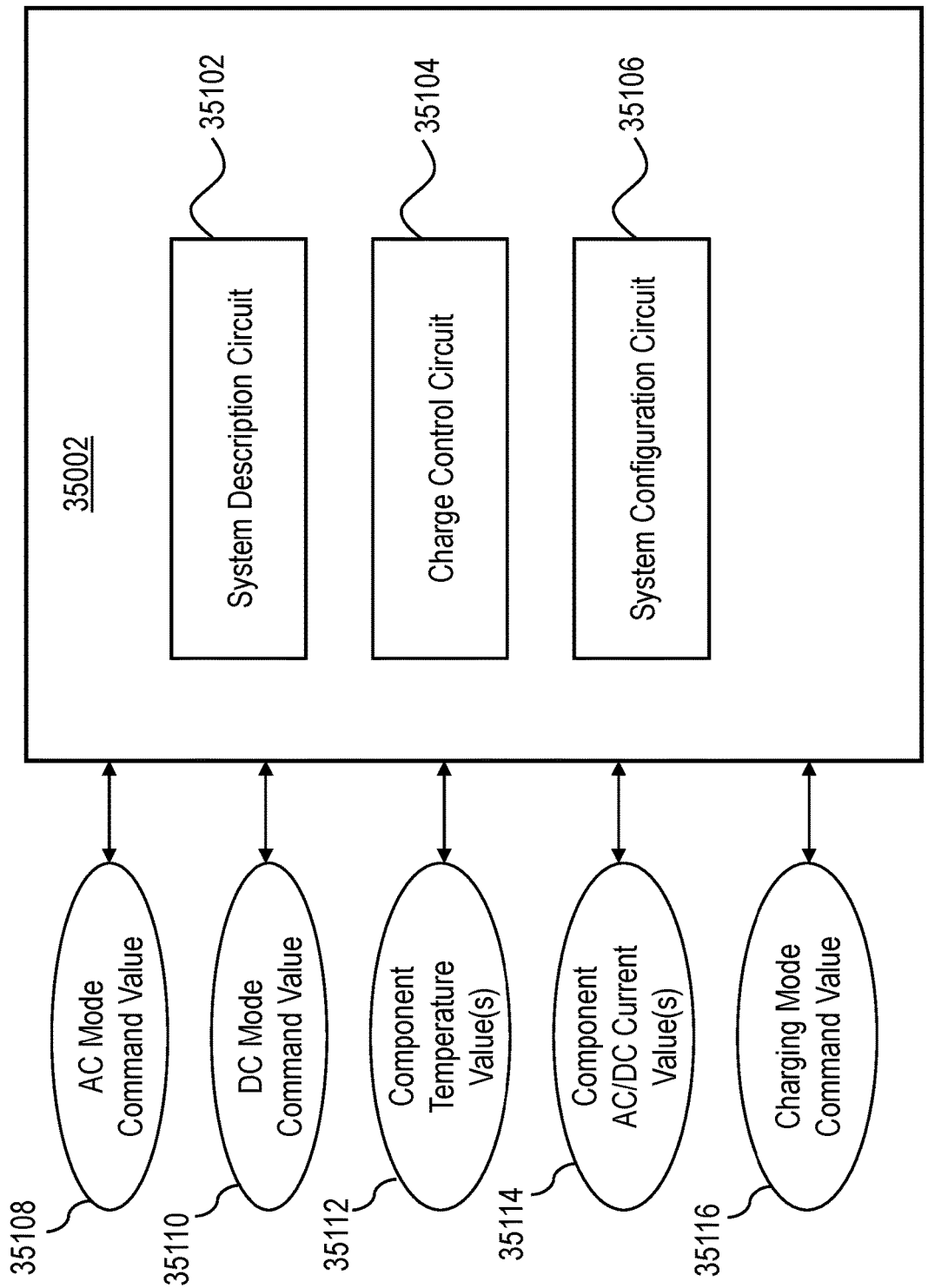
FIG. 81 depicts a schematic block diagram having a controller configured to perform operations for power conversion for a mobile application.

Referencing FIG. 81, an example controller 35002 is depicted having a number of circuits configured to perform certain operations of the DC/DC converter assembly 34600. The example of FIG. 81 depicts the controller 35002 performing operations of the DC/DC converter assembly 34600, but it will be understood that certain operations described, and/or portions or all of the circuits depicted may be positioned in other controllers (e.g., 35008, 35004, and/or 35018) of the DC/DC converter assembly 34600 and/or electric mobile application. The example controller 35002 includes a system description circuit 35102 that interprets system information such as component temperature values 35112, component AC and/or DC current values 35114, or any other information in the system such as: operating conditions (e.g., charging, motive power operations, shutdown, a service condition, etc.); a phase description for the AC charging circuit (e.g., a number of AC phases, parameters of the phases such as amplitude, frequency, and/or phase); fault conditions for one or more components; state-of-charge values for the low voltage battery and/or the high voltage battery; a phase description of the charging station (e.g., prior to and/or after coupling at interface 34608); an electrical current value of any component, interface, and/or the charging station (e.g., an electrical current capacity, and/or a detected or determined electrical current value); a voltage of any component and/or the charging station; and/or a temperature value of any component. In the examples, a value includes any one or more of the nominal time domain value (e.g., a temperature of a gate driver at time X), a rate of change of a value (e.g., a rise rate or fall rate of a voltage, temperature, etc.), a determination of a value relative to a threshold (e.g., whether the value has exceeded a predetermined value, and/or fallen below a predetermined value), and/or combinations of one or more of these.

The example controller 35002 includes a charge control circuit 35104 that determines one or more of an AC mode command value 35108 (e.g., a number of phases and/or configuration of the phases such as amplitudes, frequencies, and/or phase values to be applied by the AC charging circuit), a DC mode command value (e.g., which winding of a DC charging circuit is to be active, switching and/or routing of DC current flow through the DC charging circuit, parallel and/or serial arrangement of DC current flow through the DC charging circuits, etc.), and/or a charging mode command value (e.g., a phase command for the AC charging circuit, positions for switches of the AC charging circuit and/or DC charging circuits, where present). The description of the command values are non-limiting, and a given operation (e.g., a position command for a switch) may be a first type of command value (e.g., a DC mode command value) for a given system and/or operating condition, and a different type of command value (e.g., a charging mode command value) for a different system and/or operating condition.

The example controller 35002 includes a system configuration circuit 35106 that provides the command value(s) to appropriate components of the DC/DC converter assembly 34600, which are responsive to the command values to perform operations such as commanding transistors to implement rectification and/or inverting operations, provide the commanded switch positions, activate the commanded windings, provide the commanded DC current flow operations, or the like. In certain embodiments, commands are provided as communications (e.g., using network 35012) to controllers in communication with the controller 35002, which provide further communications and/or electrical signals to implement the commands, and/or commands may be provided as direct electrical signals to components (e.g., system configuration circuit 35106 provides an electrical output that directly interacts with an actuator performing the instructed operation).

An example system configuration circuit 35106 communicates a phase command to the AC charging circuit, where the AC charging circuit selects between a single phase rectification or a three-phase rectification in response to the phase command for the AC charging circuit. An example system description circuit 35102 interprets an electrical current value of the charging station, the charge control circuit 35104 determines a charging mode command value including selected positions for the first switch 34702 and/or second switch 34704 in response to the electrical current value, and the system configuration circuit communicates the charging mode command value to the first and/or second switch in response to the electrical current value of the charging station. For example, the controller 35002 thereby divides the current between the DC charging circuits in response to a high value of the electrical current of the charging station, and/or provides for a single one of the DC charging circuits to manage the entire electrical current of the charging station, allowing for the other one of the DC charging circuits to cool down, preserve component life, and/or perform other operations such as charging the low voltage battery from the high voltage battery.

An example system description circuit 35102 interprets a voltage of the low voltage battery, the charge control circuit 35104 determines the charging mode command value including a selected position for the switch in response to the voltage of the low voltage battery, and a system configuration circuit 35106 communicates the selected position to the switch. For example, the controller 35002 thereby allows for charging of the low voltage battery during charging operations from the charging station, allows for charging of the low voltage battery from the high voltage battery, and/or allows both DC charging circuits to participate in charging operations (e.g., allowing for charging to occur at a higher current, higher voltage, and/or higher power throughput rate) when the low voltage battery has sufficient voltage.

An example system description circuit 35102 interprets a voltage value of the charging station, the charge control circuit 35104 determines a charging mode command value including selected positions for the first switch 34702 and/or the second switch 34704 in response to the voltage value of the charging station, and the system configuration circuit communicates the charging mode command value to the first and/or second switch. The controller 35002 thereby utilizes both DC charging circuits for appropriate charging operations (e.g., where the voltage value of the charging station exceeds a threshold), configures the DC charging circuits to operate in a series and/or a parallel configuration (e.g., where the voltage value of the charging station allows for parallel operation and potentially a higher current output), and/or allows one or the other of the DC charging circuits to cool down, preserve component life, and/or perform other operations during charging when not needed.

An example system description circuit 35102 interprets a temperature value of a component of the configurable charging circuit (e.g., a winding, a gate driver, a transistor, a battery, etc.), the charge control circuit determines selected positions for the first switch 34702 and/or the second switch 34704 in response to the temperature value, and the system configuration circuit provides the selected positions to the first and/or second switch. The controller 35002 thereby utilizes one or more DC charging circuits to increase a charging rate (e.g., utilizing both DC charge circuits in parallel to allow a higher current charging operation), to reduce a charging rate (e.g., to allow a high temperature component to cool, to preserve battery life, etc.), or the like.

Figure 82:
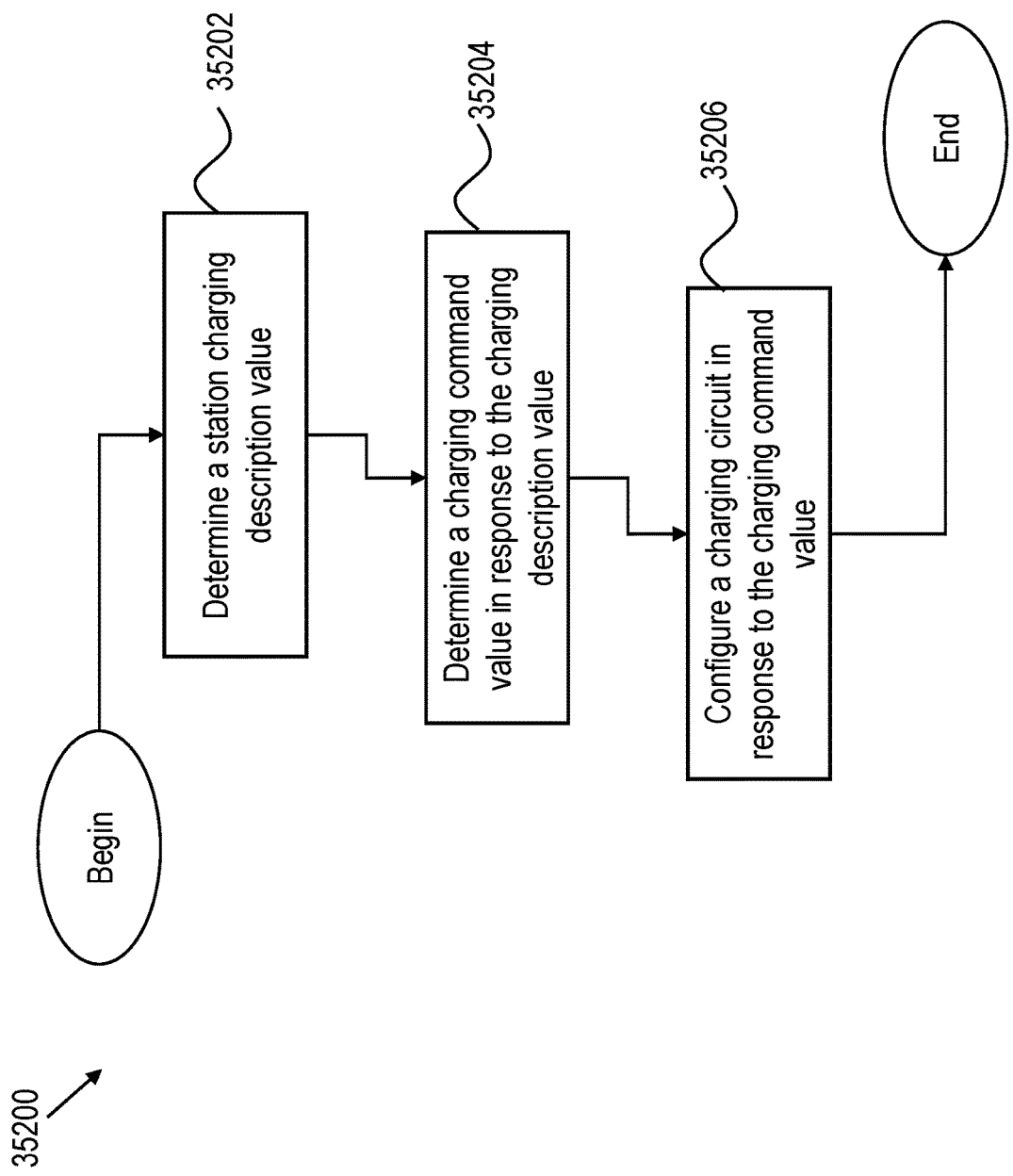
FIG. 82 is a schematic flow diagram depicting a procedure for configuring a charging circuit for a mobile application.
Figure 83:
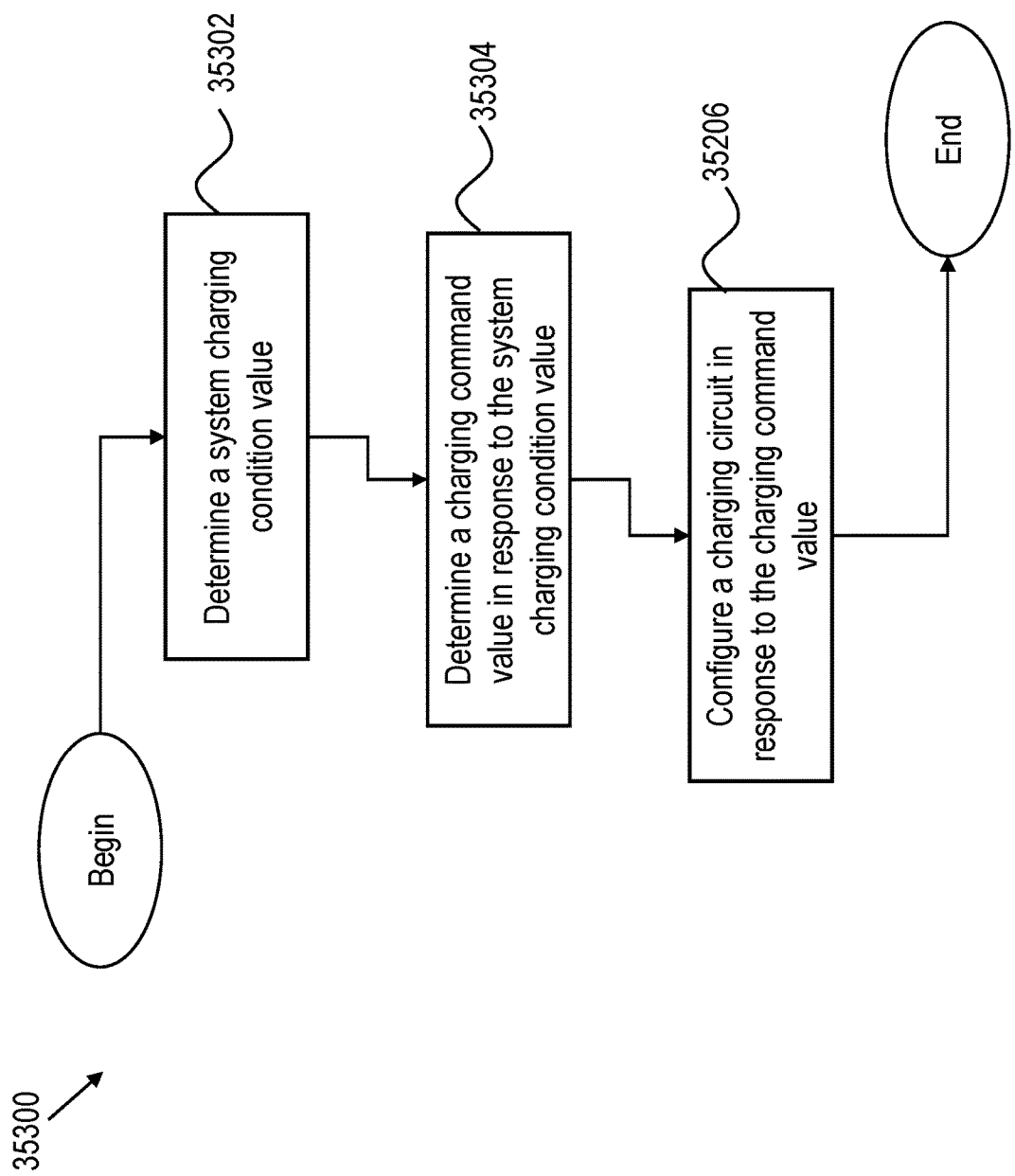
FIG. 83 is a schematic flow diagram depicting a procedure for configuring a charging circuit for a mobile application.
Figure 84:
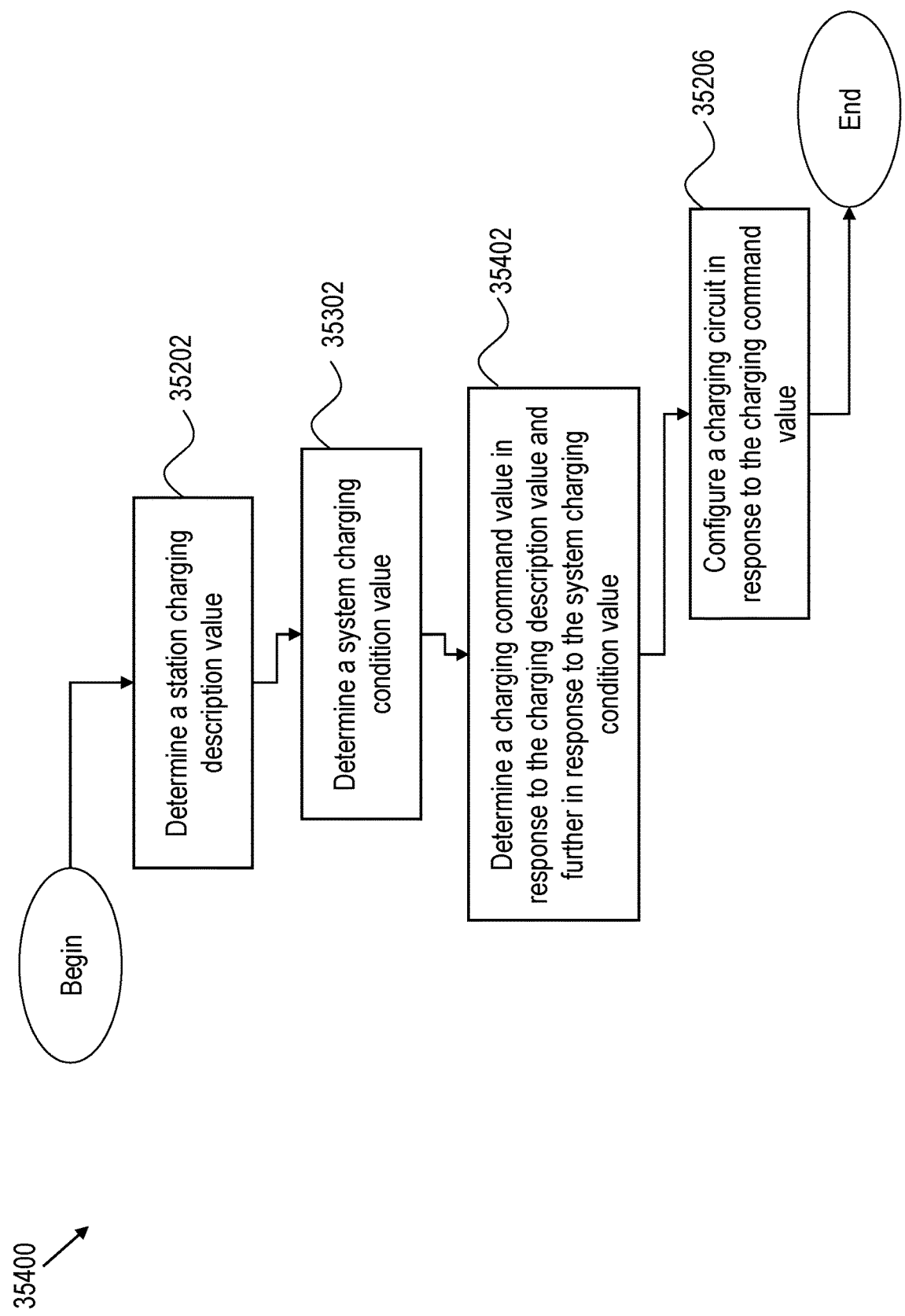
FIG. 84 is a schematic flow diagram depicting a procedure for configuring a charging circuit for a mobile application.

Referencing FIG. 82, a schematic flow diagram of a procedure 35200 to configure a charging circuit includes an operation 35202 to determine a station charging description value (e.g., charging station voltage, current, power throughput, and/or a phase description), an operation 35204 to determine a charging command value in response to the charging description value (e.g., DC charging circuit configurations such as series, parallel, and/or active/inactive DC charging circuits; active windings of the DC charging circuits; charge targets such as high voltage and/or low voltage batteries; and/or AC charging circuit configurations such as phase configurations, rectification parameters, etc.). Referencing FIG. 83, a procedure 35300 includes an operation 35302 to determine a system charging condition value (e.g., a battery voltage, a temperature of a component, an operating condition of the electric mobile application, a fault condition of a component of the electric mobile application and/or the DC/DC converter assembly 34600, etc.), an operation 35304 to determine a charging command value in response to the system charging condition value, and an operation 35206 to configure the charging circuit in response to the charging command value. Referencing FIG. 84, an example procedure 35400 includes an operation 35202 to determine a station charging description value, an operation 35302 to determine a system charging condition value, and an operation 35402 to determine a charging command value in response to the station charging description value and further in response to the system charging condition value. The procedure 35400 further includes an operation 35206 to configure a charging circuit in response to the charging command value.

Figure 85:
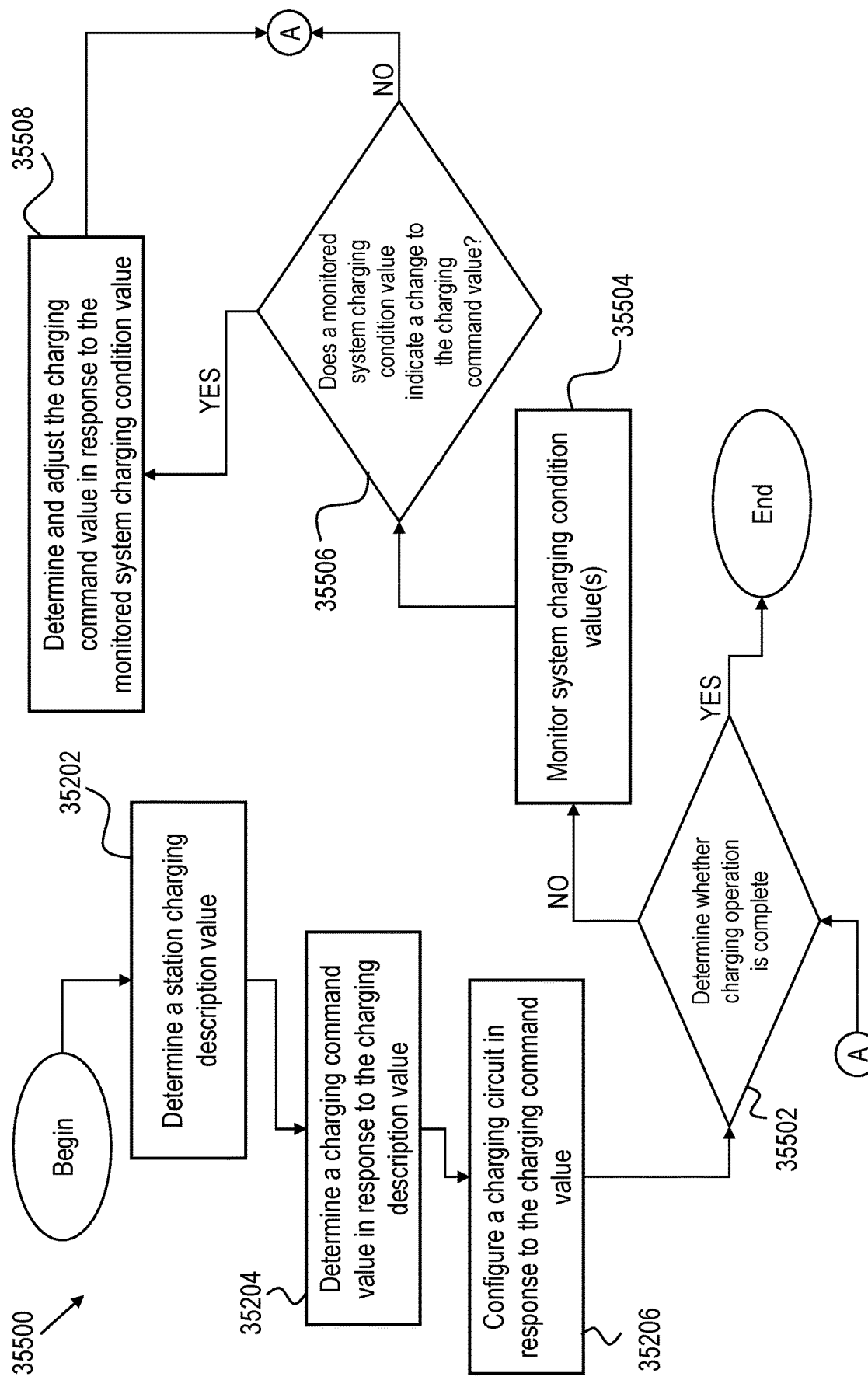
FIG. 85 is a schematic flow diagram depicting a procedure for monitoring and adjusting a charging circuit for a mobile application.

Referencing FIG. 85, an example procedure 35500 for configuring a charging circuit, monitoring system charging condition values during charging operations, and adjusting a configuration of the charging circuit during charging operations is depicted. The example procedure 35500 includes an operation 35202 to determine a station charging description value, an operation 35204 to determine a charging command value in response to the charging description value, and an operation 35206 to configure a charging circuit in response to the charging command value. The example procedure 35500 further includes an operation 35502 to determine whether the charging operation is complete. In response to operation 35502 determining NO, the procedure includes an operation 35504 to monitor system charging condition value(s), and an operation 35506 to determine whether the monitored system charging condition values indicate a change to the charging command value (e.g., a low voltage battery is now charged, a temperature of a component has exceeded a threshold value, a temperature of a component has fallen below a threshold value, etc.). In response to the operation 35506 determining YES, the procedure includes an operation 35508 to determine and adjust the charging command value in response to the monitored system charging condition value (e.g., provide relief to an overtemperature component, utilize a now available DC charging circuit, stop utilizing a no longer available DC charging circuit, etc.), and continues at operation 35502 to determine whether the charging operation is complete.

It can be seen that the systems, assemblies, procedures, controllers, and circuits herein provide for numerous benefits for electric mobile applications having a charging interface and DC/DC conversion components. Example embodiments provide for the ability to utilize higher charge rates while protecting components of the system, and utilizing high efficiency operations for charging lower power components such as a low voltage battery. Example embodiments allow for real-time response to accommodate higher charging current values and/or higher charging voltage values. Example embodiments allow for real-time, scheduled, and/or auto-detection of charging station voltage and/or current parameters and configuration of a charging circuit to accommodate the charging station voltage and/or current parameters. Embodiments allow for real-time, scheduled, and/or auto-detection of phase description information for a charging station, and configuration of a charging circuit to accommodate the charging station phase description information. Embodiments allow for continuation of high voltage/high power charging operations while simultaneously charging low voltage/low power components, either using a high voltage on-board component (e.g., a high voltage battery) or power from the high voltage/high power charging source. Embodiments allow for bi-directional power flow through a DC/DC converter assembly 34600, accepting charging power from a power source, and/or providing power to an external load. Example embodiments provide for a reduced assembly cost and/or footprint, while providing for multiple charging configurations to improve charging parameter (e.g., voltage, current, and/or power) turndown ratios.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A system, comprising:
an electric mobile application comprising a configurable charging circuit, the configurable charging circuit comprising:
   an alternating current (AC) charging circuit couplable to a charging station on a first side of the AC charging circuit;
   a first direct current (DC) charging circuit selectively couplable to a high voltage battery of the electric mobile application on a first side of the DC charging circuit; and
   a first switch included in the AC charging circuit, wherein the first switch provides selective coupling between the AC charging circuit on a second side of the AC charging circuit and the first DC charging circuit on a second side of the first DC charging circuit, wherein the first switch in a first position couples the AC charging circuit to the first DC charging circuit, and wherein the first switch in a second position disconnects the AC charging circuit from the first DC charging circuit, the DC charging circuit including a first inductive coupling arrangement and a second inductive coupling arrangement;
   a second DC charging circuit selectively couplable to the high voltage battery and
   a second switch included in the AC charging circuit, wherein the second switch in a first position couples the AC charging circuit to the second DC charging circuit, and wherein the second switch in a second position disconnects the AC charging circuit from the second DC charging circuit, the DC charging circuit including a third inductive coupling arrangement and a fourth inductive coupling arrangement.

2. The system of claim 1, wherein the first switch in the first position couples the AC charging circuit to a high voltage battery of the electric mobile application and to a low voltage battery of the electric mobile application, and wherein the switch in the second position disconnects the AC charging circuit from the high voltage battery and the low voltage battery of the electric mobile application.

3. The system of claim 1, wherein the first inductive coupling arrangement comprises a first winding arrangement sized in response to a voltage of a low voltage battery of the electric mobile application, and wherein the second inductive coupling arrangement comprises a second winding arrangement sized in response to a voltage of a high voltage battery of the electric mobile application.

4. The system of claim 1, further comprising: a controller, comprising:
   a system description circuit structured to interpret a phase description of the charging station;
   a charge control circuit structured to determine a charging mode command value comprising a phase command for the AC charging circuit;
   a system configuration circuit structured to communicate the phase command to the AC charging circuit; and
   wherein the AC charging circuit is configured to select between a single phase rectification or a three-phase rectification in response to the phase command for the AC charging circuit.

5. The system of claim 1, further comprising:
a controller, comprising:
   a system description circuit structured to interpret an electrical current value of the charging station;
   a charge control circuit structured to determine a charging mode command value comprising selected positions for at least one of the first switch or the second switch in response to the electrical current value of the charging station;
   a system configuration circuit structured to communicate the charging mode command value to the at least one of the first switch or the second switch; and
   wherein the at least one of the first switch or the second switch is responsive to the charging mode command value.

6. The system of claim 5, wherein the charge control circuit determines the selected positions for the first switch and the second switch to couple the DC charging circuit and the second DC charging circuit to the high voltage battery in a parallel arrangement in response to the electrical current value of the charging station exceeding a threshold value.

7. The system of claim 6, wherein the system description circuit is further structured to interpret a temperature value of the component of the configurable charging circuit, and wherein the charge control circuit is further structured to determine the selected positions for the first switch and the second switch to couple the DC charging circuit and the second DC charging circuit to the high voltage battery in the parallel arrangement in response to the temperature value of the component of the configurable charging circuit being below a threshold value.

8. The system of claim 1, further comprising:
wherein the second inductive coupling arrangement electrically couples the DC charging circuit to a low voltage battery of the electric mobile application;
a controller, comprising:
   a system description circuit structured to interpret a voltage of the low voltage battery;
   a charge control circuit structured to determine a charging mode command value comprising a selected position for the switch in response to the voltage of the low voltage battery;

a system configuration circuit structured to communicate the selected position to the switch; and wherein the switch or the second switch is responsive to the selected position.

9. The system of claim 1, further comprising:
a controller, comprising:
 a system description circuit structured to interpret a voltage value of the charging station;
 a charge control circuit structured to determine a charging mode command value comprising selected positions for at least one of the first switch or the second switch in response to the voltage value of the charging station;
 a system configuration circuit structured to communicate the charging mode command value to the at least one of the first switch or the second switch; and
 wherein the at least one of the switch or the second switch is responsive to the charging mode command value.

10. The system of claim 9, wherein the charge control circuit determines the selected positions for the first switch and the second switch to couple the DC charging circuit and the second DC charging circuit to the high voltage battery in a series arrangement in response to the voltage value of the charging station exceeding a threshold value.

11. The system of claim 1, wherein the alternating current (AC) charging circuit is couplable to the charging station on the first side of the AC charging circuit with an electrical coupling including three phase couplings and a neutral coupling.

12. A method, comprising:
 determining a station charging description value for a charging station coupled to a mobile electric application;
 determining a charging command value in response to the charging description value; and
 configuring a charging circuit in response to the charging command value,
 wherein determining the charging command value comprises determining an alternating current (AC) charging circuit switch configuration to provide a selected coupling configuration of two distinct direct current (DC) charging circuits, wherein the selected coupling configuration comprises one of: a serial configuration, a parallel configuration, and a split configuration comprising one of the two distinct DC charging circuits coupled to the charging station and the other one of the two distinct DC charging circuits decoupled from the charging station,
 wherein the AC charging circuit switch configuration includes a first switch positioned in either a first position or a second position and a second switch positioned in either a first position or a second position, and
 wherein configuring the charging circuit in response to the charging command value comprises providing at least a portion of a charging current from the charging station through a first routing or a second routing of a first direct current (DC) charging circuit of the two distinct charging circuits and/or to a first routing or a second routing of a second direct current charging circuit of the two distinct charging circuits, wherein the first routing comprises a first inductive component coupled to a second inductive component across a magnetic component, and wherein the second routing comprises the first inductive component coupled to a third inductive component across the magnetic component.

13. The method of claim 12, wherein determining the station charging description value comprises performing at least one operation selected from the operations consisting of:
 determining a voltage provided by the charging station;
 determining a phase configuration of the charging station;
 determining a current capacity of the charging station; and
 determining a power output of the charging station.

14. The method of claim 12, wherein determining the charging command value comprises performing at least one operation selected from the operations consisting of:
 determining an alternating current (AC) charging circuit switch configuration for a switch providing selective coupling between the AC charging circuit and at least one of two distinct direct current (DC) charging circuits;
 determining an alternating current (AC) charging circuit rectification configuration as one of a single phase rectification or a three-phase rectification; and
 determining a direct current (DC) charging circuit switch configuration, wherein the station charging description value comprises a voltage provided by the charging station, and further determining the DC charging circuit switch configuration in response to the voltage provided by the charging station.

15. The method of claim 12, wherein configuring the charging circuit in response to the charging command value comprises performing at least one operation selected from the operations consisting of:
 dividing a charging current between two distinct direct current (DC) charging circuits in a parallel arrangement;
 providing a charging current to two distinct direct current (DC) charging circuits in a series arrangement;
 providing a first charging current from the charging station to a high voltage battery of the mobile electric application, and a second charging current from the charging station to a low voltage battery of the mobile electric application;
 providing a first charging current from the charging station to a high voltage battery of the mobile electric application, and a second charging current from the high voltage battery of the mobile electric application to a low voltage battery of the mobile electric application; and
 configuring an alternating current (AC) charging circuit to rectify a selected one of a single phase charging current or a three-phase charging current from the charging station.

16. The method of claim 12, further comprising determining a system charging condition value, and determining the charging command value further in response to the system charging condition value.

17. The method of claim 16, wherein determining the system charging condition value comprises performing at least one operation selected from the operations consisting of:
 determining a temperature of a component of an alternating current (AC) charging circuit of the mobile electric application;
 determining a temperature of a component of a direct current (DC) charging circuit of the mobile electric application;
 determining a state-of-charge of a low voltage battery of the mobile electric application;
 determining a state-of-charge of a high voltage battery of the mobile electric application;

determining a temperature of a low voltage battery of the mobile electric application; and determining a temperature of a high voltage battery of the mobile electric application.

* * * * *